US008687777B1

(12) United States Patent
Lavian et al.

(10) Patent No.: US 8,687,777 B1
(45) Date of Patent: *Apr. 1, 2014

(54) SYSTEMS AND METHODS FOR VISUAL PRESENTATION AND SELECTION OF IVR MENU

(76) Inventors: Tal Lavian, Sunnyvale, CA (US); Zvi Or-Bach, San Jose, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/276,307

(22) Filed: Oct. 18, 2011

Related U.S. Application Data

(63) Continuation-in-part of application No. 12/699,618, filed on Feb. 3, 2010, and a continuation-in-part of application No. 12/707,714, filed on Feb. 18, 2010, and (Continued)

(51) Int. Cl.
*H04M 11/00* (2006.01)
(52) U.S. Cl.
USPC .................................. 379/88.18; 704/270.1
(58) Field of Classification Search
USPC ................... 379/93.17, 93.25, 93.26
See application file for complete search history.

(56) References Cited

U.S. PATENT DOCUMENTS

| 4,653,045 A | 3/1987 | Stanley et al. |
| 4,736,405 A | 4/1988 | Akiyama |

(Continued)

FOREIGN PATENT DOCUMENTS

| EP | 1225754 A3 | 7/2003 |
| EP | 1001597 A3 | 9/2003 |

(Continued)

OTHER PUBLICATIONS

Yin, M. and Zhai, S., "The Benefits of Augmenting Telephone Voice Menu Navigation with Visual Browsing and Search," CHI'06 Proceedings of the SIGCHI conference on Human Factors in computing systems: pp. 319-328, ACM, Montreal, Canada (Apr. 2006).

(Continued)

*Primary Examiner* — Maria El-Zoobi

(57) ABSTRACT

Embodiments of the invention provide a system for generating an Interactive Voice Response (IVR) database, the system comprising a processor and a memory coupled to the processor. The memory comprising a list of telephone numbers associated with one or more destinations implementing IVR menus, wherein the one or more destinations are grouped based on a plurality of categories of the IVR menus. Further the memory includes instructions executable by said processor for automatically communicating with the one of more destinations, and receiving at least one customization record from said at least one destination to store in the IVR database. Further, a corresponding method for generating an Interactive Voice Response (IVR) database is also provided.

20 Claims, 110 Drawing Sheets

Related U.S. Application Data

(63) a continuation-in-part of application No. 12/719,001, filed on Mar. 7, 2010, and a continuation-in-part of application No. 13/022,883, filed on Feb. 8, 2011, which is a continuation-in-part of application No. 12/699,618, filed on Feb. 3, 2010, application No. 13/276,307, which is a continuation-in-part of application No. 13/022,851, filed on Feb. 8, 2011, now abandoned, which is a continuation-in-part of application No. 12/699,618, filed on Feb. 3, 2010, application No. 13/276,307, which is a continuation-in-part of application No. 13/022,768, filed on Feb. 8, 2011, now Pat. No. 8,537,989, which is a continuation-in-part of application No. 12/699,618, filed on Feb. 3, 2010, application No. 13/276,307, which is a continuation-in-part of application No. 13/022,869, filed on Feb. 8, 2011, now Pat. No. 8,548,135, which is a continuation-in-part of application No. 12/699,618, filed on Feb. 3, 2010, application No. 13/276,307, which is a continuation-in-part of application No. 13/022,909, filed on Feb. 8, 2011, now Pat. No. 8,553,859, which is a continuation-in-part of application No. 12/699,618, filed on Feb. 3, 2010, application No. 13/276,307, which is a continuation-in-part of application No. 13/046,532, filed on Mar. 11, 2011, now Pat. No. 8,548,131, which is a continuation-in-part of application No. 12/699,618, filed on Feb. 3, 2010, application No. 13/276,307, which is a continuation-in-part of application No. 13/113,825, filed on May 23, 2011, now Pat. No. 8,572,303, which is a continuation-in-part of application No. 12/699,618, filed on Feb. 3, 2010, application No. 13/276,307, which is a continuation-in-part of application No. 13/159,053, filed on Jun. 13, 2011, which is a continuation-in-part of application No. 12/699,618, filed on Feb. 3, 2010, application No. 13/276,307, which is a continuation-in-part of application No. 13/185,027, filed on Jul. 18, 2011, now Pat. No. 8,406,388, which is a continuation-in-part of application No. 12/699,618, filed on Feb. 3, 2010, application No. 13/276,307, which is a continuation-in-part of application No. 13/186,984, filed on Jul. 20, 2011, which is a continuation-in-part of application No. 12/699,618, filed on Feb. 3, 2010.

(56) References Cited

U.S. PATENT DOCUMENTS

| | | | |
|---|---|---|---|
| 4,897,866 | A | 1/1990 | Majmudar et al. |
| 5,006,987 | A | 4/1991 | Harless |
| 5,007,429 | A | 4/1991 | Treatch et al. |
| 5,027,400 | A | 6/1991 | Baji et al. |
| 5,086,385 | A | 2/1992 | Launey et al. |
| 5,144,548 | A | 9/1992 | Salandro |
| 5,265,014 | A | 11/1993 | Haddock et al. |
| 5,294,229 | A | 3/1994 | Hartzell et al. |
| 5,335,276 | A | 8/1994 | Thompson et al. |
| 5,416,831 | A | 5/1995 | Chewning, III et al. |
| 5,417,575 | A | 5/1995 | McTaggart |
| 5,422,809 | A | 6/1995 | Griffin et al. |
| 5,465,213 | A | 11/1995 | Ross |
| 5,465,401 | A | 11/1995 | Thompson |
| 5,475,399 | A | 12/1995 | Borsuk |
| 5,499,330 | A | 3/1996 | Lucas et al. |
| 5,519,809 | A | 5/1996 | Husseiny et al. |
| 5,533,102 | A | 7/1996 | Robinson et al. |
| 5,550,746 | A | 8/1996 | Jacobs |
| 5,572,581 | A | 11/1996 | Sattar et al. |
| 5,585,858 | A | 12/1996 | Harper et al. |
| 5,586,235 | A | 12/1996 | Kauffman |
| 5,588,044 | A | 12/1996 | Lofgren et al. |
| 5,592,538 | A * | 1/1997 | Kosowsky et al. ......... 379/93.08 |
| 5,606,361 | A | 2/1997 | Davidsohn et al. |
| 5,633,909 | A | 5/1997 | Fitch |
| 5,633,916 | A | 5/1997 | Goldhagen et al. |
| 5,657,221 | A | 8/1997 | Warman et al. |
| 5,689,648 | A | 11/1997 | Diaz et al. |
| 5,724,412 | A | 3/1998 | Srinivasan |
| 5,739,814 | A | 4/1998 | Ohara et al. |
| 5,740,549 | A | 4/1998 | Reilly et al. |
| 5,768,142 | A | 6/1998 | Jacobs |
| 5,790,652 | A | 8/1998 | Gulley et al. |
| 5,794,205 | A | 8/1998 | Walters et al. |
| 5,796,806 | A | 8/1998 | Birckbichler |
| 5,802,283 | A | 9/1998 | Grady et al. |
| 5,802,526 | A | 9/1998 | Fawcett et al. |
| 5,807,336 | A | 9/1998 | Russo et al. |
| 5,819,225 | A | 10/1998 | Eastwood et al. |
| 5,822,404 | A | 10/1998 | Cave |
| 5,822,405 | A | 10/1998 | Astarabadi |
| 5,838,682 | A | 11/1998 | Dekelbaum et al. |
| 5,838,775 | A | 11/1998 | Montalbano |
| 5,867,816 | A | 2/1999 | Nussbaum |
| 5,873,068 | A | 2/1999 | Beaumont et al. |
| 5,885,083 | A | 3/1999 | Ferrell |
| 5,885,245 | A | 3/1999 | Lynch et al. |
| 5,890,123 | A | 3/1999 | Brown et al. |
| 5,892,813 | A | 4/1999 | Morin et al. |
| 5,907,793 | A | 5/1999 | Reams |
| 5,912,952 | A | 6/1999 | Brendzel |
| 5,913,195 | A | 6/1999 | Weeren et al. |
| 5,920,477 | A | 7/1999 | Hoffberg et al. |
| 5,937,040 | A | 8/1999 | Wrede et al. |
| 5,940,488 | A | 8/1999 | DeGrazia et al. |
| 5,948,040 | A | 9/1999 | DeLorme et al. |
| 5,956,034 | A | 9/1999 | Sachs et al. |
| 5,982,875 | A | 11/1999 | Lieben et al. |
| 5,987,103 | A | 11/1999 | Martino |
| 6,009,398 | A | 12/1999 | Mueller et al. |
| 6,014,428 | A | 1/2000 | Wolf |
| 6,020,915 | A | 2/2000 | Bruno et al. |
| 6,049,779 | A | 4/2000 | Berkson |
| 6,055,513 | A | 4/2000 | Katz et al. |
| 6,062,863 | A | 5/2000 | Kirksey et al. |
| 6,088,429 | A | 7/2000 | Garcia |
| 6,088,712 | A | 7/2000 | Huang et al. |
| 6,091,805 | A | 7/2000 | Watson |
| 6,091,956 | A | 7/2000 | Hollenberg |
| 6,104,790 | A | 8/2000 | Narayanaswami |
| 6,144,848 | A | 11/2000 | Walsh et al. |
| 6,148,065 | A | 11/2000 | Katz |
| 6,169,734 | B1 | 1/2001 | Wilson |
| 6,212,547 | B1 | 4/2001 | Ludwig et al. |
| 6,228,921 | B1 | 5/2001 | Kasemann et al. |
| 6,229,694 | B1 | 5/2001 | Kono |
| 6,230,197 | B1 | 5/2001 | Beck et al. |
| 6,259,444 | B1 | 7/2001 | Palmer et al. |
| 6,263,064 | B1 | 7/2001 | O'Neal et al. |
| 6,273,726 | B1 | 8/2001 | Kirksey et al. |
| 6,321,198 | B1 | 11/2001 | Hank et al. |
| 6,335,678 | B1 | 1/2002 | Heutschi |
| 6,366,650 | B1 | 4/2002 | Rhie et al. |
| 6,373,817 | B1 | 4/2002 | Kung et al. |
| 6,400,807 | B1 | 6/2002 | Hewitt et al. |
| 6,405,033 | B1 | 6/2002 | Kennedy, III et al. |
| 6,408,301 | B1 | 6/2002 | Patton et al. |
| 6,427,063 | B1 | 7/2002 | Cook et al. |
| 6,445,694 | B1 | 9/2002 | Swartz |
| 6,449,595 | B1 | 9/2002 | Arslan et al. |
| 6,456,706 | B1 | 9/2002 | Blood et al. |
| 6,460,057 | B1 | 10/2002 | Butler et al. |
| 6,463,145 | B1 | 10/2002 | O'Neal et al. |
| 6,482,156 | B2 | 11/2002 | Iliff |
| 6,505,146 | B1 | 1/2003 | Blackmer |
| 6,510,411 | B1 | 1/2003 | Norton et al. |
| 6,529,500 | B1 | 3/2003 | Pandharipande |

(56) References Cited

U.S. PATENT DOCUMENTS

| | | |
|---|---|---|
| 6,560,320 B1 | 5/2003 | Paleiov et al. |
| 6,603,840 B2 | 8/2003 | Fellingham et al. |
| 6,606,611 B1 | 8/2003 | Khan |
| 6,606,741 B2 | 8/2003 | Kojima et al. |
| 6,636,835 B2 | 10/2003 | Ragsdale et al. |
| 6,653,930 B1 | 11/2003 | Bonomo et al. |
| 6,658,389 B1 | 12/2003 | Alpdemir |
| 6,705,869 B2 | 3/2004 | Schwartz |
| 6,714,519 B2 | 3/2004 | Luzzatti et al. |
| 6,731,625 B1 | 5/2004 | Eastep et al. |
| 6,754,181 B1 | 6/2004 | Elliott et al. |
| 6,788,770 B1 | 9/2004 | Cook et al. |
| 6,791,583 B2 | 9/2004 | Tang et al. |
| 6,816,580 B2 | 11/2004 | Timmins |
| 6,820,037 B2 | 11/2004 | Simon |
| 6,820,062 B1 | 11/2004 | Gupta et al. |
| 6,826,194 B1 | 11/2004 | Vered et al. |
| 6,829,368 B2 | 12/2004 | Meyer et al. |
| 6,856,673 B1 | 2/2005 | Banks et al. |
| 6,862,713 B1 | 3/2005 | Kraft et al. |
| 6,865,268 B1 | 3/2005 | Matthews et al. |
| 6,885,737 B1 | 4/2005 | Gao et al. |
| 6,889,195 B2 | 5/2005 | Strandberg |
| 6,920,205 B2 | 7/2005 | Hahn et al. |
| 6,920,425 B1 | 7/2005 | Will et al. |
| 6,920,431 B2 | 7/2005 | Showghi et al. |
| 6,937,705 B1 | 8/2005 | Godfrey et al. |
| 6,968,506 B2 | 11/2005 | Yacovone et al. |
| 6,990,455 B2 | 1/2006 | Vozick |
| 7,020,609 B2 | 3/2006 | Thrift et al. |
| 7,027,990 B2 | 4/2006 | Sussman |
| 7,036,128 B1 | 4/2006 | Julia et al. |
| 7,039,589 B2 | 5/2006 | Whitham |
| 7,047,196 B2 | 5/2006 | Calderone et al. |
| 7,065,188 B1 | 6/2006 | Mei et al. |
| 7,068,643 B1 | 6/2006 | Hammond |
| 7,092,738 B2 | 8/2006 | Creamer et al. |
| 7,100,118 B1 | 8/2006 | Klask |
| 7,130,391 B2 | 10/2006 | Janakiraman et al. |
| 7,136,480 B2 | 11/2006 | Mason |
| 7,139,591 B2 | 11/2006 | Callaghan et al. |
| 7,145,902 B2 | 12/2006 | Schindler et al. |
| 7,146,321 B2 | 12/2006 | Cyr et al. |
| 7,149,549 B1 | 12/2006 | Ortiz et al. |
| 7,159,008 B1 | 1/2007 | Wies et al. |
| 7,177,814 B2 | 2/2007 | Gong et al. |
| 7,180,889 B1 | 2/2007 | Kung et al. |
| 7,180,985 B2 | 2/2007 | Colson et al. |
| 7,181,401 B2 | 2/2007 | Johnson et al. |
| 7,181,502 B2 | 2/2007 | Incertis |
| 7,188,352 B2 | 3/2007 | Nathan et al. |
| 7,203,517 B2 | 4/2007 | Shimoda et al. |
| 7,206,745 B2 | 4/2007 | Sarukkai et al. |
| 7,206,809 B2 | 4/2007 | Ludwig et al. |
| 7,209,124 B2 | 4/2007 | Hunt et al. |
| 7,213,061 B1 | 5/2007 | Hite et al |
| 7,215,743 B2 | 5/2007 | Creamer et al. |
| 7,216,348 B1 | 5/2007 | deCarmo |
| 7,225,409 B1 | 5/2007 | Schnarel et al. |
| 7,225,455 B2 | 5/2007 | Bennington et al. |
| 7,228,492 B1 | 6/2007 | Graham |
| 7,231,636 B1 | 6/2007 | Evans |
| 7,231,656 B1 | 6/2007 | Nathan |
| 7,240,006 B1 | 7/2007 | Brocious et al. |
| 7,240,289 B2 | 7/2007 | Naughton et al. |
| 7,246,063 B2 | 7/2007 | James et al. |
| 7,248,885 B2 | 7/2007 | Benco et al. |
| 7,250,939 B2 | 7/2007 | Lira |
| 7,254,227 B2 | 8/2007 | Mumick et al. |
| 7,265,861 B1 | 9/2007 | Ranalli et al. |
| 7,266,185 B2 | 9/2007 | Trandal et al. |
| 7,266,186 B1 | 9/2007 | Henderson |
| 7,266,499 B2 | 9/2007 | Surace et al. |
| 7,272,222 B2 | 9/2007 | Joseph et al. |
| 7,272,497 B2 | 9/2007 | Koshiji et al. |
| 7,277,854 B2 | 10/2007 | Bennett et al. |
| 7,280,097 B2 | 10/2007 | Chen et al. |
| 7,280,646 B2 | 10/2007 | Urban et al. |
| 7,280,651 B2 | 10/2007 | Anderson |
| 7,286,990 B1 | 10/2007 | Edmonds et al. |
| 7,289,608 B2 | 10/2007 | Kumhyr |
| 7,289,904 B2 | 10/2007 | Uyeki |
| 7,299,405 B1 | 10/2007 | Lee et al. |
| 7,303,121 B2 | 12/2007 | Martinez |
| 7,319,477 B2 | 1/2008 | Katz |
| 7,324,947 B2 | 1/2008 | Jordan et al. |
| 7,328,239 B1 | 2/2008 | Berberian et al. |
| 7,330,890 B1 | 2/2008 | Partovi et al. |
| 7,353,016 B2 | 4/2008 | Roundtree et al. |
| 7,392,193 B2 | 6/2008 | Mault |
| 7,398,215 B2 | 7/2008 | Mesbah et al. |
| 7,406,413 B2 | 7/2008 | Geppert et al. |
| 7,412,533 B1 | 8/2008 | Johnson et al. |
| 7,433,452 B2 | 10/2008 | Taylor et al. |
| 7,440,898 B1 | 10/2008 | Eberle et al. |
| 7,450,112 B2 | 11/2008 | Shneidman |
| 7,466,803 B2 | 12/2008 | Burg et al. |
| 7,492,883 B2 | 2/2009 | Kumhyr |
| 7,539,484 B2 | 5/2009 | Roundtree |
| 7,546,143 B2 | 6/2009 | Nelson et al. |
| 7,584,249 B2 | 9/2009 | Mumick et al. |
| 7,606,741 B2 | 10/2009 | King et al. |
| 7,646,858 B2 | 1/2010 | Salafia et al. |
| 7,693,720 B2 | 4/2010 | Kennewick et al. |
| 7,720,091 B2 | 5/2010 | Faber et al. |
| 7,729,490 B2 | 6/2010 | Hemm et al. |
| 7,757,173 B2 | 7/2010 | Beaman |
| 7,809,376 B2 | 10/2010 | Letourneau et al. |
| 7,813,485 B2 | 10/2010 | Yin et al. |
| 7,843,899 B2 | 11/2010 | Burritt |
| 7,864,944 B2 | 1/2011 | Khouri et al. |
| 7,908,381 B2 | 3/2011 | Koch et al. |
| 7,966,188 B2 | 6/2011 | Ativanichayaphong et al. |
| 7,996,251 B2* | 8/2011 | Kannan et al. ............... 705/7.13 |
| 8,000,454 B1 | 8/2011 | Or-Bach et al. |
| 8,023,624 B2 | 9/2011 | Kargman et al. |
| 8,054,952 B1 | 11/2011 | Or-Bach et al. |
| 8,155,280 B1 | 4/2012 | Or-Bach et al. |
| 8,160,215 B2 | 4/2012 | Or-Bach et al. |
| 2002/0055844 A1 | 5/2002 | L'Esperance et al. |
| 2002/0147986 A1 | 10/2002 | Michael et al. |
| 2003/0005126 A1 | 1/2003 | Schwartz et al. |
| 2003/0007625 A1 | 1/2003 | Pines et al. |
| 2003/0033382 A1 | 2/2003 | Bogolea et al. |
| 2003/0074198 A1* | 4/2003 | Sussman ..................... 704/270.1 |
| 2003/0112931 A1 | 6/2003 | Brown et al. |
| 2004/0034561 A1 | 2/2004 | Smith |
| 2004/0122941 A1 | 6/2004 | Creamer et al. |
| 2004/0198316 A1 | 10/2004 | Johnson |
| 2004/0204116 A1 | 10/2004 | Ben-Efraim et al. |
| 2005/0004977 A1 | 1/2005 | Roberts et al. |
| 2005/0055310 A1 | 3/2005 | Drewett et al. |
| 2006/0203977 A1 | 9/2006 | Erhart et al. |
| 2006/0239422 A1 | 10/2006 | Rinaldo et al. |
| 2006/0259424 A1 | 11/2006 | Turcotte et al. |
| 2006/0262921 A1 | 11/2006 | Eppel et al. |
| 2006/0285662 A1 | 12/2006 | Yin et al. |
| 2007/0026852 A1 | 2/2007 | Logan et al. |
| 2007/0032247 A1 | 2/2007 | Shaffer et al. |
| 2007/0038513 A1 | 2/2007 | Flax et al. |
| 2007/0094109 A1 | 4/2007 | Perry |
| 2007/0123223 A1* | 5/2007 | Letourneau et al. ........ 455/414.1 |
| 2007/0239537 A1 | 10/2007 | Protheroe et al. |
| 2007/0243887 A1 | 10/2007 | Bandhole et al. |
| 2007/0298776 A1 | 12/2007 | Arlene |
| 2008/0055394 A1* | 3/2008 | Shiue ........................ 348/14.01 |
| 2008/0066015 A1 | 3/2008 | Blankenhorn |
| 2008/0095330 A1 | 4/2008 | Jin et al. |
| 2008/0226042 A1 | 9/2008 | Singh |
| 2008/0250334 A1 | 10/2008 | Price |
| 2009/0041215 A1 | 2/2009 | Schmitt et al. |
| 2009/0099965 A1* | 4/2009 | Grant, IV ........................ 705/41 |
| 2009/0116414 A1 | 5/2009 | Or et al. |
| 2009/0136014 A1 | 5/2009 | Bigue et al. |

(56) References Cited

U.S. PATENT DOCUMENTS

| | | |
|---|---|---|
| 2009/0154666 A1* | 6/2009 | Rios et al. ............... 379/88.18 |
| 2009/0202050 A1 | 8/2009 | Berger et al. |
| 2009/0207980 A1 | 8/2009 | Berger et al. |
| 2009/0207996 A1 | 8/2009 | Berger et al. |
| 2009/0225788 A1 | 9/2009 | Kephart et al. |
| 2009/0228908 A1 | 9/2009 | Margis et al. |
| 2009/0276441 A1 | 11/2009 | Malik |
| 2009/0276708 A1 | 11/2009 | Smith et al. |
| 2009/0280863 A1 | 11/2009 | Shin et al. |
| 2009/0285380 A1 | 11/2009 | Chen et al. |
| 2010/0007028 A1 | 1/2010 | Fachmann et al. |
| 2010/0021030 A1 | 1/2010 | Collins et al. |
| 2010/0049654 A1 | 2/2010 | Pilo et al. |
| 2010/0087175 A1 | 4/2010 | Roundtree |
| 2010/0100377 A1 | 4/2010 | Madhavapeddi et al. |
| 2010/0166158 A1 | 7/2010 | Costello et al. |
| 2010/0172481 A1 | 7/2010 | Canu et al. |
| 2010/0189250 A1 | 7/2010 | Williams et al. |
| 2011/0009096 A1 | 1/2011 | Rotsztein et al. |
| 2011/0014952 A1 | 1/2011 | Minton |
| 2011/0060683 A1 | 3/2011 | Salmon Rock et al. |
| 2011/0091021 A1 | 4/2011 | Adkar et al. |
| 2011/0099116 A1 | 4/2011 | Gabel |
| 2011/0276408 A1 | 11/2011 | Toole |
| 2012/0063574 A1 | 3/2012 | Or-Bach et al. |

FOREIGN PATENT DOCUMENTS

| | | |
|---|---|---|
| EP | 1351477 A1 | 10/2003 |
| EP | 1120954 A3 | 6/2005 |
| EP | 1545101 A3 | 12/2005 |
| EP | 774853 B1 | 5/2006 |
| EP | 1874018 A1 | 1/2008 |
| JP | 2004274425 A | 9/2004 |
| WO | 9819259 A1 | 5/1998 |
| WO | 9820409 A8 | 5/1998 |
| WO | 9840826 A3 | 12/1998 |
| WO | 9856158 A3 | 3/1999 |
| WO | 9848551 A3 | 4/1999 |
| WO | 0131497 A1 | 5/2001 |
| WO | 0157851 A1 | 8/2001 |
| WO | 0165871 A1 | 9/2001 |
| WO | 0217604 A1 | 2/2002 |
| WO | 2004049306 A1 | 6/2004 |
| WO | 2004064299 A3 | 7/2005 |
| WO | 2007012831 A1 | 2/2007 |
| WO | 2007081929 A3 | 1/2008 |
| WO | 2008086320 A1 | 7/2008 |
| WO | 2009006173 A3 | 3/2009 |
| WO | 2009100477 A1 | 8/2009 |

OTHER PUBLICATIONS

Damhuis, M., et al., "A Multimodal Consumer Information Server with IVR Menu," 2nd IEEE Workshop on Interactive Voice Technology for Telecommunications Applications (IVTTA94): pp. 73-76, Kyoto, Japan (Sep. 1994).

Shah, S.AA., et al., "Interactive Voice Response with Pattern Recognition Based on Artificial Neural Network Approach," International Conference on Emerging Technologies: pp. 249-252, (Nov. 2007).

Trihandoyo, A., et al., "A real-time speech recognition architecture for a multi-channel interactive voice response system," International Conference on Acoustics, Speech, and Signal Processing vol. 4: pp. 2687-2690,(1995).

Hattori, S., et al., "A multimedia intelligent message communication system for distributed coordination environments," Electronics & Communications in Japan, Part I—Communications, vol. 76, No. 1, pp. 11-23 (1993).

Patent abstracts of Japan, vol. 097, No. 001, Jan. 31, 1997 & JP 08 242307 A (Canon Inc), Sep. 17, 1996.

Kalva, H., et al., "Delivering Object-Based Audio-Visual Services," IEEE Transactions on Consumer Electronics, vol. 45, No. 4, pp. 1108-1111, (1999).

Schmandt, "Phoneshell: the telephone as computer terminal," Proceedings of first ACM International Conference on Multimedia, Anaheim, CA, US, pp. 373-381, (1993).

Himberg, J., et al., "Time Series Segmentation for Context Recognition in Mobile Devices", IEEE, 203-210, (2001).

Chris Schmandt and Stephen Casner, "Phonetool: Integrating Telephones and Workstations," IEEE Communication Society, Nov. 27-30, pp. 0970-0974, (1989).

Basinger, R. G., et al., "Calling Card Service—Overall Description and Operational Characteristics", The Bell System Technical Journal, (1982).

Cadiz et al. "Designing and Deploying an Information Awareness interface" CSCW'02, Nov. 2002, ACM, pp. 314-323.

Corcoran et al. disclose "User interface technologies for home appliances and networks", IEEE Trans. Consumer Elect.; pp. 679-685, (1998).

Nancy Friedrich, "Graphical-User-Interface Module Eases Integration," Wireless Systems Design, Oct. 2004, 1 page.

Balachandran, R., et al., "Dialog System for Mixed Initiative One-Turn Address entry and Error Recovery," Proceedings of SIGDIAL 2009, the 10th Annual Meeting of the Special Interest Group in Discourse and Dialogue, pp. 152-155, Queen Mary University of London, Association of Computational Logistics, (2009).

* cited by examiner

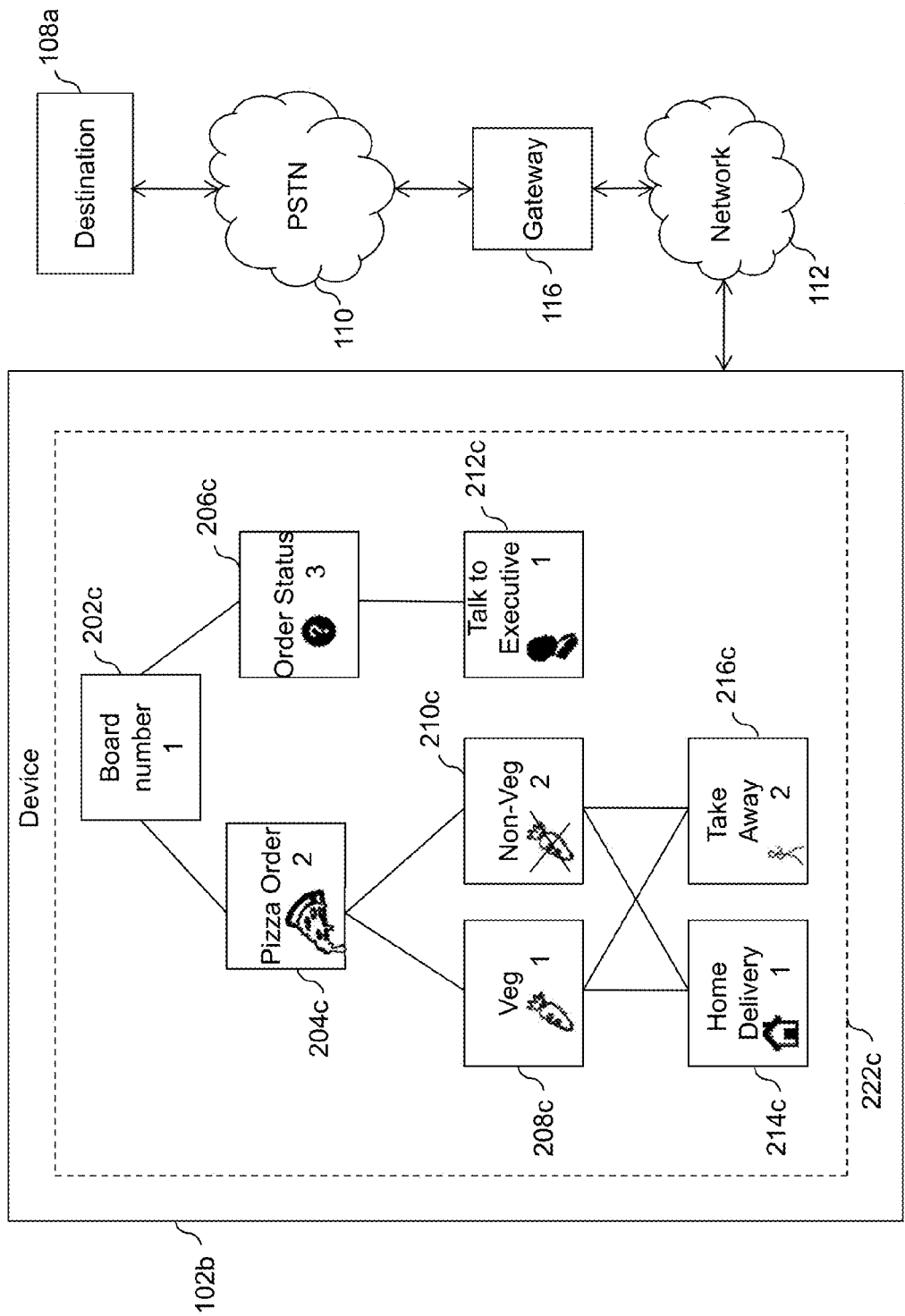

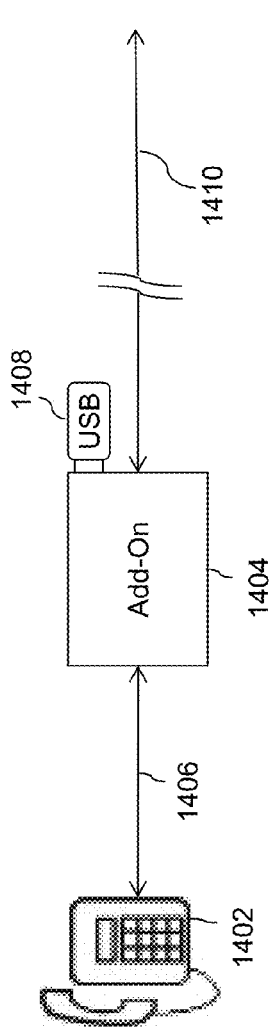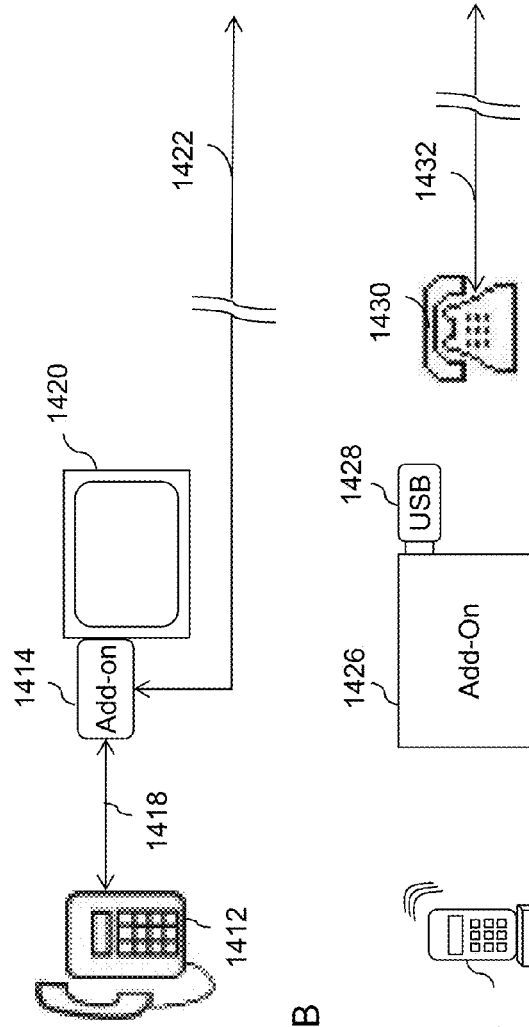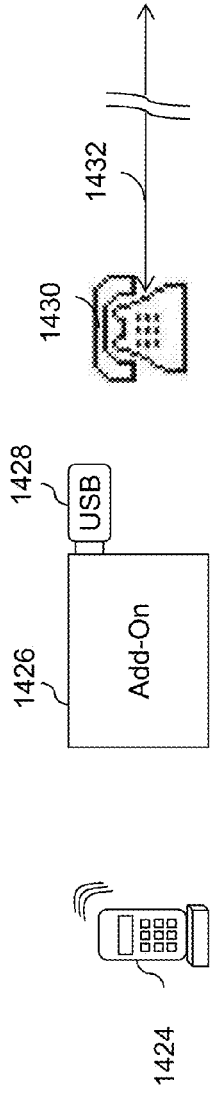
FIG. 14A
FIG. 14B
FIG. 14C

Payment Form for ABC — 2014

2004b — Please enter invoice number:

2006b — Please enter the payment amount

2008b — Please choose your payment card:
● VISA   ○ MasterCard

2010b — Please enter your Credit Card number

2012b — Please enter your Credit Card expiry date

2016 — Submit

FIG.20B

Login Form for XYZ

Please enter login Identity (ID) — 2504b

Please enter password — 2506b

Submit — 2508

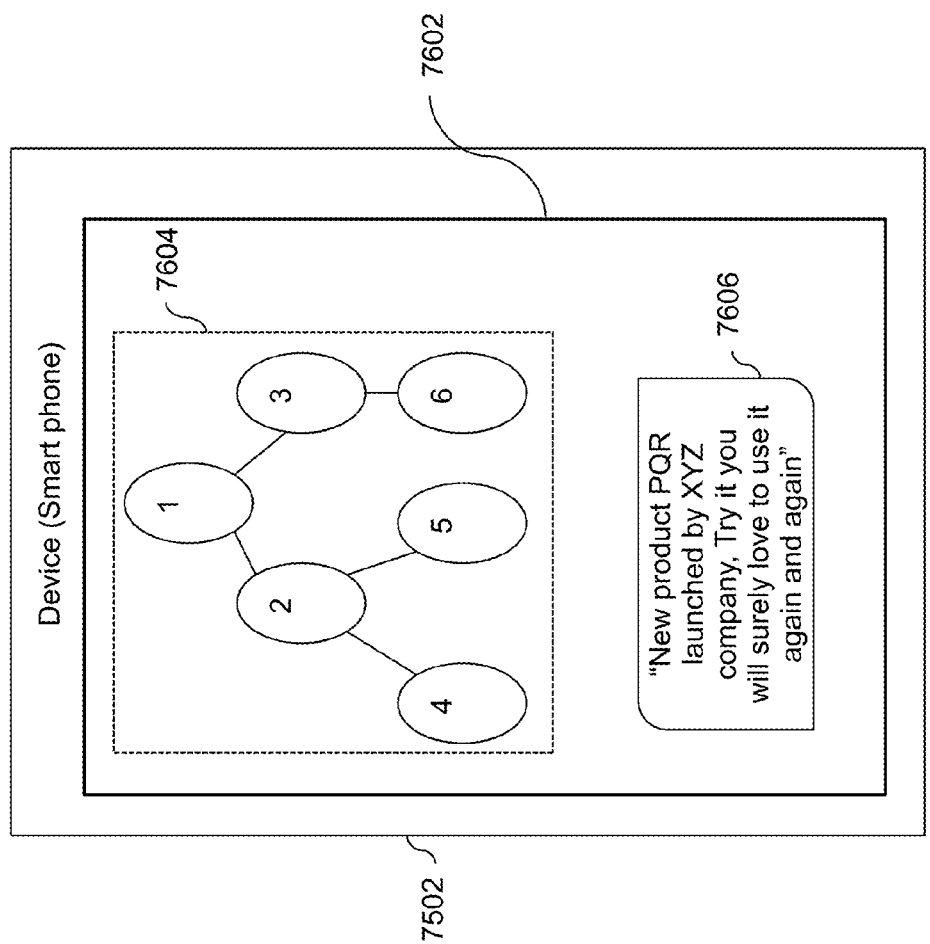

SYSTEMS AND METHODS FOR VISUAL PRESENTATION AND SELECTION OF IVR MENU

CROSS REFERENCE TO RELATED APPLICATIONS

This application is a Continuation-In-Part (CIP) of U.S. Non-Provisional application Ser. No. 12/699,618 entitled 'Systems and methods for visual presentation and selection of IVR menu' and filed on Feb. 3, 2010.

This application is a Continuation-In-Part (CIP) of U.S. Non-Provisional application Ser. No. 12/707,714 entitled 'Systems and methods for visual presentation and selection of IVR menu' and filed on Feb. 18, 2010.

This application is a Continuation-In-Part (CIP) of U.S. Non-Provisional application Ser. No. 12/719,001 entitled 'Systems and methods for visual presentation and selection of IVR menu' and filed on Mar. 7, 2010.

This application is a Continuation-In-Part (CIP) of U.S. Non-Provisional application Ser. No. 13/022,883 entitled 'Systems and methods for visual presentation and selection of IVR menu' and filed on Feb. 8, 2011, which is a Continuation-In-Part (CIP) of U.S. Non-Provisional application Ser. No. 12/699,618 entitled 'Systems and methods for visual presentation and selection of IVR menu' and filed on Feb. 3, 2010.

This application is a Continuation-In-Part (CIP) of U.S. Non-Provisional application Ser. No. 13/022,851 entitled 'Device and method for providing enhanced telephony' and filed on Feb. 8, 2011, which is a Continuation-In-Part (CIP) of U.S. Non-Provisional application Ser. No. 12/699,618 entitled 'Systems and methods for visual presentation and selection of IVR menu' and filed on Feb. 3, 2010.

This application is a Continuation-In-Part (CIP) of U.S. Non-Provisional application Ser. No. 13/022,768 entitled 'Device and method for providing enhanced telephony' and filed on Feb. 8, 2011, which is a Continuation-In-Part (CIP) of U.S. Non-Provisional application Ser. No. 12/699,618 entitled 'Systems and methods for visual presentation and selection of IVR menu' and filed on Feb. 3, 2010.

This application is a Continuation-In-Part (CIP) of U.S. Non-Provisional application Ser. No. 13/022,869 entitled 'Systems and methods for visual presentation and selection of IVR menu' and filed on Feb. 8, 2011, which is a Continuation-In-Part (CIP) of U.S. Non-Provisional application Ser. No. 12/699,618 entitled 'Systems and methods for visual presentation and selection of IVR menu' and filed on Feb. 3, 2010.

This application is a Continuation-In-Part (CIP) of U.S. Non-Provisional application Ser. No. 13/022,909 entitled 'Device and method for providing enhanced telephony' and filed on Feb. 8, 2011, which is a Continuation-In-Part (CIP) of U.S. Non-Provisional application Ser. No. 12/699,618 entitled 'Systems and methods for visual presentation and selection of IVR menu' and filed on Feb. 3, 2010.

This application is a Continuation-In-Part (CIP) of U.S. Non-Provisional application Ser. No. 13/046,532 entitled 'Systems and methods for communicating with an interactive voice' and filed on Mar. 11, 2011, which is a Continuation-In-Part (CIP) of U.S. Non-Provisional application Ser. No. 12/699,618 entitled 'Systems and methods for visual presentation and selection of IVR menu' and filed on Feb. 3, 2010.

This application is a Continuation-In-Part (CIP) of U.S. Non-Provisional application Ser. No. 13/113,825 entitled 'Portable universal communication device' and filed on May 23, 2011, which is a Continuation-In-Part (CIP) of U.S. Non-Provisional application Ser. No. 12/699,618 entitled 'Systems and methods for visual presentation and selection of IVR menu' and filed on Feb. 3, 2010.

This application is a Continuation-In-Part (CIP) of U.S. Non-Provisional application Ser. No. 13/159,053 entitled 'Systems and methods for visual presentation and selection of IVR menu' and filed on Jun. 13, 2011, which is a Continuation-In-Part (CIP) of U.S. Non-Provisional application Ser. No. 12/699,618 entitled 'Systems and methods for visual presentation and selection of IVR menu' and filed on Feb. 3, 2010.

This application is a Continuation-In-Part (CIP) of U.S. Non-Provisional application Ser. No. 13/185,027 entitled 'Systems and methods for visual presentation and selection of IVR menu' and filed on Jul. 18, 2011, which is a Continuation-In-Part (CIP) of U.S. Non-Provisional application Ser. No. 12/699,618 entitled 'Systems and methods for visual presentation and selection of IVR menu' and filed on Feb. 3, 2010.

This application is a Continuation-In-Part (CIP) of U.S. Non-Provisional application Ser. No. 13/186,984 entitled 'Systems and methods for visual presentation and selection of IVR menu' and filed on Jul. 20, 2011, which is a Continuation-In-Part (CIP) of U.S. Non-Provisional application Ser. No. 12/699,618 entitled 'Systems and methods for visual presentation and selection of IVR menu' and filed on Feb. 3, 2010.

FIELD OF THE INVENTION

The invention relates to Interactive Voice Response (IVR) system and more specifically the invention relates to visual selection of IVR option from a caller device.

BACKGROUND OF THE INVENTION

Interactive Voice Response (IVR) technology is generally used to detect voice and key inputs from a caller. The advent of Interactive Voice Response (IVR) systems has reduced operating costs for many types of businesses for providing services. Generally, the IVR systems allow a user to interact with an audio or visual response system. The IVR systems can provide prompts to a user and receive touch tone and/or spoken responses on the prompts from the user. Through such IVR dialogue the system collects sufficient information about the user to direct the call to the most appropriate resource, information processing system or the like.

Generally, when the caller calls a destination, such as a bank, an automated audio IVR menu is played. The audio IVR menu can contain instructions to provide instant services such as account balance inquiry when the destination is a bank. Further, audio menu can provide options for the caller to connect to a desired end inside the destination. For example, the menu may direct the caller to press various keys on a telephone to connect to a particular department or agent. The audio IVR menu is designed specific to a destination. Therefore, each destination or organization may have different audio IVR menus. Further, the IVR menu in an organization can be based on the type of departments, type of services, customer care executives or agents and so forth. For example, an IVR menu of a bank may include options related to the account details of the caller, while an IVR menu of a pizzeria may contain options to order or select a pizza.

Typically, the caller calling the destination may have to listen and follow instructions on the menu to get a desired response or a function performed. Therefore, the process can be time consuming. Moreover, in case the caller provides an incorrect input, the complete process may have to be repeated. Furthermore, the IVR menu for an organization may be updated or changed regularly. For example, extension numbers inside an organization may be changed and correspondingly, the extension numbers associated with the IVR menu may be updated. As a result, a frequent caller may not be able to reach a desired end by remembering a combination of numbers. Furthermore, the dialed destination may not include the information desired by the user. In such a case, the user may have to call the destination again for retrieving the desired information. Therefore, the user may become frustrated with the IVR systems.

Usually, the IVR menus are same for all the users. Therefore, the customer has to listen them carefully to select the appropriate option. The user may have to wait for long time for receiving information while interacting with the IVR systems. Moreover, sometimes the requested information might not be available at the time when the user calls the destination. Therefore, the user may have to either wait for long time or call again later. For example, the user may desire to talk to a customer care executive of the destination, who is busy at the time of the call. Therefore, the call of the user may be put on hold or he may be asked to call later.

Some prior art try to address this problem by providing visual form of IVR. These prior arts display the IVR menu graphically on a caller device. U.S. Pat. No. 7,215,743 assigned to International Business Machines Corporation and a published U.S. patent application Ser. No. 11/957,605, filed Dec. 17, 2007 and assigned to Motorola Inc., provides the IVR menu of the destination in a visual form to the caller. The caller can select the options from the IVR menu without listening to the complete audio IVR menu. However, the IVR menu displayed on the caller device is stored on an IVR server at the destination end. As a result, the visual IVR menu is specific to the destination and only the IVR of the destination dialed is displayed. These techniques therefore, require each destination to set-up hardware, software and other facilities to be deployed for providing visual IVR servers.

A U.S. Pat. No. 7,460,652, assigned to AT&T Intellectual Property I, L.P., discloses techniques for call routing and communication with a call originator. The call may be received at an automated call handling system. Thereafter, the call is evaluated based on a set of business rules and routed to an interactive voice response unit based on the evaluation. Further, the interactive voice response unit automatically schedules and sends an email to the originator of the call. However, the scheduling of the email is performed after establishing a communication with the automated call handling system. Moreover, the scheduling is performed at the automated call handling system.

Another existing technique as disclosed in U.S. Pat. No. 6,560,320 assigned to International Business Machines Corporation enables an operator of the IVR to send customized signals to the caller for generating and displaying graphical elements on the device of the caller. Thereafter, the caller can respond by selecting options through touch-screen interface of the device. Dual Tone Multi frequency (DTMF) signals of the IVR. However, this technique requires a specifically configured device to interpret the codes sent as Dual Tone Multi frequency (DTMF) signals for generating the graphics. Moreover, an operator is required to present the graphics to the caller. Furthermore, specialized software and hardware are required at the operator to design and generate DTMF codes. Therefore, the technique faces various practical limitations.

Generally, the IVR menus of the organizations are in form of audible menu. Moreover, there are a large number of organizations that use IVR menus. Therefore, converting the audible menus to visual IVR menus can be time consuming. An existing technique, as disclosed in U.S. Pat. No. 6,920,425 assigned to Nortel Networks Limited, discloses an automated script to convert the audible menus scripts to visual IVR menu scripts. However, the audible menus scripts must be available in a particular format to enable the conversion. Furthermore, the audio menu scripts must be available or downloadable for the program to function. As a result, only the audio menus scripts that are available can be converted to visual IVR menu scripts. Furthermore, the device of the caller must be designed or programmed to understand the visual IVR menu scripts.

Various organizations encourage the customers to call them for information on their products or services, or for helping existing customers. Generally, a contact number is provided by the organizations on their website as a button. Therefore, when the customer presses the button a form is displayed. The customer then enters his contact number where an executive from the organization may call. However, this may be time consuming for the customer. Moreover, the customer may be not being able to talk to another executive during the call in case the on-line executive is not able to satisfy the customer. U.S. patent application Ser. No. 12/049,021, filed Mar. 14, 2008 and assigned to Harprit Singh, provides methods and systems for displaying an IVR menu, when the caller clicks a link on a webpage provided by the organization. However, the customer is still required to request the webpage with embedded information from a server of the organization. Moreover, the methods and systems are limited to the organizations that provide the required webpage to the customers. Other technologies include U.S. patent application Ser. No. 11/877,952 filed Oct. 24, 2007 and assigned to International Business Machine Corporation.

The effectiveness of providing the IVR in visual form is discussed in a technical paper titled, 'The Benefits of Augmenting Telephone Voice Menu Navigation with Visual Browsing and Search' by Min Yin et al. The paper discusses a setup where visual content of the IVR is sent from a service provider to a computer connected to a mobile phone. However, the technique discussed in the paper is limited to the visual content provided by the service provider's end, after the connection is established. Moreover, the providers are required to individually set up the hardware and services for providing visual content.

As discussed above the existing technologies have various limitations. Hence, techniques are desired for providing enhanced telephony.

SUMMARY

Embodiments of the present invention provide a system for enhancing user interaction with a plurality of destinations comprising one or more Interactive Voice Response (IVR) menus. The system includes a processor and a memory coupled to the processor. The memory includes a database comprising a list of telephone numbers associated with the plurality of destinations. Further, the memory includes instructions executable by the processor for automatically selecting at least one visual IVR menu from said database and displaying said at least one visual IVR menu to a user. The at least one visual IVR menu is associated with a telephone number dialed by the user from the list of telephone numbers. Further the at least one visual IVR menu includes at least one icon.

Embodiments of the present invention provide a system for enhancing user interaction with a plurality of destinations comprising one or more Interactive Voice Response (IVR) menus. The system includes a processor and a memory coupled to the processor. The memory includes a database comprising a list of telephone numbers associated with the plurality of destinations. Further, the memory includes instructions executable by the processor for automatically selecting at least one visual IVR menu from the database and displaying the at least one visual IVR menu to a user. The visual IVR menu is associated with a telephone number dialed by the user from the list of telephone numbers. Furthermore, the database includes at least two records associated with at least two distinct destinations. Each of the at least two records includes a business category field, and each of the at least two records have the same business category. Additionally, the database includes a standard menu for said same business category.

Here, the database includes at least one record based on personal information of the user that may be filled in a form displayed, to the user, by the system.

In an aspect of the invention, a system selects and displays at least one advertisement along with a visual IVR menu. The at least one advertisement may be selected and display based on a category of the visual IVR menu. Further, the visual IVR menu and the advertisement are displayed based on the time of dialing of the telephone number by a user.

Embodiments of the present invention provide a system for enhancing user interaction with a plurality of destinations comprising Interactive Voice Response (IVR) menus. The system includes a processor and a memory coupled to the processor. The memory includes a database comprising a list of telephone numbers associated with the plurality of destinations. Further, the memory includes instructions executable by the processor for automatically selecting at least one visual IVR menu from the database and displaying the at least one visual IVR menu to a user. The at least one visual IVR menu is associated with a telephone number dialed by the user from the list of telephone numbers. Further, the memory includes instructions executable by the processor for selecting and displaying at least one advertisement. The at least one advertisement is selected based on at least one category associated with the at least one visual IVR menu.

In an aspect of the invention, a telephone number may be dialed through a portable device and at least one IVR menu, corresponding to the dialed telephone number, may be displayed through an external device.

Embodiments of the present invention provide a method for enhancing user interaction with a plurality of destinations comprising one or more Interactive Voice Response (IVR) menus. The method includes selecting at least one visual IVR menu from a database at a device automatically. The database includes a list of telephone numbers associated with a plurality of destinations. The method further includes displaying the at least one visual IVR menu to a user. The at least one visual IVR menu is associated with a telephone number dialed by the user from the list of telephone numbers. Further the at least one visual IVR menu includes at least one icon.

Embodiments of the present invention provide a method for enhancing user interaction with a plurality of destinations comprising one or more Interactive Voice Response (IVR) menus. The method includes selecting at least one visual IVR menu from a database at a device automatically. The database includes a list of telephone numbers associated with the plurality of destinations. Further, the method includes displaying the at least one visual IVR menu to a user. The visual IVR menu is associated with a telephone number dialed by the user from the list of telephone numbers. Further, the database includes at least two records associated with at least two distinct destinations. Furthermore, each of the at least two records includes a business category field, and each of said at least two records have the same business category. Also, the database includes a standard menu for the same business category.

Embodiments of the present invention provide a method for enhancing user interaction with a plurality of destinations comprising Interactive Voice Response (IVR) menus. The method includes selecting automatically at least one visual IVR menu from a database at a device. The database includes a list of telephone numbers associated with the plurality of destinations. Further, the method includes displaying said at least one visual IVR menu to a user, wherein said at least one visual IVR menu is associated with a telephone number dialed by the user from a list of telephone numbers. Furthermore, the method includes selecting and displaying at least one advertisement. The at least one advertisement is selected based on at least one category associated with said at least one visual IVR menu.

In an aspect of the invention a call to a destination is scheduled based on predefined calling information. At least one visual IVR menu associated with each of the plurality of destinations may be stored in a database. A phone number of a destination from a plurality of destinations may be dialed based on predefined calling information. The predefined calling information is selected from a visual IVR menu associated with the destination. Further, information from the dialed destination may be received based on the predefined calling information. The received information may further be displayed.

Advantageously, the invention provides to a caller a visual IVR menu corresponding to an audible IVR menu of a destination. This may enable the caller to directly interact with the visual IVR menu without listening to the audible IVR menu of the destination. Further, the visual IVR menu is displayed based on the time of dialing a phone number, corresponding to the destination, by the caller. Furthermore, the visual IVR menu of the destination may be provided according to the location of a communication device of a caller and/or a location of the dialed destination phone number. This may provide the visual IVR menu(s) of one or more destinations having location near to the location of the communication device of the caller. Additionally, the invention provides a standard visual IVR menu corresponding to a business category associated with the destination. The standard menu may be common for at least two destinations corresponding to the business category.

BRIEF DESCRIPTION OF THE DRAWINGS

Figure 1A:
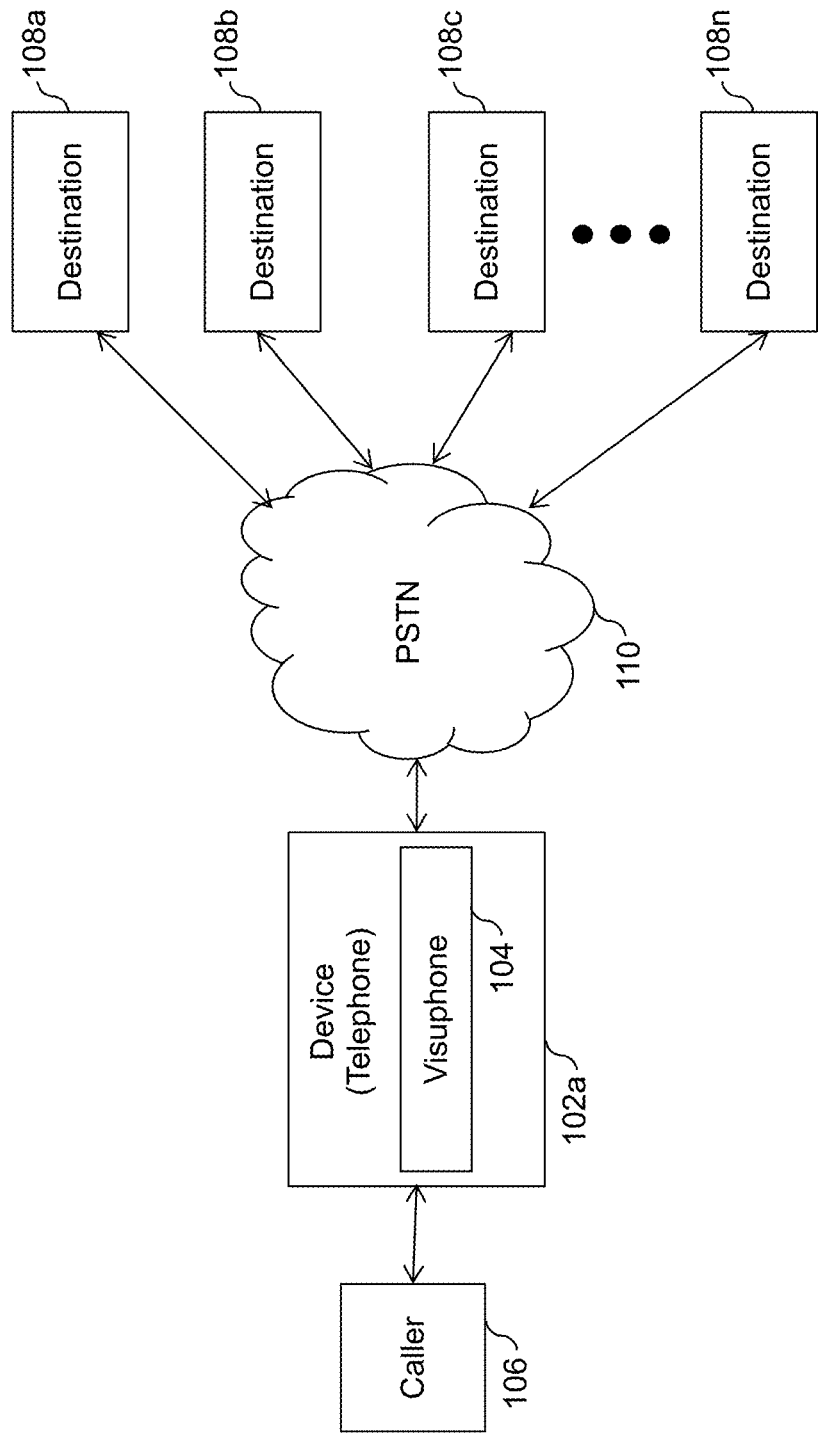
Figure 1B:
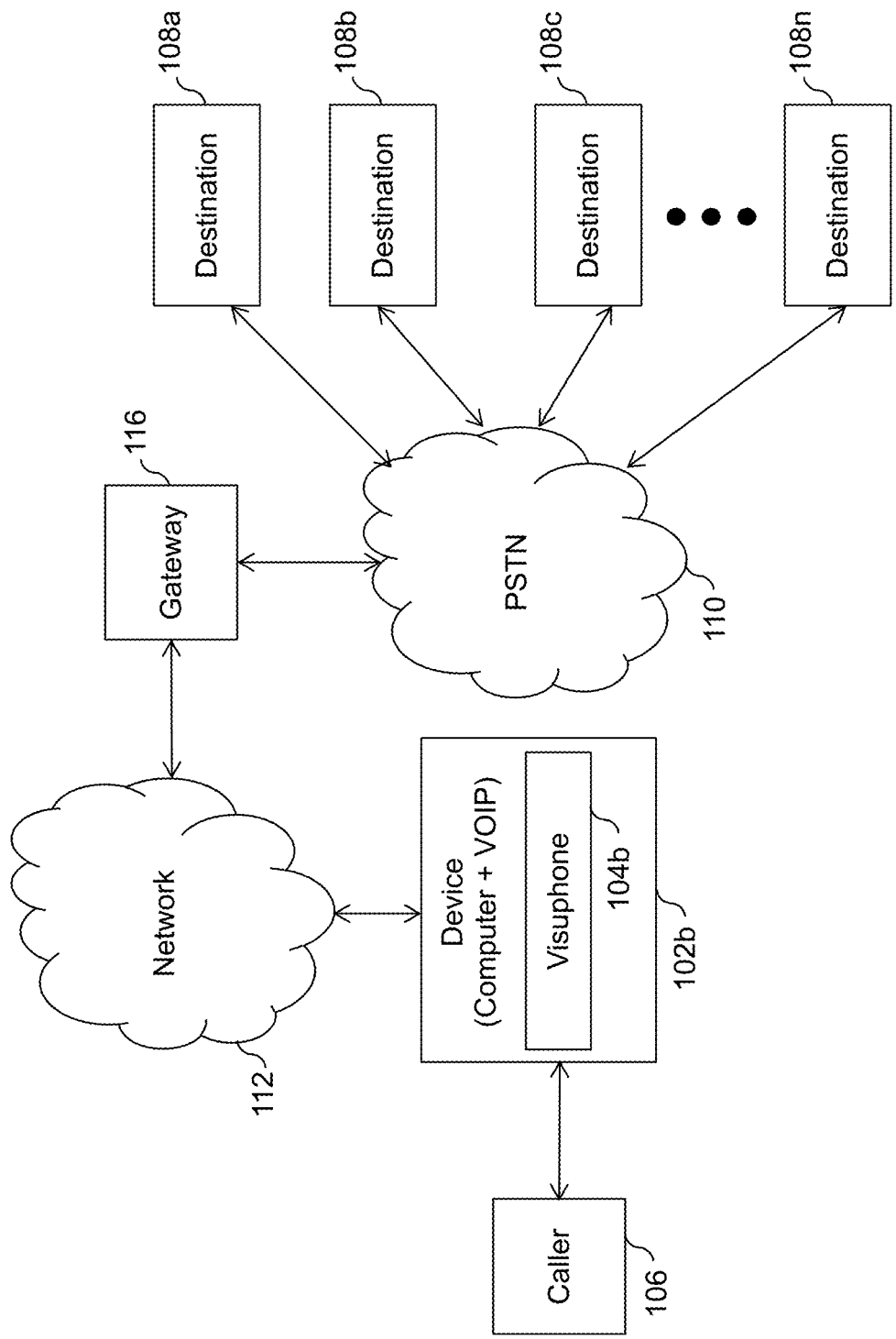
Figure 1C:
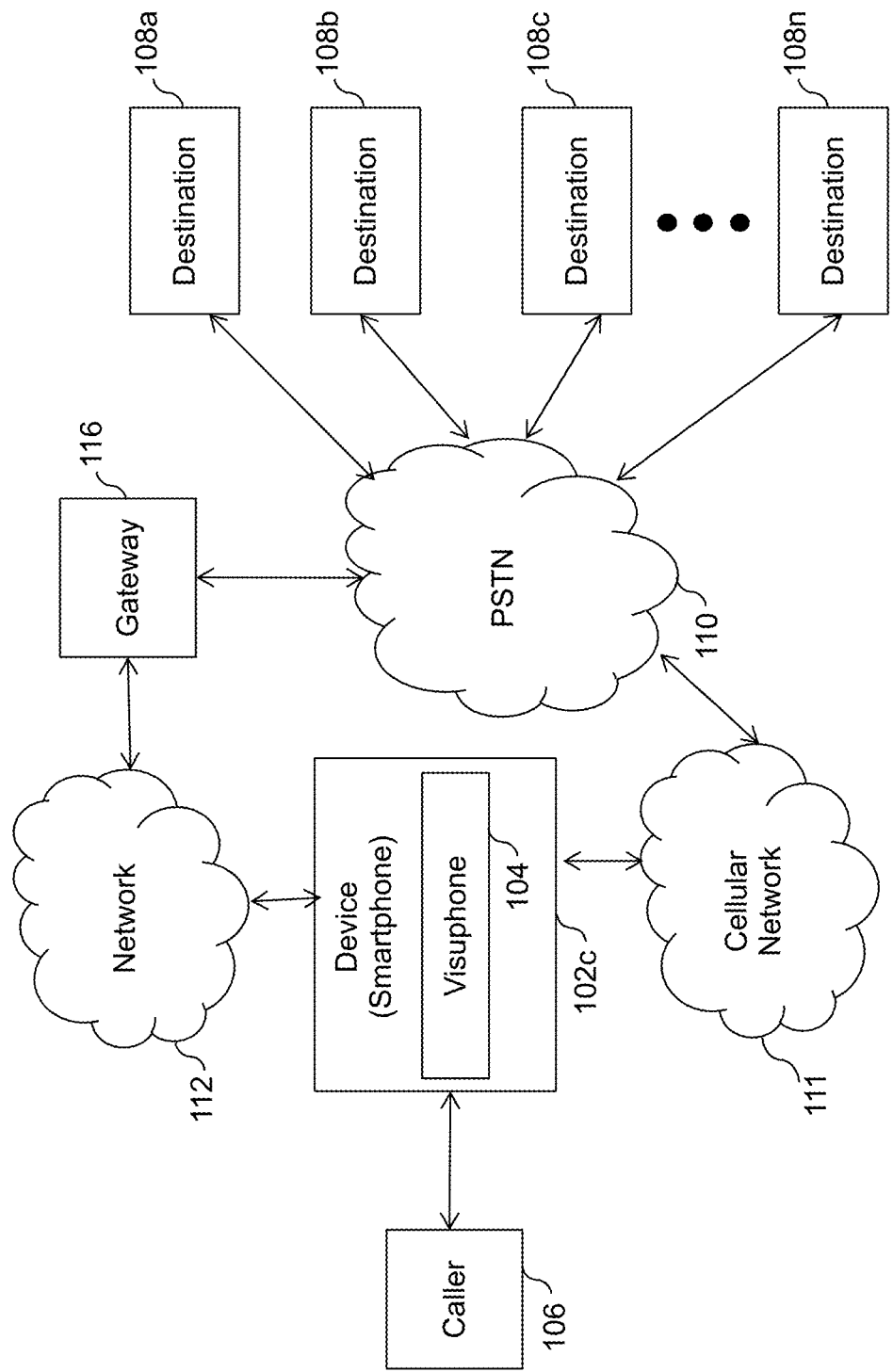
Figure 2A:
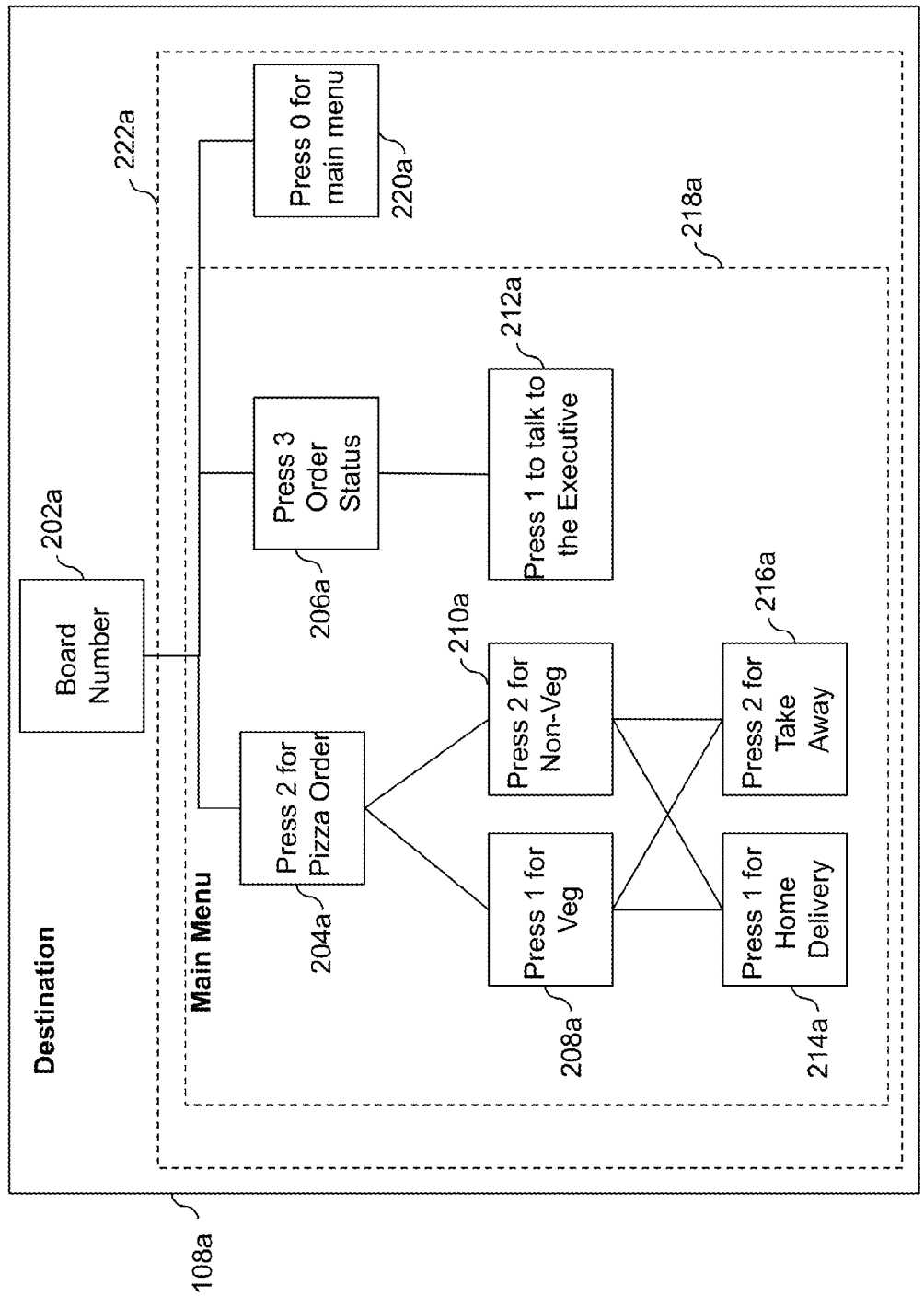
Figure 2B:
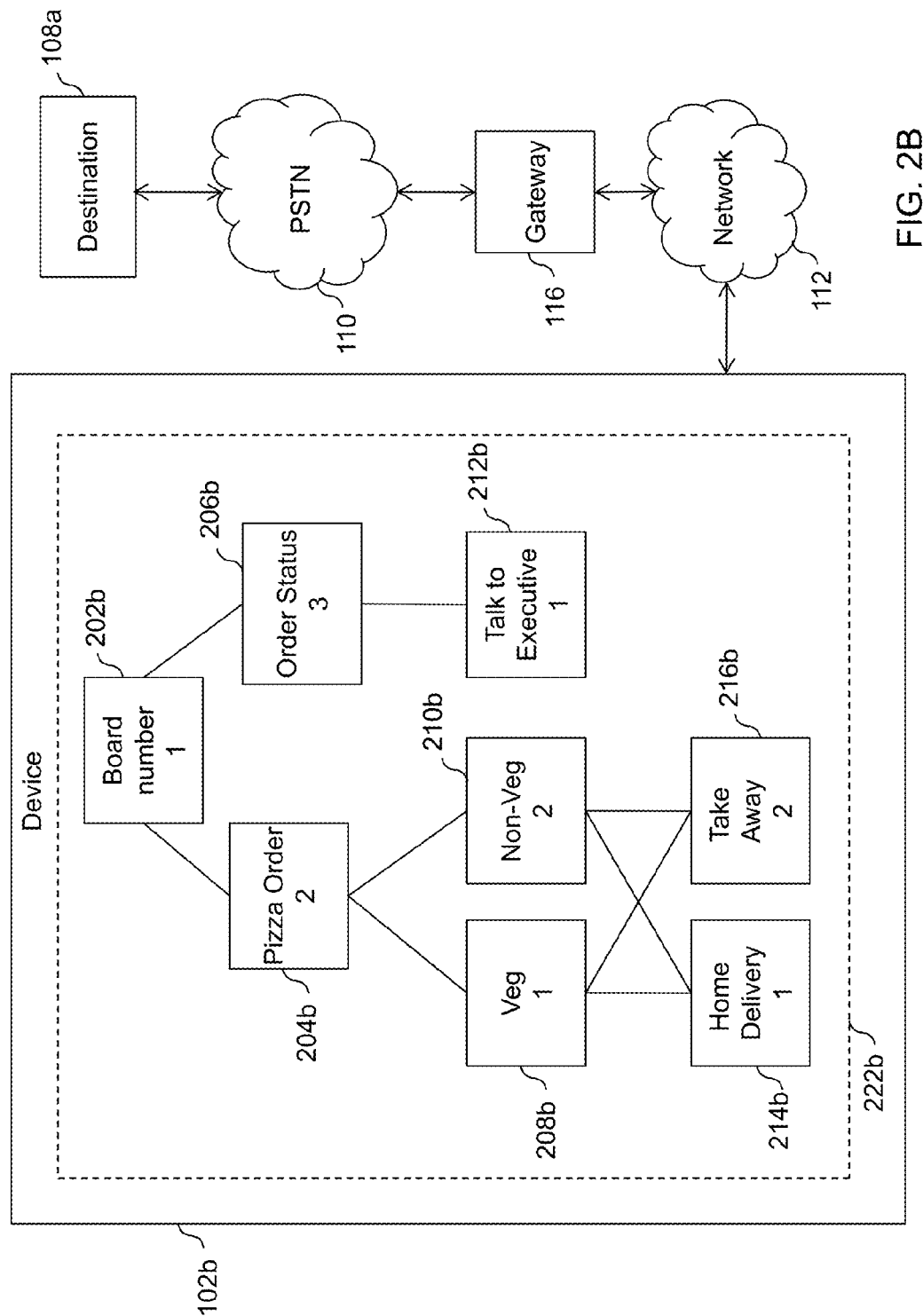
Figure 2D:
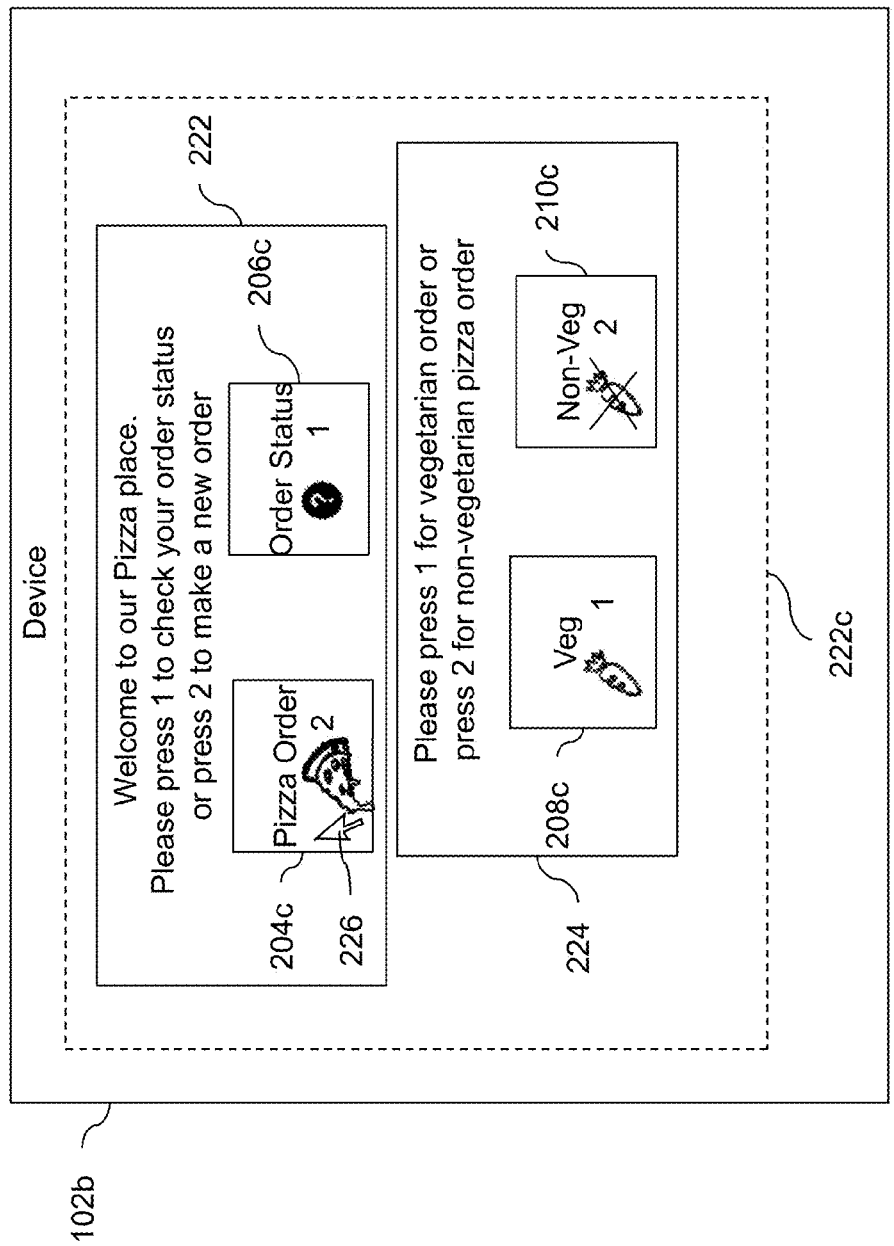
Figure 3A:
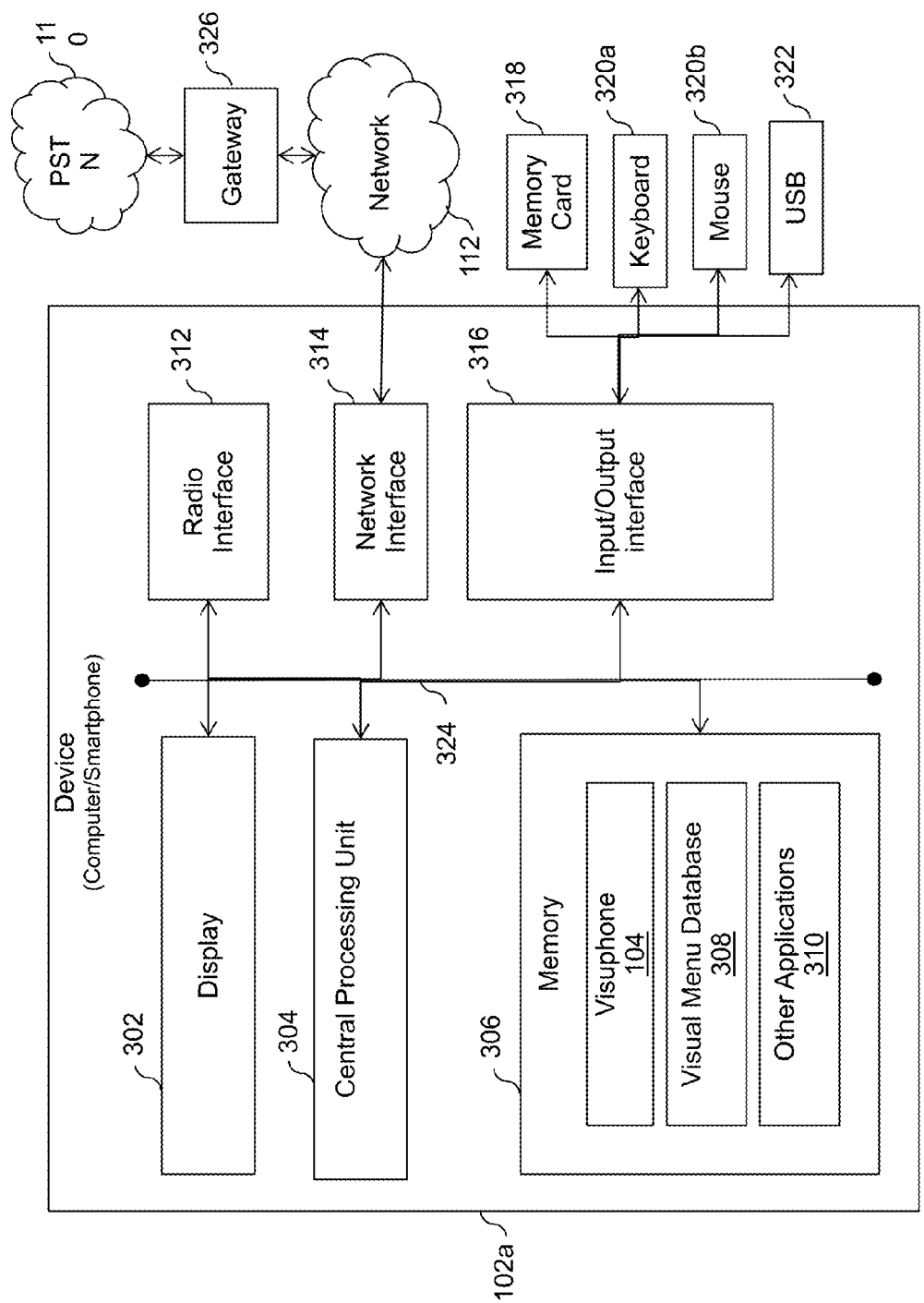
Figure 3B:
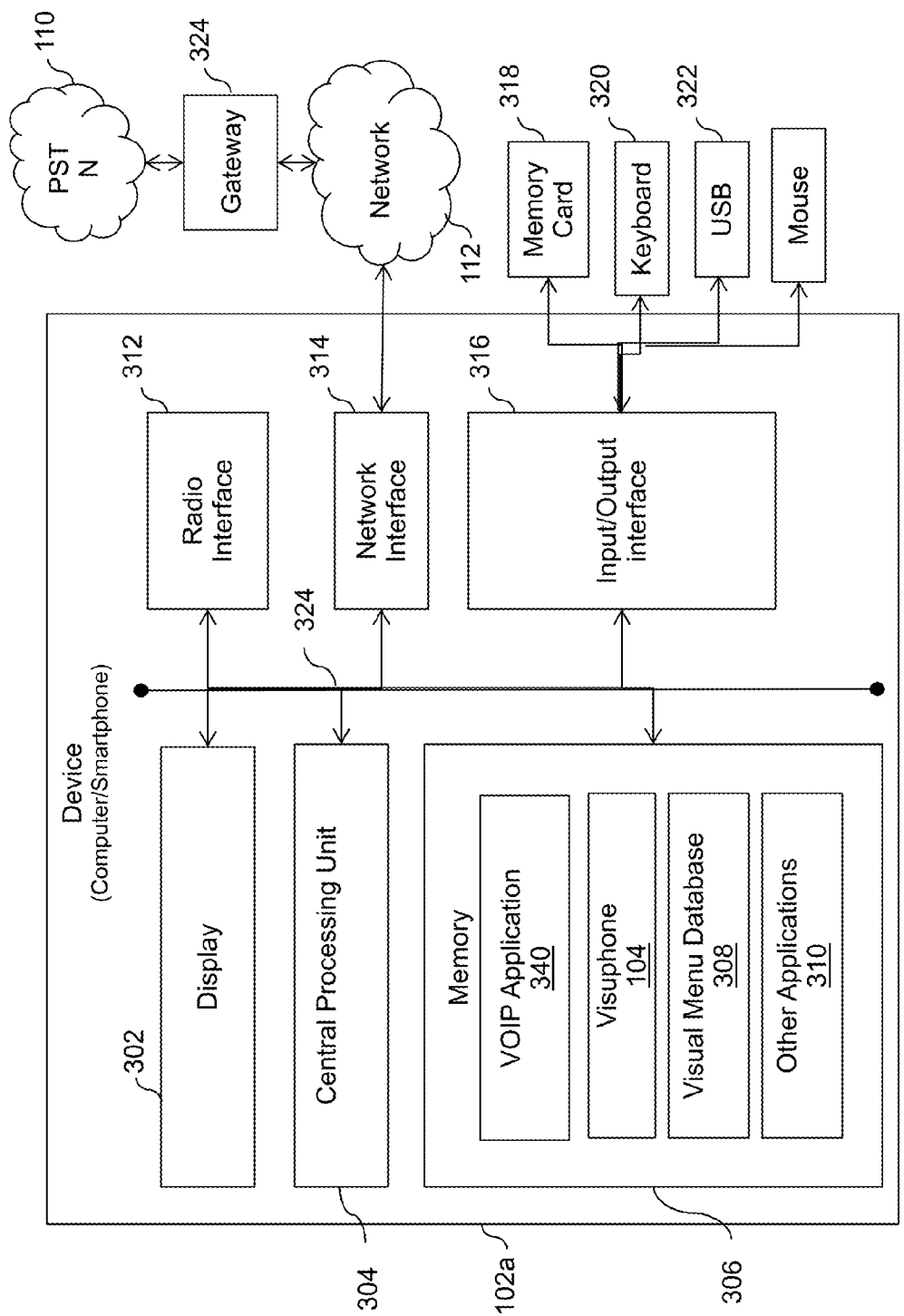
Figure 4:
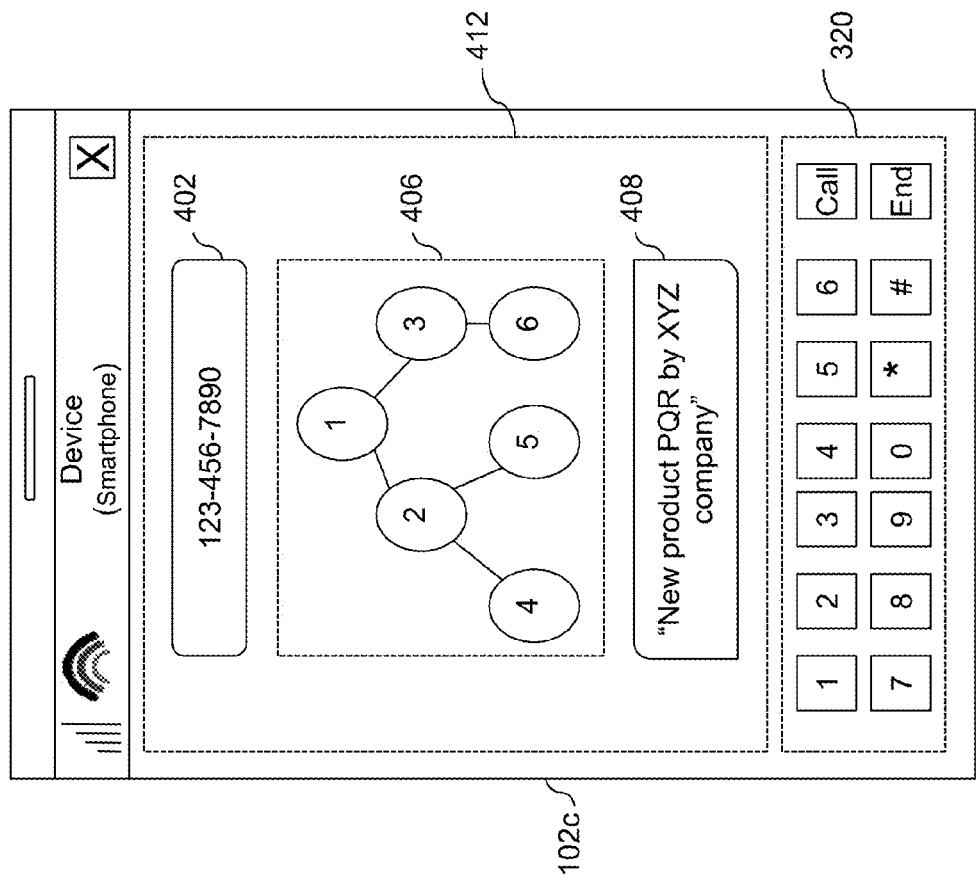
Figure 5:
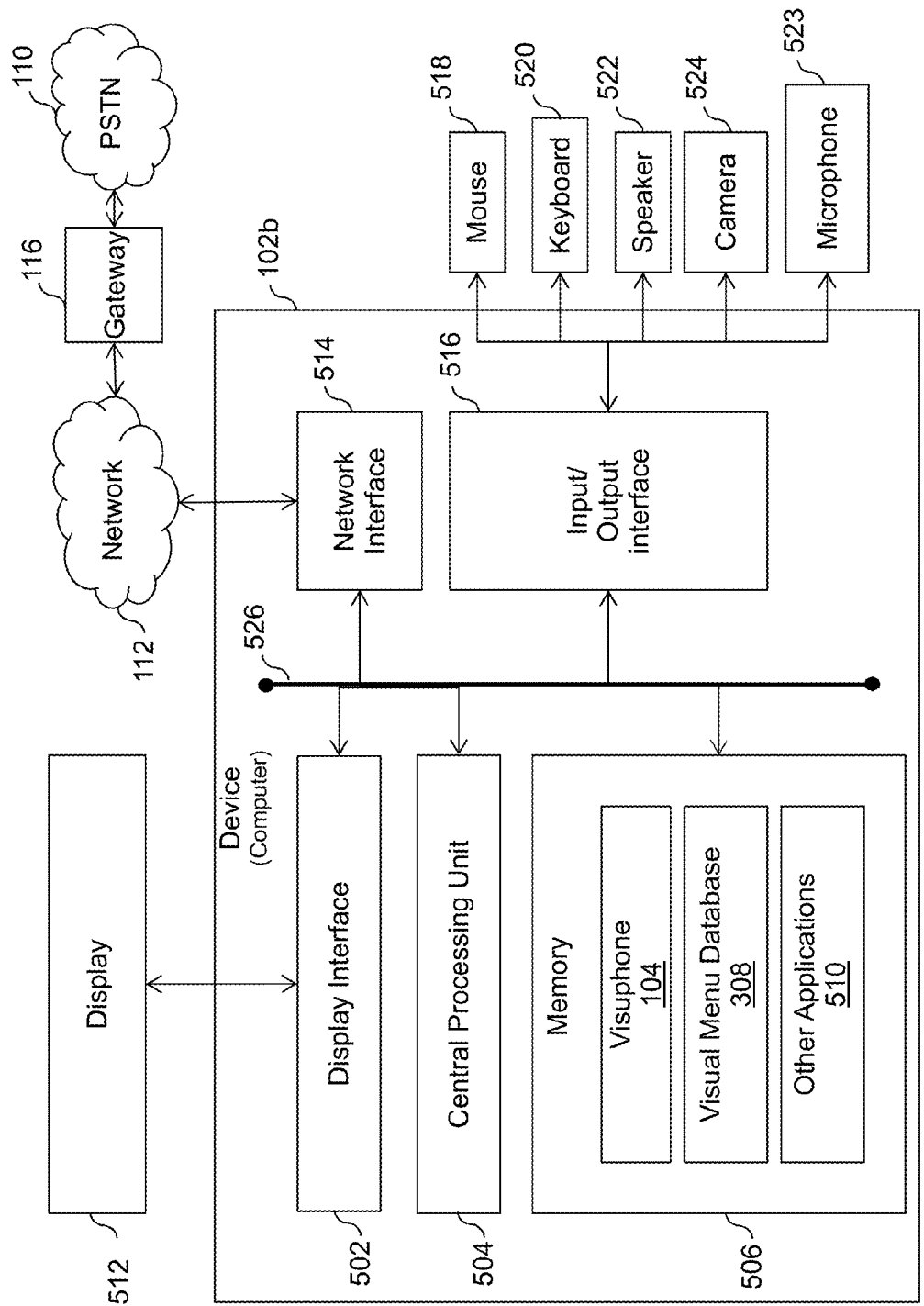
Figure 6:
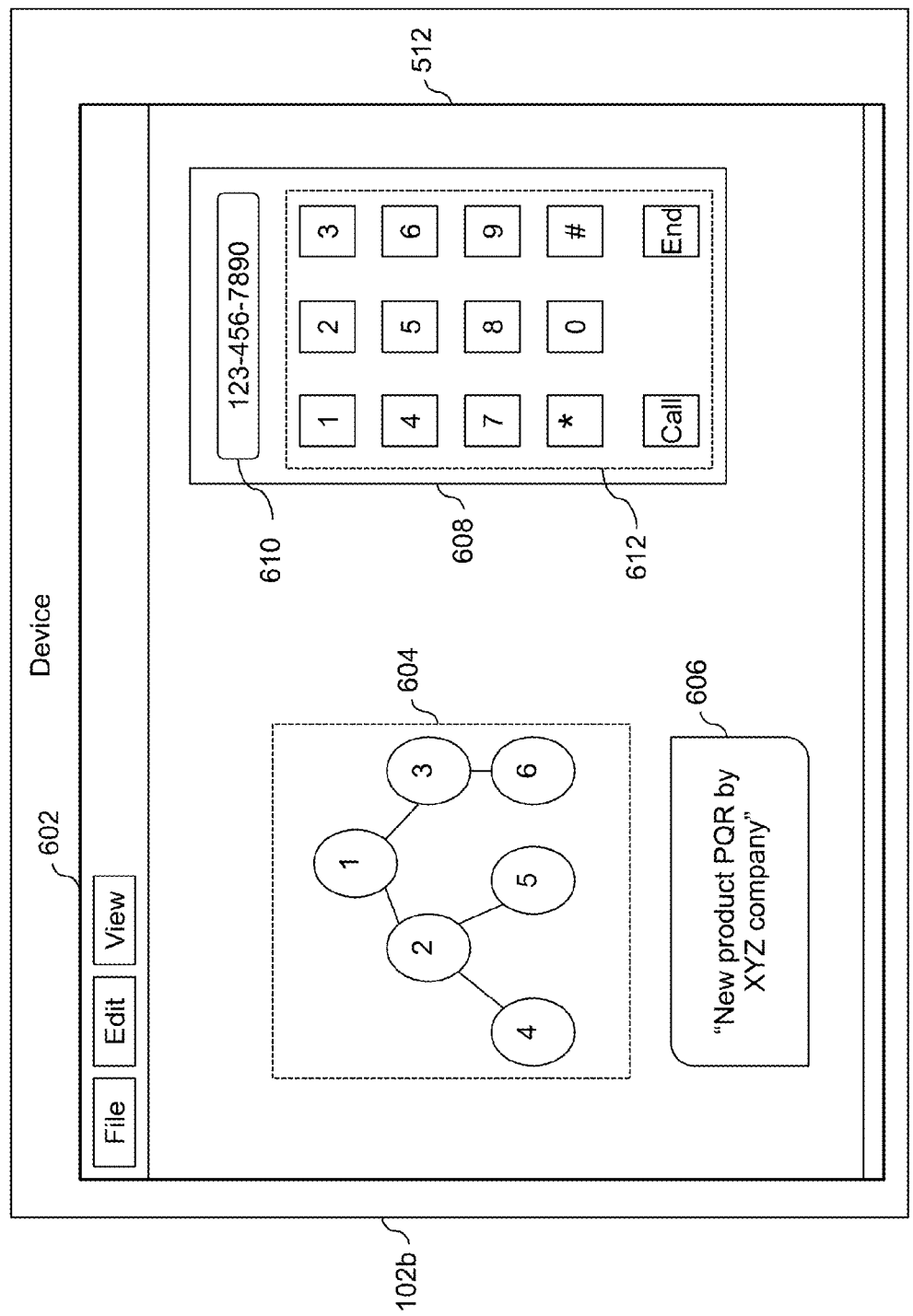
Figure 7:
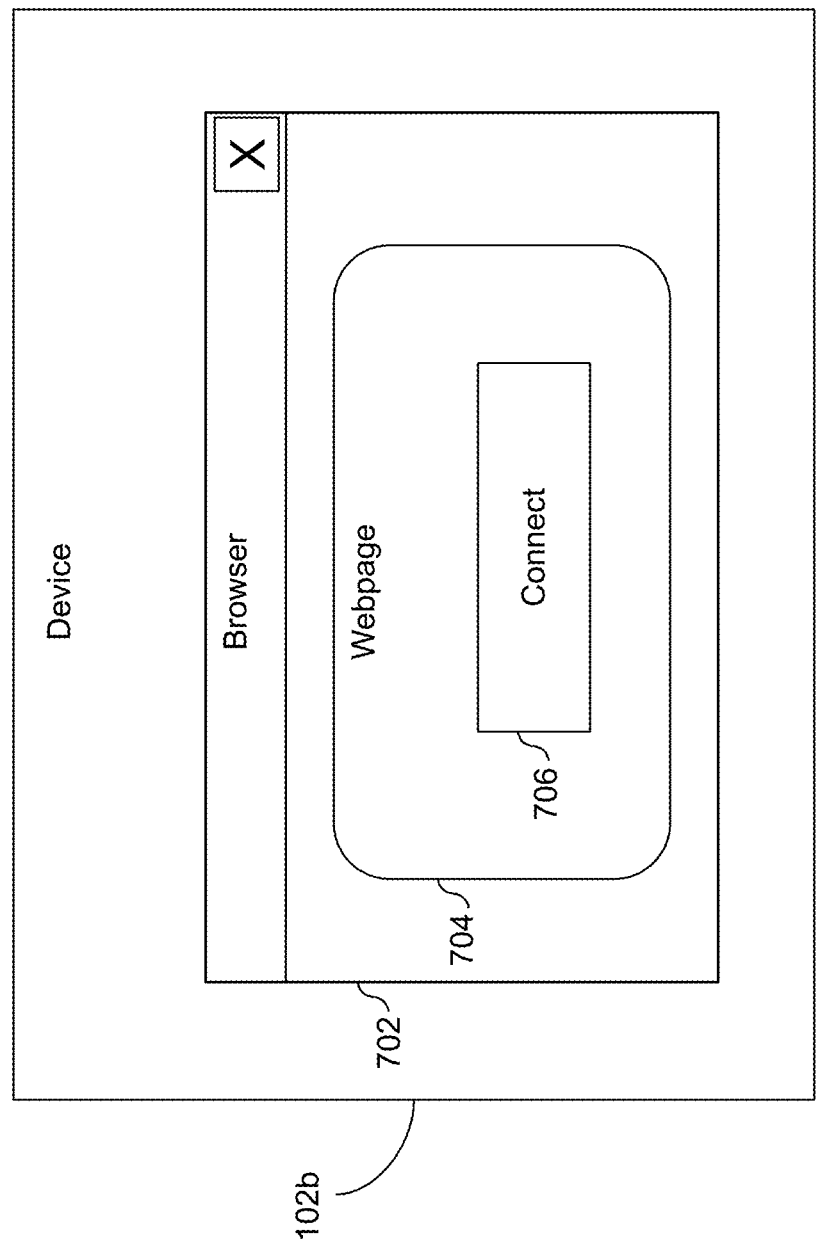
Figure 8:
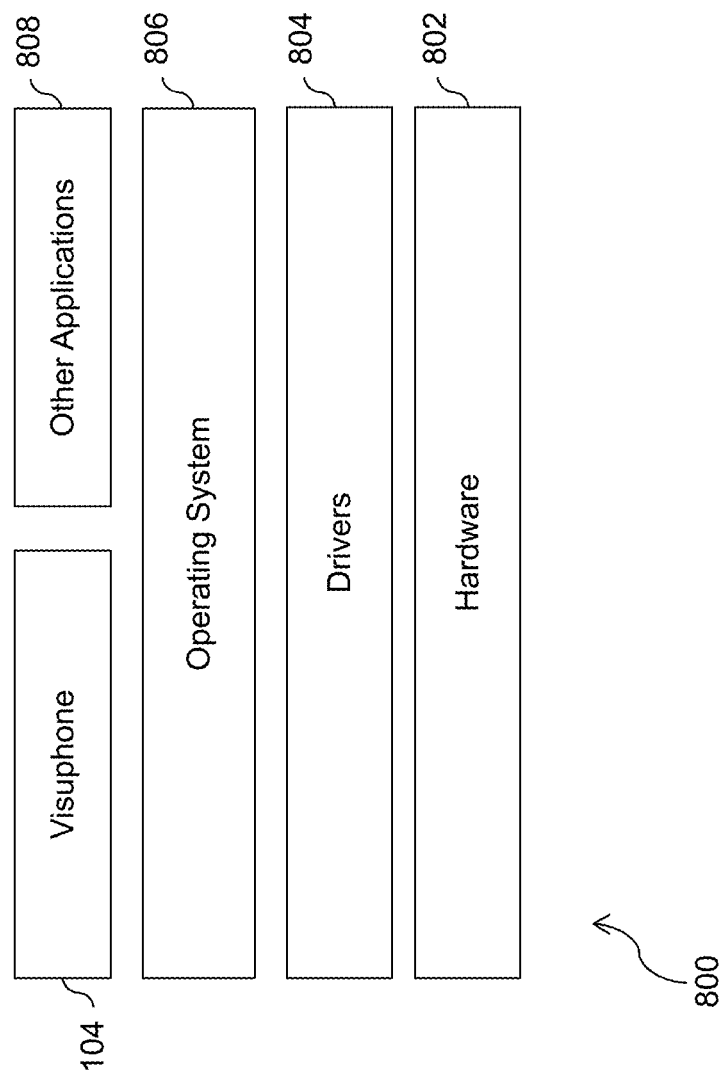
Figure 9:
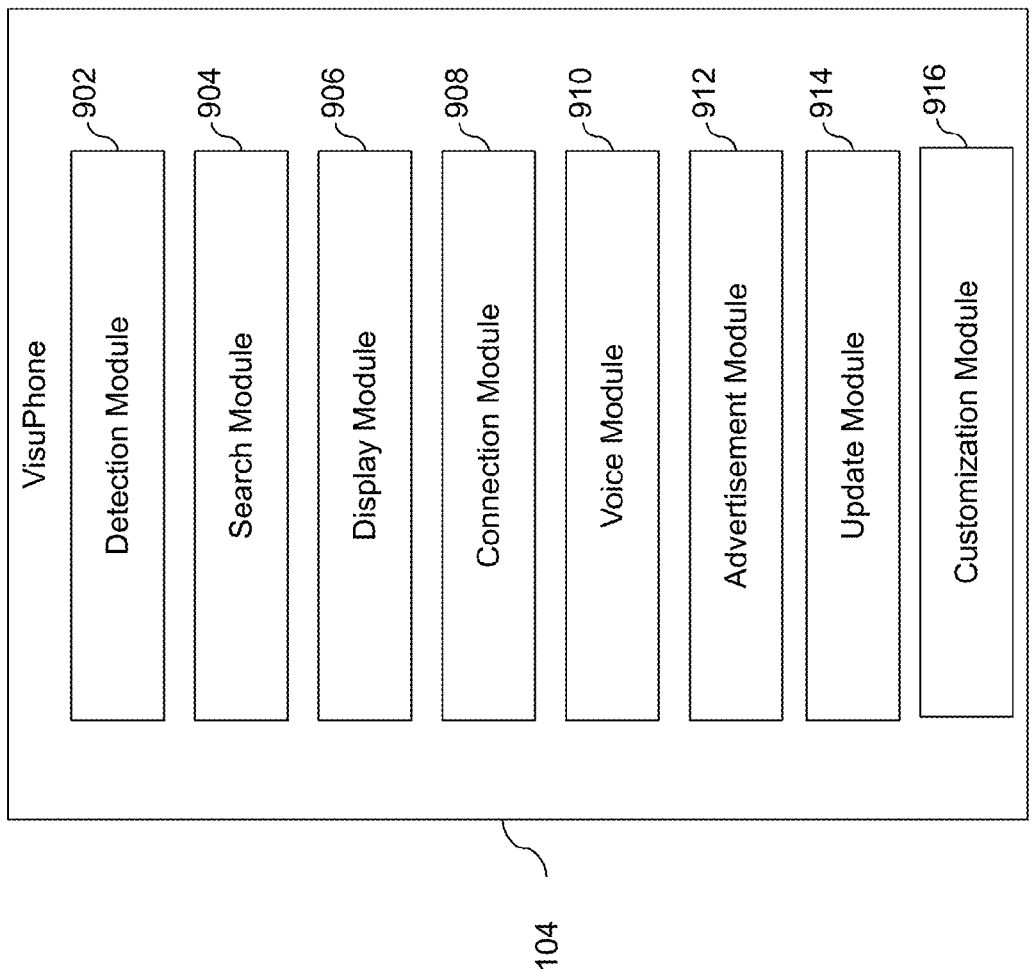
Figure 10:
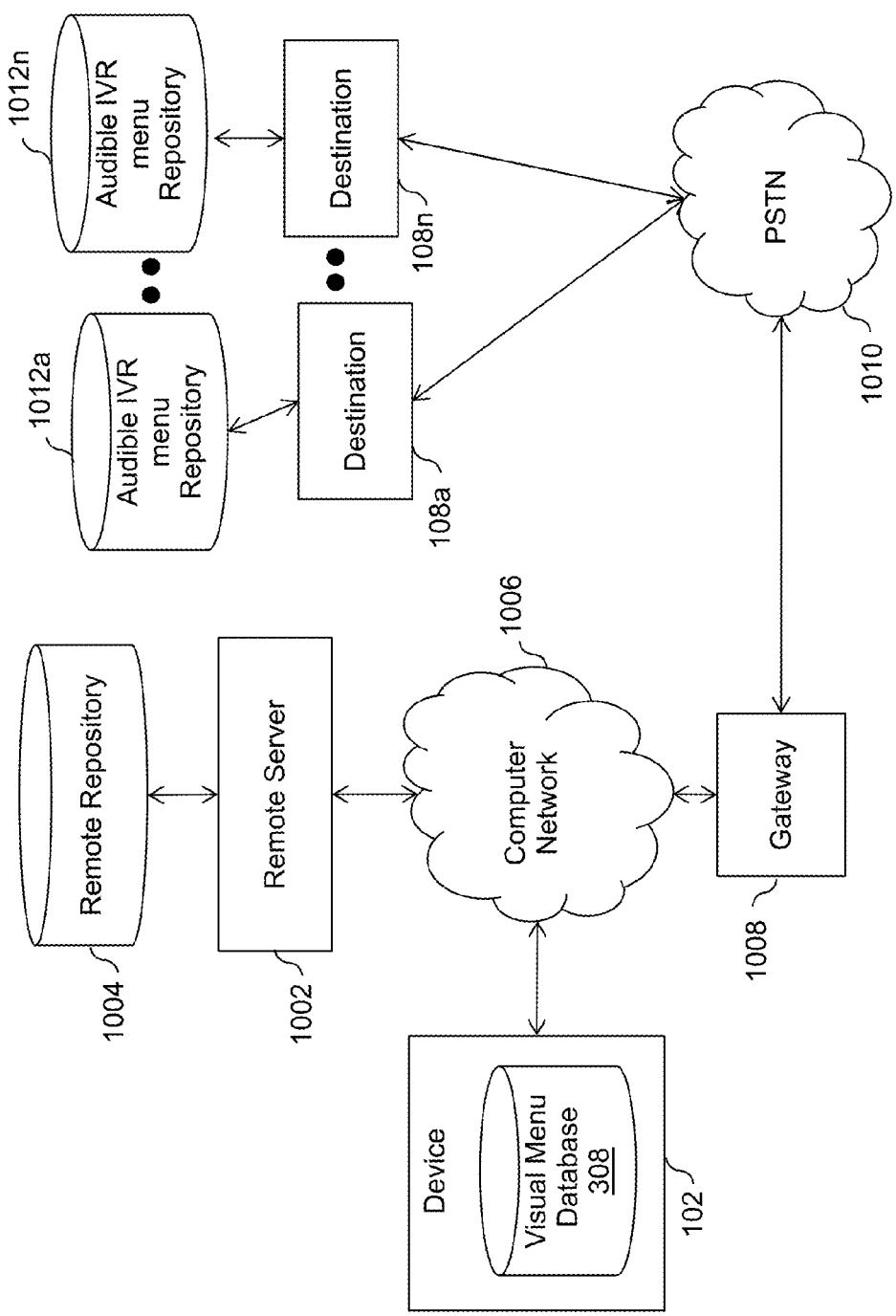
Figure 11:
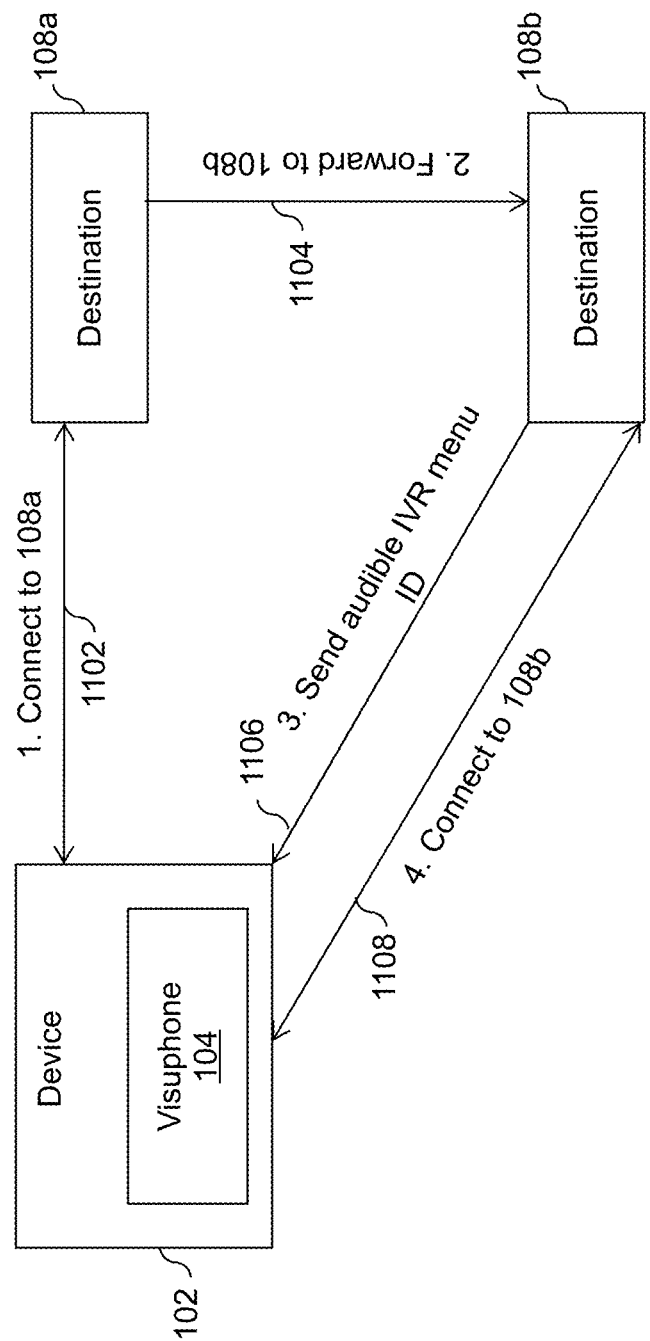
Figure 12:
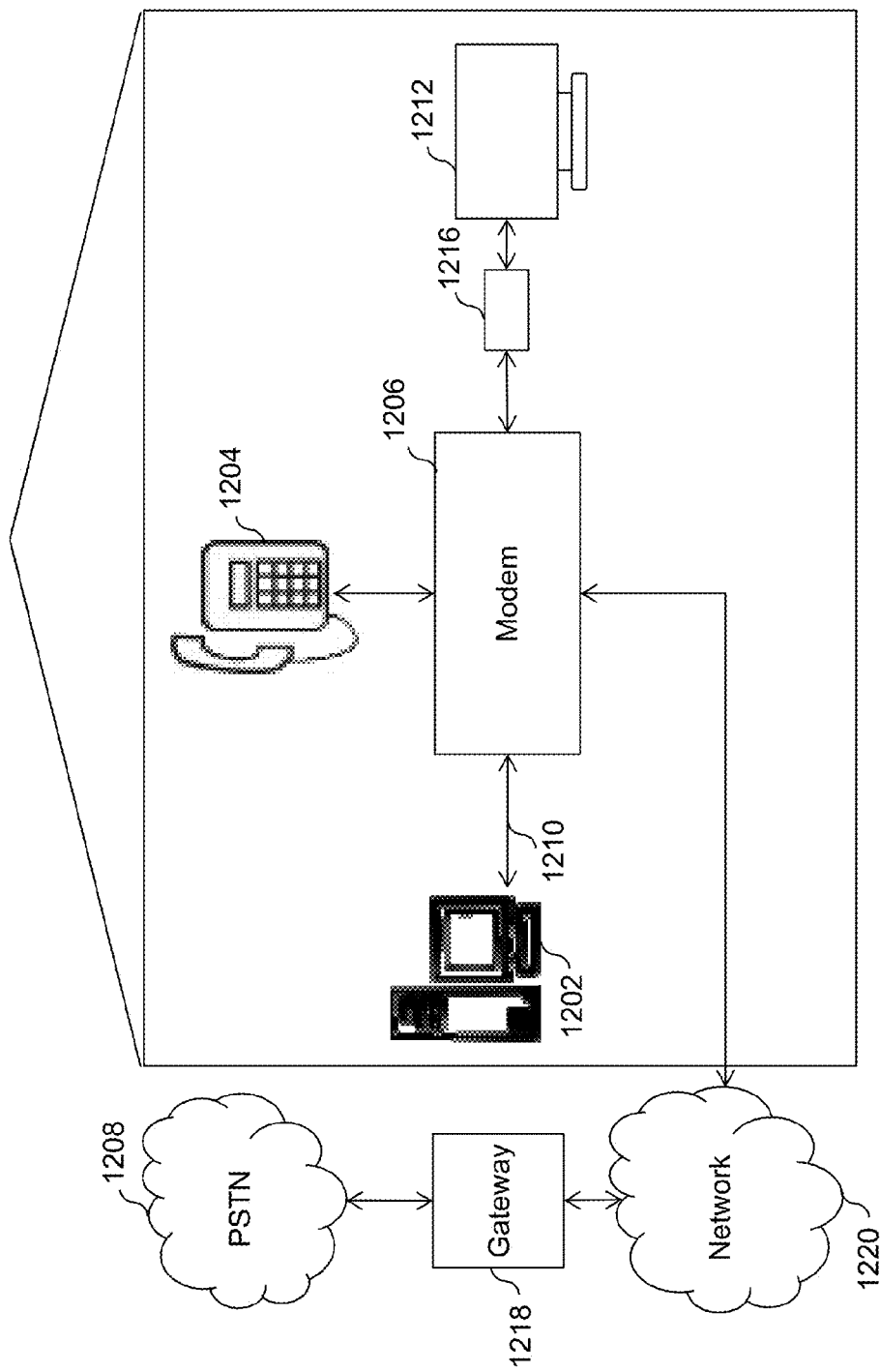
Figure 13:
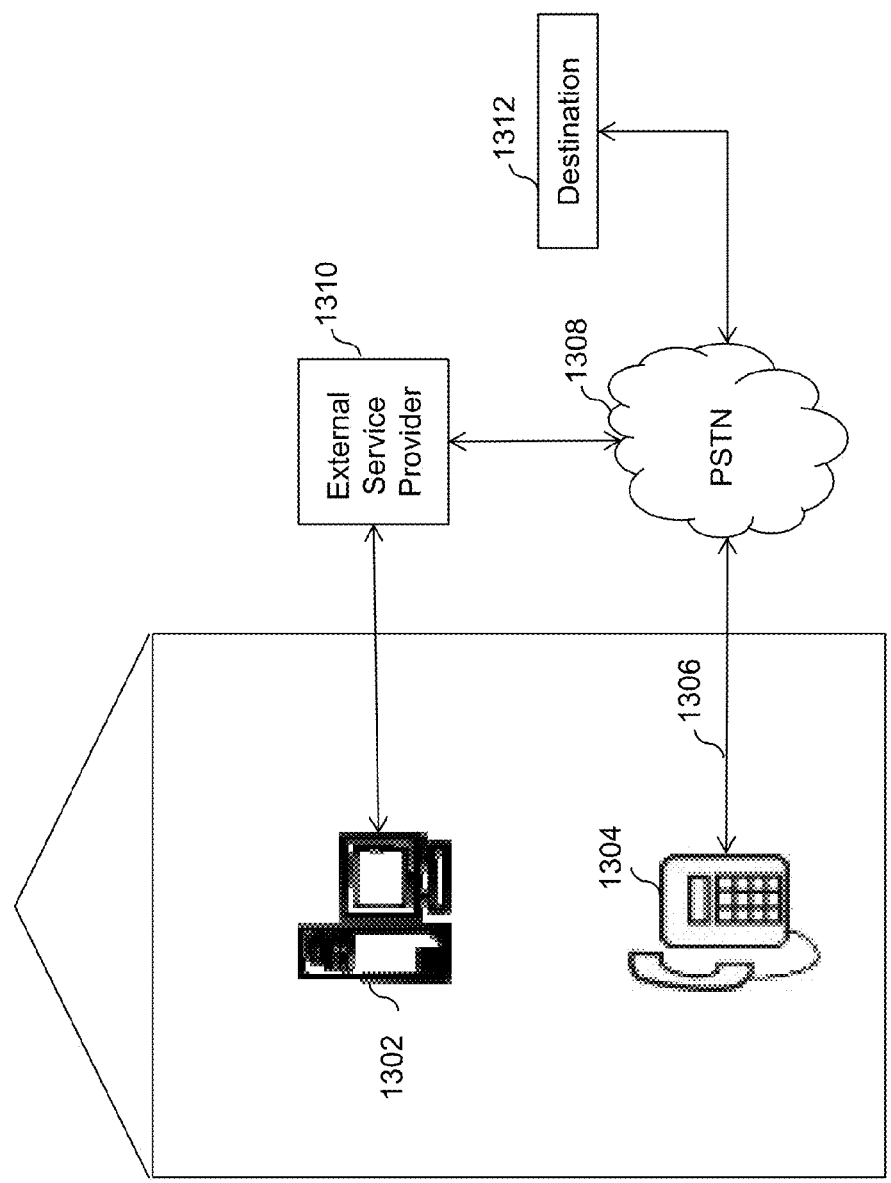
Figure 15A:
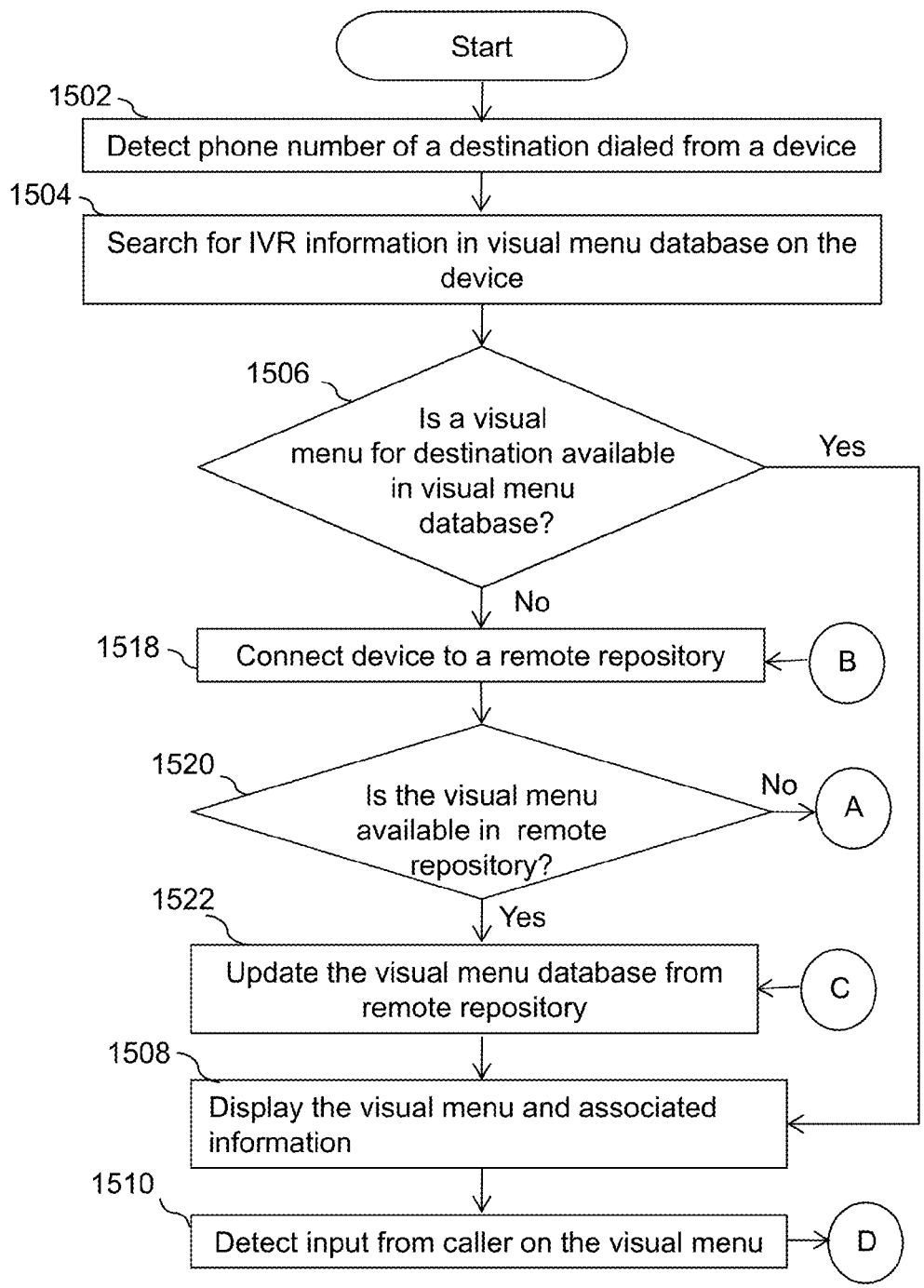
Figure 15B:
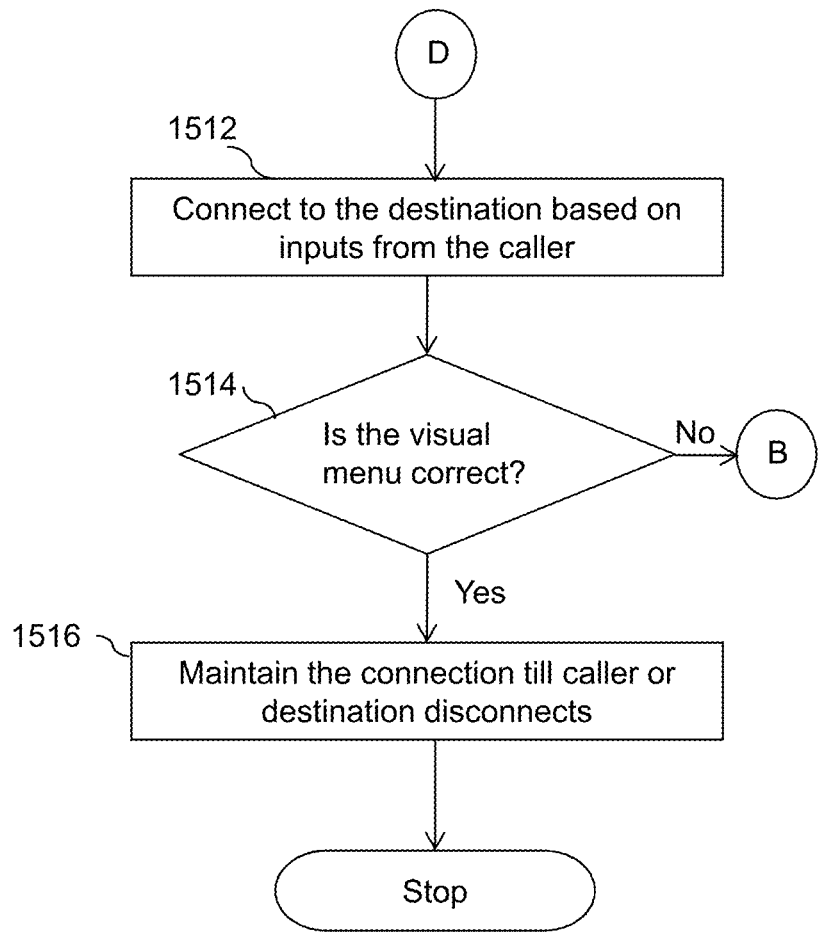
Figure 15C:
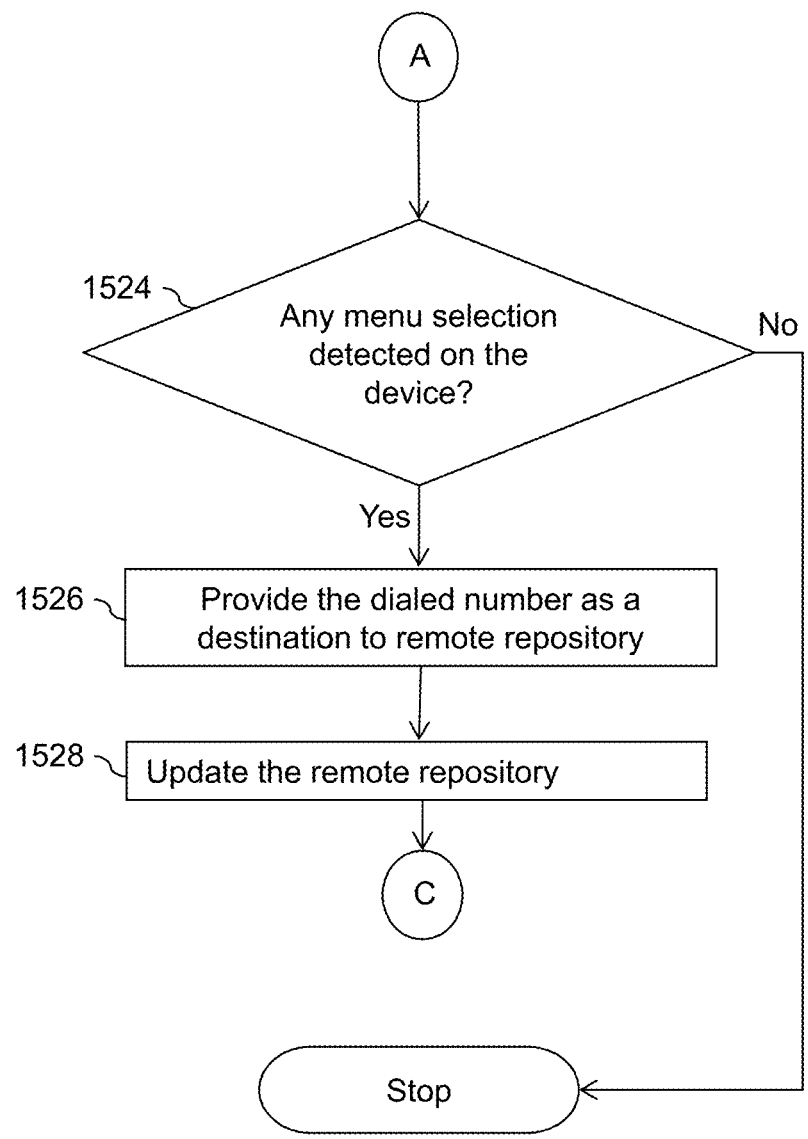
Figure 16:
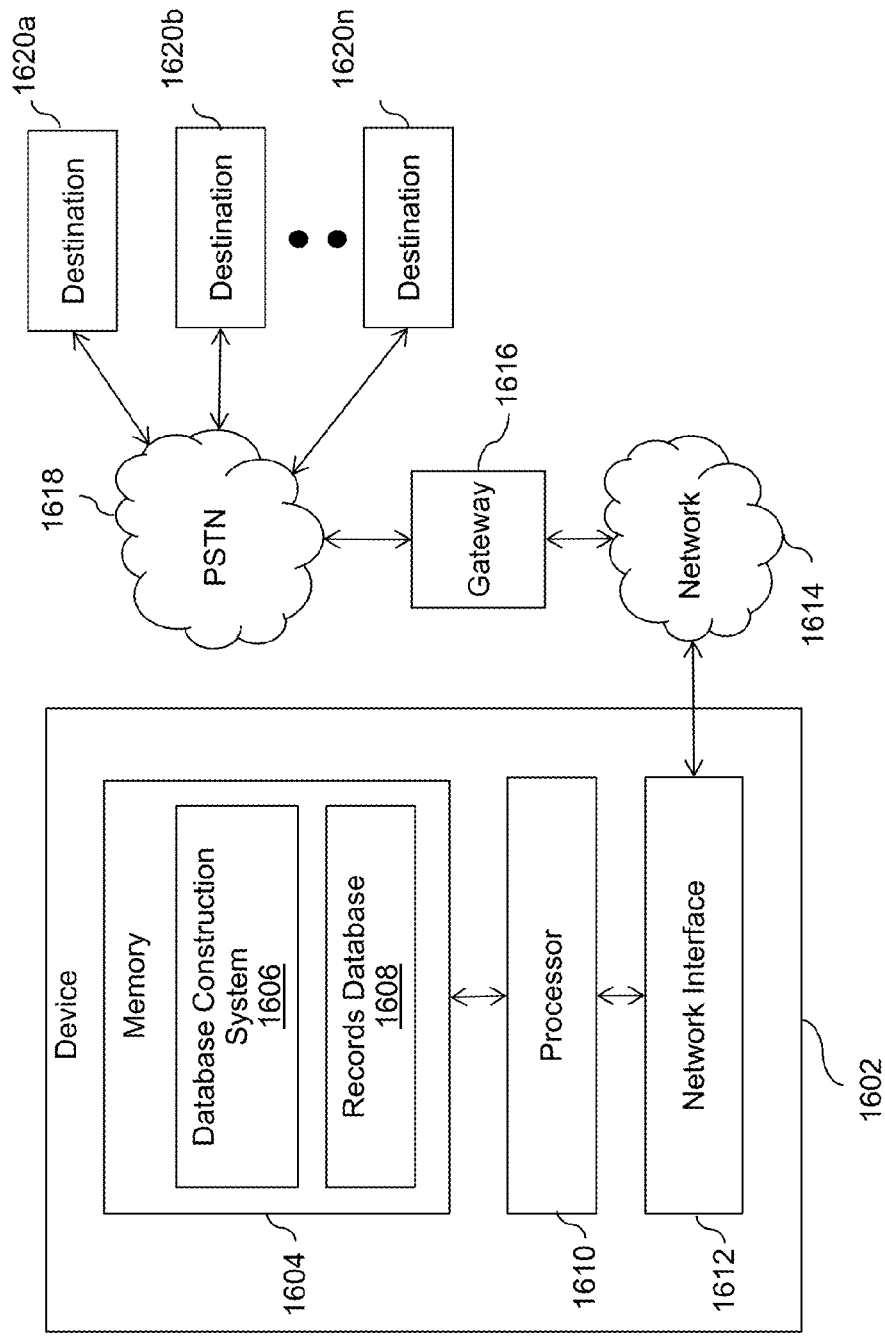
Figure 17A:
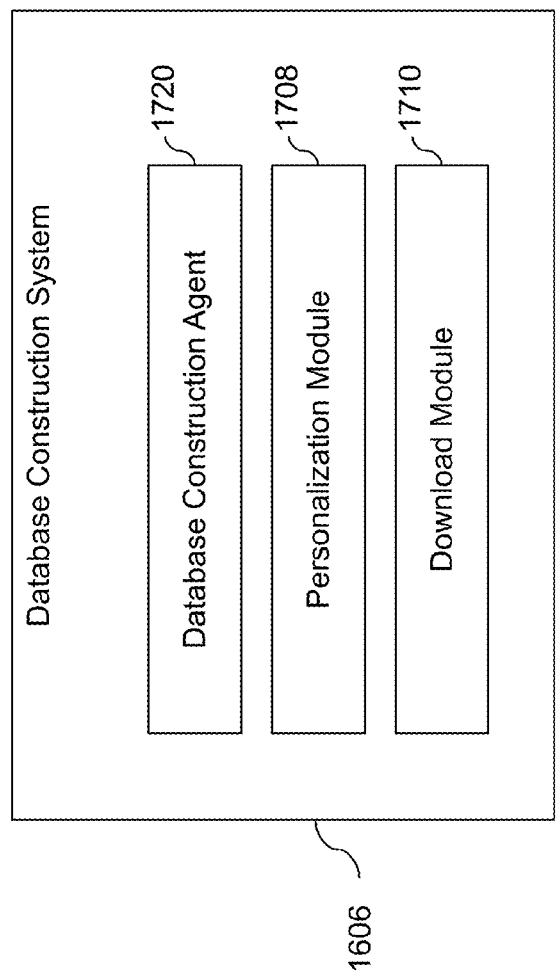
Figure 17B:
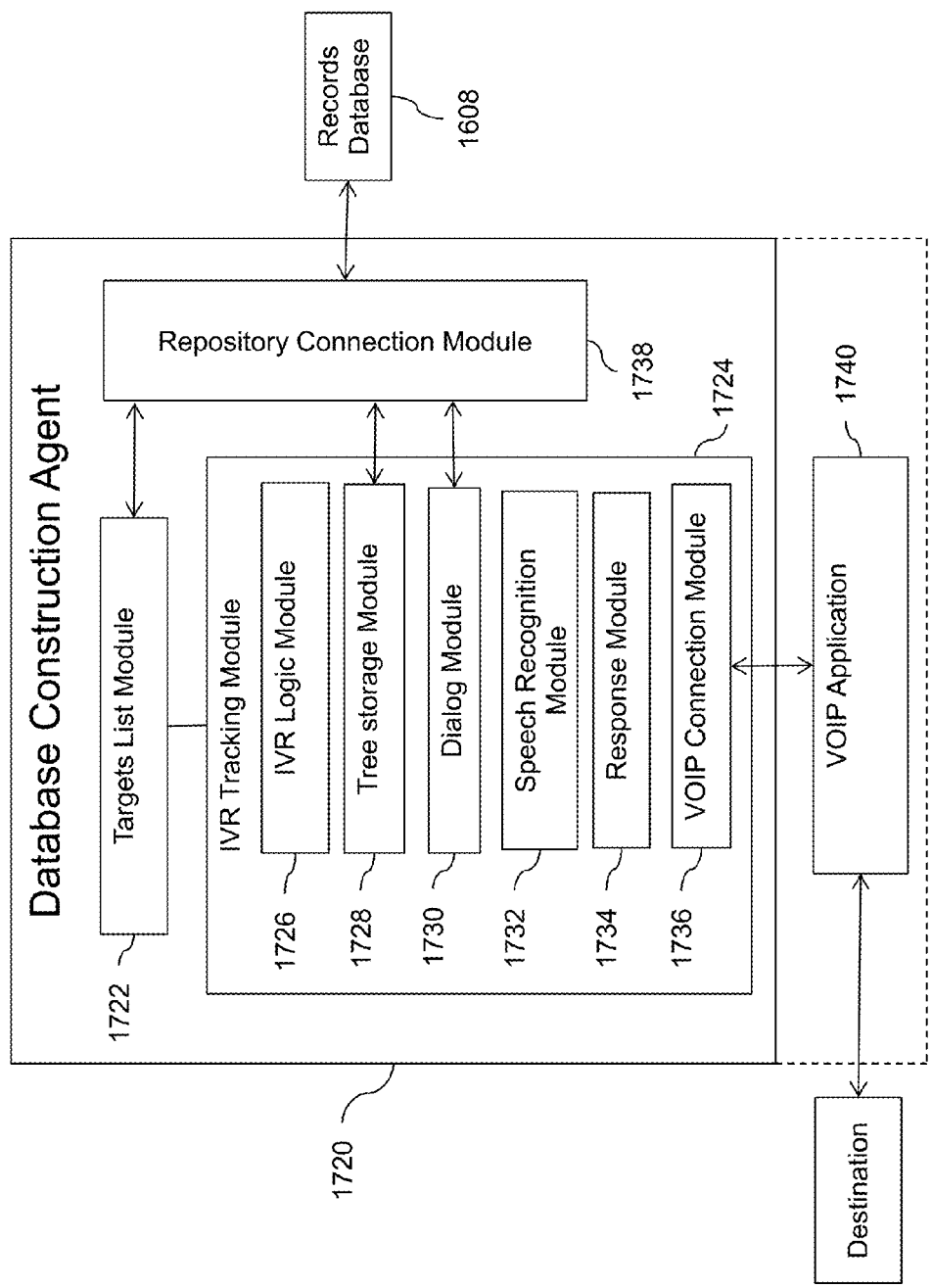
Figure 17C:
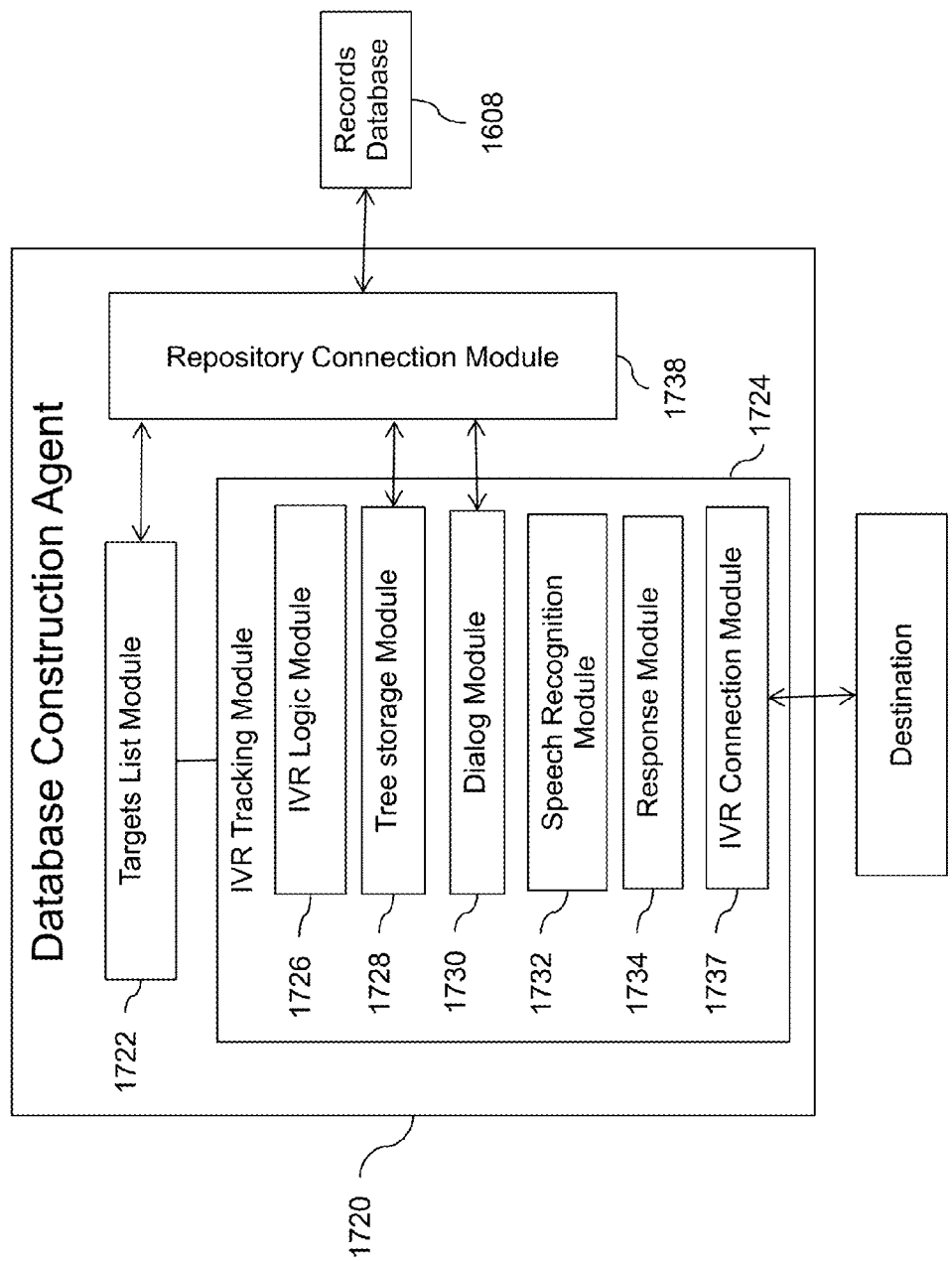
Figure 18A:
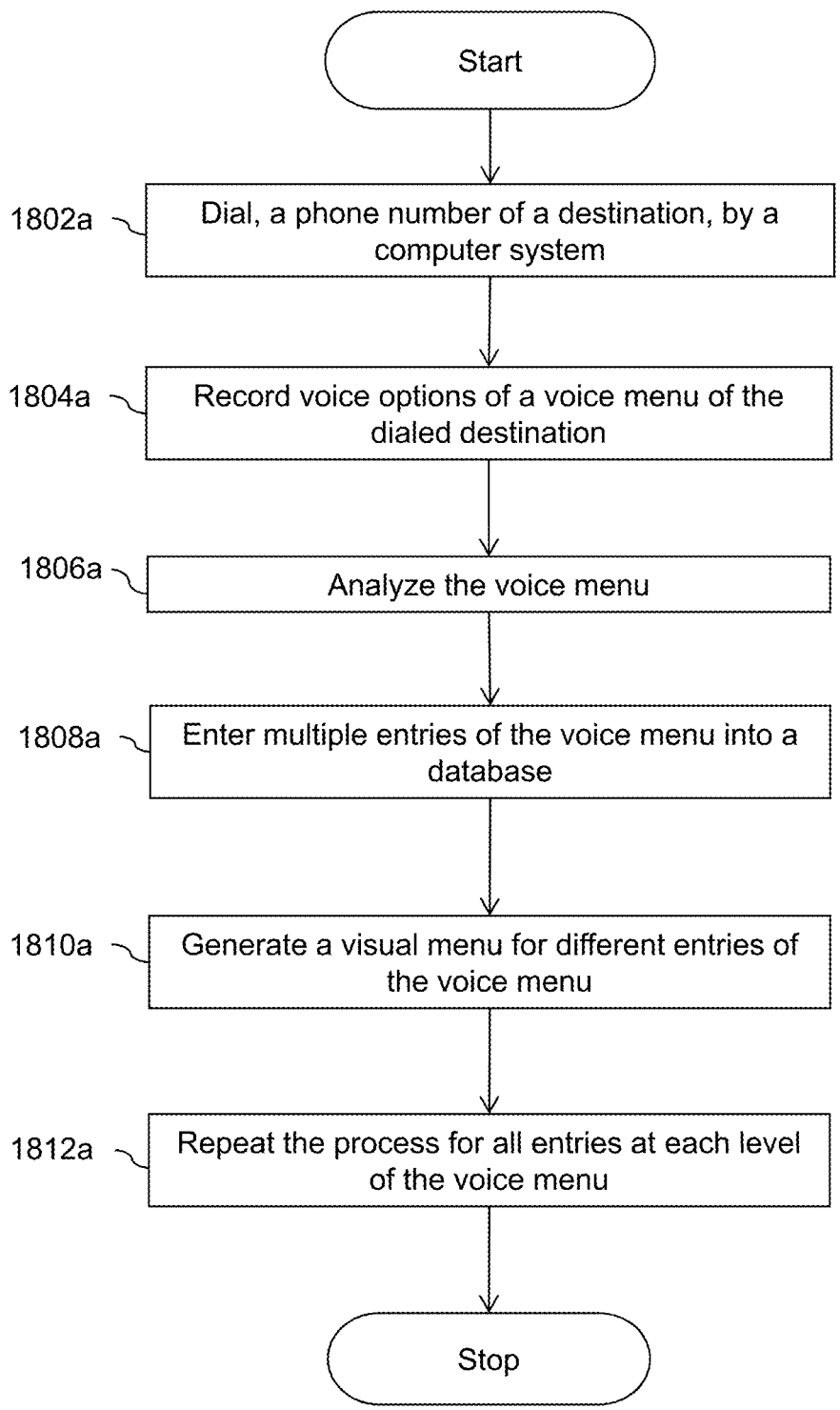
Figure 18B:
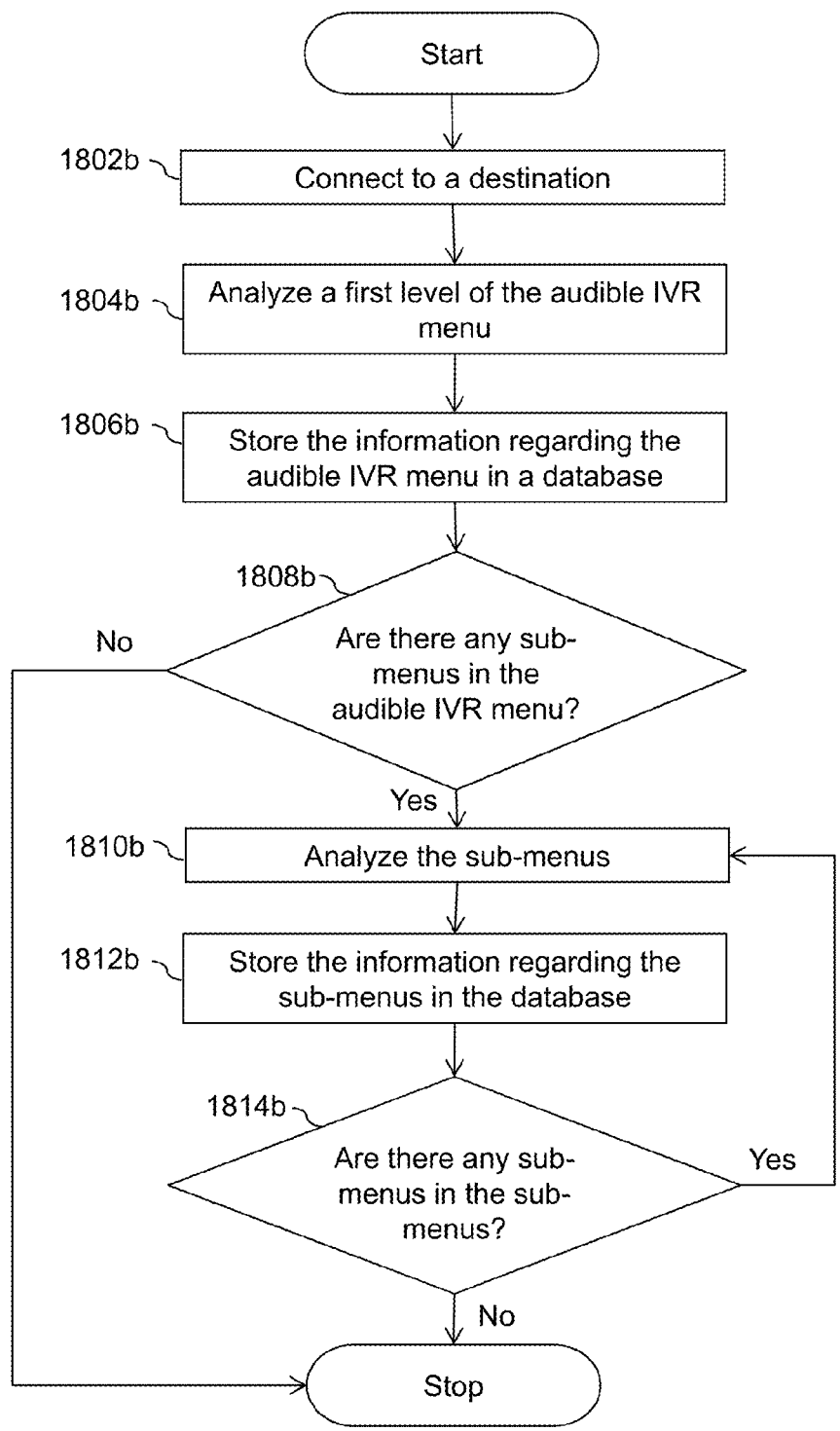
Figure 19:
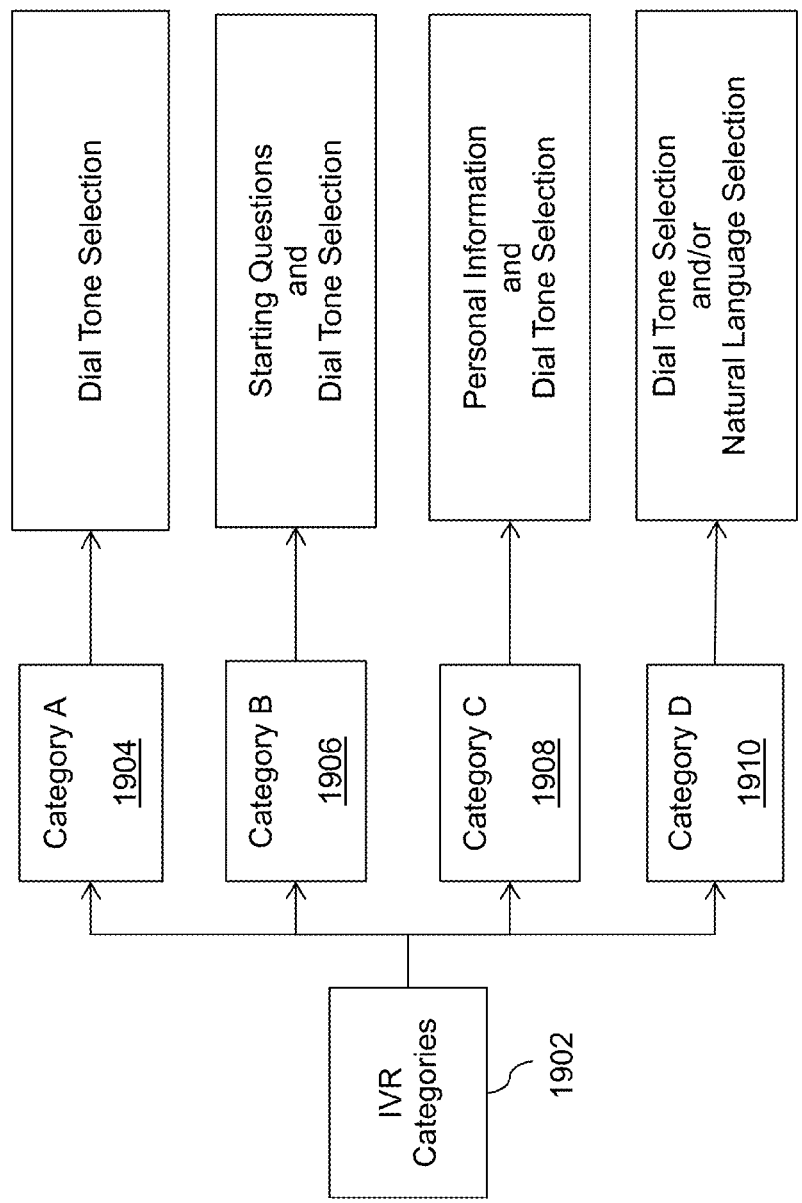
Figure 20A:
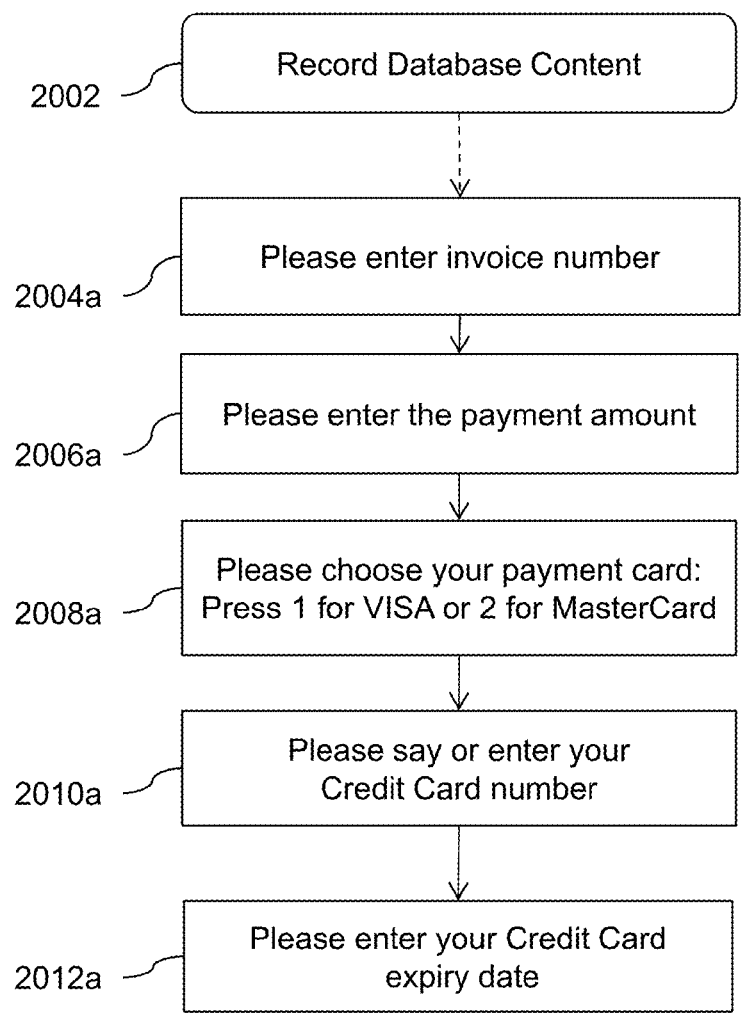
Figure 21:
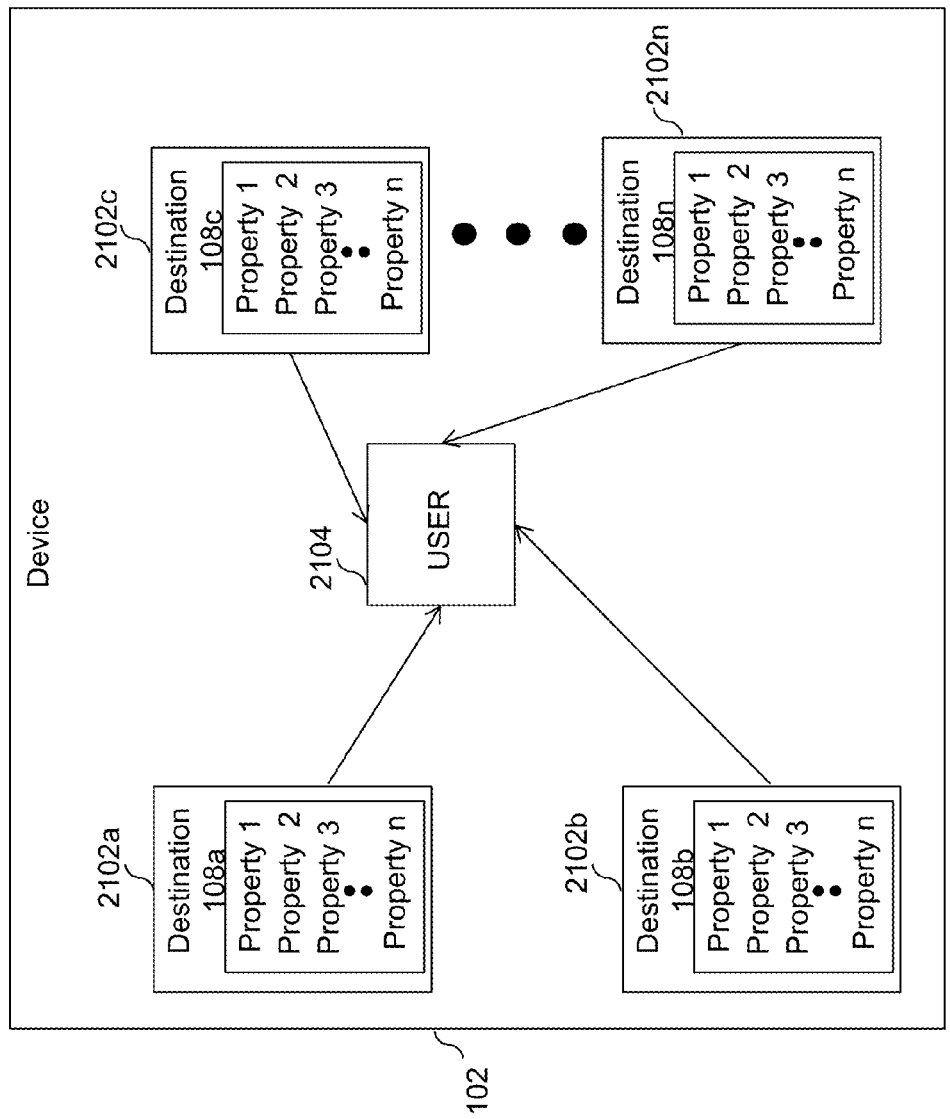
Figure 22:
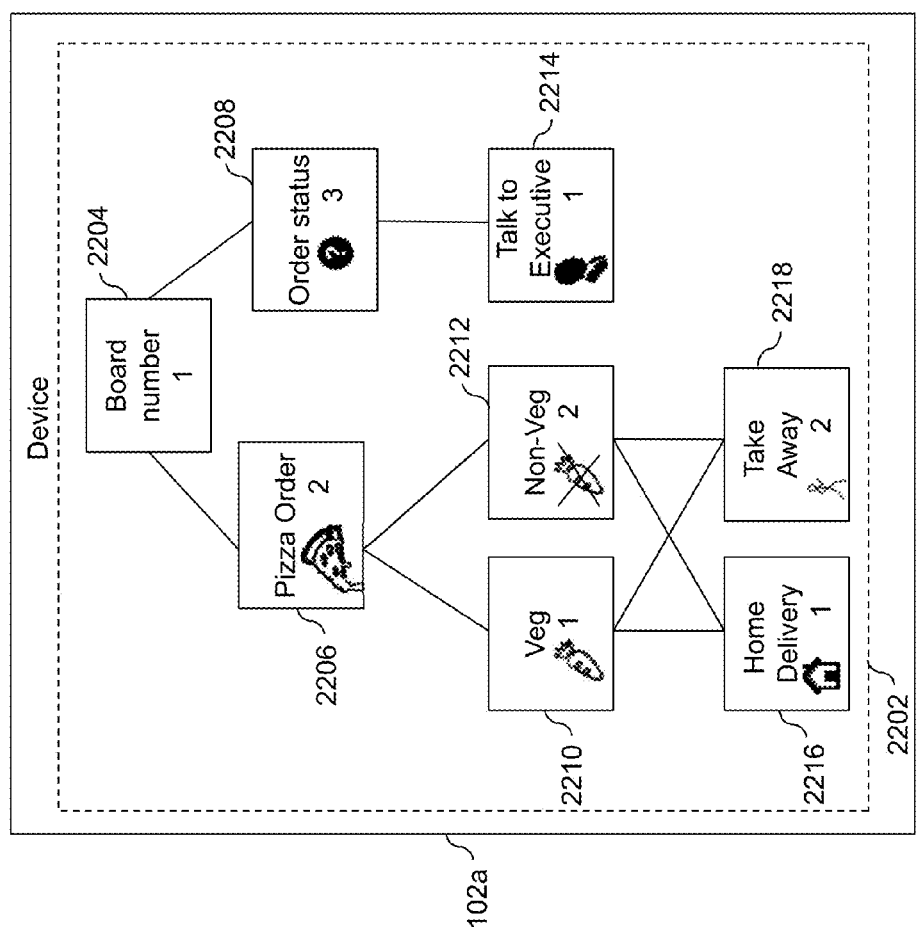
Figure 23A:
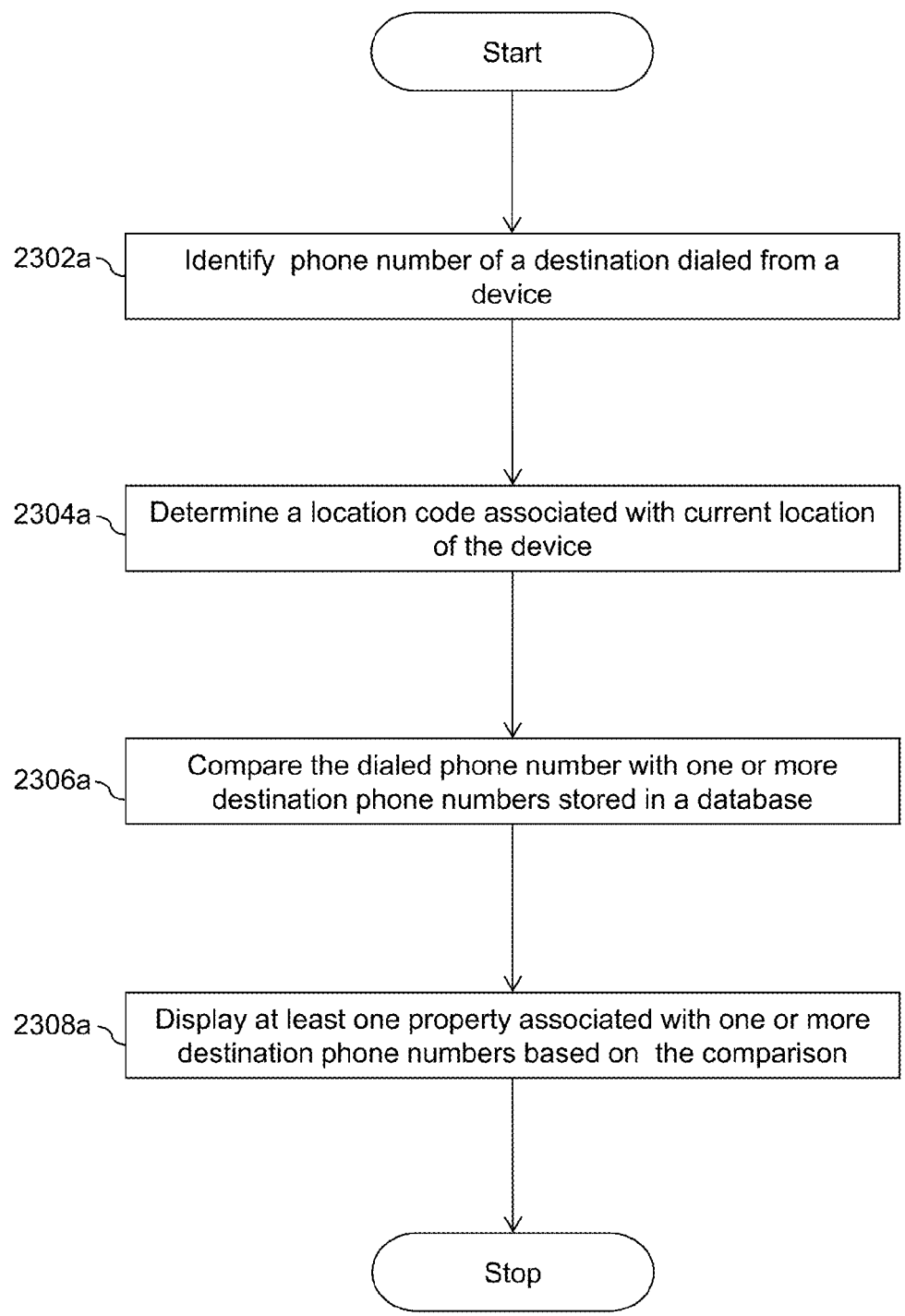
Figure 23B:
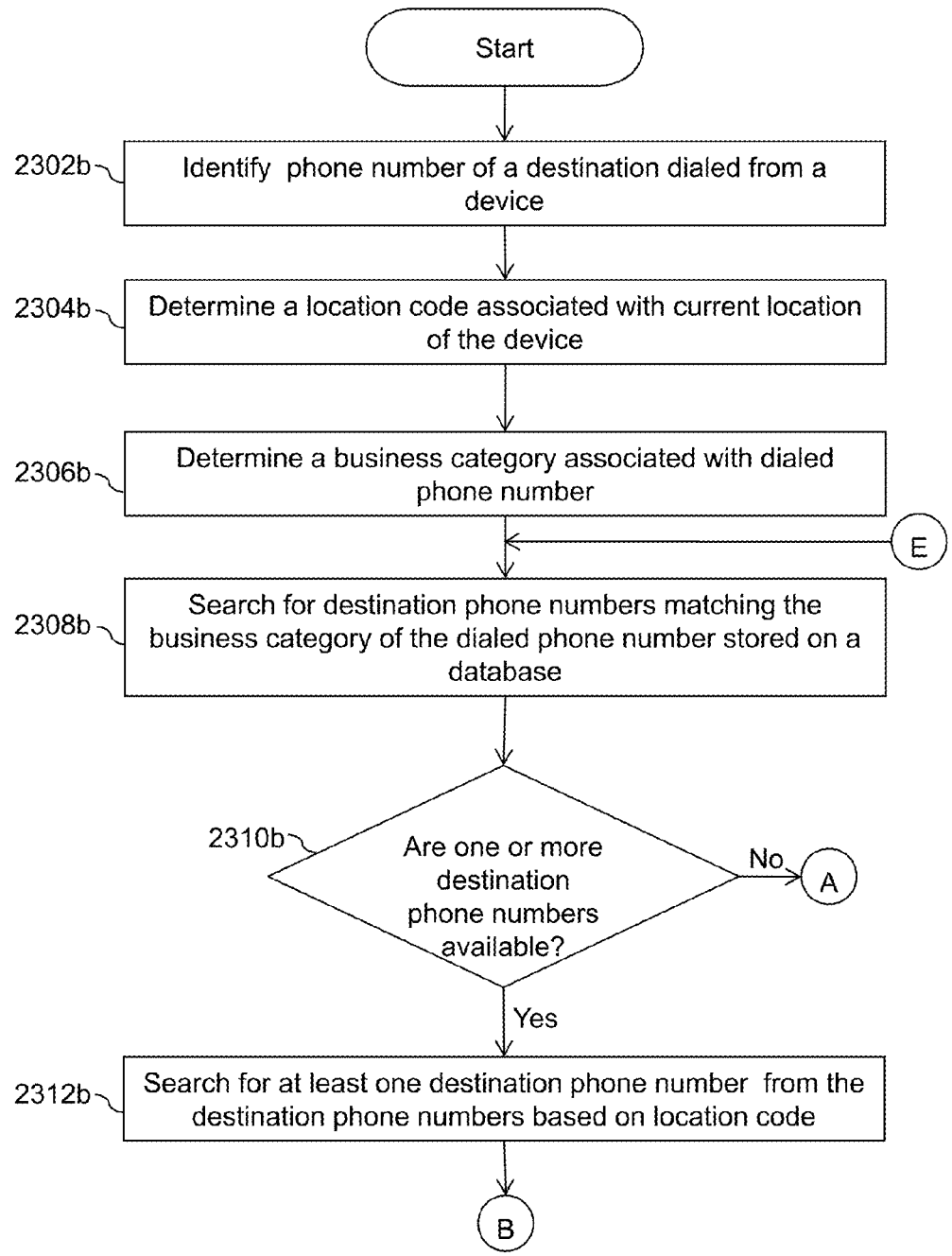
Figure 23C:
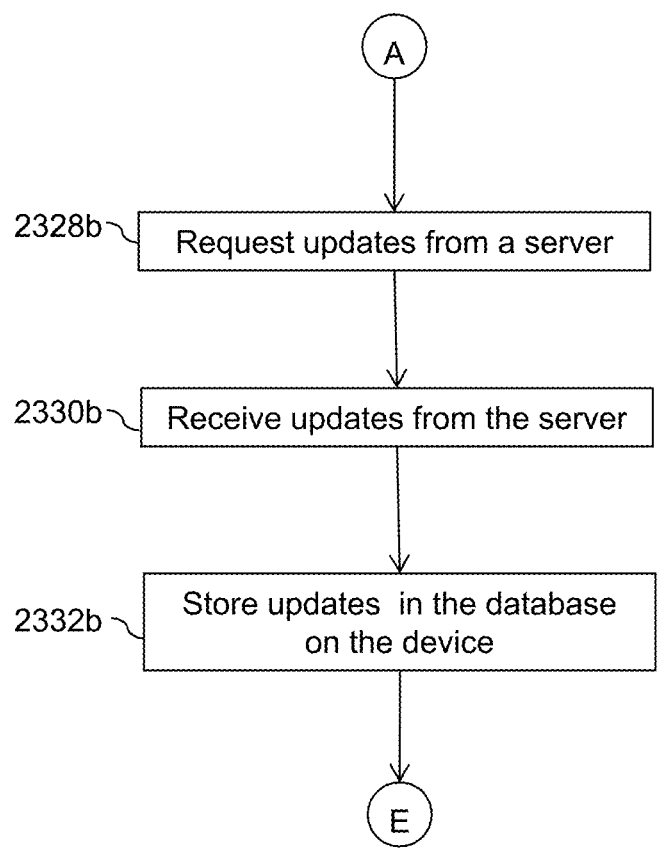
Figure 23D:
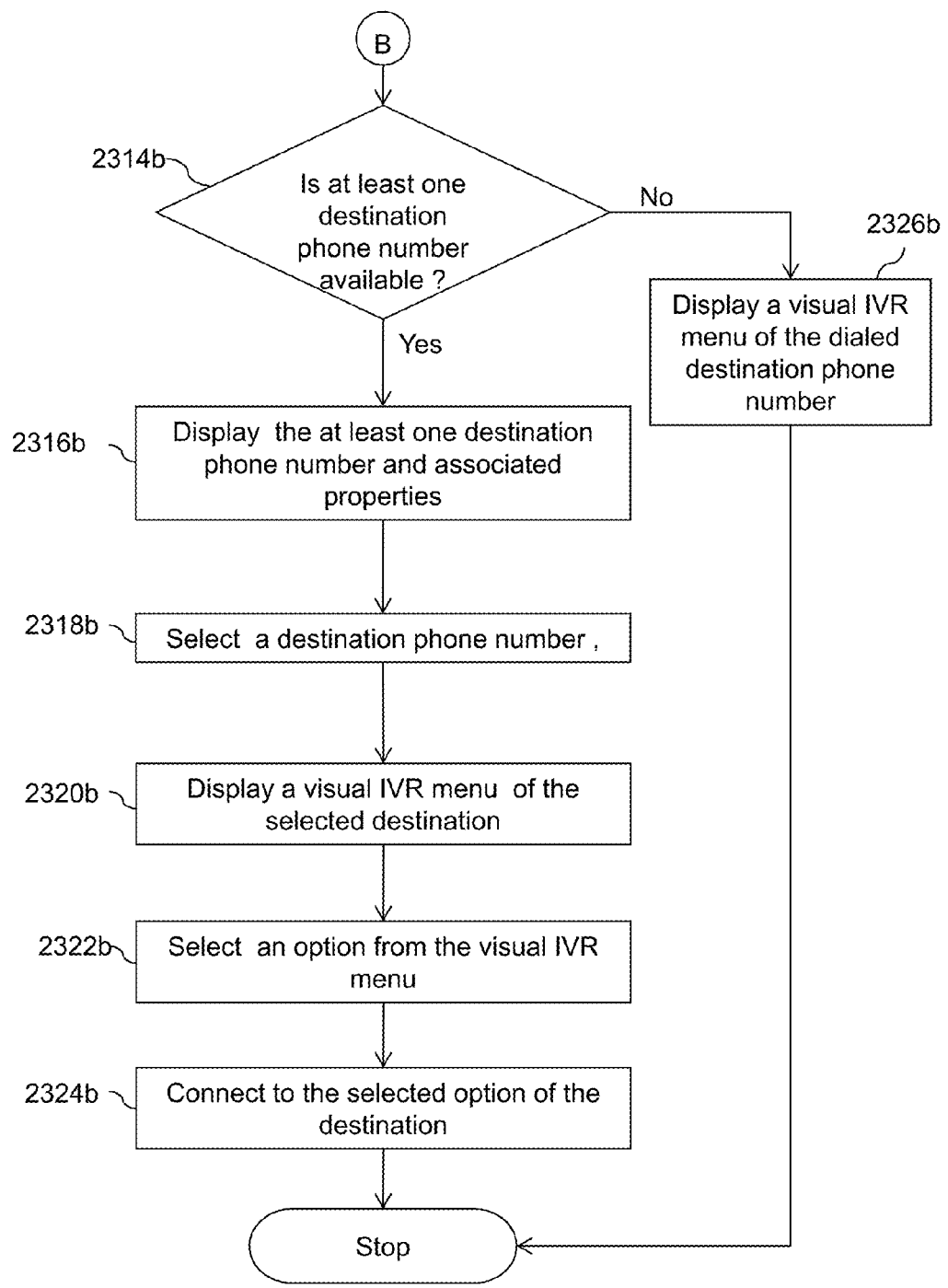
Figure 24:
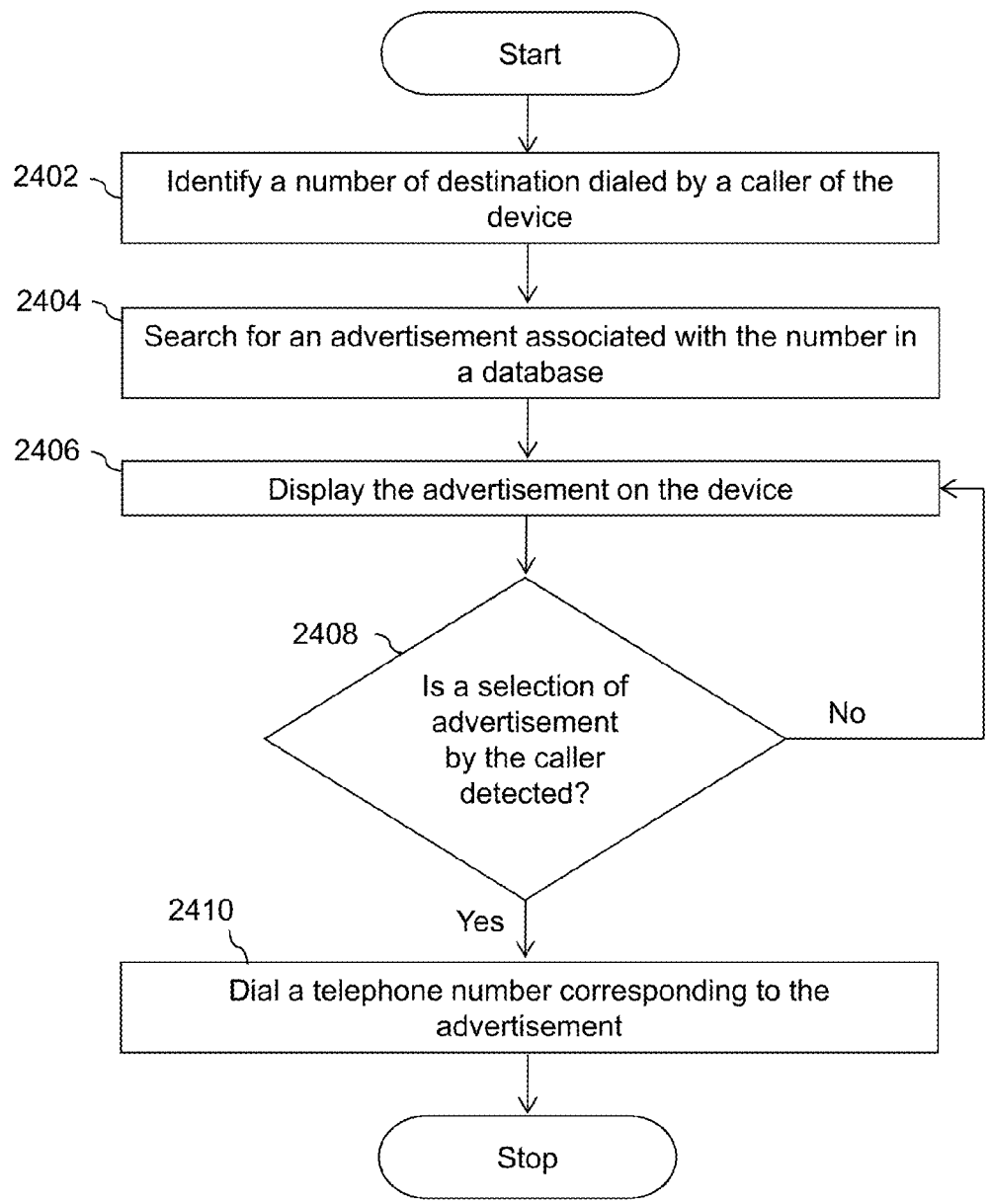
Figure 25A:
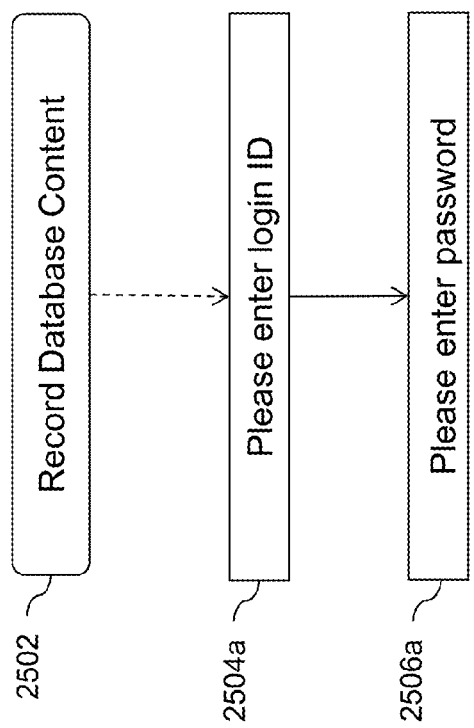
Figure 26A:
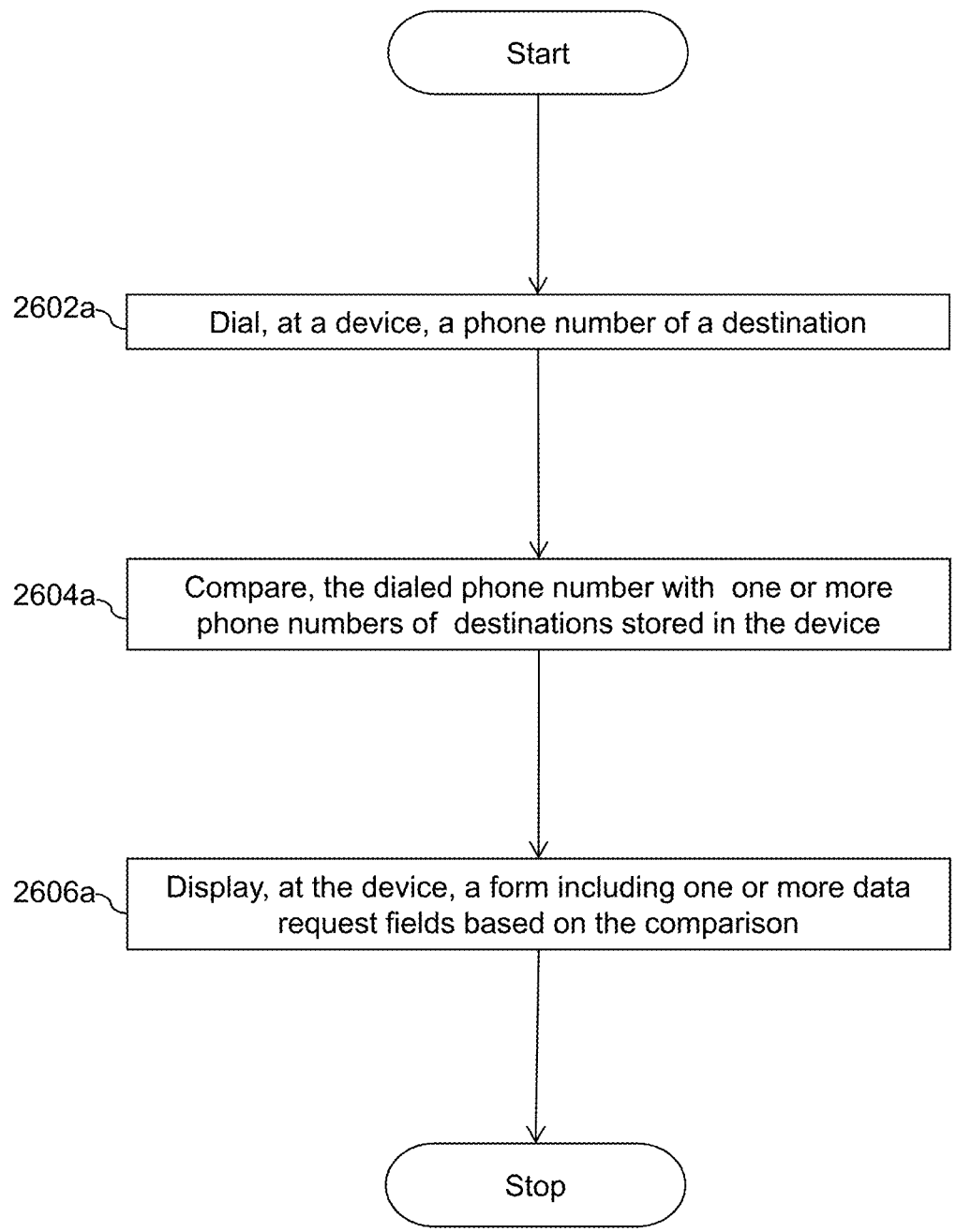
Figure 26B:
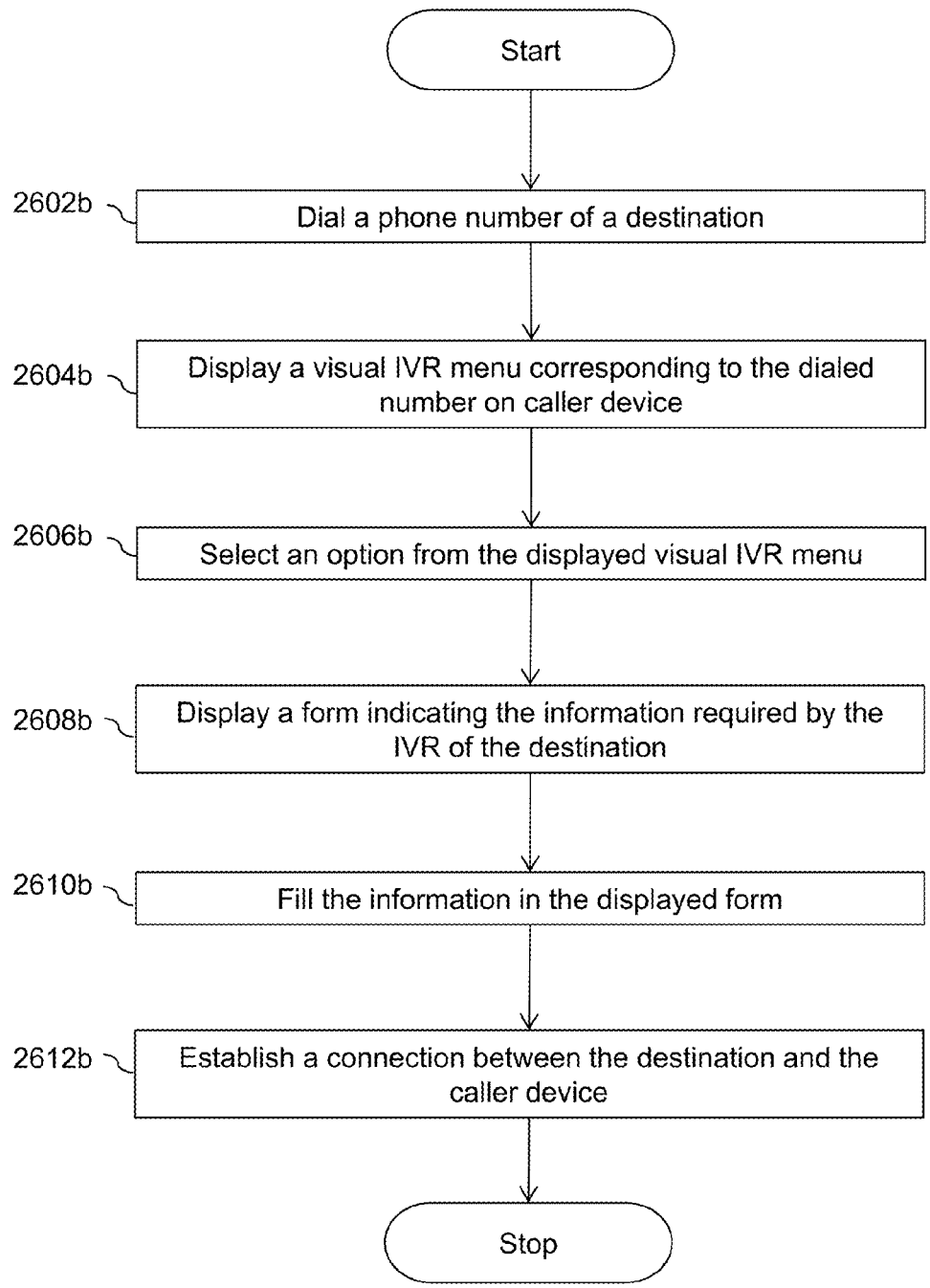
Figure 27:
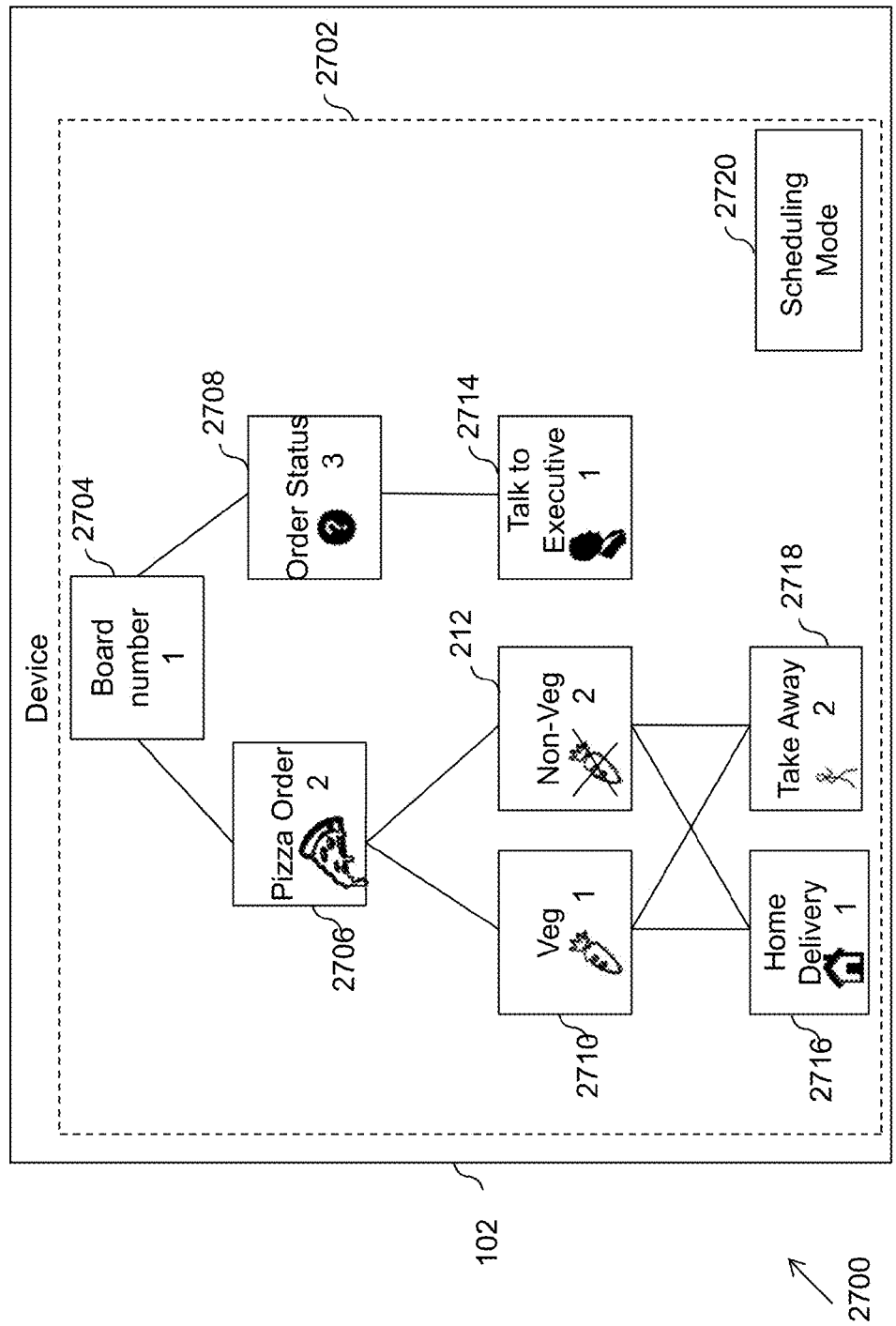
Figure 28:
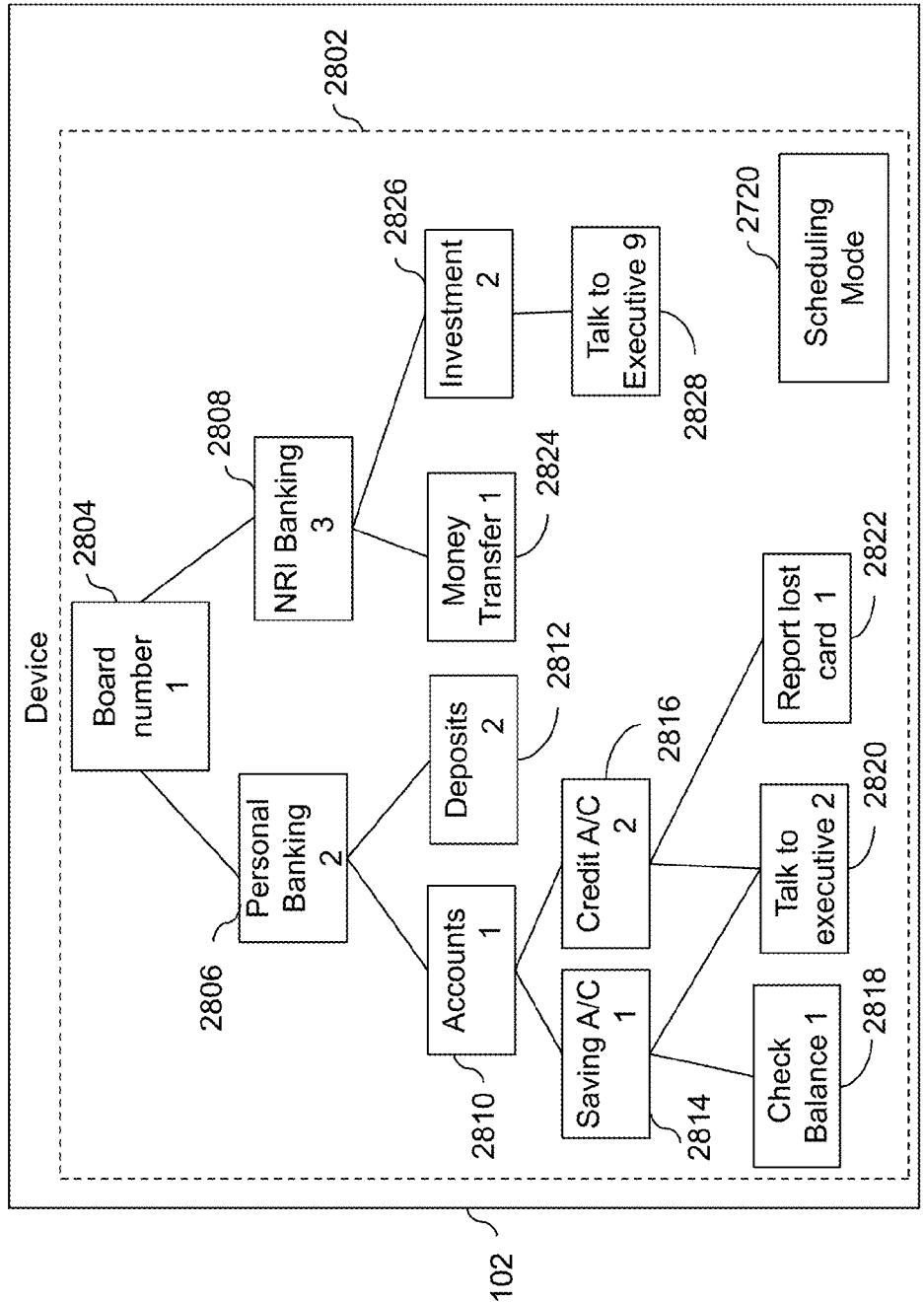
Figure 29:
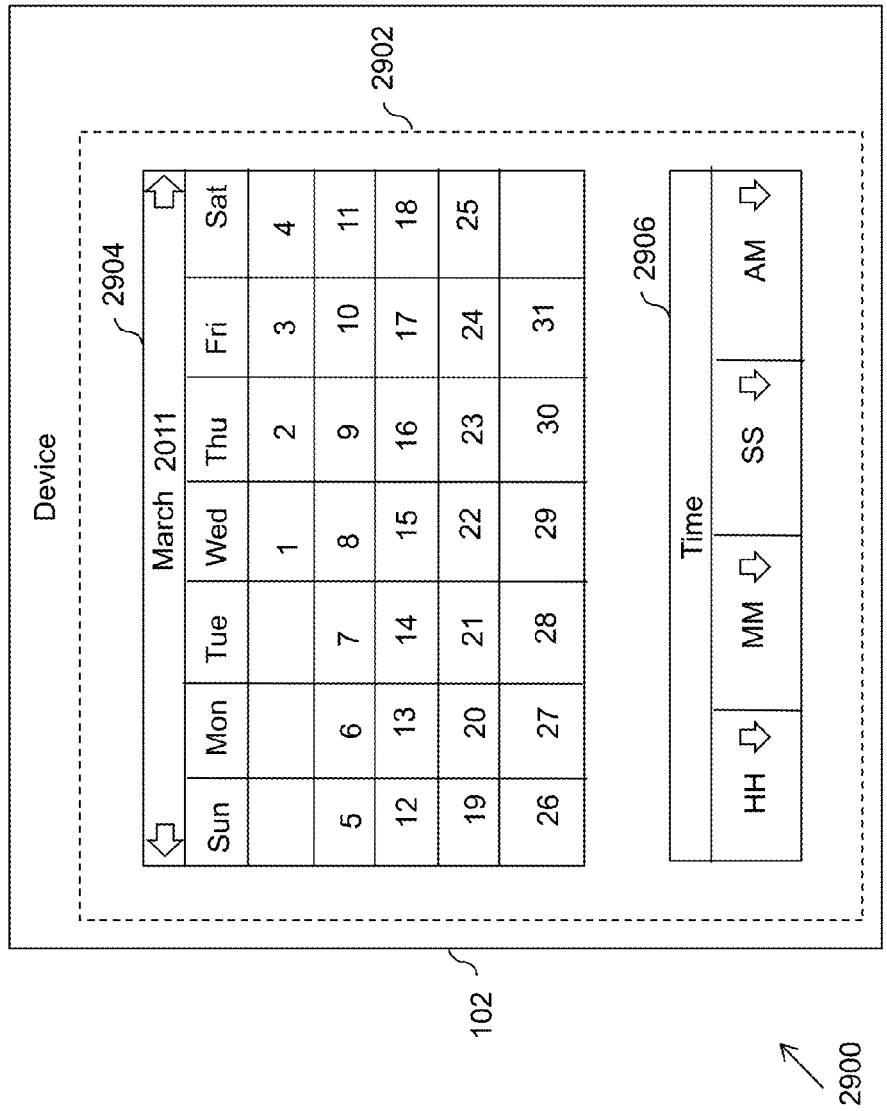
Figure 30A:
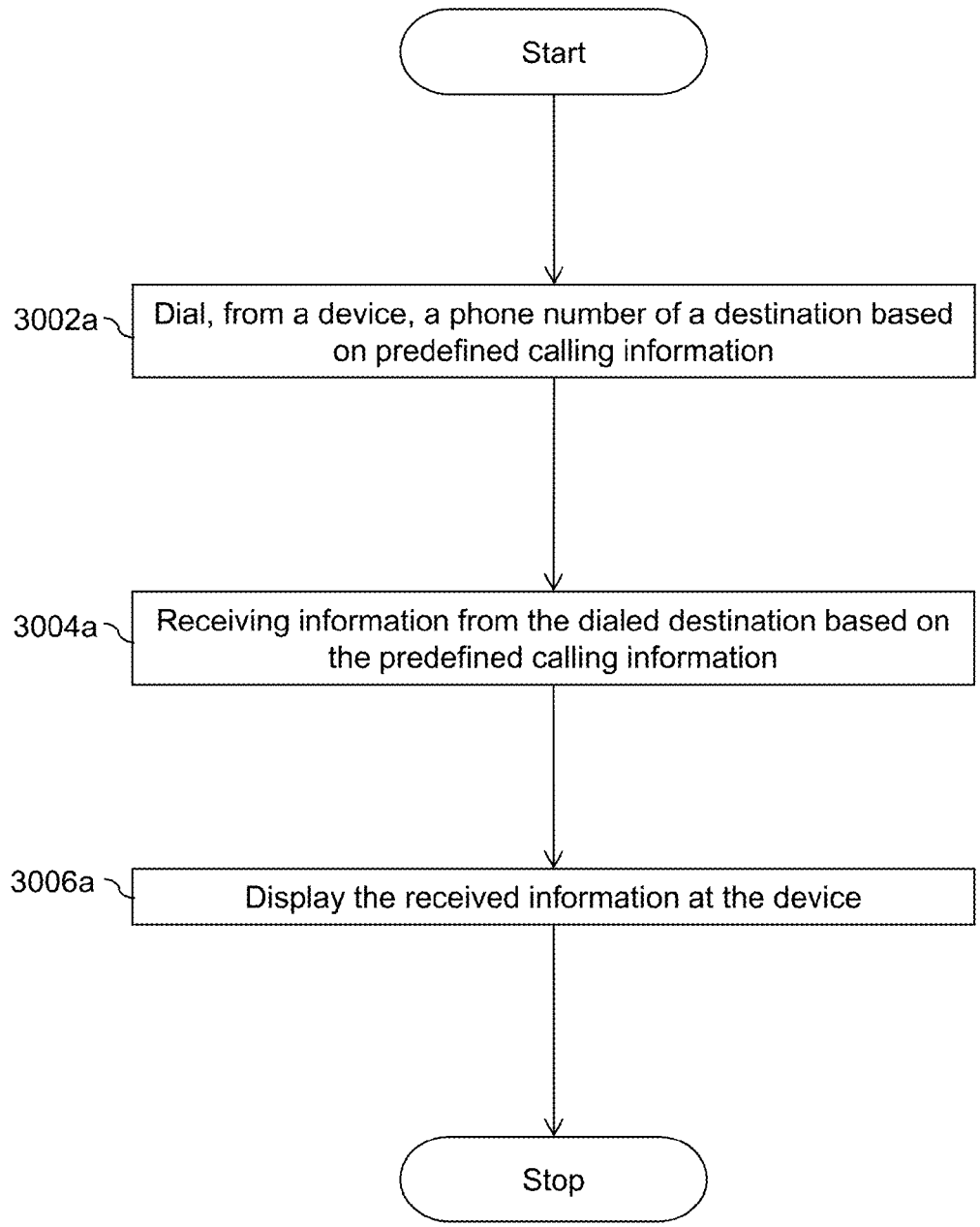
Figure 30B:
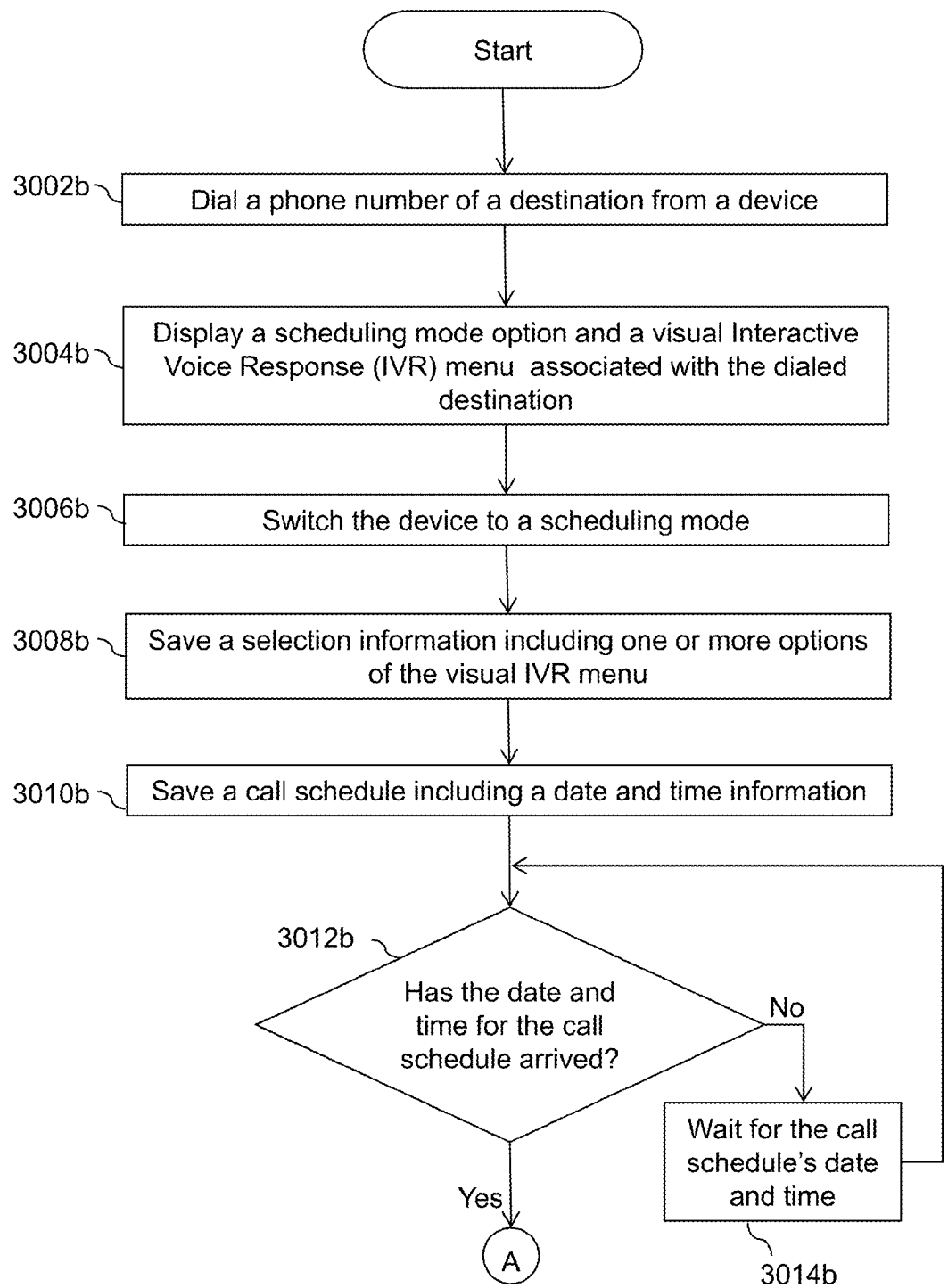
Figure 30C:
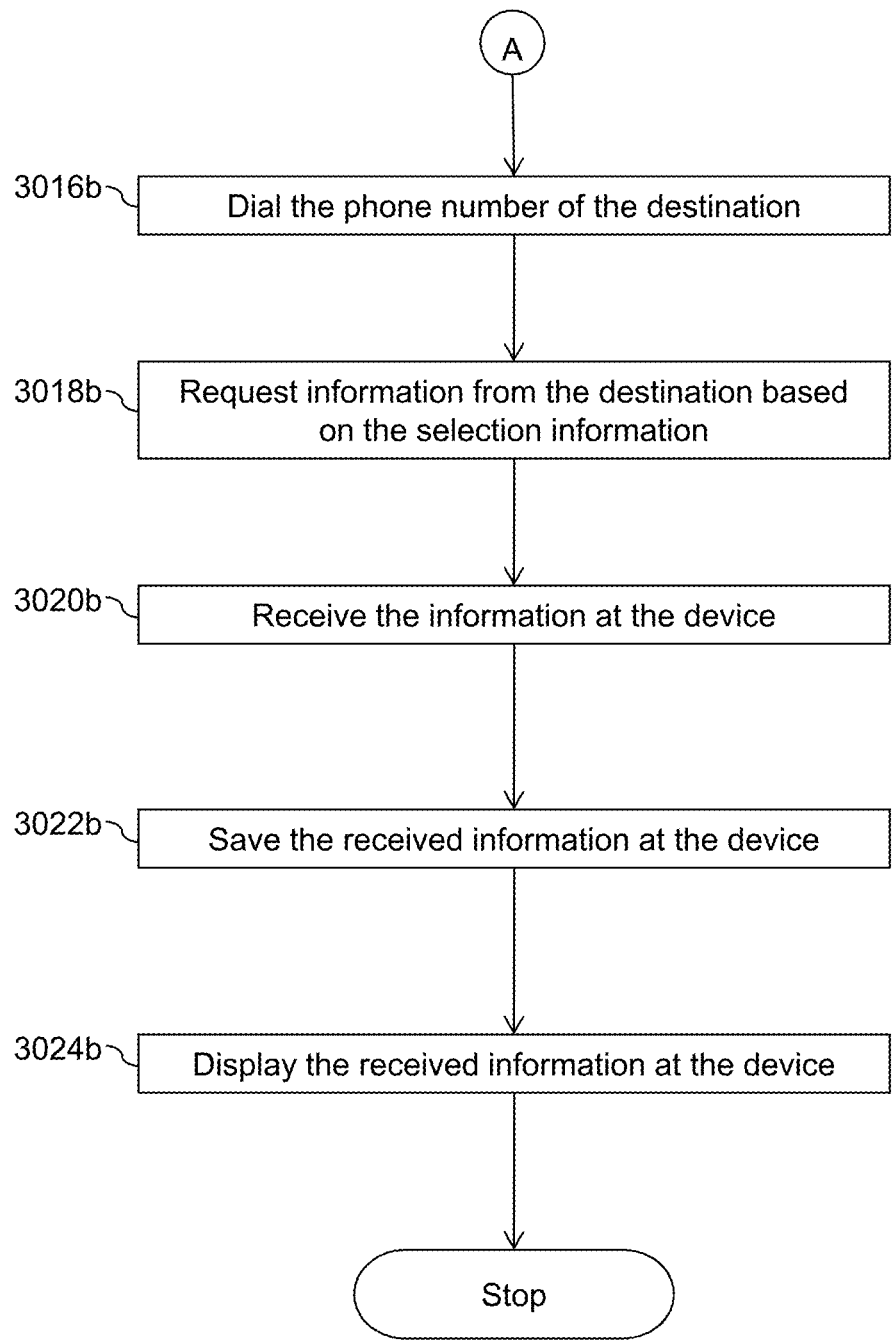
Figure 32:
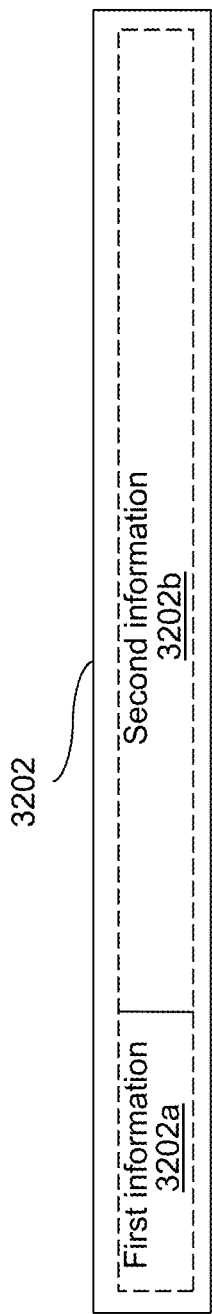
Figure 33:
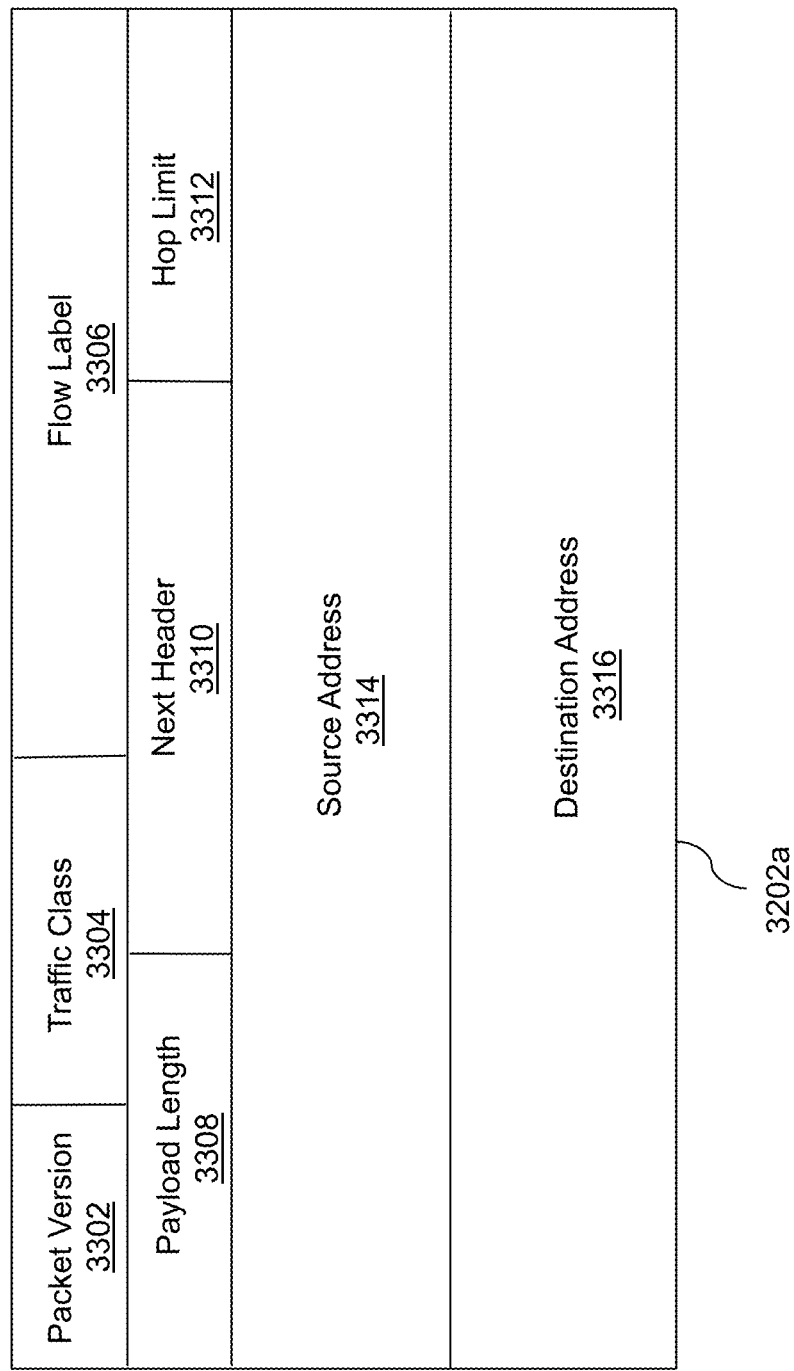
Figure 34A:
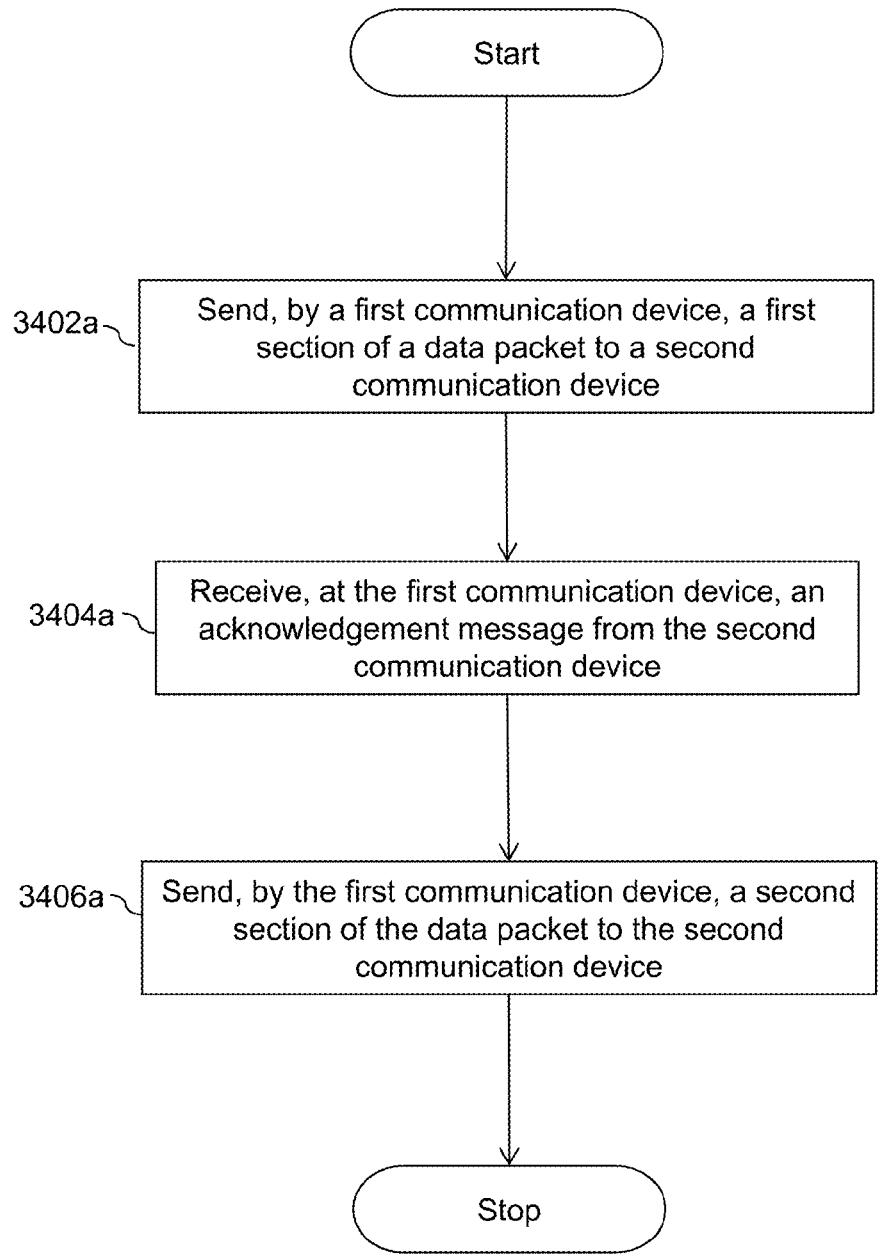
Figure 34B:
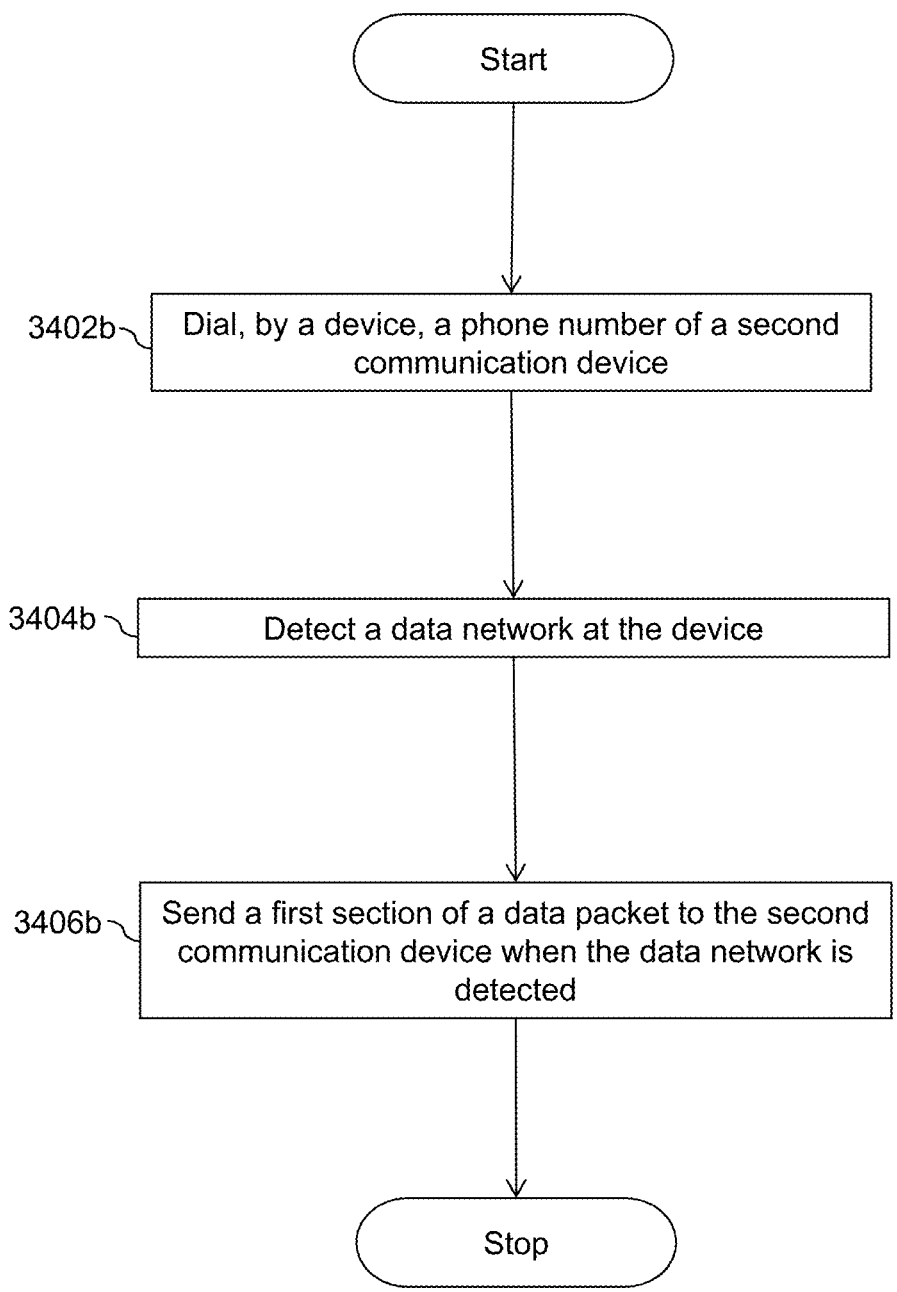
Figure 34C:
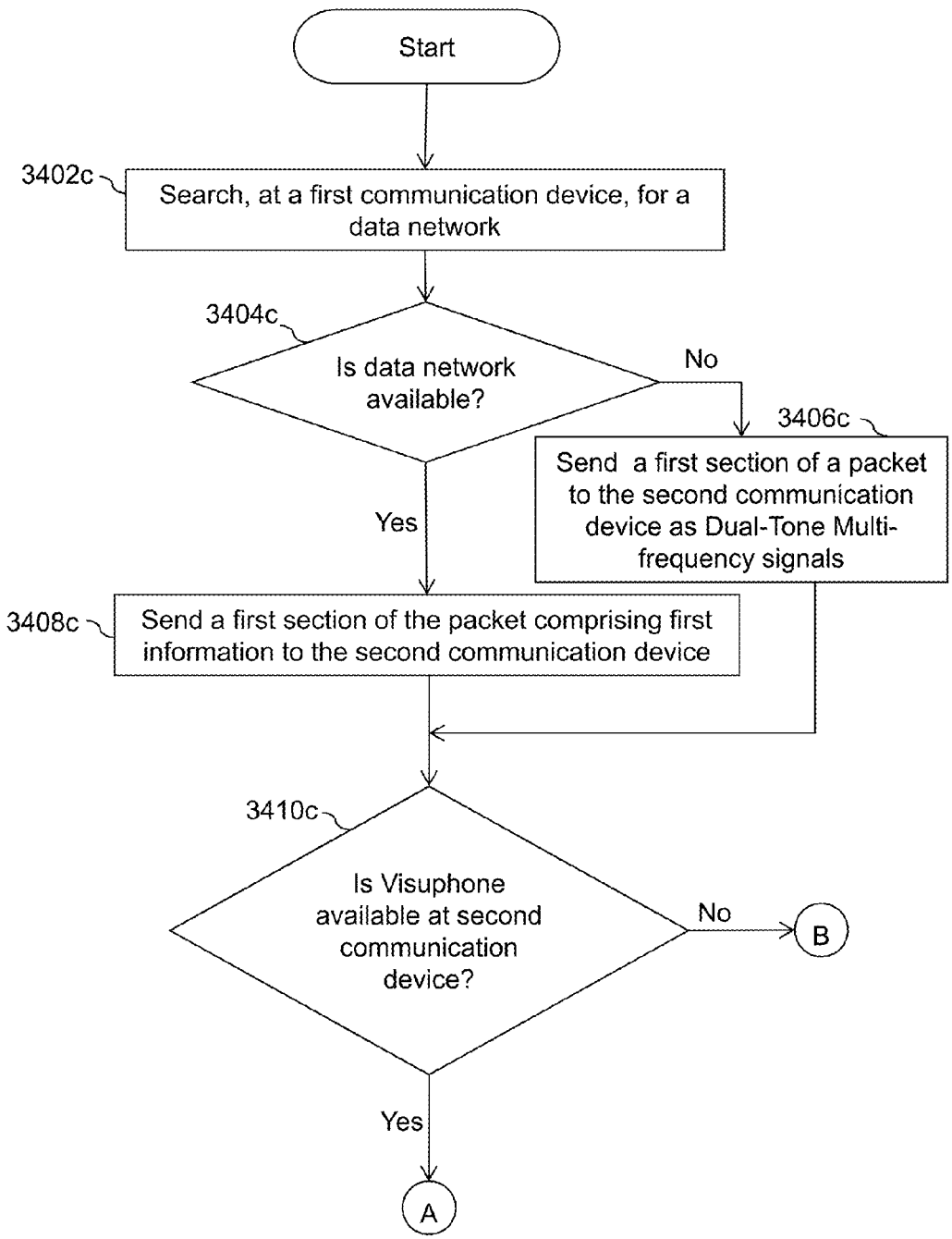
Figure 34D:
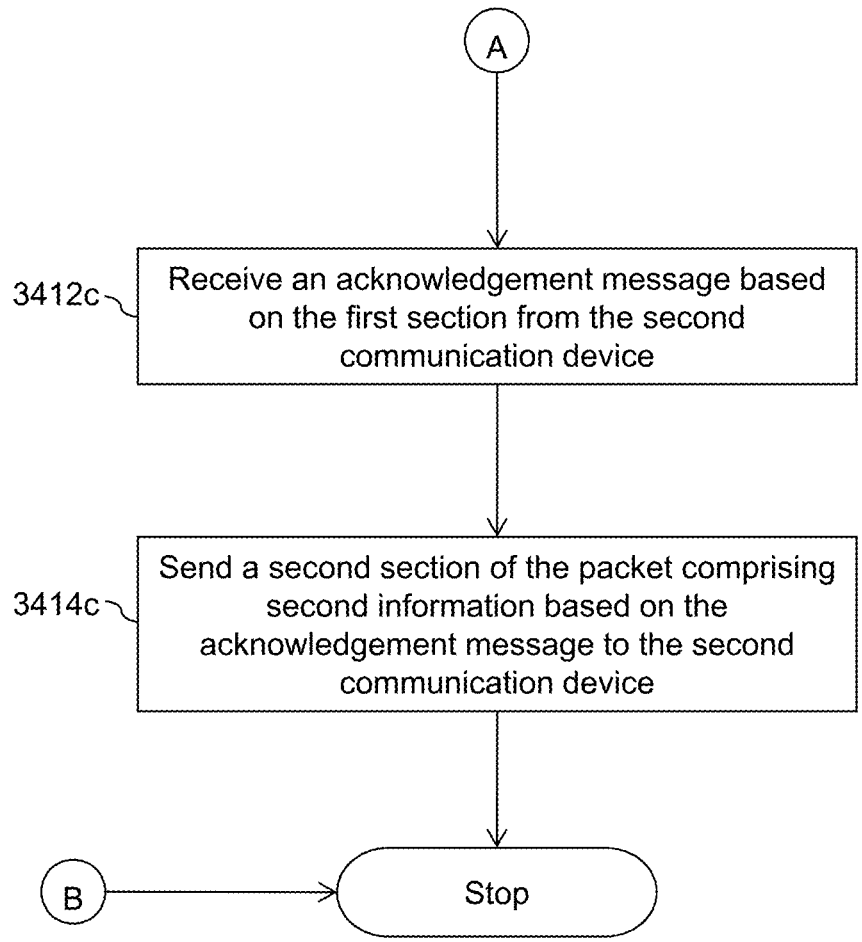
Figure 35A:
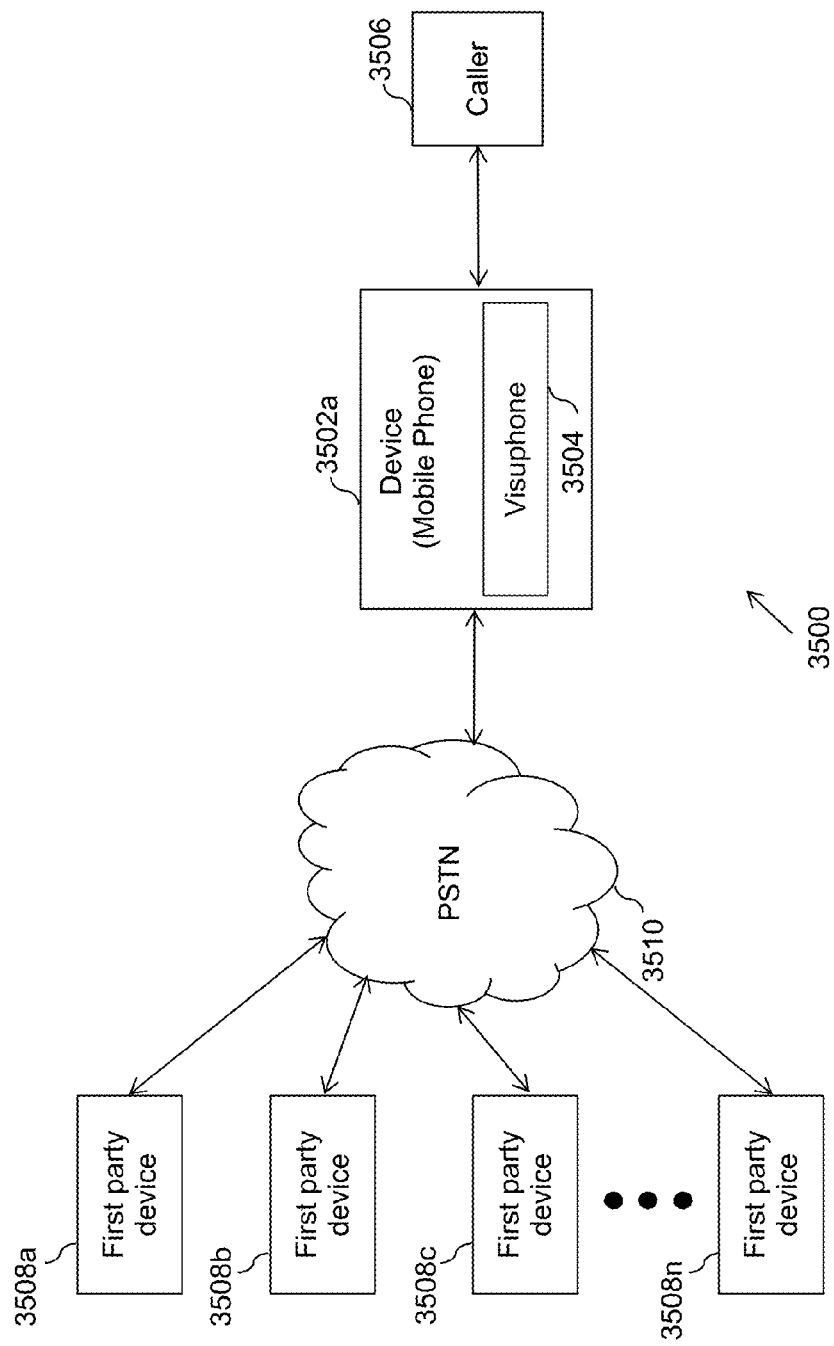
Figure 35B:
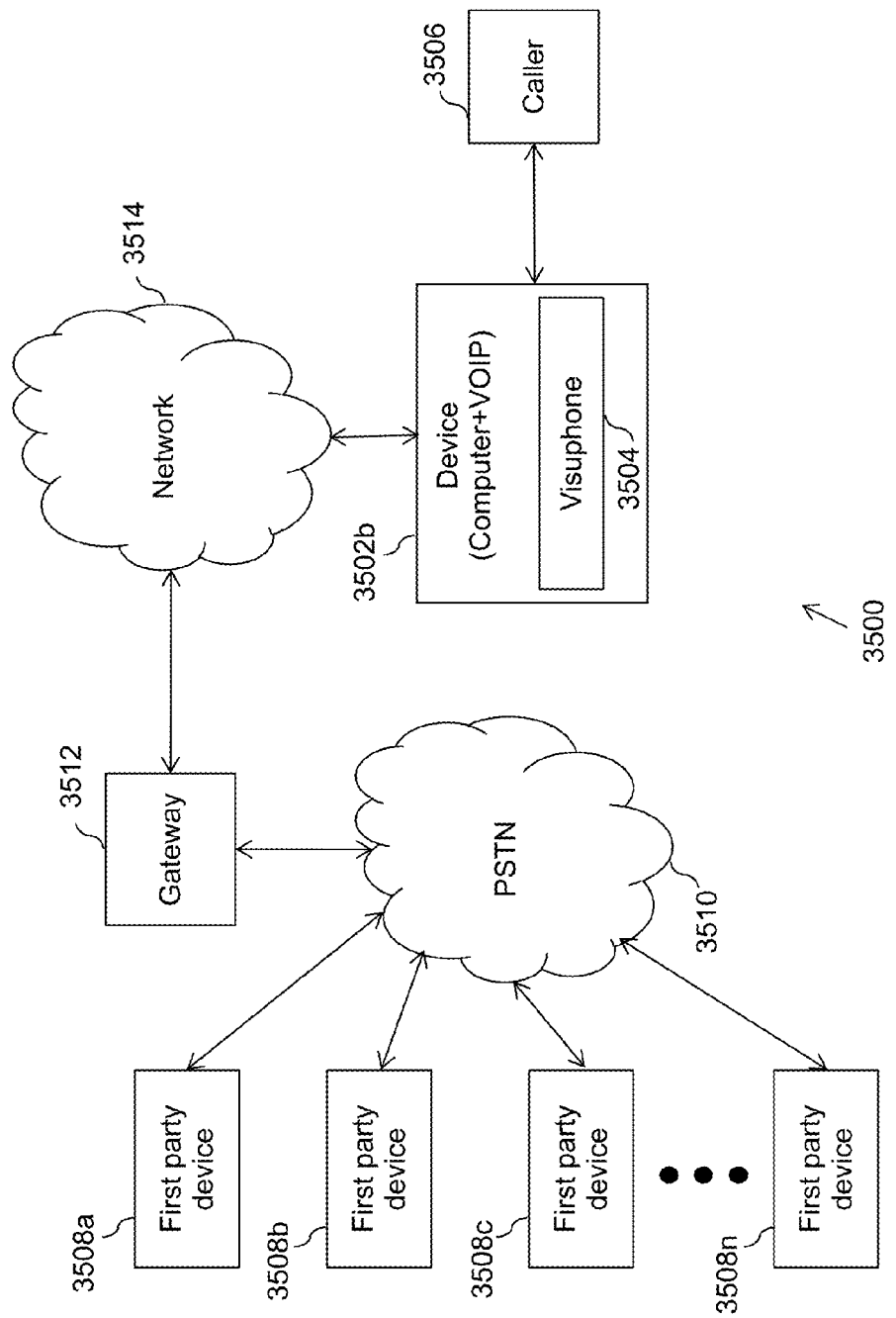
Figure 35C:
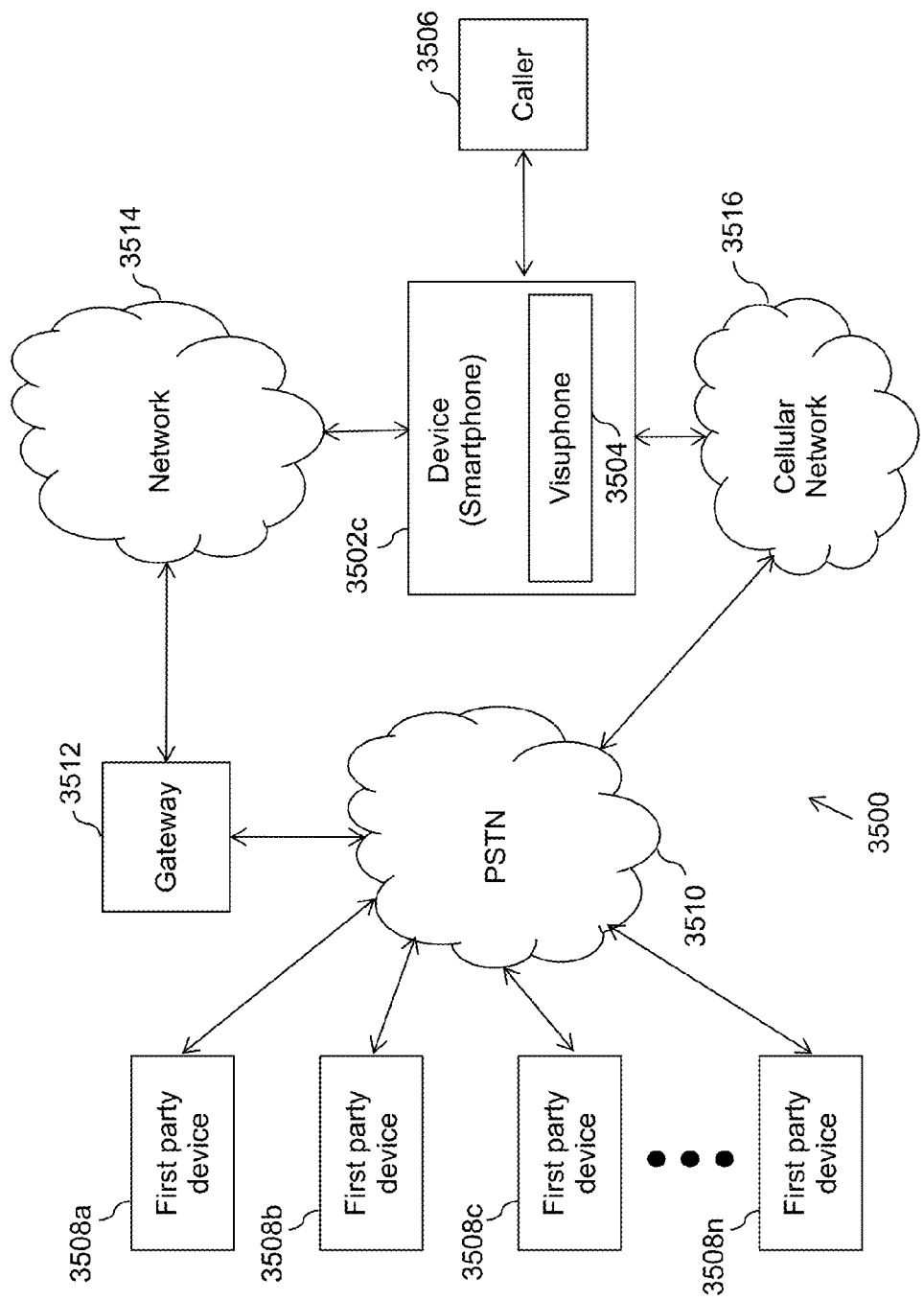
Figure 36:
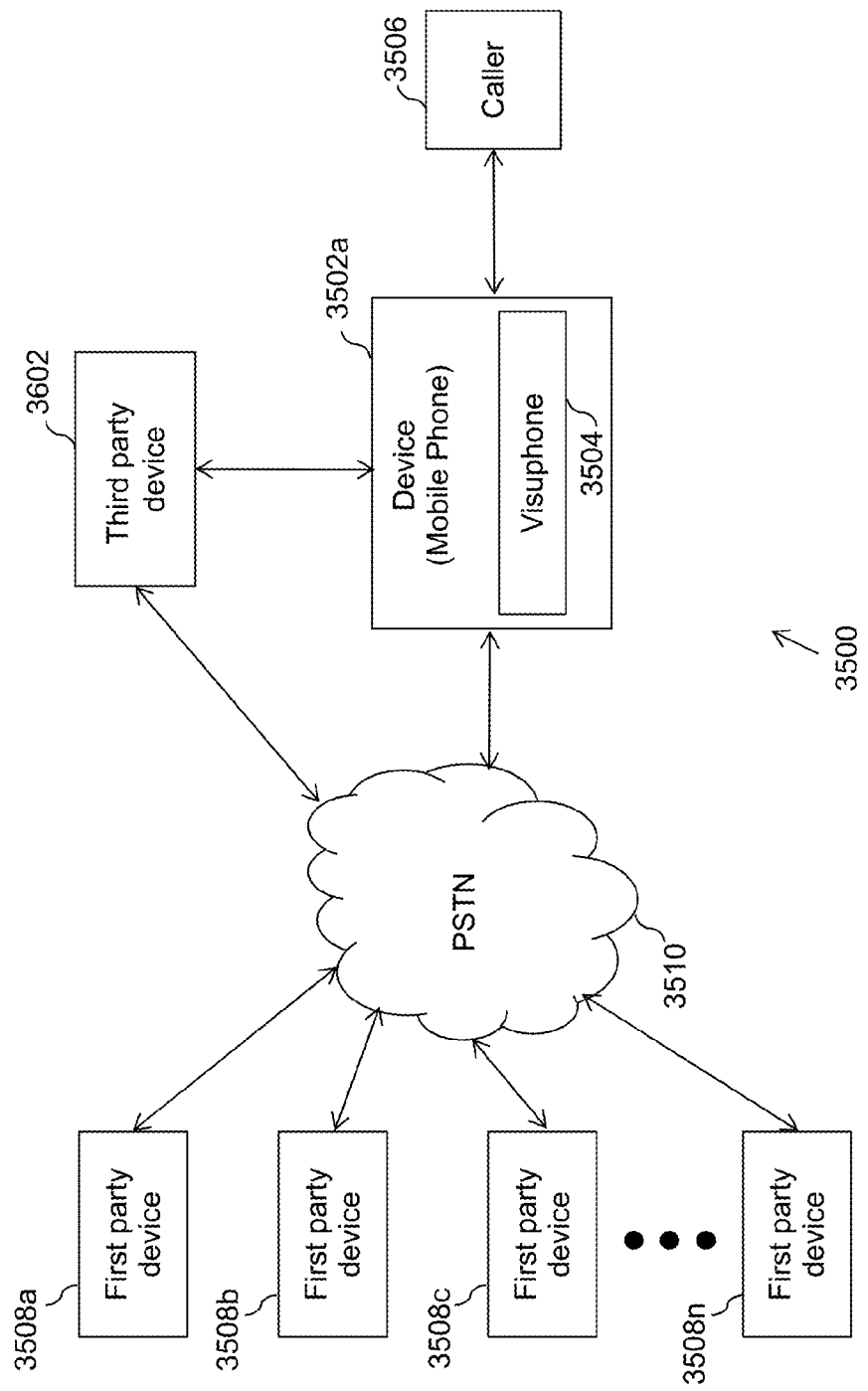
Figure 37:
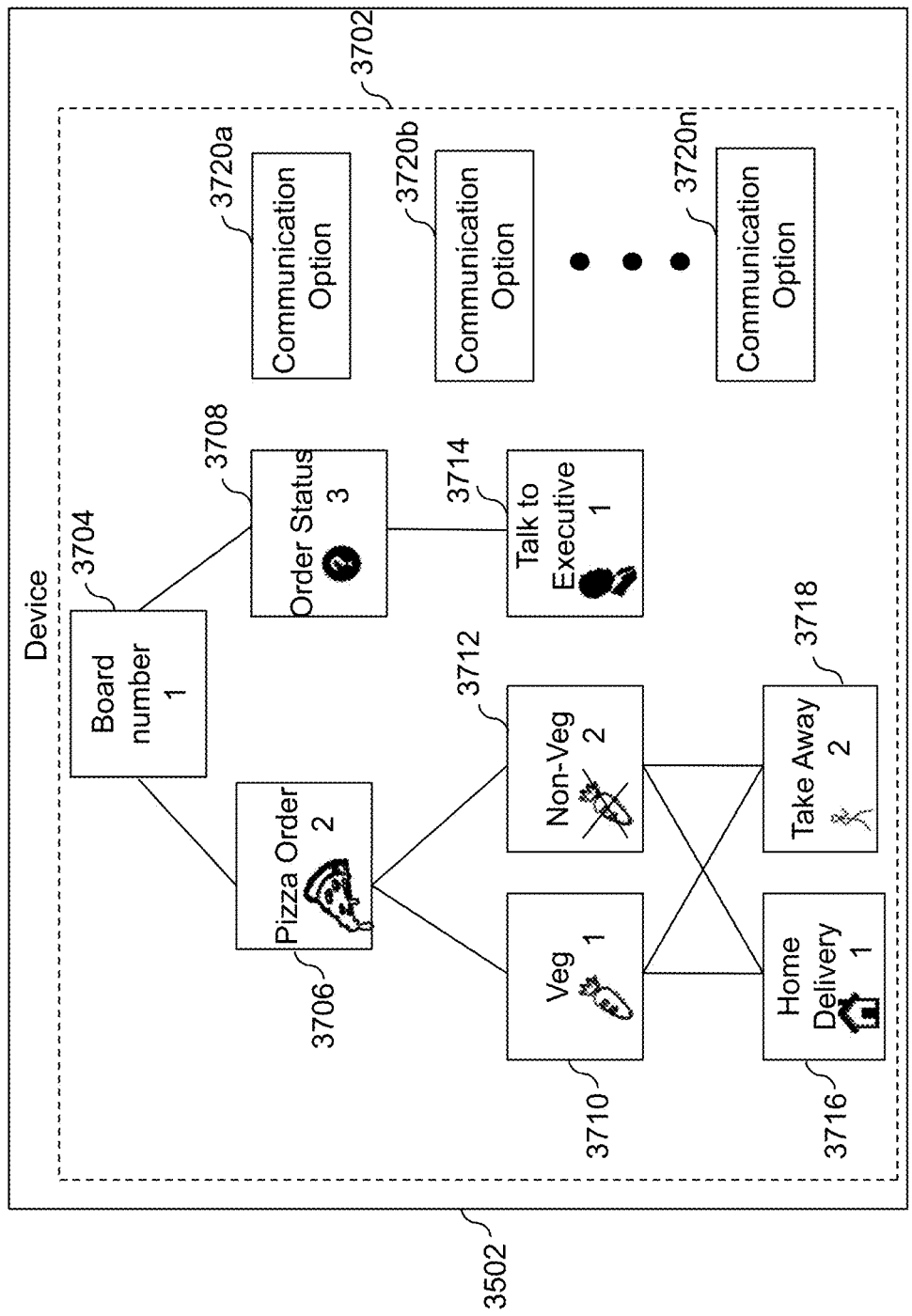
Figure 38:
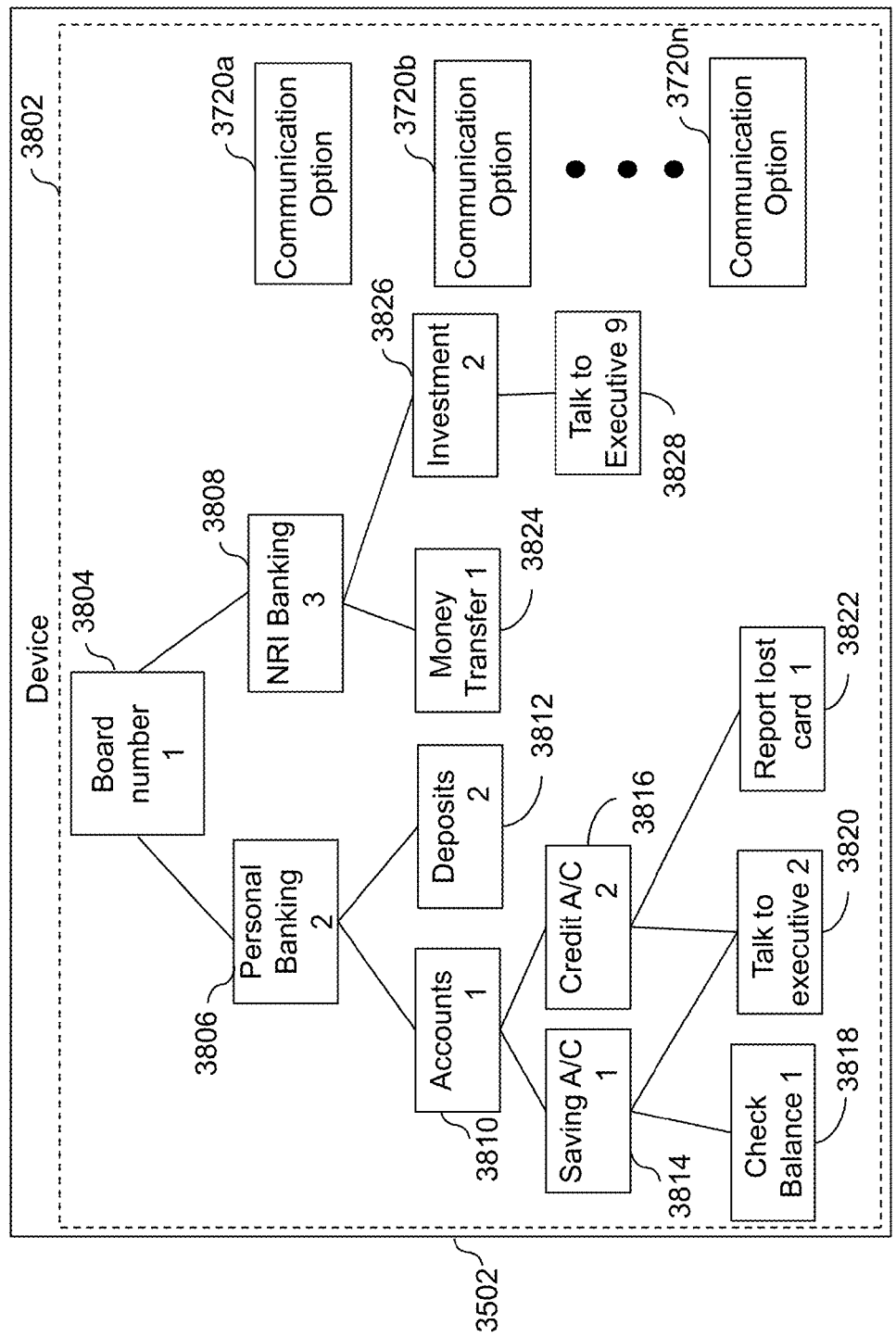
Figure 39:
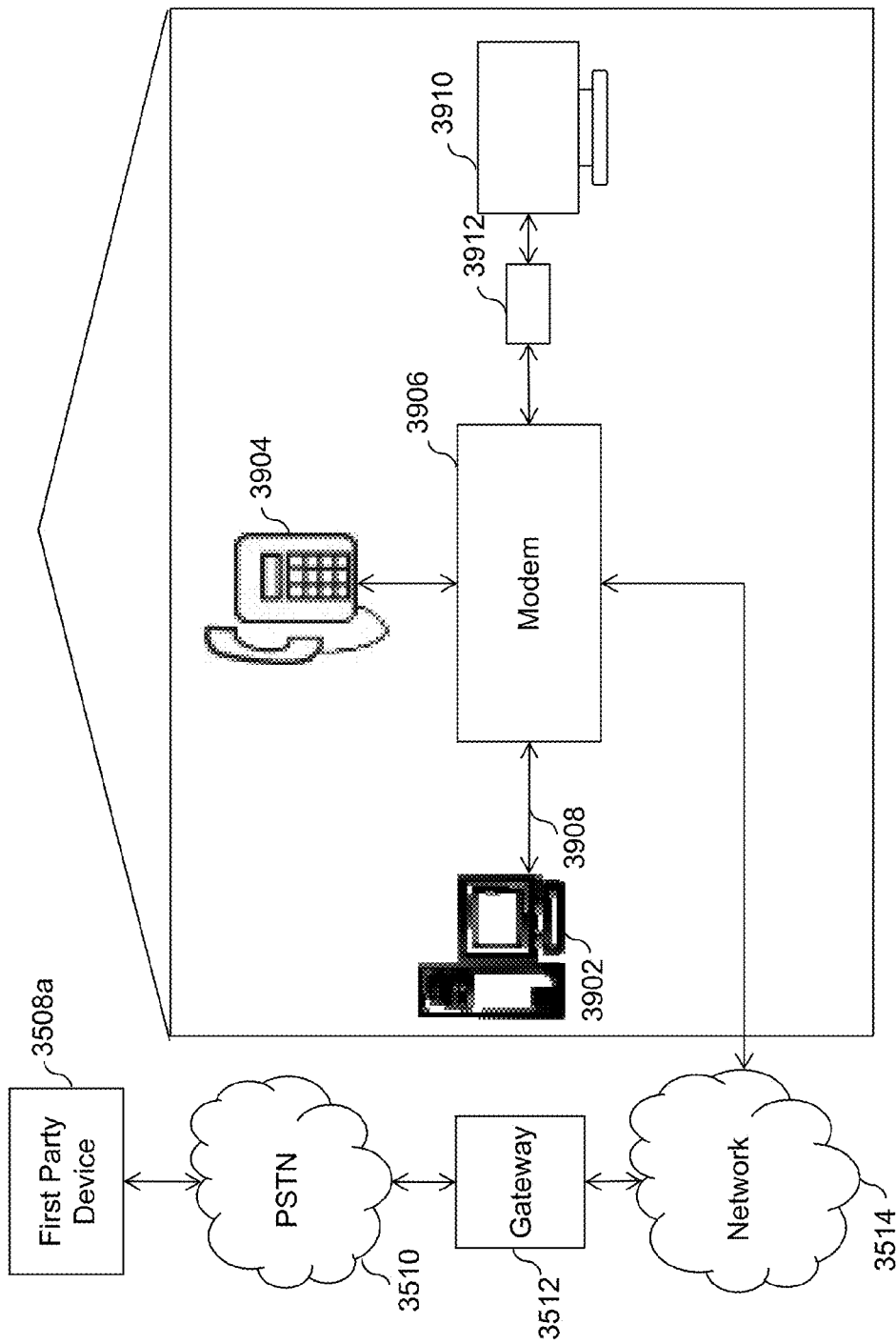
Figure 40:
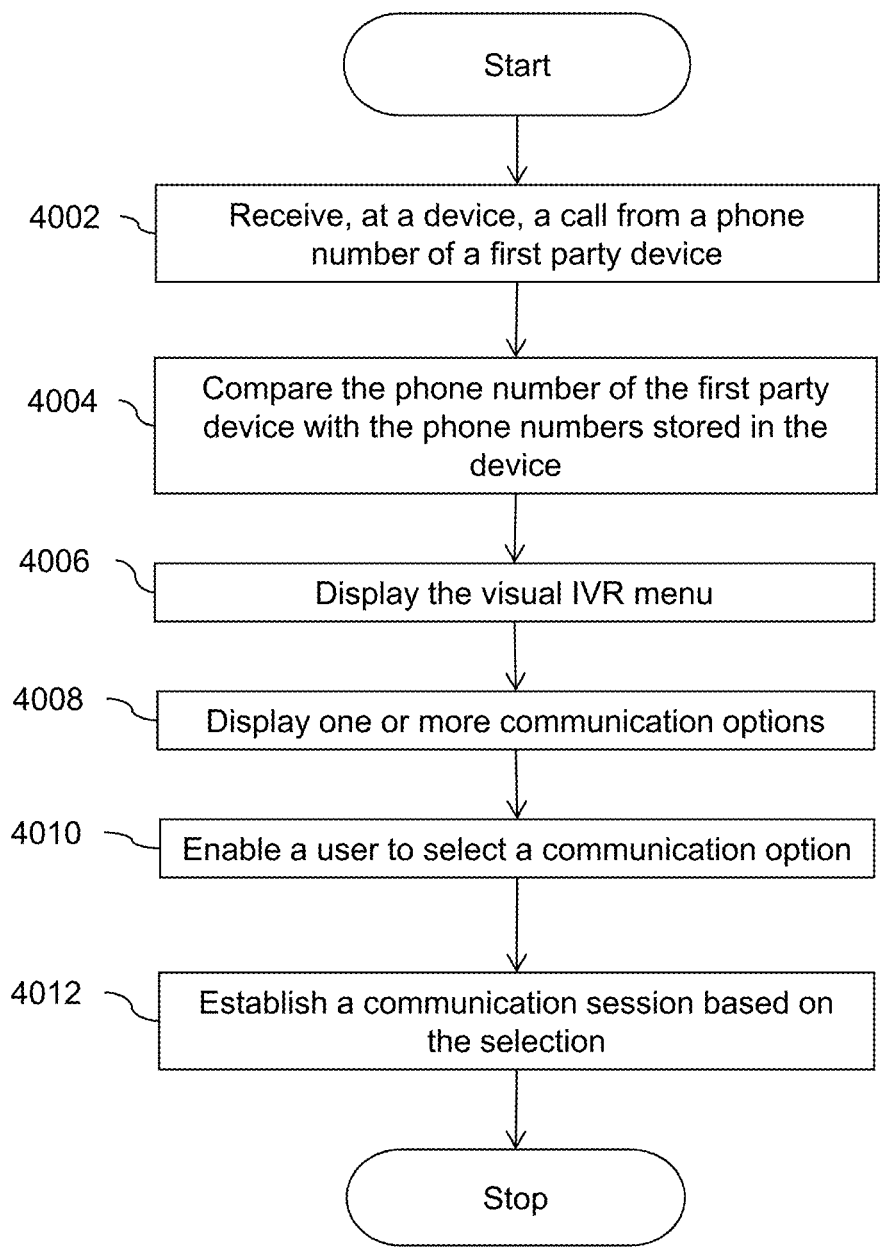
Figure 41:
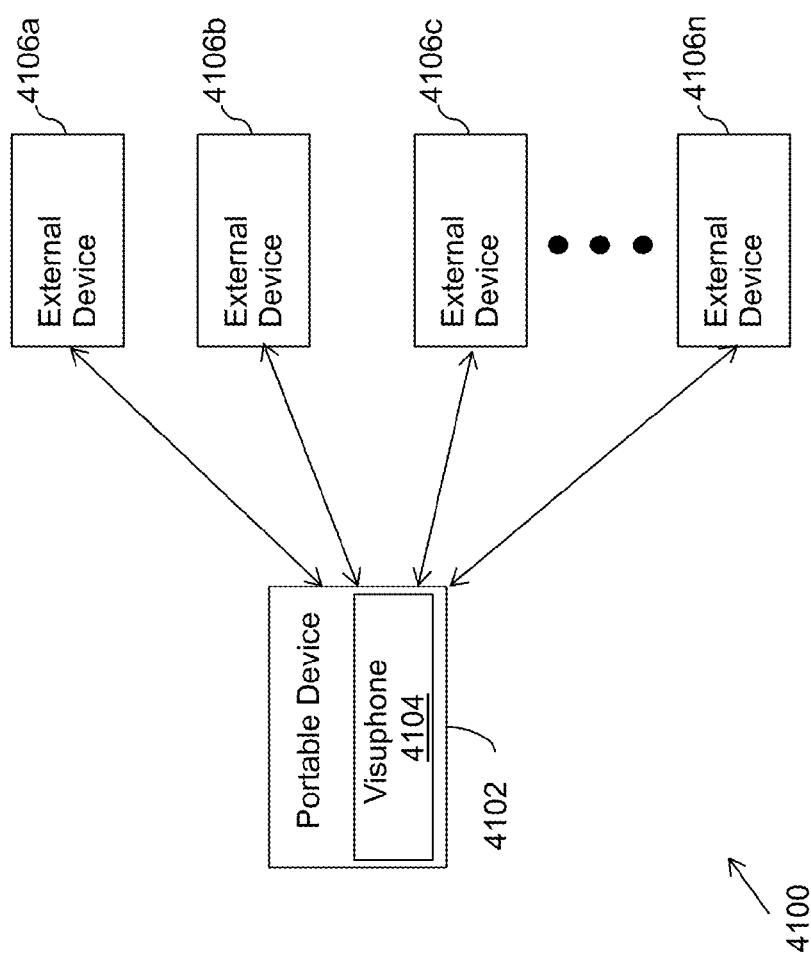
Figure 42:
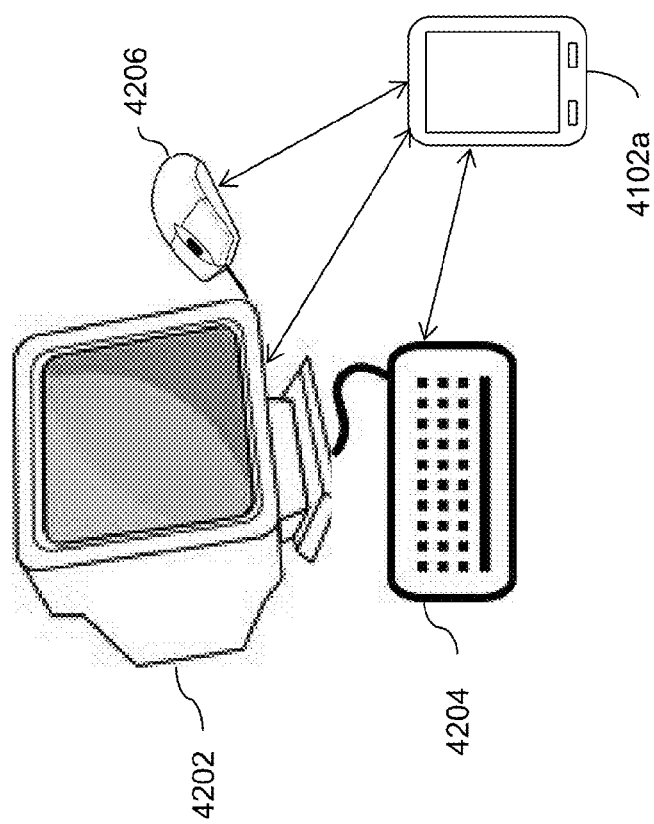
Figure 43:
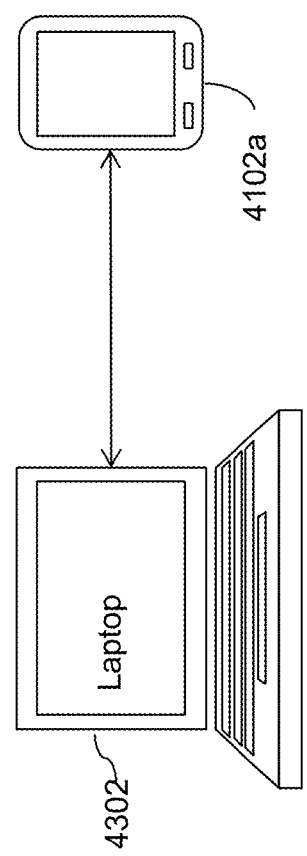
Figure 44:
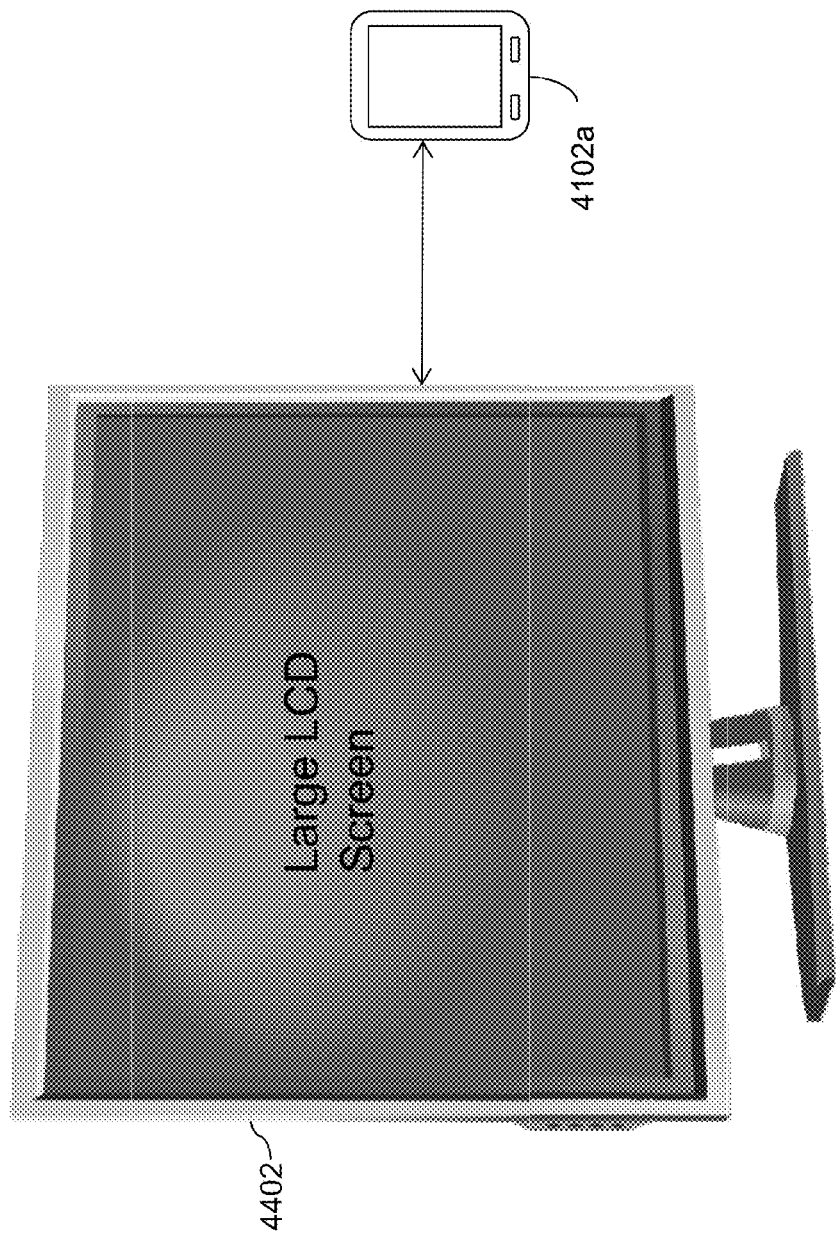
Figure 45:
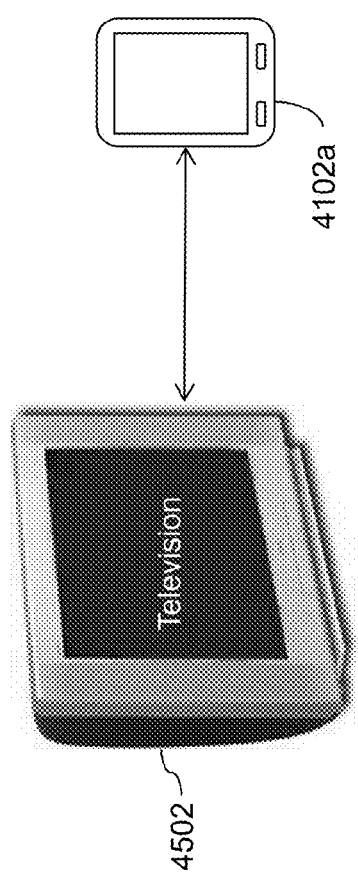
Figure 46:
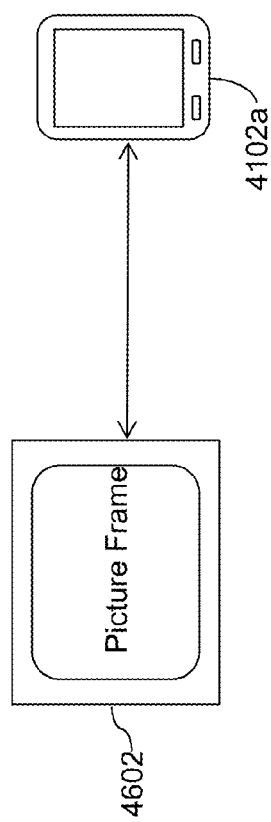
Figure 47:
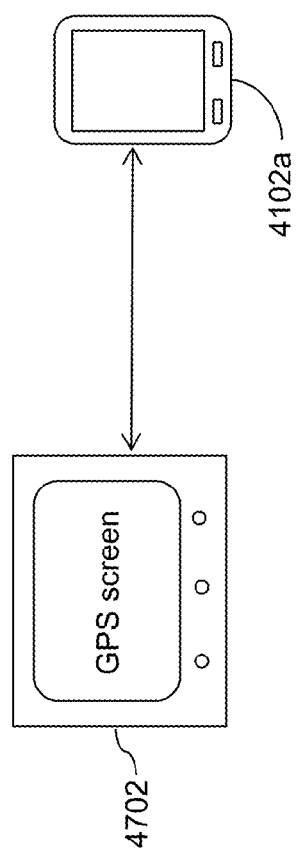
Figure 48:
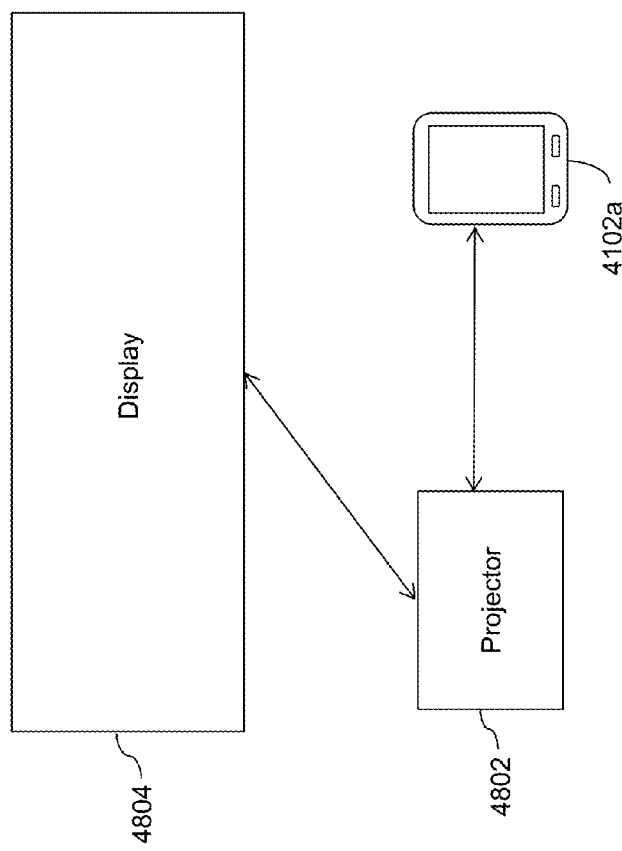
Figure 49:
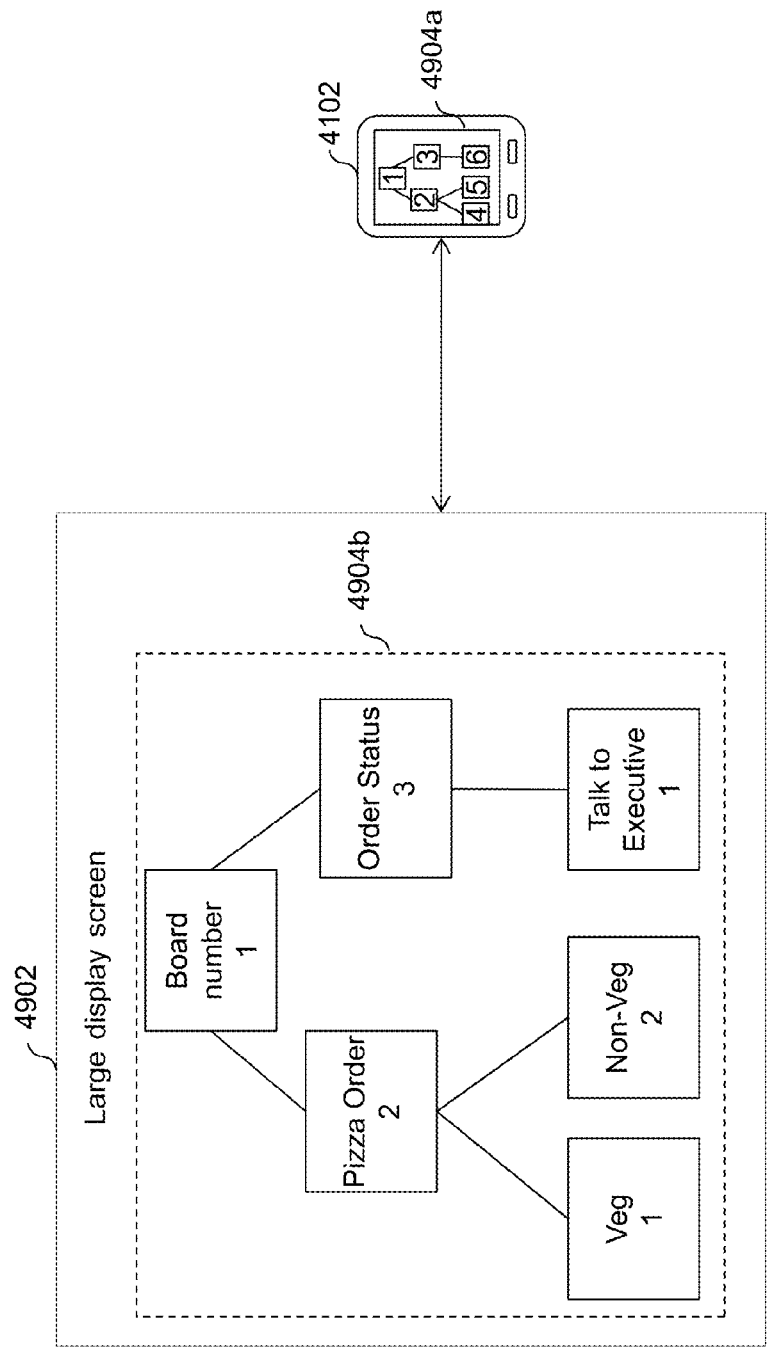
Figure 50:
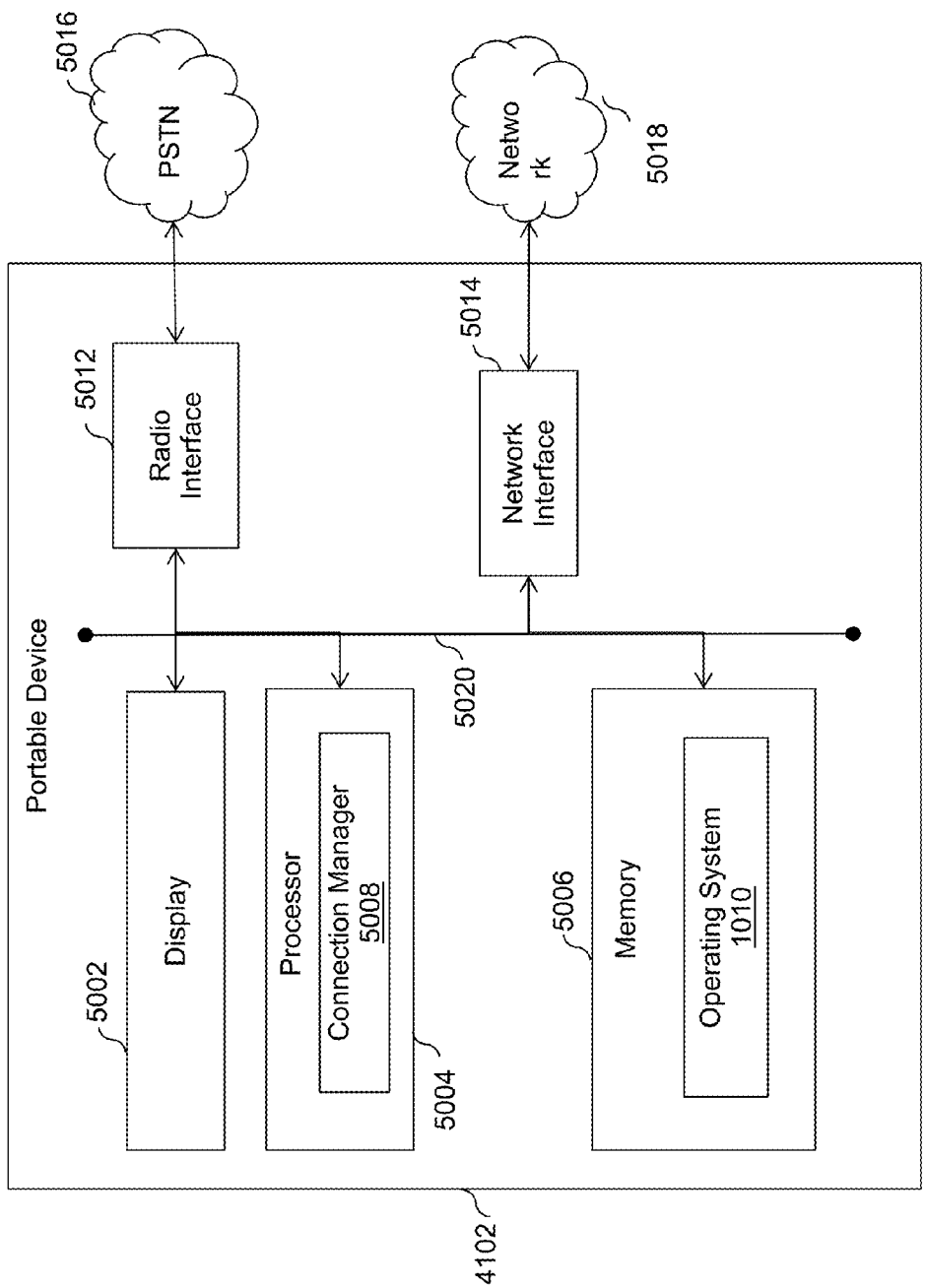
Figure 51:
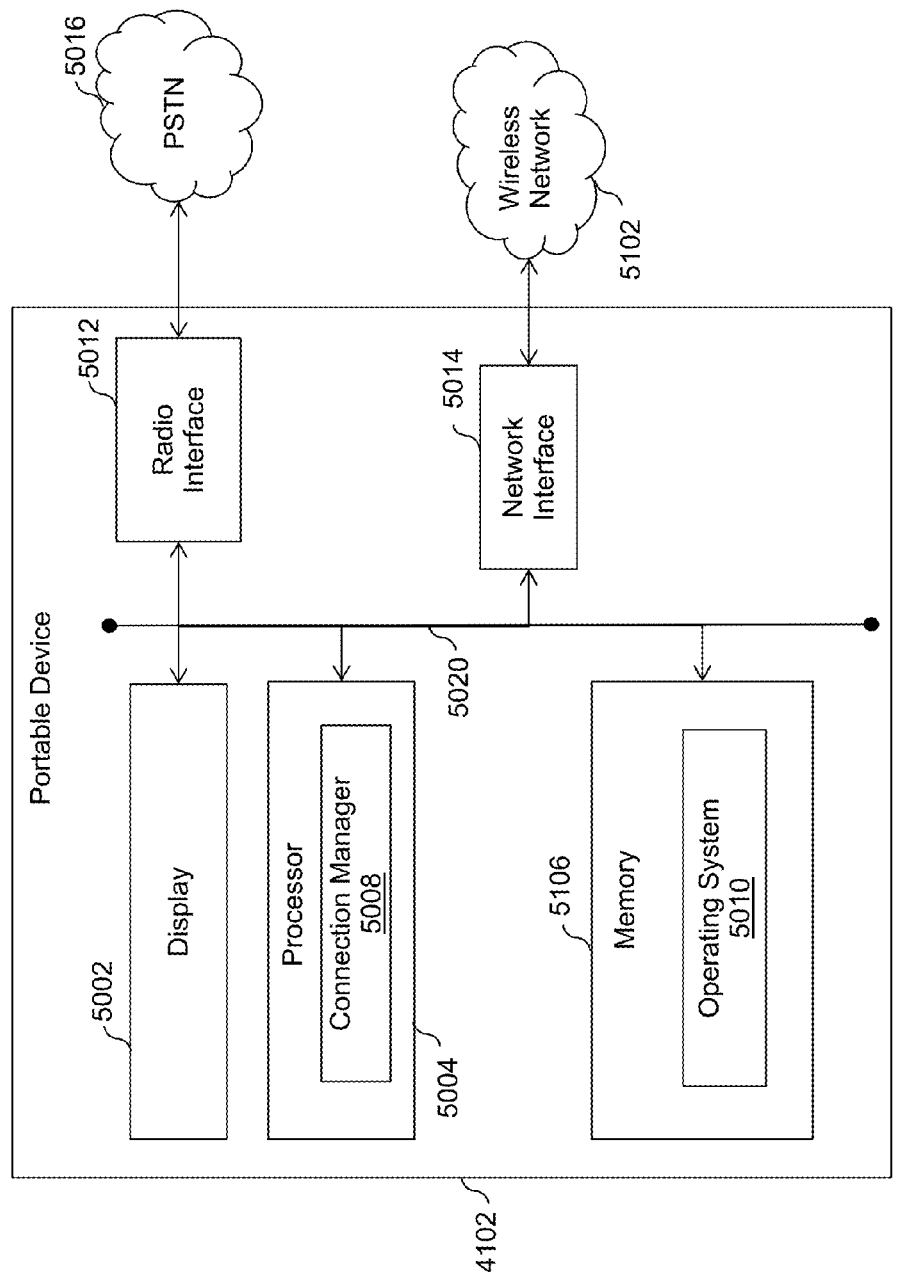
Figure 52:
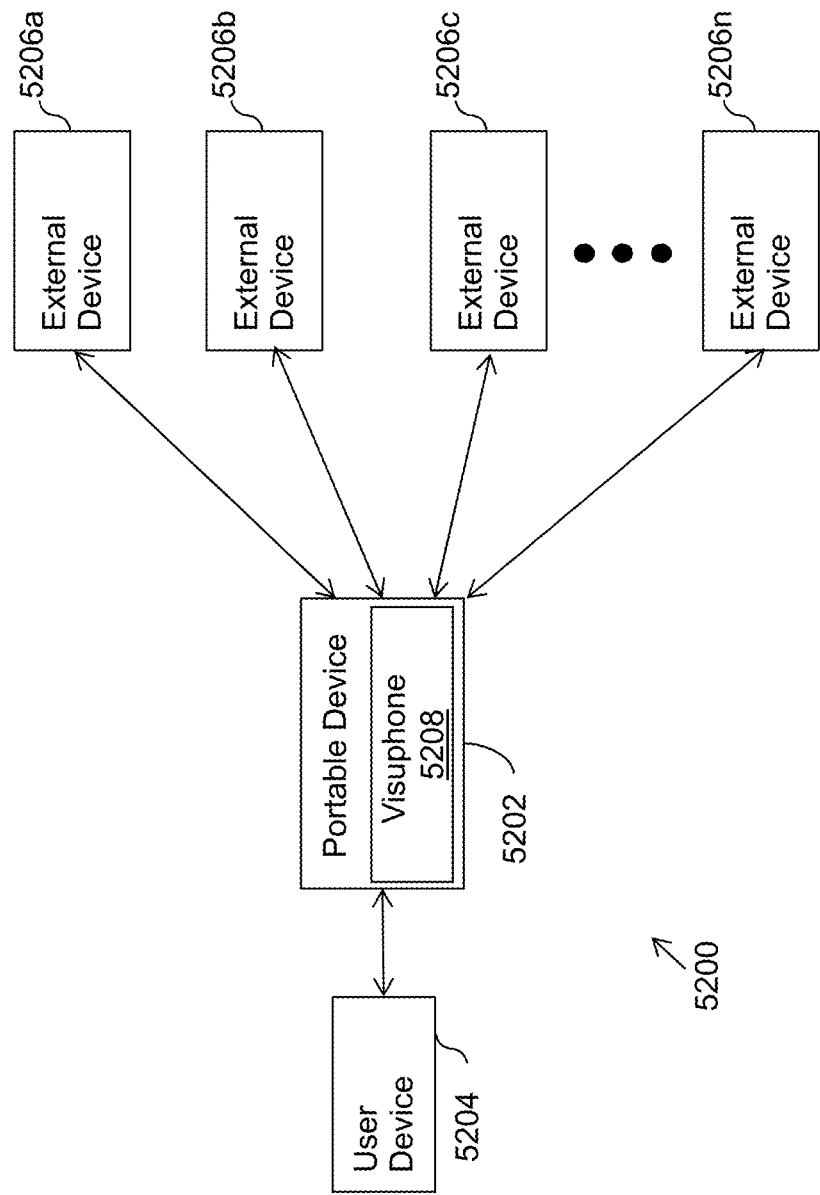
Figure 53:
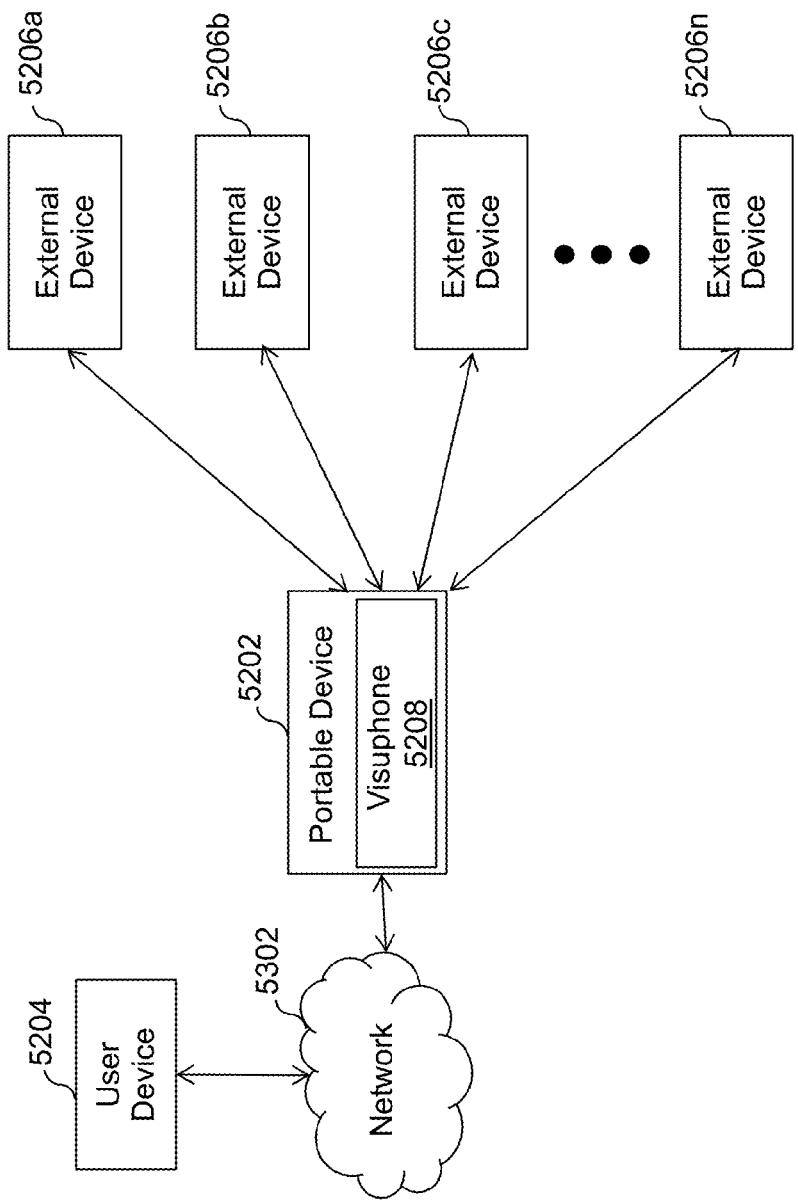
Figure 54:
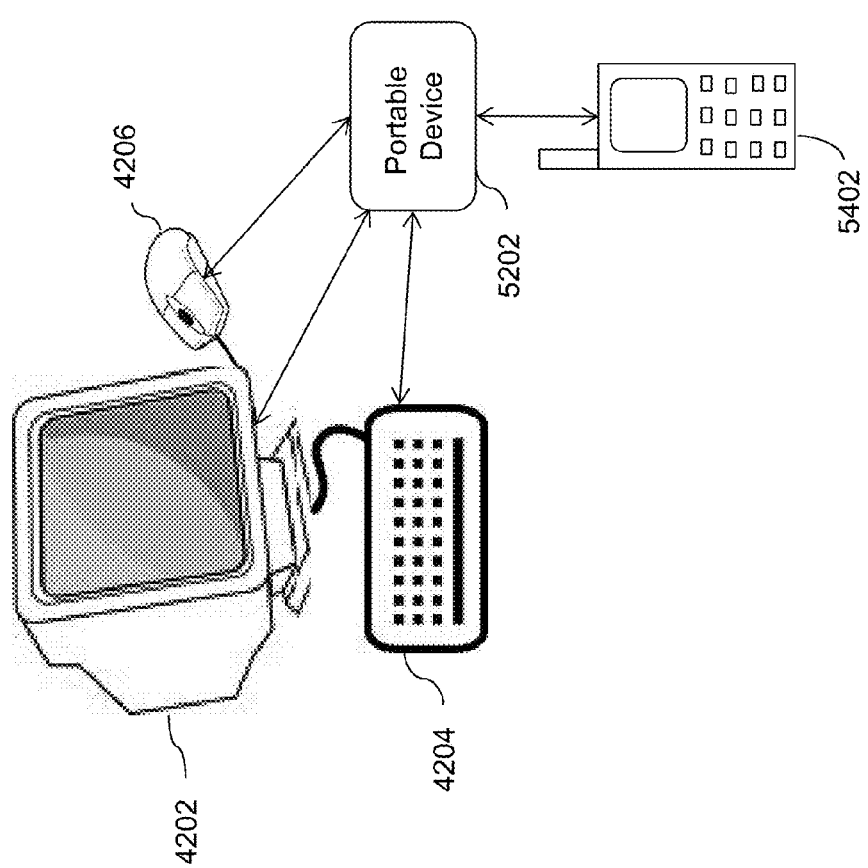
Figure 55:
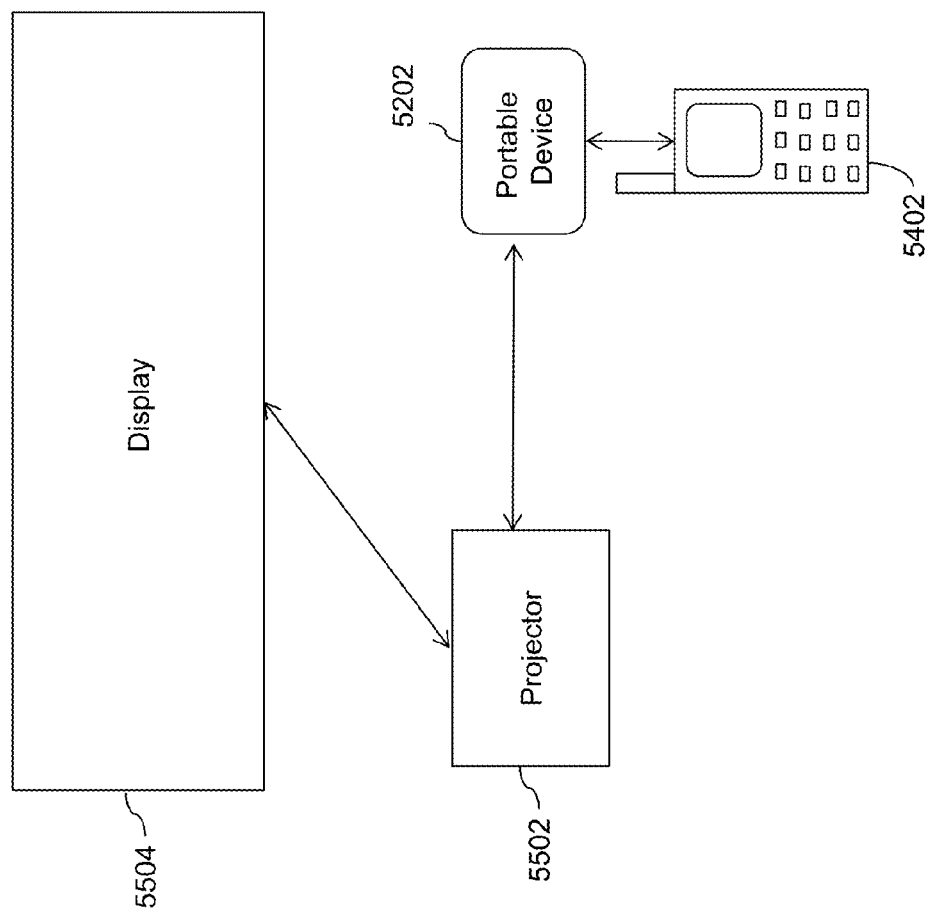
Figure 56:
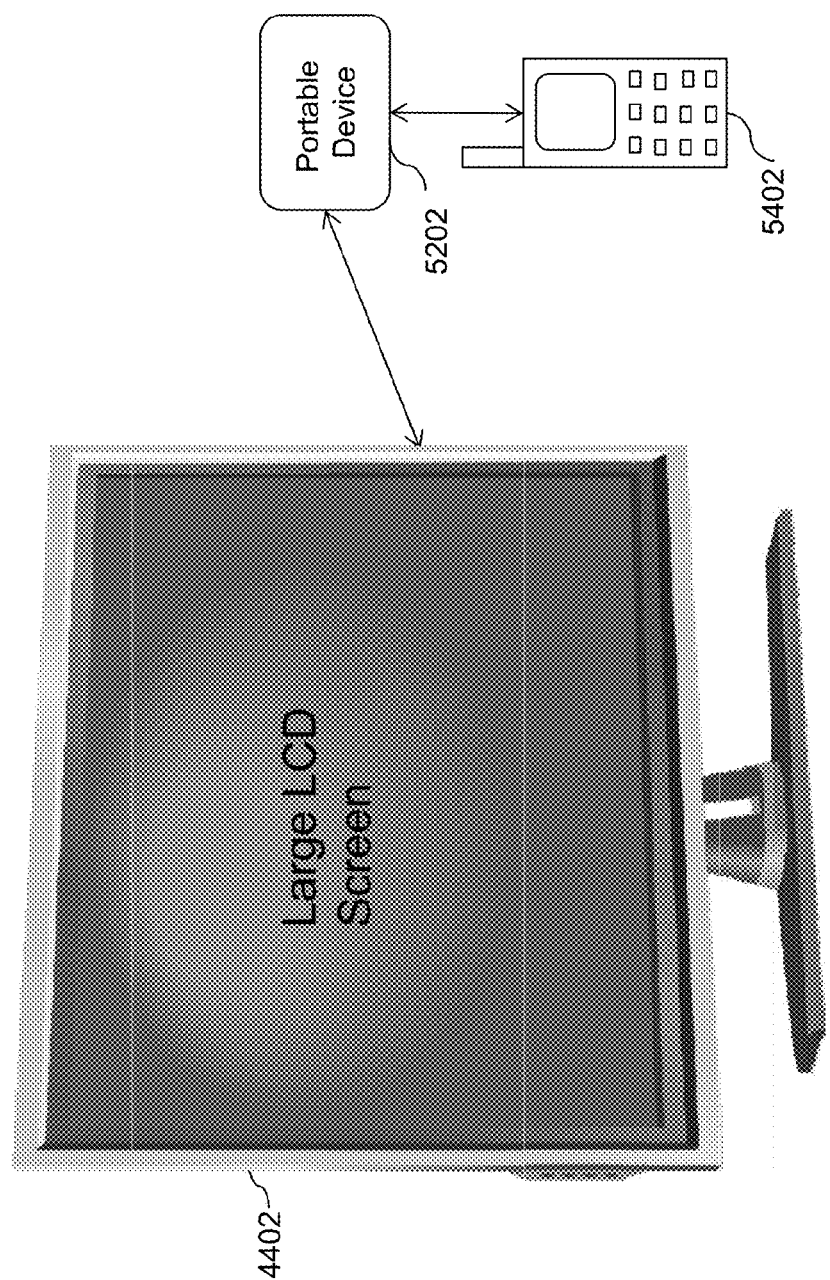
Figure 57:
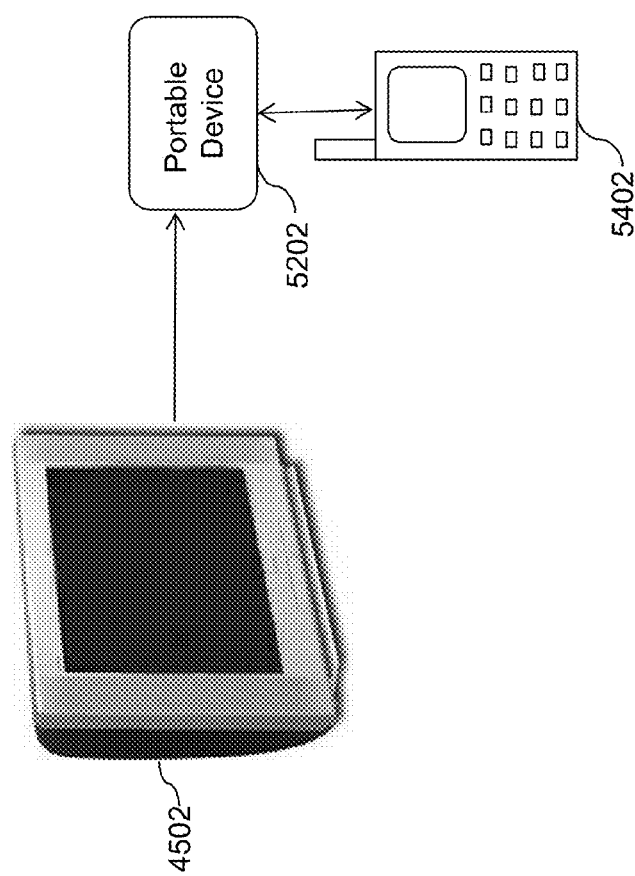
Figure 58:
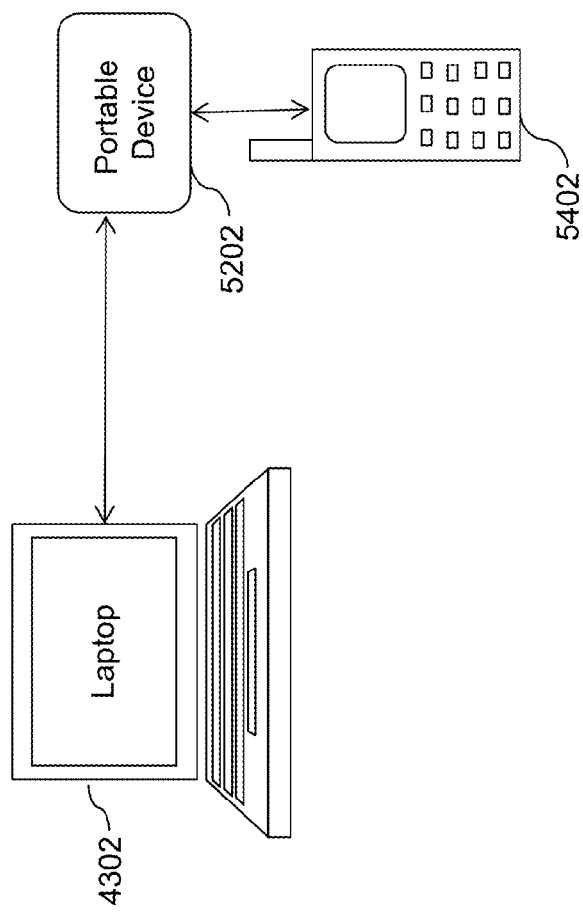
Figure 59:
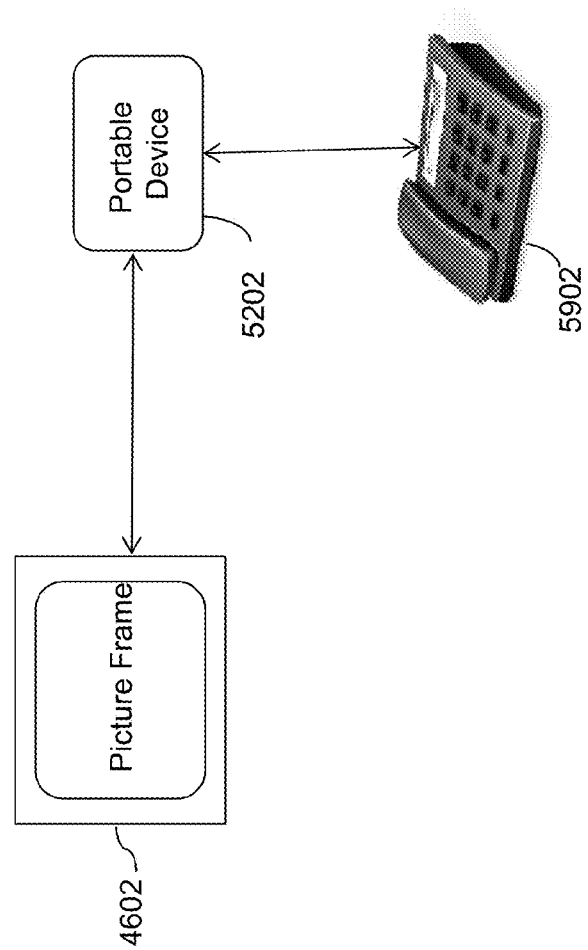
Figure 60:
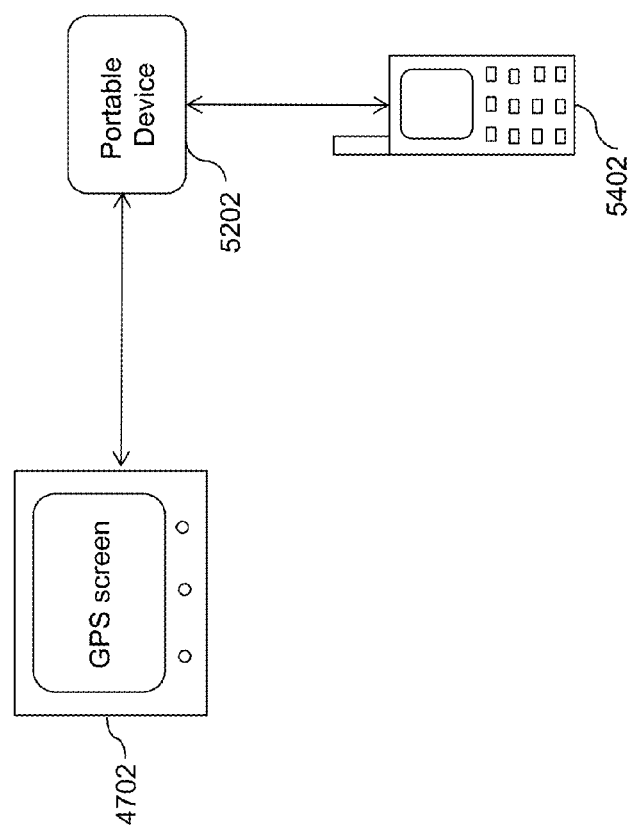
Figure 61:
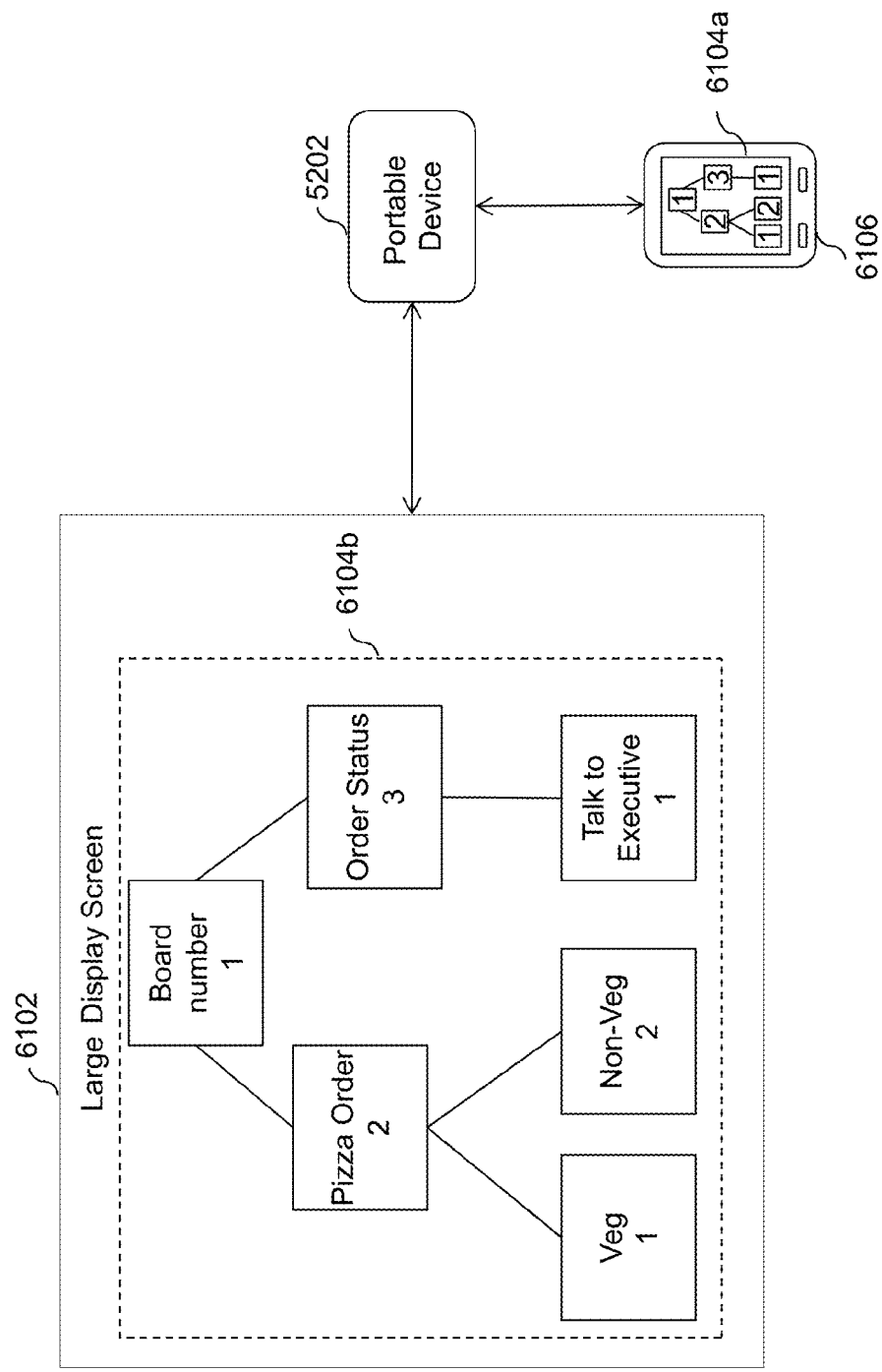
Figure 62:
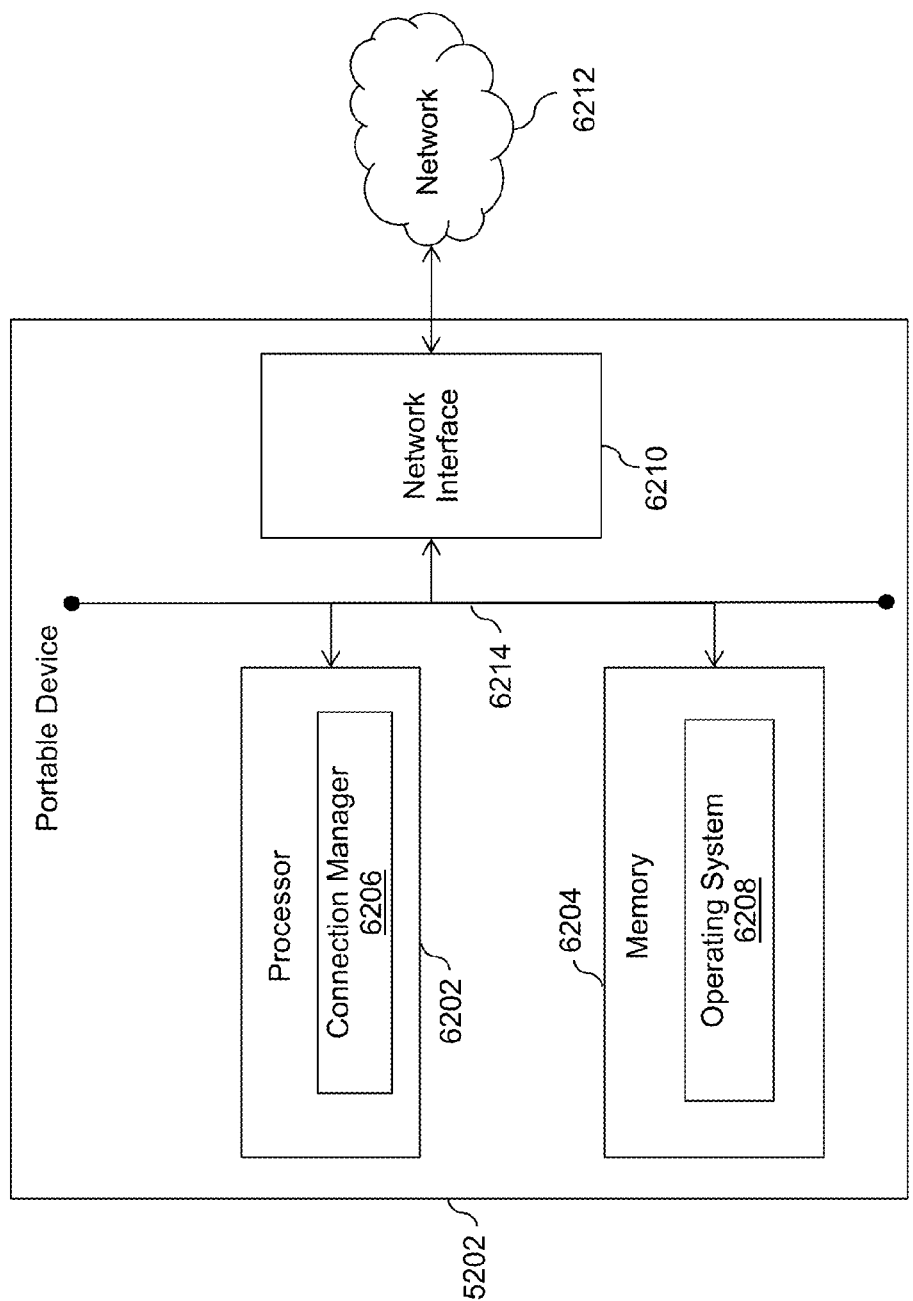
Figure 63:
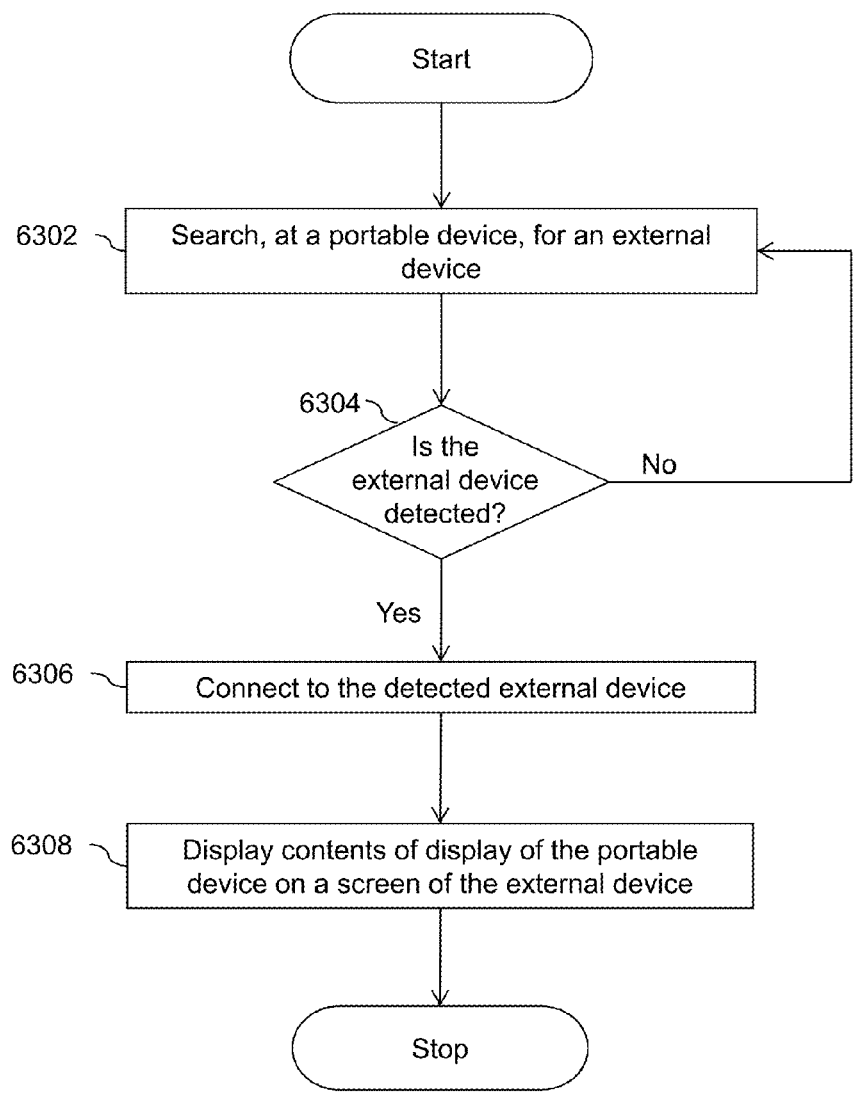
Figure 64A:
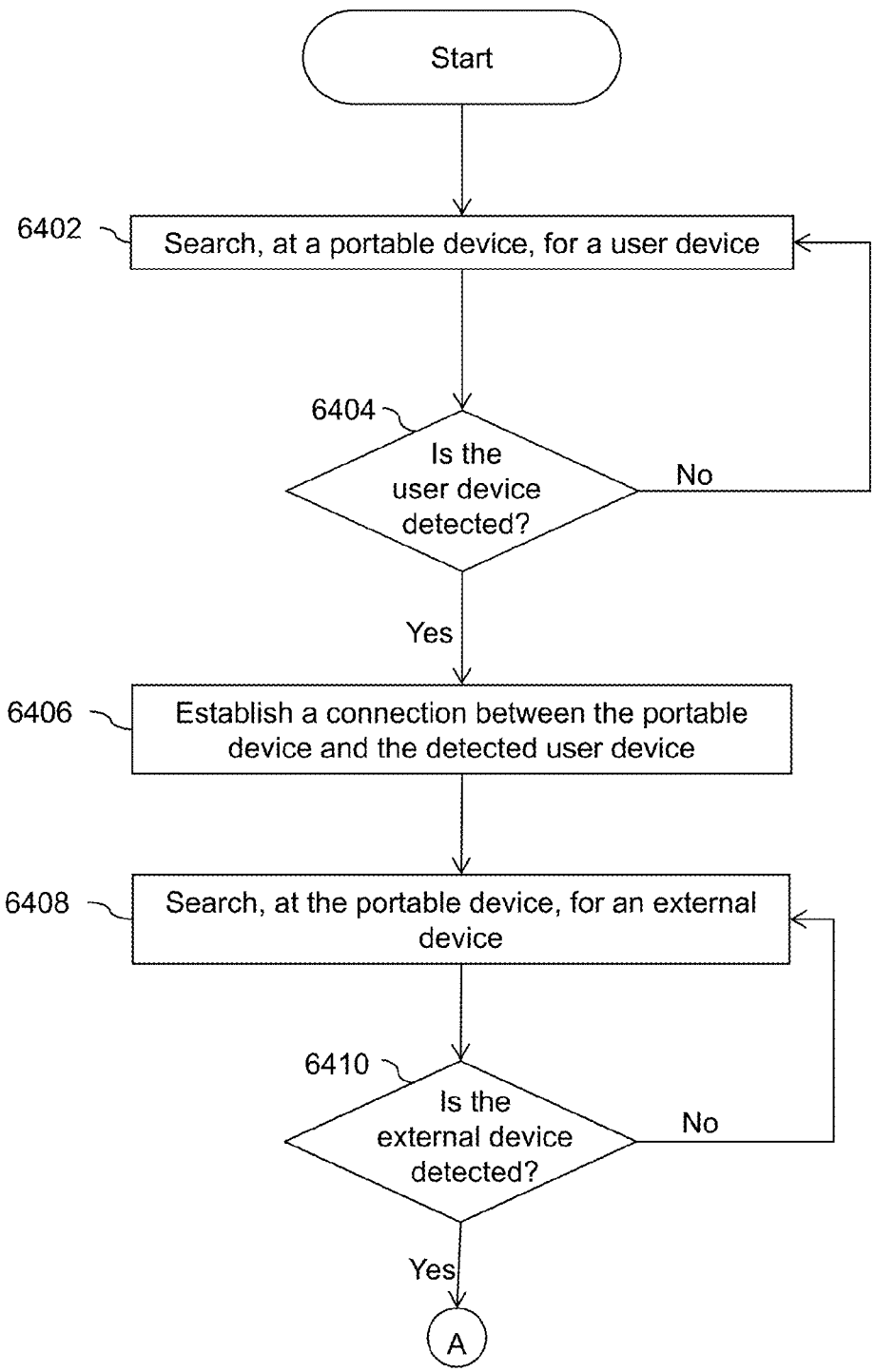
Figure 64B:
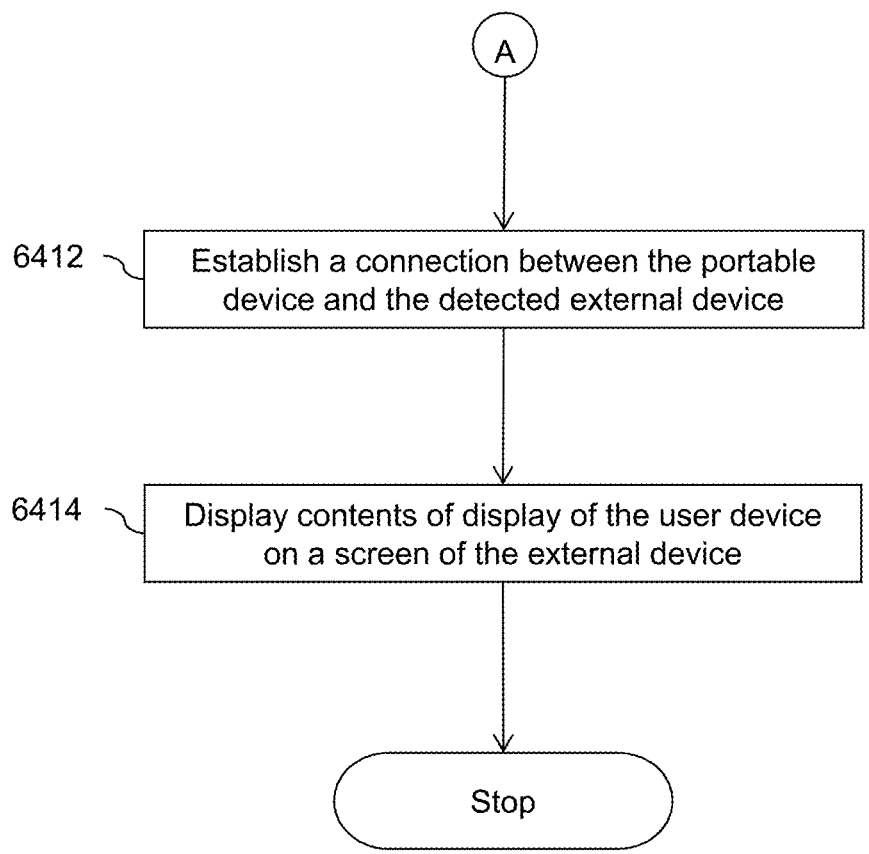
Figure 65:
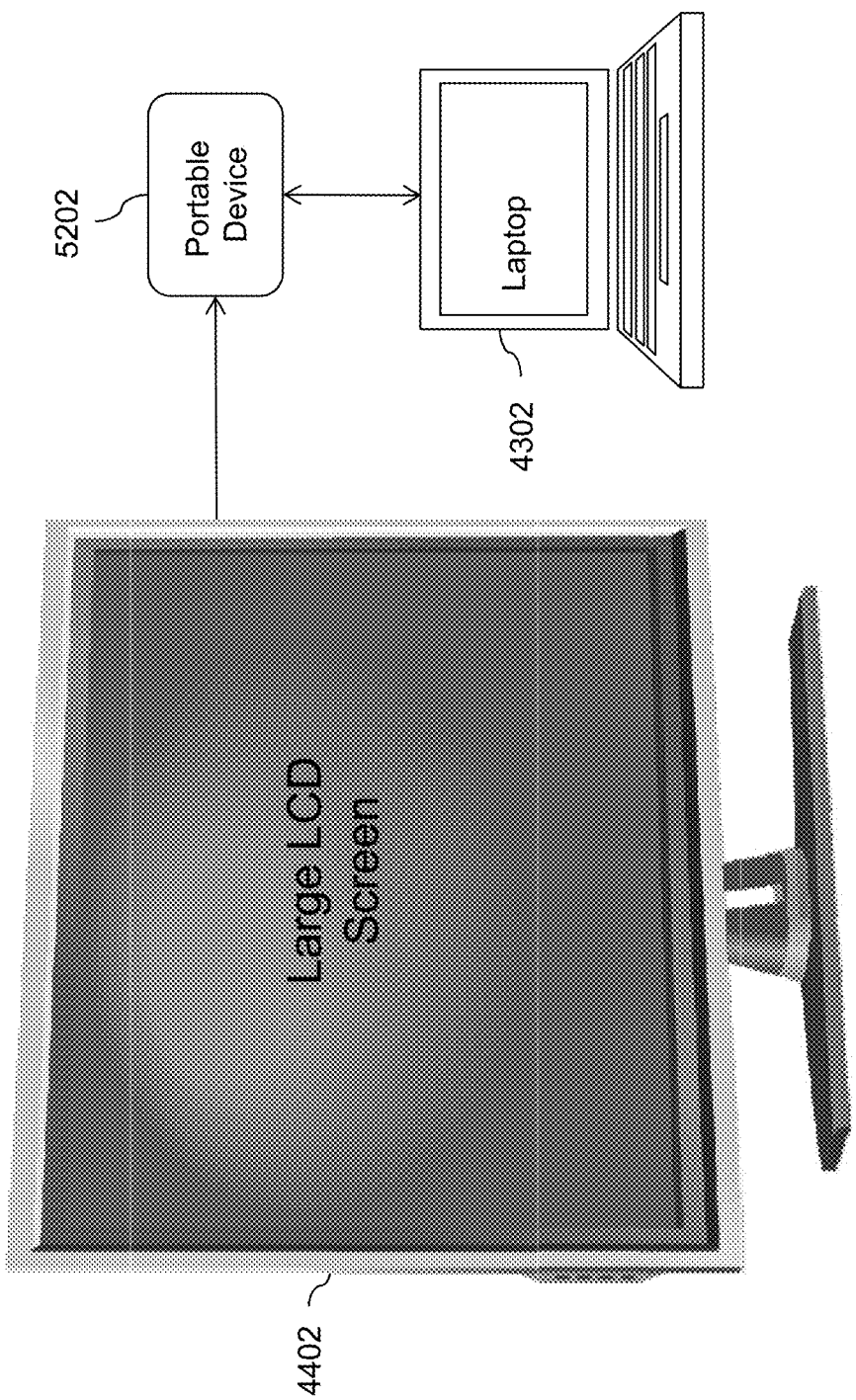
Figure 66:
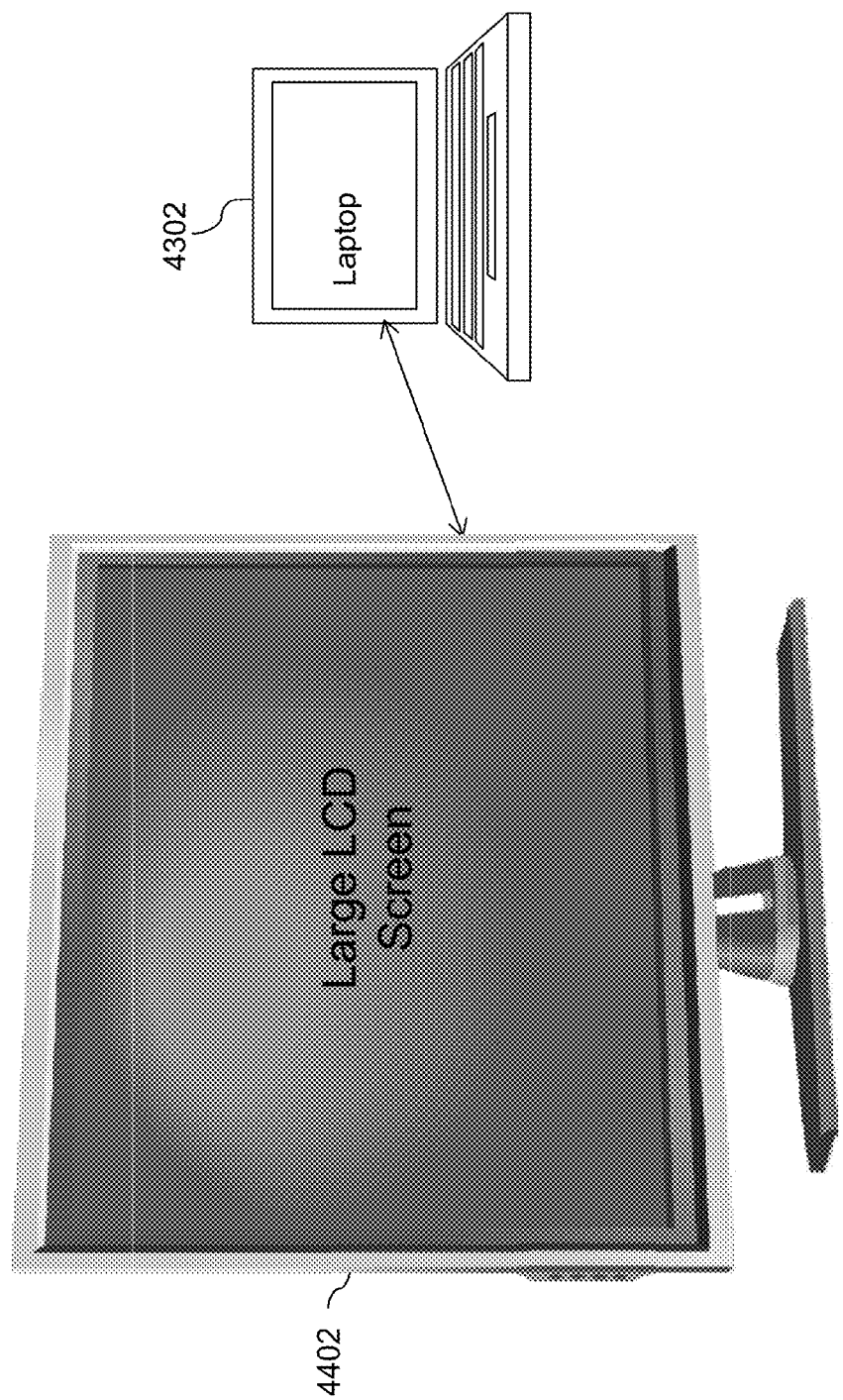
Figure 67:
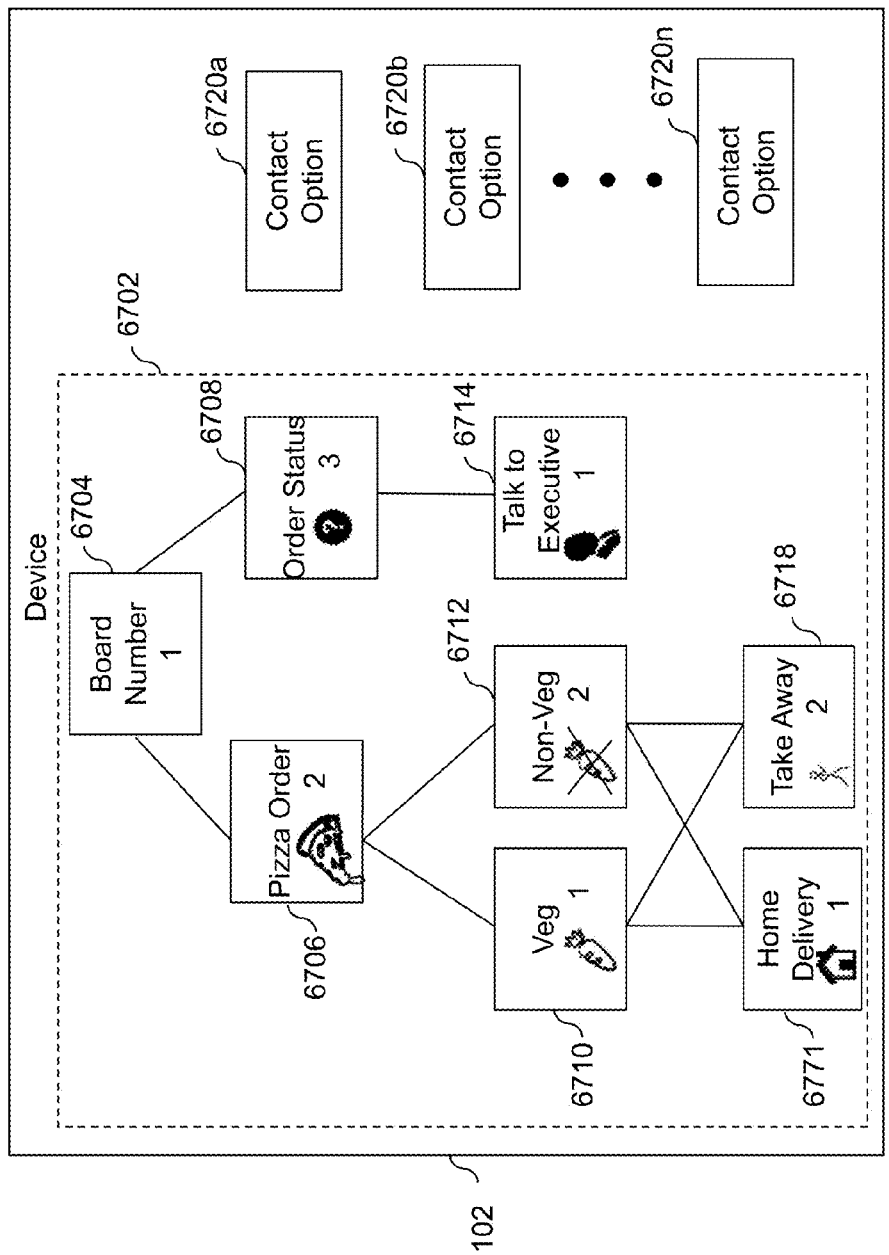
Figure 68:
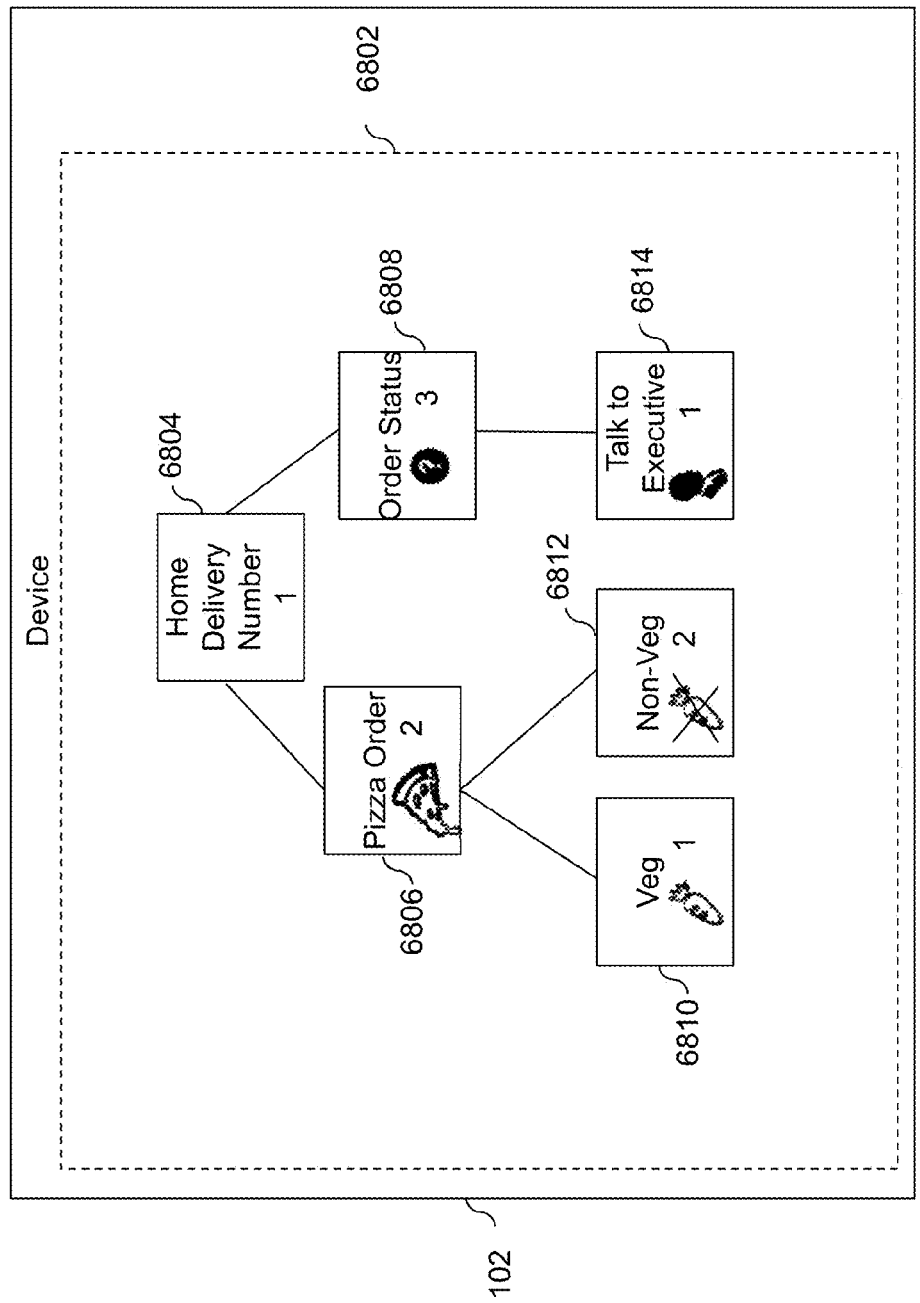
Figure 69:
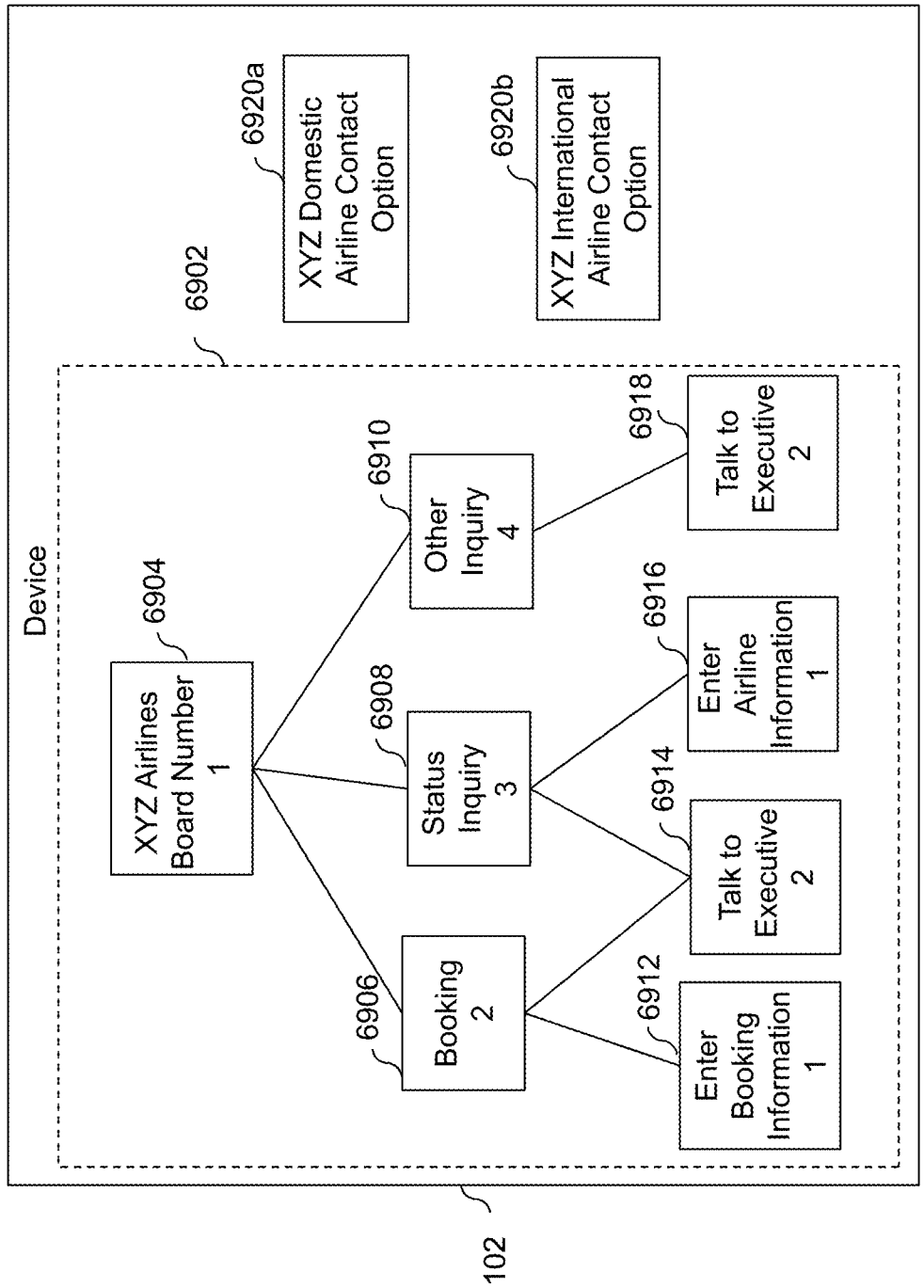
Figure 70:
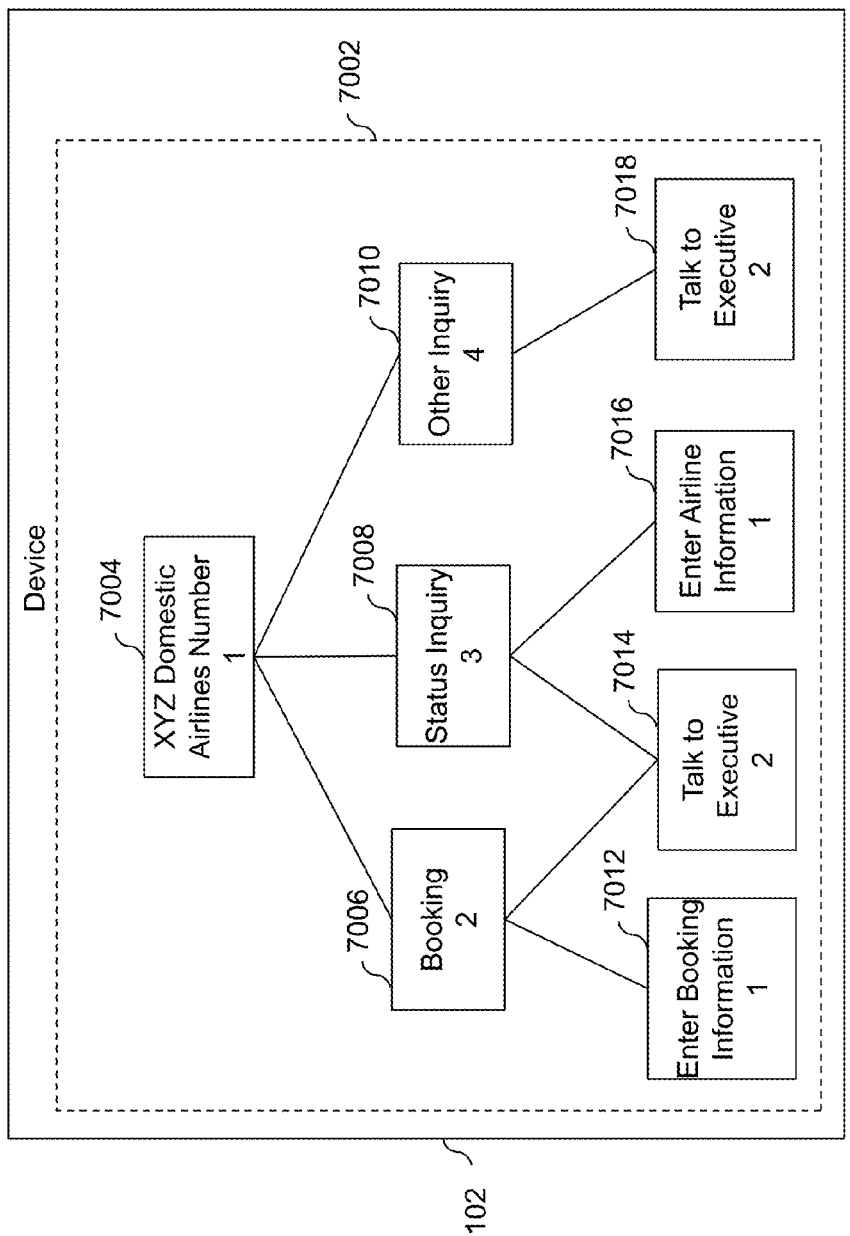
Figure 71:
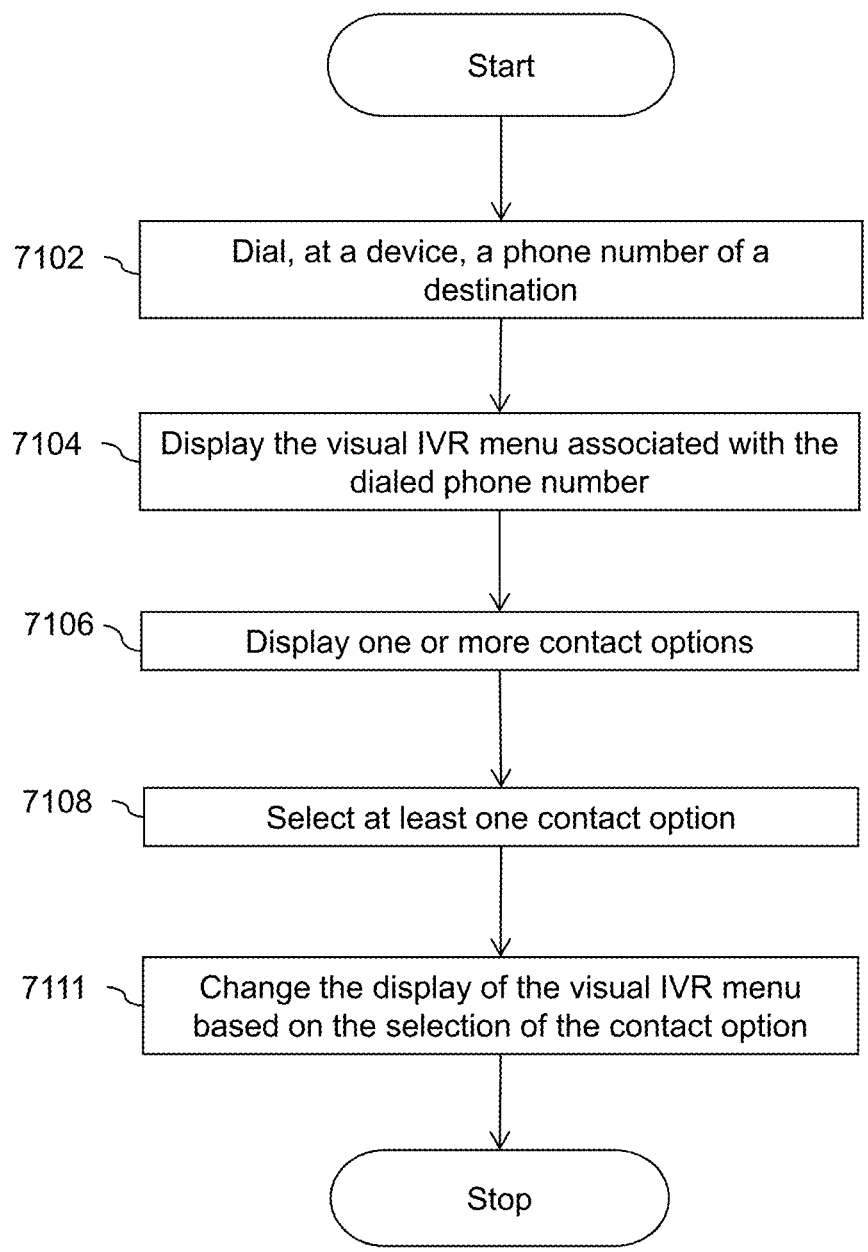
Figure 72:
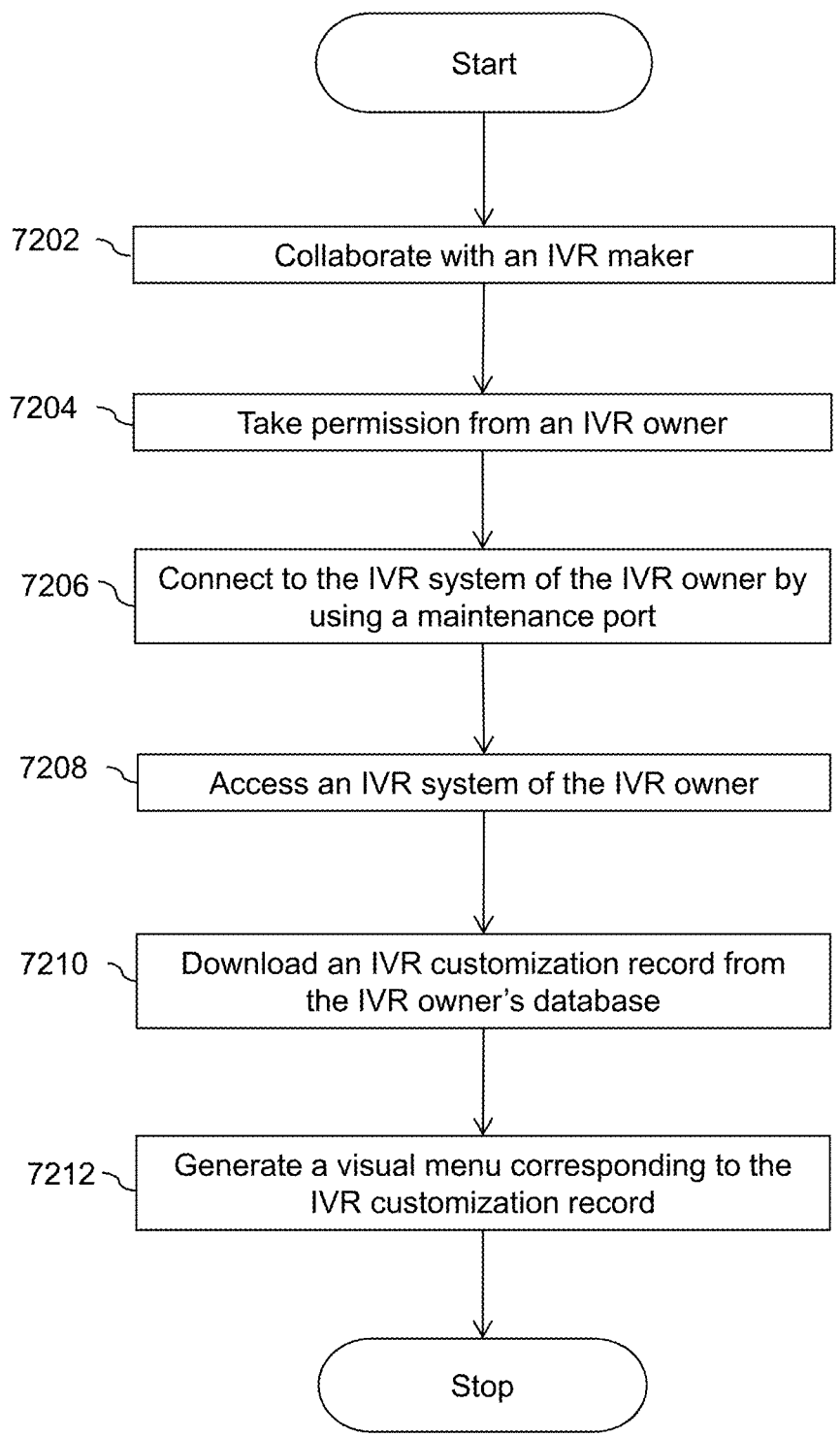
Figure 73:
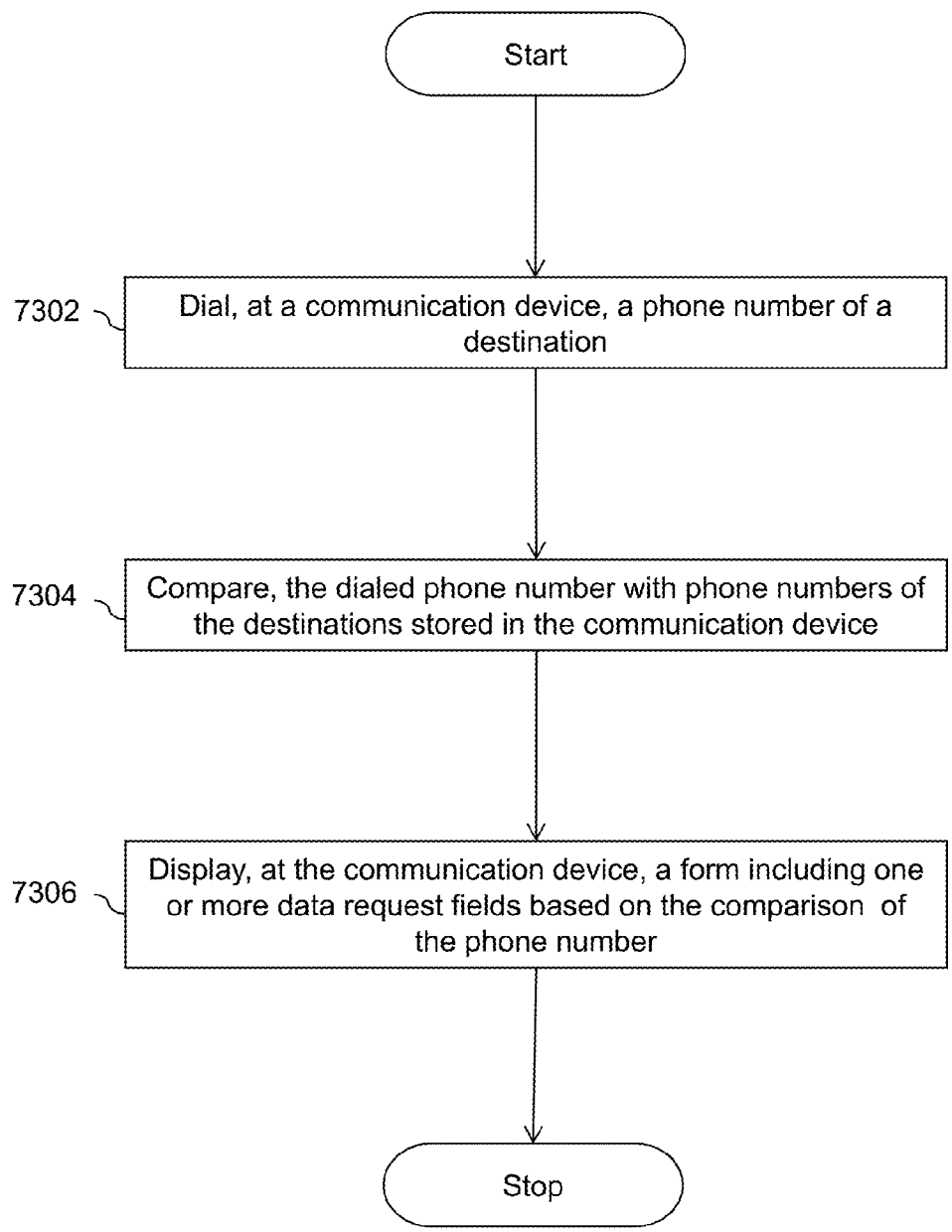
Figure 74:
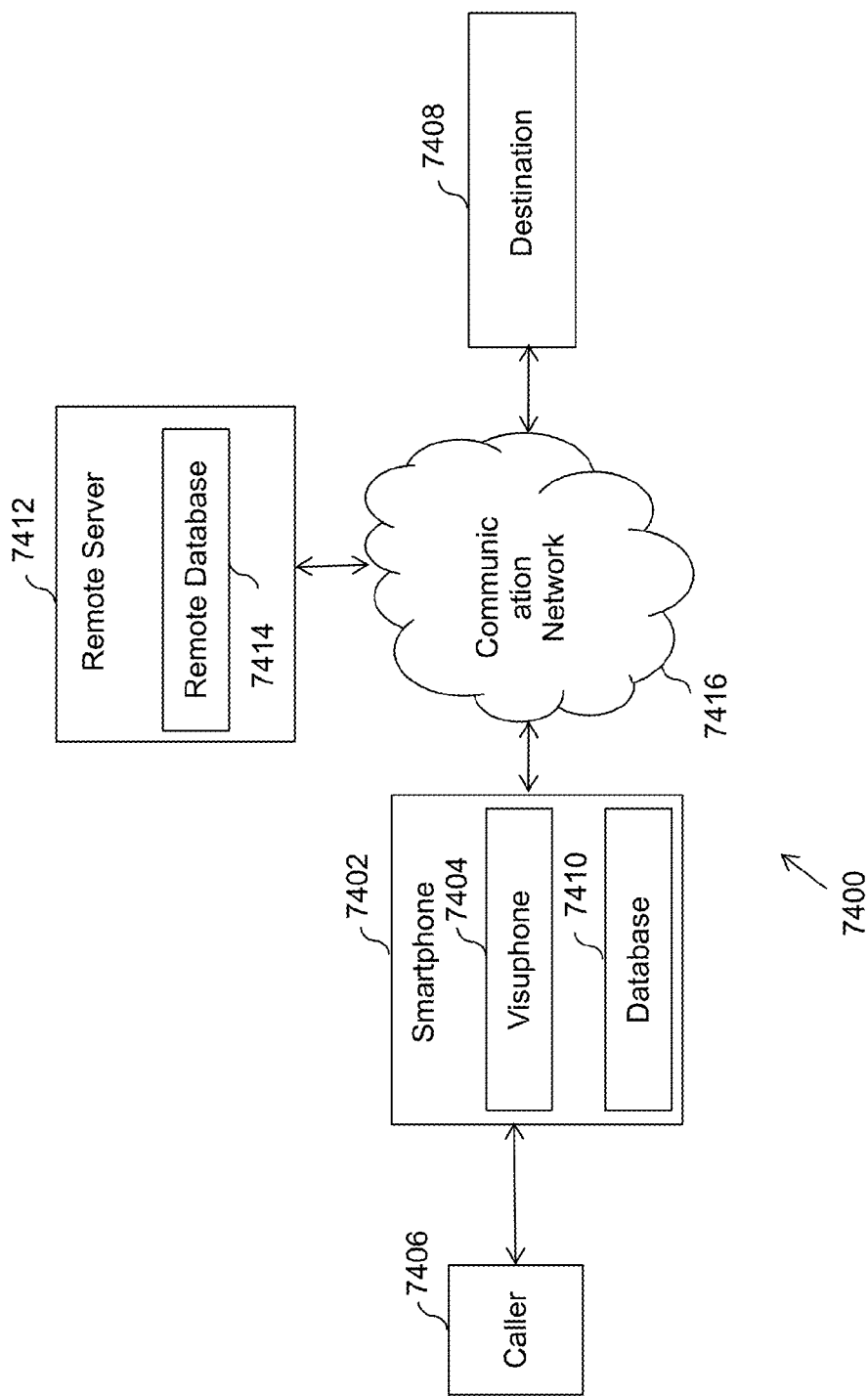
Figure 75:
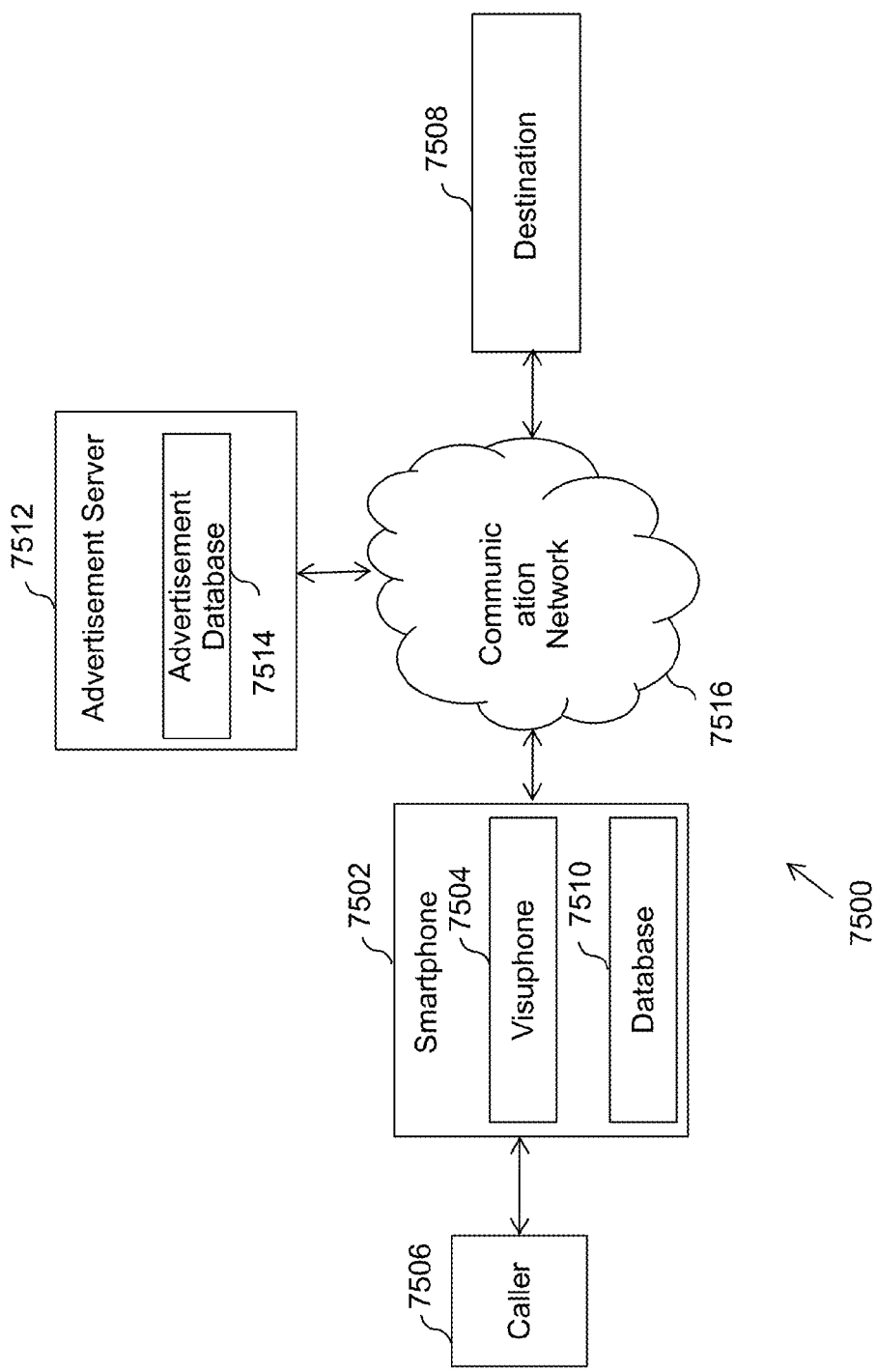
Figure 77A:
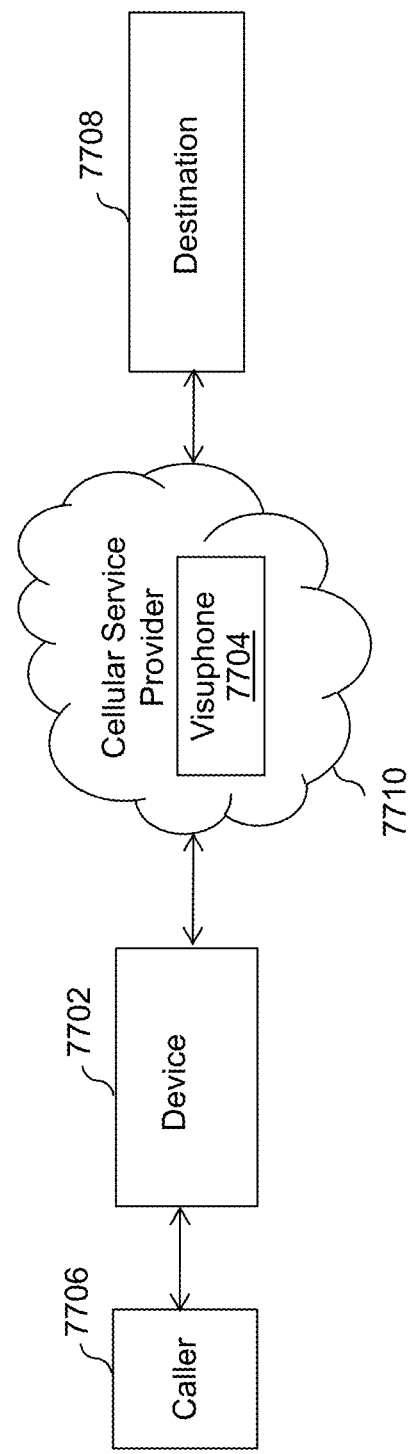
Figure 77B:
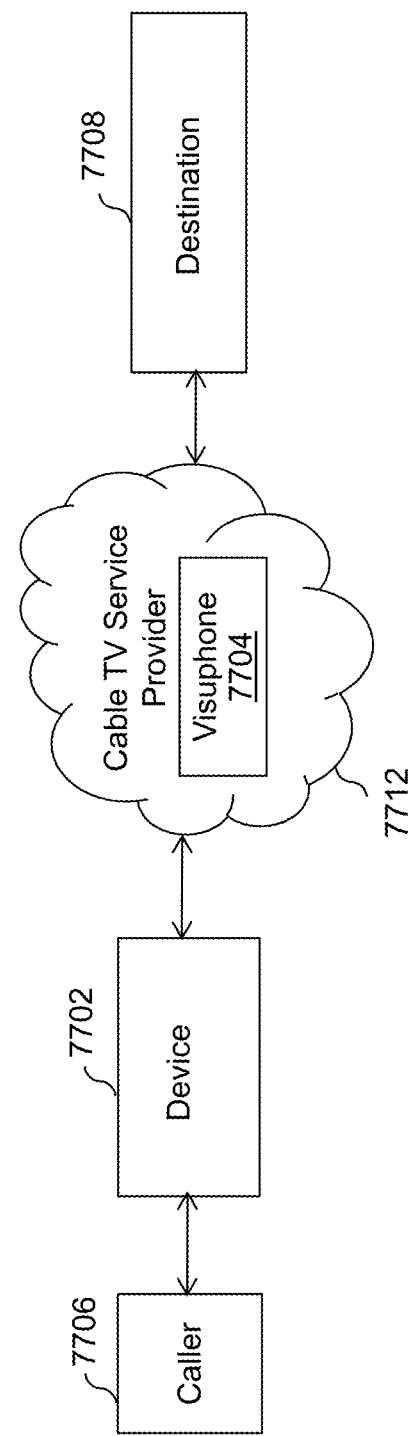
Figure 77C:
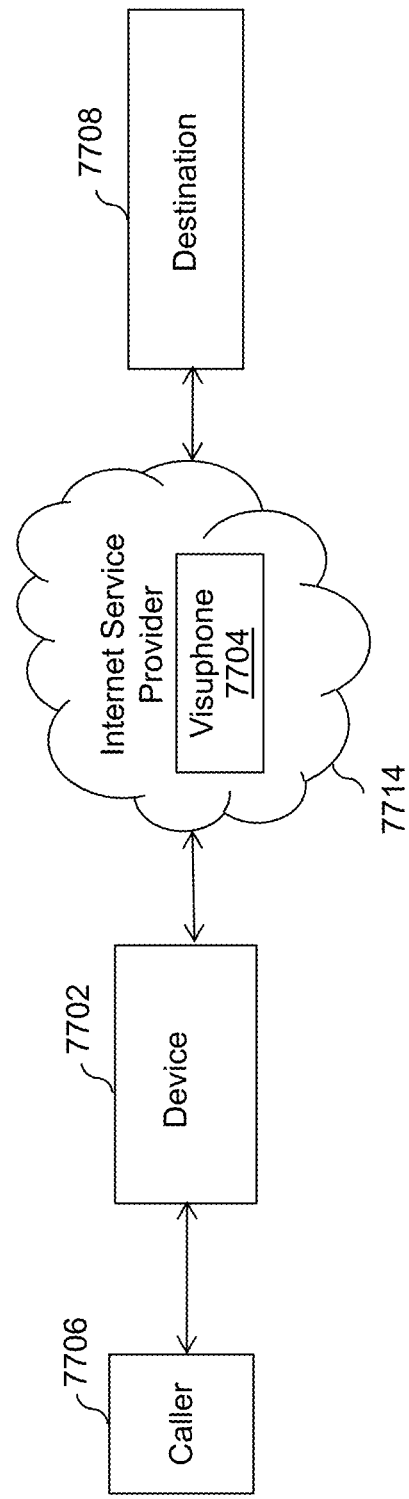
Figure 78:
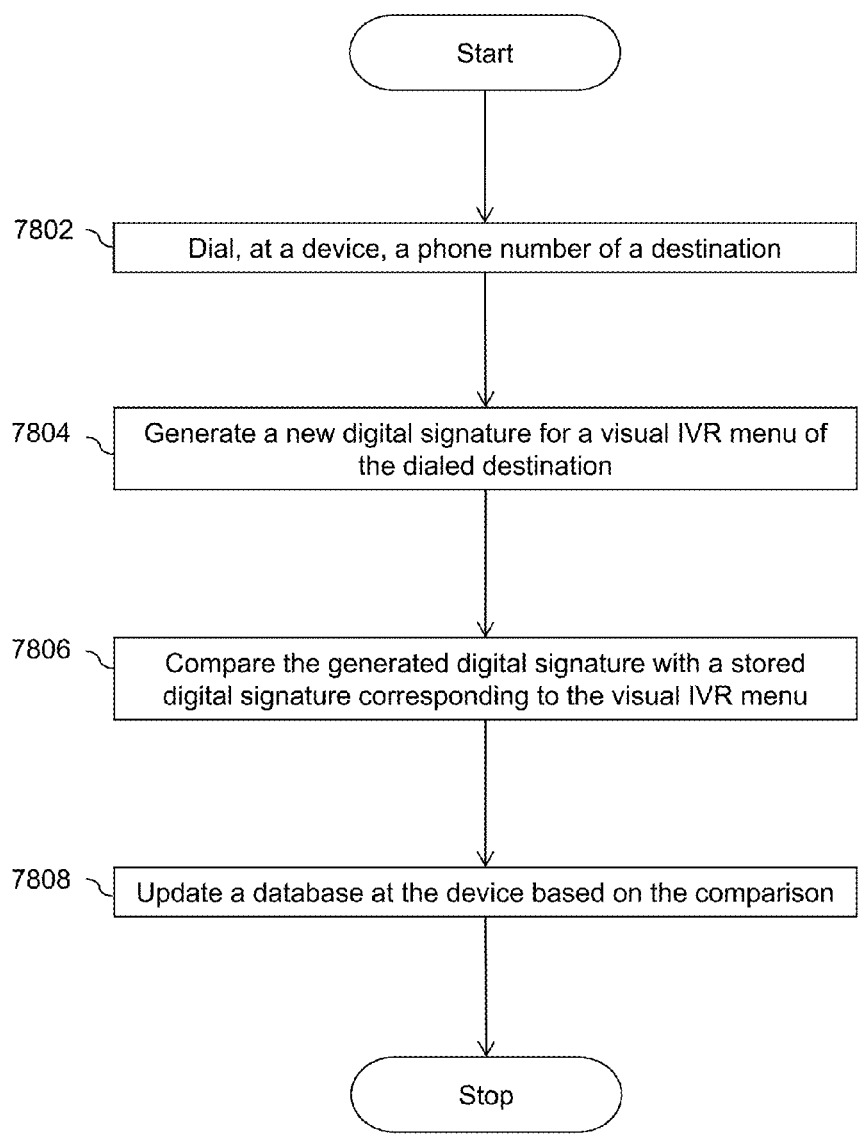

Having thus described the invention in general terms, reference will now be made to the accompanying drawings, which are not necessarily drawn to scale, and wherein:

FIG. 1A illustrates an exemplary environment where various embodiments of the invention may function;

FIG. 1B illustrates another exemplary environment where various embodiments of the invention may function;

FIG. 1C illustrates yet another exemplary environment where various embodiments of the invention may function;

FIG. 2A illustrates an exemplary audible Interactive Voice Response (IVR) menu at a destination, in accordance with an embodiment of the invention;

FIG. 2B illustrates an exemplary visual IVR menu at a device corresponding to the audible IVR menu of the destination, in accordance with an embodiment of the invention;

FIG. 2C illustrates an exemplary visual IVR menu that displays graphics for each option of an IVR menu, in accordance with an embodiment of the invention;

FIG. 2D illustrates an exemplary visual IVR menu that displays tooltip when a curser is hovering over an option for more than a certain time without action, in accordance with an embodiment of the invention;

FIGS. 3A and 3B illustrate exemplary components of the device for implementing a Visuphone, in accordance with an embodiment of the invention;

FIG. 4 illustrates an exemplary display of the visual IVR menu on the device, in accordance with an embodiment of the invention;

FIG. 5 illustrates exemplary components of the device for implementing the Visuphone, in accordance with another embodiment of the invention;

FIG. 6 illustrates an exemplary display of the visual IVR menu on the device, in accordance with another embodiment of the invention;

FIG. 7 illustrates a webpage displayed on the device that may be used to initiate a connection to the destination, in accordance with an embodiment of the invention;

FIG. 8 illustrates an exemplary software architecture of Visuphone, in accordance with an embodiment of the invention;

FIG. 9 illustrates an exemplary components of the Visuphone, in accordance with an embodiment of the invention;

FIG. 10 illustrates an exemplary remote server for storing information required by the Visuphone, in accordance with an embodiment of the invention;

FIG. 11 illustrates presentation of a visual IVR menu in case of call forwarding, in accordance with an embodiment of the invention;

FIG. 12 illustrates the presentation of the visual IVR menu when a phone connection is associated with a wide band internet 'smart' modem;

FIG. 13 illustrates the presentation of the visual IVR menu when a telephone connection is established through an external telephone service by using a computer;

FIGS. 14A-G illustrate a Visu-add-on that provides features and functionality of the Visuphone;

FIGS. 15A, 15B, and 15C illustrate a flow diagram for presenting, selecting and updating visual IVR menus, in accordance with an embodiment of the invention;

FIG. 16 illustrates exemplary components of a device for implementing a database construction system, in accordance with an embodiment of the invention;

FIGS. 17A, 17B, and 17C illustrate exemplary components of the database construction system, in accordance with an embodiment of the invention;

FIG. 18A illustrates a flow diagram for creating a database for visual IVR menus, in accordance with an embodiment of the invention;

FIG. 18B illustrates a flow diagram for creating a database for visual IVR menus, in accordance with another embodiment of the invention;

FIG. 19 illustrates an exemplary set of IVR categories;

FIG. 20A illustrates an exemplary information process stored in a database, in accordance with an embodiment of the invention;

FIG. 20B illustrates an exemplary web form generated for the information process of FIG. 20A;

FIG. 21 illustrates an exemplary display of representations of destinations on the device, in accordance with an embodiment of the invention;

FIG. 22 illustrates an exemplary visual IVR menu of the selected destination with added graphics at a device, in accordance with an embodiment of the invention;

FIG. 23A illustrates a flow diagram for providing representation of destinations based on position, in accordance with an embodiment of the invention;

FIGS. 23B, 23C, and 23D illustrate a flow diagram for providing representation of destinations based on position, in accordance with another embodiment of the invention;

FIG. 24 illustrates flowchart for presenting advertisement along with the visual IVR menu on the device, in accordance with an embodiment of the invention;

FIG. 25A illustrates an exemplary information process for an IVR menu stored in records database, in accordance with an embodiment of the invention;

FIG. 25B illustrates an exemplary web form generated for the information process of FIG. 25A, in accordance with an embodiment of the invention;

FIG. 26A illustrates a flowchart for submitting personal information of a caller by Visuphone, in accordance with an embodiment of the invention;

FIG. 26B illustrates a flowchart for submitting personal information of a caller by Visuphone, in accordance with another embodiment of the invention;

FIG. 27 illustrates an exemplary representation of a visual IVR menu associated with the dialed phone number of the destination along with a scheduling mode option, in accordance with an embodiment of the invention;

FIG. 28 illustrates another exemplary representation of a visual IVR menu associated with the dialed phone number of the destination along with a scheduling mode option, in accordance with an embodiment of the invention;

FIG. 29 illustrates an exemplary display at the device after switching to a scheduling mode, in accordance with an embodiment of the invention;

FIG. 30A illustrates a flowchart for providing enhanced telephony by presenting a scheduling mode option to the caller, in accordance with an embodiment of the invention;

FIGS. 30B and 30C illustrate a flowchart for providing enhanced telephony by presenting a scheduling mode option to the caller, in accordance with another embodiment of the invention;

FIGS. 31A, 31B, 31C and 31D illustrate exemplary environments where communication device may exchange one or more messages/data packets for establishing communication session, in accordance with various embodiments of the invention;

FIG. 32 illustrates an exemplary packet sent from a device to a second communication device, in accordance with an embodiment of the invention;

FIG. 33 illustrates an exemplary structure of a first section of the packet sent to the second communication device, in accordance with an embodiment of the invention;

FIG. 34A illustrates a flowchart for establishing communication among a plurality of communication devices, in accordance with an embodiment of the invention;

FIG. 34B illustrates a flowchart for establishing communication among a plurality of communication devices, in accordance with another embodiment of the invention;

FIGS. 34C and 34D illustrate a flowchart for communicating among a plurality of communication devices, in accordance with yet another embodiment of the invention;

FIGS. 35A, 35B, and 35C illustrate an exemplary communication network where a call is received at a device from a first party device, in accordance with various embodiments of the invention function;

FIG. 36 illustrates yet another exemplary communication network in which an IVR is displayed when a call is received at a device, in accordance with an embodiment of the invention;

FIG. 37 illustrates an exemplary visual IVR menu along with one or more communication options at a device, in accordance with an embodiment of the invention;

FIG. 38 illustrates another exemplary visual IVR menu along with one or more communication options at a device, in accordance with an embodiment of the invention;

FIG. 39 illustrates the presentation of the visual IVR menu when a phone connection is associated with a wide band internet 'smart' modem;

FIG. 40 illustrates a flowchart for providing enhanced telephony when a call is received, in accordance with an embodiment of the invention;

FIG. 41 illustrates an environment where a device may be connected to an external device, according to an embodiment of the invention;

FIG. 42 illustrates an exemplary functioning of the device (portable device) in the environment of FIG. 41, in accordance with an embodiment of the invention;

FIG. 43 illustrates an exemplary functioning of the portable device such as a smart phone connected to a laptop in the environment of FIG. 41, in accordance with another embodiment of the invention;

FIG. 44 illustrates an exemplary functioning of the portable device connected to a large display screen in the environment of FIG. 41, in accordance with another embodiment of the invention;

FIG. 45 illustrates an exemplary functioning of the portable device such as the smart phone connected to a television screen in the environment of FIG. 41, in accordance with yet another embodiment of the invention;

FIG. 46 illustrates an exemplary functioning of the portable device connected to a picture frame in the environment of FIG. 41, in accordance with another embodiment of the invention;

FIG. 47 illustrates an exemplary functioning of the portable device connected to a Global Positioning System (GPS) navigation system in the environment of FIG. 41, in accordance with another embodiment of the invention;

FIG. 48 illustrates an exemplary functioning of the portable device, such as the smart phone, connected to a projector in the environment of FIG. 41, in accordance with yet another embodiment of the invention;

FIG. 49 illustrates an exemplary display of an Interactive Voice Response (IVR) menu on a large display screen connected to a portable device such as the smart phone, in accordance with an embodiment of the invention;

FIG. 50 illustrates block diagram of the portable device, in accordance with an embodiment of the invention;

FIG. 51 illustrates block diagram of the portable device, in accordance with another embodiment of the invention;

FIG. 52 illustrates an environment where a portable device may be connected to a user device, in accordance with an embodiment of the invention;

FIG. 53 illustrates an environment where a portable device may be connected to a user device, in accordance with another embodiment of the invention;

FIG. 54 illustrates an exemplary functioning of the portable device connected to a mobile phone in the environment of FIG. 52 or FIG. 53, in accordance with an embodiment of the invention;

FIG. 55 illustrates exemplary functioning of the portable device connected to a mobile phone and a projector in the environment of FIG. 52 or FIG. 53, in accordance with another embodiment of the invention;

FIG. 56 illustrates another exemplary functioning of the portable device connected to a mobile phone and a large screen in the environment of FIG. 52 or FIG. 53, in accordance with another embodiment of the invention;

FIG. 57 illustrates another exemplary functioning of the portable device connected to a mobile phone and a television in the environment of FIG. 52 or FIG. 53, in accordance with another embodiment of the invention;

FIG. 58 illustrates an exemplary functioning of the portable device connected to a mobile phone and a laptop in the environment of FIG. 52 or FIG. 53, in accordance with yet another embodiment of the invention;

FIG. 59 illustrates another exemplary functioning of the portable device connected to a picture frame and a wired telephone in the environment of FIG. 52 or FIG. 53, in accordance with yet another embodiment of the invention;

FIG. 60 illustrates an exemplary functioning of the portable device connected to a mobile phone and a GPS navigation system in the environment of FIG. 52 or FIG. 53, in accordance with another embodiment of the invention;

FIG. 61 illustrates an exemplary display of an Interactive Voice Response menu (IVR) on a large display screen connected to a portable device and a user device such as smart phone, in accordance with an embodiment of the invention;

FIG. 62 illustrates a block diagram of portable device 5202, in accordance with an embodiment of the invention;

FIG. 63 is a flowchart illustrating the functioning of portable device 4102, in accordance with an embodiment of the invention;

FIGS. 64A and 64B illustrate a flowchart for implementing the portable device in the environment of FIG. 52 and FIG. 53, in accordance with an embodiment of the invention;

FIG. 65 illustrates an exemplary functioning of the portable device connected to a laptop and a large screen in the environment of FIG. 52 or FIG. 53, in accordance with another embodiment of the invention;

FIG. 66 illustrates an exemplary functioning of the portable device such as the laptop connected to a large screen in the environment of FIG. 41, in accordance with yet another embodiment of the invention;

FIG. 67 illustrates an exemplary functioning of Visuphone for displaying one or more contact options at a device, in accordance with an embodiment of the invention;

FIG. 68 illustrates change of display at user device 102, when a user selects a contact option, in accordance with an embodiment of the invention;

FIG. 69 illustrates an exemplary functioning of Visuphone for displaying one or more contact options at a device, in accordance with another embodiment of the invention;

FIG. 70 illustrates change in display at device 102 based on selection of a contact option by a user of device 102, in accordance with an embodiment of the invention;

FIG. 71 illustrates a flow diagram illustrating an exemplary functioning of the Visuphone for displaying one or more contact options at a device, in accordance with an embodiment of the invention;

FIG. 72 illustrates a flowchart for creating a database of visual IVR menus, in accordance with an embodiment of the invention;

FIG. 73 illustrates a flowchart for providing enhanced telephony at a communication device, in accordance with an embodiment of the invention;

FIG. 74 illustrates an environment where various embodiments of the invention may function;

FIG. 75 illustrates an environment explaining functionality of an advertisement server, in accordance with another embodiment of the invention;

FIG. 76 illustrates an exemplary display of a visual IVR menu along with an advertisement on device 7502, in accordance with an embodiment of the invention;

FIGS. 77A-77C illustrate functionality of Visuphone provided by various service providers, in accordance with various embodiments of the invention; and FIG. 78 illustrates a flowchart for validating a database entry at the device based on digital signatures, in accordance with an embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1A illustrates an exemplary environment where various embodiments of the invention may function. A device 102a can be used by a caller 106 for connecting to a plurality of destinations 108a-n. Device 102a can be a telecommunication device that can connect directly to a Public Switched Telephone Network (PSTN) 110. A person skilled in the art will appreciate that device 102a can also connect to a private telephone exchange. Examples of device 102a include, but are not limited to, a mobile phone, a Smartphone, a telephone, a laptop, a computer, a tablet computer, or any other device capable of voice or data communication. Each of destinations 108a-n may include one or more Interactive Voice Response (IVR) menus. Further, each of destinations 108a-n may have one or more associated phone numbers. When caller 106 dials a phone number of a destination and connects to any destination from destinations 108a-n, an audible IVR menu may be played to caller 106. Each of destinations 108a-n can have different and more than one audible IVR menus. For example, IVR menus of bank may be completely different from that of a hospital. Typically, the audible IVR menu provided by destinations 108a-n comprises audible options or instructions. Caller 106 may be required to select various options from the audible IVR menu to obtain the required information or resource or service from the dialed destination. Various types of destinations 108a-n that implement the audible IVR menu include, for example, banks, hotels, fast-food outlets, utility services providers, corporate offices, and so forth.

In an embodiment, device 102a includes a Visuphone 104 that may select at least one visual IVR menu from a database of device 102a and display the at least one visual IVR menu on device 102a corresponding to the audible IVR menu based on a phone number of the destination to be connected. Visuphone 104 may be hardware, an application stored as software, a firmware on device 102a, or a combination thereof. Thereafter, caller 106 can select the options of the audible IVR menu from the visual display without the requirement to listen to the audible instructions. Further, Visuphone 104 may display one or more options based on the dialed destination. Exemplary audible IVR menu at destination 108a and a corresponding visual IVR menu are explained in detail in conjunction with FIGS. 2A and 2B. In an embodiment of the invention, Visuphone 104 may further display a legal notice or a disclaimer to the user along with visual IVR menu 222b. The legal notice or the disclaimer may be a text message, a multimedia message, a voice message, and so forth. In an embodiment of the invention, the legal notice may be associated with the IVR menu(s). Further, Visuphone 104 is configured to detect a legal notice associated with the IVR menu. In an embodiment of the invention, Visuphone 104 may convert the legal notice to text by using the speech recognition. In an embodiment of the invention, Visuphone 104 may also score the quality of the speech recognition for one or more records of the database.

In an embodiment of the invention, device 102a can request for updates from a server through a communication network. The server may maintain the updated information of destinations and their associated properties. This may happen in a case when requested information is not available on the dialed destination. The communication network can include more than one device. Examples of the communication network may include, but are not limited to, the Network, PSTN, Local Area Network (LAN), Wide Area Network (WAN), WiMAX, IEEE 802.11, Wi-Fi network, ZigBee, Radio Frequency 4 for consumer Electronics (RF4CE), Long Term Evolution (LTE) network, $3^{rd}$ generation (3G) network, $4^{th}$ generation (4G) network, and so forth. Further, the interaction between caller 106 (user) and the destination including the IVR system may be performed over the communication network.

FIG. 1B illustrates another exemplary environment where various embodiments of the invention may function. As shown, device 102b can be a device that can be connected directly to a network 112. Examples of device 102b include, but are not limited to, a personal computer, a laptop, a mobile phone, a smart-phone, a fixed line telephone, Voice over Internet Protocol (VOIP) phone or other devices capable of voice or data communication. Device 102b may include various applications or computer programs that enable caller 106 to use device 102b for connecting to any of destinations 108a-n through PSTN 110 over network 112. For example, the applications may be VOIP applications, such as but not limited to, Skype, Magic Jack, Google Talk and so forth. A gateway 116 can be used to interconnect PSTN 110 and network 112. Network 112 may include any wired or wireless network. Examples of network 112 include, but are not limited to, Local Area Network (LAN), Wide Area Network (WAN), Wi-Fi network, WiMAX, $3^{rd}$ Generation network, $4^{th}$ generation network, Long Term Evolution (LTE) network, Universal Mobile Telecommunication Systems (UMTS) network, IEEE 802.16m, LTE Advanced network, Mobile WiMAX, IEEE 802.20, Flash-OFDM, HIPERMAN, iBurst, HSDPA, Global System for Mobile communications (GSM), Code Division Multiple Access (CDMA), Evolution Data Optimized (EV-DO), RF4CE network, General Packet Radio Service (GPRS), Enhanced Data rates for GSM Evolution (EDGE), High Speed Packet Access (HSPA), High-Speed Downlink Packet Access (HSDPA), Mobile Broadband Wireless Access (MBWA), and so forth. As discussed with reference to FIG. 1A, destinations 108a-n can present the audible IVR to caller 106. Device 102b includes Visuphone 104b that displays a visual IVR menu on device 102b corresponding to the audible IVR menu based on a phone number of the destination to be connected. Further, Visuphone 104 may display one or more options for communication on device 102b.

FIG. 1C illustrates yet another exemplary environment where various embodiments of the invention may function. As shown, device 102c can be connected to PSTN 110 through network 112 or through the cellular network 111. Various service providers provide multiple or overlapping services to customers. For example, cable television service provider may also provide phone and Internet service, optical Internet provider may also provide phone or television services, WiMAX service providers that provide phone service, and so forth. Network 112 may be any service provider that provides such services, for example, but not limited to, cell phone services, wireless services, Internet services, cable television services, or various combinations of the above or other type of services. As discussed with reference to FIG. 1A, destinations 108a-n presents the audible IVR to caller 106. Device 102c includes Visuphone 104 that displays a visual IVR menu on device 102b corresponding to the audible IVR menu based on a phone number of the destination to be connected. Further, Visuphone 104 may display other communication options to caller 106.

In an embodiment of the invention, Visuphone 104 may call the dialed destination based on the predefined calling information automatically. In an embodiment, Visuphone 104 may keep on calling to the dialed destination until the requested information is received. In an embodiment, the dialed destination may request the information, requested by Visuphone 104 of device 102c (or 102a or 102b), from a server of the communication network. Thereafter, the dialed destination may send the information received from the server to Visuphone 104 of device 102c. Further, Visuphone 104 may save and/or display the received information at device 102c.

FIG. 2A illustrates an exemplary audible Interactive Voice Response (IVR) menu 222a at a destination, such as destination 108a, in accordance with an embodiment of an invention. A person skilled in the art will appreciate that audible IVR menu 222a is an exemplary graphical representation of the audible instructions presented by destination 108a for the sake of explanation and is not an actual graphical display. For explanation, assuming that destination 108a is a pizzeria that provides home delivery and takes away services. Caller 106 connects to destination 108a by dialing a board phone number 202a. Subsequently, various options of audible IVR menu 222a are played to caller 106. The various options include an option 204a that plays an audible instruction, "press 2 for pizza order", an option 206a that plays an audible instruction, "press 3 for order status", an option 220a that plays an audible instruction, "press 0 for main menu". Caller 106 can select an option by pressing from device 102, a button corresponding to the instructions in the audible IVR menu. Subsequently, the selected options are transmitted to the destination and the menu is advanced if there are any further options. Alternatively the display can present the next layer of menu options to give the caller better view of the option domain and allow even faster interface between caller and the IVR.

For example, selection of option 204a presents an option 208a that plays an audible instruction, "press 1 for veg" and an option 210a that plays an audible instruction, "press 2 for non-veg" is played. Similarly, selecting option 208a or 210a presents or option 214a that plays an audible instruction, "press 1 for home delivery", an option 216a that plays an audible instruction, "press 2 for take away". Similarly, selection of option 206a presents an option 212a that plays an audible instruction, "press 1 to talk to an executive".

Options 204a, 206a, 208a, 210a, 212a, 214a, and 216a are part of a main menu 218a. Main menu 218a can be repeatedly played by selecting option 220a by caller 106. Caller 106 may repeat main menu 218a for example, in case of a mistake in selection. Therefore, caller 106 directly interacting with audible IVR menu 222a may be required to listen to all or various audible options before executing a desired action. However, the interaction is simplified by Visuphone 104, that presents a visual IVR menu 222b to caller 106 corresponding to audible IVR menu 222a, as explained with reference to FIG. 2B. In an embodiment of the invention, Visuphone 104 may convert a language of audible IVR menu 222a while generating a visual IVR menu 222b. Visuphone 104 may generate a visual IVR menu 222b in a language different from the language of audible IVR menu 222a. For example, Visuphone 104 may convert an audible IVR menu which is in French language to a visual IVR menu in English language. Further, Visuphone 104 may create multiple copies of visual IVR menus corresponding to an audible IVR menu in different language. For example, corresponding to an audible IVR menu in Spanish language, five different visual IVR menus may be generated and stored at device 102. The five visual IVR menus may be in different languages.

Further, each of destinations 108a-n may have more than one audio IVR menus. Therefore, different visual IVR menus corresponding to one or more audio IVR menus can be available for each of destinations 108a-n. In an embodiment, device 102 may include more than one visual IVR menus for each destination of destinations 108a-n based on the time. Hereinafter device 102 collectively refers to device 102a, 102b and 102c. Therefore, different visual IVR menus corresponding to a destination 108 might be presented to caller 106 depending on the time of dialing to destination 108. The visual IVR menu may be displayed based on the time of dialing of the phone number of the destination by caller 106.

In an exemplary scenario, in a hotel, the food items in a daytime menu card may be different from a night menu card. Accordingly, the options in the visual IVR menu may differ. Therefore, the visual IVR menus for daytime and nighttime can be different for the hotel. When caller 106 dials the phone number of the hotel in daytime, a daytime visual IVR menu can be displayed at device 102a, and if caller 106 calls at night, a different menu can be displayed at device 102a. Therefore, a visual IVR menu of the hotel displayed at the calling device for a call made at noon may be different than the visual IVR menu displayed for another call made at evening.

FIG. 2B illustrates an exemplary visual IVR menu 222b, at a device, corresponding to an audible IVR menu 222a, in accordance with an embodiment of the invention. Visual IVR menu 222b may be displayed on a screen of the device, such as device 102b, that may connect to destination 108a through network 112 and PSTN 110. In an embodiment, visual IVR menu 222b can be displayed before a connection is established with destination 108a. A person skilled in the art will appreciate that device 102b is illustrated for the sake of explanation, and similar visual IVR menu 222b can be displayed on device 102a that connects to destination 108a directly through PSTN 110. Visual IVR menu 222b includes various nodes corresponding to the options of an audible IVR menu of destination 108a. The various nodes of visual IVR menu 222b include a node 202b for connecting to board number 202a of destination 108a. Similarly, nodes 204b, 206b, 208b, 210b, 212b, and 216b correspond to options 204a, 206a, 208a, 210a, 212a, and 216a respectively. A node corresponding to option 220a may not be required in visual IVR menu 222b, as the complete menu is visible and caller 106 may not be required to repeat audible IVR menu 222a. Therefore, when caller 106 selects a node from visual IVR menu 222b, Visuphone 104 automatically transmits the desired action corresponding to the options in audible IVR menu 222a to dialed destination 108a. For example, assuming that caller 106 calls destination 108a to order a veg pizza for home delivery. In this case, caller 106 may directly select nodes 208b and 214b from a touch screen of device 102a, corresponding to veg pizza and home delivery from visual IVR menu 222b. Alternatively, caller 106 directly selects nodes 204b, 208b and 214b by pressing corresponding keys '2', '1', and '1', from a keypad or screen of device 102a without a need to listen to the complete audible IVR menu. Accordingly, Visuphone 104 may transmit the signals to audible IVR menu 222a. In this case, the signals required by audible IVR menu 222a may be the Dual Tone Multi-Frequency (DTMF) tones of '2', '2', and '1' for options 204a, 208a, and 214a. It may be appreciated by a person skilled in the art that caller 106 may not be required to select all the corresponding options to select a particular option. For example, when caller 106 wants to order a veg-pizza for take away. Then, only the nodes 208b and 216b may be required to be selected, and node 204b is automatically understood by Visuphone 104b. Further, a node that is necessary for a transaction is automatically highlighted. For example, if caller 106 only selects node 216b for take away, then node 208b for a veg-pizza or node 210b for non-veg are highlighted for selection. In an embodiment of the invention, caller 106 may select nodes irrespective of the sequence presented in the audible IVR menu. For example, node 214b for home delivery may be selected before node 208b of veg-pizza. Visuphone 104 automatically generates a sequence of the selections made by caller 106 and transmits the corresponding signals to the destination. Furthermore, Visuphone 104 stores the selections and the numbers dialed by the caller during the call in association with the destination phone number. In an embodiment, Visuphone 104 may enable callers to search or bookmark options in a menu with a large number of options. For example, callers can search for a node 214b from the menu by typing 'home delivery'. As a result, navigation of a complete visual IVR menu may not be required.

In an embodiment of the invention, visual IVR menu 222b is displayed to caller 106 when a call is received at device 102 from a destination of destinations 108a-n. For example, a service provider may call to provide information about new services or account of caller 106. Further, caller 106 may be required to select various options based on his preferences. Visuphone 104b may detect the received number and correspondingly display a visual IVR menu to the caller. Further, the calling destination may push or send the visual IVR menu associated with the destination to device 102a (102b or 102c). The process of displaying visual IVR menu when a call is received at the device is explained in detail in FIG. 35 to FIG. 40.

Visual IVR menu 222b may include multiple options. Visuphone 104 may also allow caller 106 to perform search based on a term or word or option in visual IVR menu 222b. Visuphone 104 may allow caller 106 to search an option in the entire visual menu 222b and connect to the searched option directly. Visuphone 104 may also provide caller 106 an interface to perform word based search on visual IVR menu 222b. Further, Visuphone 104 may allow caller 106 to select more than one option of visual IVR menu 222b including a search word or phrase without any need to look at the entire visual IVR menu 222b. In an embodiment of the invention, Visuphone 104 may further display a legal notice or disclaimer to the user along with visual IVR menu 222b. In an embodiment of the invention, the disclaimer may be about device 102 or about an application executing on device 102. In another embodiment of the invention, the disclaimer or the legal notice may be a public notice or notice about other devices or applications such as of dialed destination. The legal notice or the disclaimer may be a text message, a multimedia message, a voice message, and so forth. In an embodiment of the invention, the legal notice may be associated with the IVR menu(s). Further, Visuphone 104 is configured to detect a legal notice associated with the IVR menu. In an embodiment of the invention, Visuphone 104 may convert the legal notice to text by using the speech recognition. In an embodiment of the invention, Visuphone 104 may also score the quality of the speech recognition for one or more records of the database.

FIG. 2C illustrates an exemplary visual IVR menu 222c with added graphics for the nodes. It is well known that graphics are easier to learn and are faster to recognize than words. Therefore, graphics are used in various computerized device interfaces. The exemplary graphics as shown with reference to FIG. 2C are icons. Various other types of graphics can be displayed for example, animated icons, icons that highlight or animate when the node is highlighted, and so forth.

In an embodiment, the graphics may be displayed for each node or a few nodes based on the usability of visual IVR menu 222c. For example, for the node 208c an icon of a vegetable may be displayed to designate a vegetarian pizza, and an icon of house for the node 214c of home delivery may be displayed. In an embodiment of the invention, visual IVR menu 222c can be customized to display only the text, only the icons or both. Furthermore, caller 106 can suggest or use various icons based on his preferences.

FIG. 2D illustrate an exemplary tooltip that is displayed when a cursor is hovered over an option in the visual IVR menu. As shown, a tooltip box 222 is displayed when a cursor 226 is hovered on option 204c or 206c. Similarly, a Tooltip box 224 may be displayed containing the next menu text with or without it's available options 210c, 208c in case the caller decides to select the option over which cursor 226 is hovered, for example option 204c.

In an embodiment of the invention, Visuphone 104b may provide a standard menu per group of similar audible IVR or destinations. With reference to FIG. 2B, an example of a menu at a pizza provider is discussed. Generally, every pizza provider may have its specific audible IVR menu. However, caller 106 may prefer to use a single standard visual IVR menu for all pizza providers. Therefore, learning a single visual IVR menu will be useful for engaging various providers. In such a case, the database may include a standard menu per class of compatible providers. Further, the database may include a plurality of telephone numbers associated with one or more destinations 106a-n. Visuphone 104 may offer caller 106 an option to use the standard domain menu. Therefore, when caller 106 makes a selection on the standard menu, Visuphone 104 may translate the selection to the specific audible IVR menu selection and send the proper dialing tones (or DTMF) to that specific audible IVR. Furthermore, the standard menus may be published. Therefore, various providers may modify their own menus to help their customers. Additional aspect of the standard menu is the use of icons as discussed with reference to FIG. 2C. The icons may represent standard choice across various domains. For example, if a specific icon may represent sales, then the same icon may be used for sales of airlines tickets when the destination is an airline company or sales of telephone service when the destination is a telephone company. In an embodiment of the invention, the caller may customize the icons or graphics displayed on the menu.

FIG. 3 illustrates exemplary components of device 102a for implementing Visuphone 104. Device 102a includes a system bus 324 to connect the various components. Examples of system bus 324 include several types of bus structures including a memory bus or memory controller, a peripheral bus, or a local bus using any of a variety of bus architectures. As discussed with reference to FIG. 1A, device 102a can be a device such as computer, a smart-phone and so forth. Device 102a can connect to PSTN 110 through a gateway 326, which is connected to network 112 through a network interface 314. Input/Output (IO) interface 316 of device 102a may be configured to connect external or peripheral devices such as a memory card 318, a keyboard 320a, a mouse 320b and a Universal Serial Bus (USB) device 322. Although not shown, various other devices can be connected through 10 interface 316 to device 102a. In an embodiment of the invention, device 102a may be connected to a hub that provides various services such as voice communication, Internet access, television services, and so forth. For example, the hub may be a Home Gateway device that acts as a hub between the home environment and the Broadband Network.

Device 102a includes a display 302 to output graphical information to caller 106. In an embodiment of the invention, display 302 may includes a touch sensitive screen. Therefore, caller 106 can provide inputs to device 102a by touching display 302 or by point and click using the 'mouse'. Memory 306 of device 102a stores various programs, data and/or instructions that can be executed by a Central Processing Unit (CPU) 304. Examples of memory 306 include, but are not limited to, a Random Access Memory (RAM), a Read Only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by device 102a. Memory 306 may include Operating System (OS) (not shown) for device 102a to function. Further, memory 306 may include other applications 310 that enable the caller to communicate with destinations. Examples of other applications 310 include, but are not limited to, Skype, Google Talk, Magic Jack, and so forth. Other applications 310 may be stored as software or firmware on device 102a.

Further, memory 306 includes Visuphone 104 for presenting a visual IVR menu corresponding to the audible IVR menu of destination as discussed with reference to FIGS. 2A, 2B and 2C. Visuphone 104 may be an application stored as a software or firmware on device 102a. In an embodiment of the invention, Visuphone 104 may display a legal notice or disclaimer to the user or caller 106 along with the visual IVR menu at device 102. The legal notice or the disclaimer may be a text message, a multimedia message, a voice message, and so forth. In an embodiment of the invention, the legal notice may be associated with the IVR menu(s). Further, Visuphone 104 is configured to detect a legal notice associated with the IVR menu. In an embodiment of the invention, Visuphone 104 may convert the legal notice to text by using the speech recognition.

The visual IVR menus are stored in a visual menu database 308 in memory 306 of device 102a. Visuphone 104 automatically searches visual menu database 308 for visual IVR menus corresponding to a phone number of destinations 108a-n dialed by caller 106. In an embodiment of Visuphone 104 may automatically select the at least one visual IVR menu associated with the phone number of destinations 108a-n dialed by caller 106 (or user). In an embodiment, Visuphone 104 searches visual menu database 308 for visual IVR menus corresponding to a phone number of a calling destination. Subsequently, if the visual IVR menu for the phone number is available in the database, then the visual IVR menu is displayed on display 302. Further, Visuphone 104 may be implemented as a plug-in to other applications 310. Therefore, when a phone number is dialed from other applications 310, Visuphone 104 detects the dialing of the number and automatically displays the visual IVR menu corresponding to the phone number. Thereafter, the caller can interact with the visual IVR menu, without listening to the complete audible IVR menu of destinations.

In an embodiment of the invention, visual menu database 308 includes at least two records associated with at least two destinations. Each of the two records includes an associated business category field. Further, each of the two records have same business category. Further, visual menu database 308 may include a standard menu for the same business category. In an embodiment of the invention, Visuphone 104 may generate visual IVR menus in more than one language. In an embodiment of the invention, Visuphone 104 may generate visual IVR menu in a language different from the language of the audible IVR menu of destination 108. For example, Visuphone 104 may convert an audible IVR menu which is in French language to a visual IVR menu in English language. In another embodiment of the invention, Visuphone 104 may create multiple copies of visual IVR menus in different languages corresponding to an audible IVR menu of destination 108. For example, for an audible IVR menu in Spanish, five visual IVR menus may be generated and stored at device 102. The five visual IVR menus may be in different languages.

Visual menu database 308 may also store a digital signature corresponding to each entry or record (visual IVR menus) in visual menu database 308. Digital signature may be used to check accuracy of the entry. For example, Visuphone 104 may generate digital signatures for every visual IVR menu for each destination of destinations 108a-n and may store in visual menu database 308. Further, while accessing a visual IVR menu of a dialed destination, Visuphone 104 may generate a new digital signature which then may be compared with a stored digital signature of the visual IVR menu to check accuracy of the visual IVR menu. In an embodiment of the invention, the digital signatures may be generated and compared by Visuphone 104 in real time. A mismatch in digital signatures while comparing the digital signatures may indicate that the visual IVR menu has been modified and a new visual IVR menu is available for update. Therefore, based on the comparison results, visual IVR menu 308 may be updated by Visuphone 104. In an embodiment of the invention, visual IVR menu database 308 may be updated by receiving updates from the dialed destination. In an embodiment of the invention, visual menu database 308 may be updated by receiving updates from a server or a remote repository.

Further, Visuphone 104 may update visual menu database 308 based on reviews and ratings or feedback of one or more callers or users. In an embodiment of the invention, Visuphone 104 may validate the accuracy of visual menu database 308 by crowd sourcing. For example, if ten users have given some good rating about a visual IVR menu stored in visual menu database 308, and two users have given bad rating or reviews about the visual IVR menu then, Visuphone 104 may update visual menu database 308 accordingly. In an embodiment of the invention, Visuphone 104 may create a new entry for visual IVR menus in visual menu database 308 based on reviews and ratings received from different callers. In an embodiment of the invention, Visuphone 104 may update visual IVR menus at a database at the server based on crowd sourcing and/or reviews and ratings of users.

With reference to FIG. 4, an exemplary display of a visual IVR menu 406 on device 102c is illustrated. The caller may dial a phone number 402 corresponding to a destination using keypad 320. Keypad 320 may be a physical keypad or a virtual keypad displayed on a touch screen display 412. Subsequently, visual IVR menu 406 corresponding to phone number 402 is searched and displayed on a display 412.

In an exemplary instance, if caller dials a phone number of an IVR destination, then a visual IVR menu corresponding to audible IVR menu of the dialed destination is displayed on display 412. Similarly, if the caller receives a call from a phone number of destination, then a visual IVR menu corresponding to audible IVR menu of destination is displayed on display 412. Thereafter, caller can interact with the visual IVR menu to select options from the audible IVR menu. Visual IVR menu 406 may be displayed before actual connection of device 102c to destinations. Therefore, caller can select a desired action from visual IVR menu 406 before connecting to destinations. In an embodiment of the invention, visual IVR menu 406 may be provided in real-time to caller. In an embodiment of the invention, visual IVR menu 406 is provided a messaging service such as a Short Messaging Service (SMS). Therefore, destinations may provide customized visual IVR menu 406 to caller 106. Visual IVR menu 406 may be customized based on the profile of caller. In an embodiment of the invention, the profile may be generated based on access pattern of caller or the data capture by a hub connected to device 102c.

Caller can interact with visual IVR menu 406 by pressing a desired button from keypad 320. For example, caller can press a '5' key from keypad 320 to select a node 5 in visual IVR menu 406. Further, caller can directly select the node 5 of visual IVR menu 406 from display 412, in case of a touch sensitive screen. Depending on the complexity or size of destinations, visual IVR menu 406 may have various nodes. Moreover, display area of display 412 may be limited or small. As a result, all the nodes of visual IVR menu 406 may not be displayed together on display 412. In such a case, Visuphone 104 is configured to allow caller to navigate by scrolling horizontally and/or vertically to view nodes on visual IVR menu 406. Further, Visuphone 104 may detect the capability of device 102a before displaying the visual IVR menu. For example, in case device 102a is a basic mobile phone with limited functionality of the display screen. Therefore, Visuphone 104 may display the visual IVR menu in form of a simple list. Similarly, a list may be displayed in case of fixed line telephones. Moreover, in case device 102c includes a high capability screen, such as but not limited to an iPhone, then the visual IVR menu is displayed in form of graphics.

Subsequently, after caller selects a desired action from visual IVR menu 406, a connection is established between device 102c and destinations based on the selected option. In one embodiment, Visuphone 104 is configured to detect and present an application or computer program available on device 102c.

In an embodiment, Visuphone 104 may be configured to select and display an advertisement 408. Advertisement 408 may correspond to the type of services provided by the dialed destinations or may be related to category of the visual IVR menu of the destination. For example, if destination dialed is a pizzeria, then advertisement 408 may include promotions or offers about a new pizza. Moreover, advertisement 408 may include promotions or offers from a third party or a competitor of the destination. Further, Visuphone 104 may be coupled to an advertising database. The advertising database may include advertisements related to the phone numbers of the destinations. The advertising database may be stored at device 102c, the destinations, service providers, optical network providers, or other third party servers. Further, the advertisements may be provided based on a profile of caller. For example, assuming that the caller calls a bank holding his saving account. Therefore, the advertisement displayed to the caller may be based on the location, address, account balance, type and volume of transactions, loans, purchases and so forth.

Visuphone 104 may be configured to connect to an intended destination, when caller selects advertisement 408. Further, Visuphone 104 may display visual IVR menu 406 of the intended destination. In an embodiment, Visuphone 104 may store the interactions of caller with visual IVR menus. For example, Visuphone 104 may automatically learn the numbers dialed or options selected from the menu. Moreover, the learned numbers or choices are associated with the dialed phone number of the destination. Therefore, the caller is assisted in his future calls. For example, when caller calls the destination again, then the actions that were performed in the last interaction are presented prominently to caller; or a previous sequence may be automatically performed. Further, the actions that are frequently performed are presented prominently to the caller. For example, if caller dials a bank frequently to enquire about his account balance, then the options for selecting his account balance may be highlighted.

In an embodiment of the invention, Visuphone 104 may display visual IVR menus in different languages other than the language of the audible IVR menu. For example, Visuphone 104 may convert an audible IVR menu which is in French language to a visual IVR menu in English language. Further, Visuphone 104 may create multiple copies of visual IVR menus corresponding to an audible IVR menu. For example, for an audible IVR menu in Spanish, five visual IVR menus may be generated and stored at device 102. The five visual IVR menus may be in different languages.

In an embodiment, Visuphone 104 may display a visual IVR menu associated with the dialed destination. In an embodiment, Visuphone 104 may display a mode option on a screen of device 102. The mode option may be selected by a caller such as caller 106 for switching the mode of device 102. Based on the selected mode of device 102, one or more input or output options may be displayed on the screen. Example of the one or more input or output options include, but are not limited to, a date of making a call, a time of making a call, a predefined time interval for repeating a call, and so forth.

In an embodiment of the invention, the mode option is a scheduling mode option. Caller 106 may switch device 102 to a scheduling mode by selecting the mode option. In an embodiment, when device 102 is in scheduling mode, Visuphone 104 may save the inputs from caller 106. In an embodiment, Visuphone 104 may save the options of the displayed visual IVR menu selected by caller 106. In the scheduling mode, Visuphone 104 may display one or more input options on the screen to enter a call schedule including a date and time information. In an embodiment, Visuphone 104 may further ask caller 106 to enter other important information required for dialing the phone number of the destination automatically at a later time. Thereafter, caller 106 may enter the date and time information for dialing the phone number of the destination. Furthermore, Visuphone 104 may call a phone number of a destination of destinations 108a-n automatically based on the predefined calling information. The predefined calling information can be entered by caller 106. The predefined calling information may include the selection information and the call schedule. The selection information may include one or more options of the displayed visual IVR menu associated with the dialed destination, selected by caller 106. In an embodiment of the invention, Visuphone 104 may further display a legal notice or disclaimer to the user or caller along with the visual IVR menu at device 102. The legal notice or the disclaimer may be a text message, a multimedia message, a voice message, and so forth. In an embodiment of the invention, the legal notice may be associated with the IVR menu(s). Further, Visuphone 104 is configured to detect a legal notice associated with the IVR menu. In an embodiment of the invention, Visuphone 104 may convert the legal notice to text by using the speech recognition. In an embodiment of the invention, Visuphone 104 may score the quality of the speech recognition for one or more records of the database.

In an embodiment of the invention, Visuphone 104 may establish a communication with the dialed destination based on the predefined calling information. Further, Visuphone 104 may request information from the dialed destination based on the predefined calling information. Furthermore, Visuphone 104 may receive the requested information from the dialed destination based on the predefined calling information. In an embodiment, caller 106 may also interact with the dialed destination after establishment of the communication. Furthermore, Visuphone 104 may save the received information at device 102. In an embodiment, Visuphone 104 may convert the format of the received information from a first format to a second format. In an embodiment, the first format of the received information may be an audio format. Examples of the audio format include, but are not limited to, WAV, Real Audio, Musical Instrument Digital Interface (MIDI), Windows Media Audio (WMA), MP3, Ogg, and so forth. In an embodiment, the second format may be a text format such as a Unicode text, Rich Text format, Hypertext Markup Language (HTML) or any other format compatible with device 102a. In an embodiment, Visuphone 104 may display the received information at device 102a.

FIG. 5 illustrates exemplary components of device 102b for implementing Visuphone 104, in accordance with another embodiment of the invention. Device 102b includes a system bus 526 to connect the various components. Examples of system bus 526 include several types of bus structures such as, but not limited to, a memory bus or memory controller, a peripheral bus, or a local bus using any of a variety of bus architectures. As discussed with reference to FIG. 1B, device 102b can be a computing device such as, but not limited to, a personal computer, a laptop, a mobile phone, a smart-phone, and so forth. Device 102b can connect to network 112 through a network interface 514. Further, device 102b can connect to PSTN 110 through gateway 116 and network 112 through network interface 514. Input/Output (IO) interface 516 of device 102b may be configured to connect external or peripheral devices such as a mouse 518, a keyboard 520, a speaker 522, microphone 523, and a camera 524. Although not shown, various other devices such as hard disk, a Universal Serial Bus (USB) device or others can be connected through IO interface 516 to device 102b. A person skilled in the art will appreciate that although not described, various other types of devices capable of voice and/or data communication can be connected to device 102b.

Device 102b includes a display interface 502 to connect to a display 512. Display interface 502 can be for example, a video adapter. Display 512 outputs graphical information to caller. In an embodiment of the invention, display 512 includes a touch sensitive screen. Therefore, caller 106 can provide inputs to device 102b by touching display 512 or by pointing with the mouse and click. Memory 506 of device 102b stores various programs, data and/or instructions that can be executed by Central Processing Unit (CPU) 504. Examples of memory 506 include, but are not limited to, a Random Access Memory (RAM), a Read Only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by device 102b. Memory 506 may include Operating System (OS) (not shown) for device 102b to function. Further, memory 506 may include other applications 510 that enable caller 106 to communicate with destinations 108a-n. Examples of other applications 510 include, but are not limited to, Skype, Google Talk, Magic Jack, and so forth. Other applications 510 may be stored as software or firmware on device 102b. Further, memory 506 includes Visuphone 104 for searching and presenting a visual IVR menu corresponding to the audible IVR menu of a destination as discussed with reference to FIGS. 2A and 2B. Visuphone 104 may be an application stored as a software or firmware on device 102b. The visual IVR menus are stored in visual menu database 308 in memory 506 of device 102b. Visuphone 104 searches visual menu database 308 for visual IVR menu corresponding to a phone number of a destination dialed by caller 106. Subsequently, the visual IVR menu is presented on display 512 for selection of options by caller 106. Further, Visuphone 104 may be implemented as plug-in to other applications 510. Therefore, when a phone number is dialed from other applications 510, Visuphone 104 detects the dialing and automatically searches and displays the visual IVR menu corresponding to the dialed phone number. Thereafter, caller 106 can interact with the visual IVR menu, without listening to the audible IVR menu of destinations 108a-n.

In an embodiment of the invention, Visuphone 104 may allow caller 106 to navigate an IVR system of a destination before actually calling phone number of the destination. In an embodiment of the invention, Visuphone 104 may be launched through a website or it may be launched by selecting a sub part of a web site or web page. Caller 106 may navigate a website IVR system and may select the right person or option in the IVR system before connecting to the IVR system by using Visuphone 104 application. Visuphone 104 further allows caller 106 to search for an appropriate service, product, department or option in the IVR system of a company or website or destination before dialing to the destination. Thereafter, selecting the desired department or option, caller 106 may dial phone number of the destination.

Further, features of Visuphone 104 may be provided by a service provider, such as but not limited to, a cellular service provider, a cable TV service provider, an Internet Service Provider (ISP), a Wi-Fi service provider, optical network providers, and so forth. In an embodiment of the invention, Visuphone 104 is not installed at device 102. In such a scenario, caller 106 may use functionalities of Visuphone 104 through various service providers. For example, if Visuphone 104 is not installed at a smart phone and user of the smart phone wants to use Visuphone 104, he/she may do so by subscribing to services of Visuphone 104 from a service provider such as an ISP or cellular service provider. In an embodiment of the invention, Visuphone 104 application may be provided by various service providers on subscription basis. In an embodiment of the invention, Visuphone 104 may be used by various users through cloud implementation.

Further, Visuphone 104 may update visual menu database 308 based on reviews and ratings or feedback of one or more callers or users. In an embodiment of the invention, Visuphone 104 may validate the accuracy of visual menu database 308 by crowd sourcing. For example, if five users have given some good rating about a visual IVR menu stored in visual menu database 308, and two users have given bad rating or reviews about the visual IVR menu then, Visuphone 104 may update visual menu database 308 accordingly. In an embodiment of the invention, Visuphone 104 may create a new entry in visual menu database 308. In an embodiment of the invention, Visuphone 104 may update visual IVR menus at a database at the server based on crowd sourcing and/or reviews and ratings of users.

In an embodiment of the invention, visual menu database 308 may also store a digital signature corresponding to each entry or record (visual IVR menus) in visual menu database

308. Digital signature may be used to check accuracy of the entry. For example, digital signatures for every visual IVR menu for each destination of destinations 108*a-n* may be stored in visual menu database 308. Further, while accessing a visual IVR menu of a dialed destination, a new digital signature may be generated which may be compared with a stored digital signature of the visual IVR menu to check accuracy of the visual IVR menu. In an embodiment of the invention, Visuphone 104 may generate and compare digital signatures in real time. A mismatch in digital signatures while comparing may indicate that the visual IVR menu has been modified and a new visual IVR menu is available for update. Therefore, based on the comparison results, visual menu database 308 may be updated. In an embodiment of the invention, visual IVR menu database 308 may be updated by the dialed destination. In an embodiment of the invention, visual menu database 308 may be updated by a server or a remote repository.

FIG. 6 illustrates an exemplary display of a visual IVR menu 604 on device 102*b*, in accordance with an embodiment of an invention. Caller 106 may dial a phone number 610 from a VOIP application 608 on device 102*b*. Phone number 610 may correspond to any of destinations 108*a-n*. In an embodiment, caller selects a pre-stored phone number from the application 608. Subsequently, visual IVR menu 604 corresponding to a dialed destination is displayed on display 512. In an embodiment, display 512 may comprise a touch sensitive screen. Therefore, caller 106 can interact with device 102*b* directly through display 512.

In an exemplary instance, if caller 106 dials a phone number of destination, then a visual IVR menu corresponding to audible IVR menu of destination is displayed. Thereafter, caller 106 can interact with the visual IVR menu to select options and to transmit inputs for the audible IVR menu of the corresponding destination. Visual IVR menu 604 could be displayed before actual connection of device 102*b* to destinations. Therefore, caller 106 can select a desired option from visual IVR menu 604 before establishing a connection to the dialed destination. Depending on the complexity or size of the destinations, visual IVR menu 604 may have various nodes. For example, an organization with 50 departments may have more menu options or nodes than that of an organization with 10 departments. Further, the display area of display 512 may be limited. As a result, all the nodes of visual IVR menu 604 may not be displayed together on display 512. In such a case, Visuphone 104 may be configured to allow caller 106 to navigate by scrolling horizontally and/or vertically to view nodes on visual IVR menu 604. Moreover, caller 106 can search for a desired option from the visual IVR menu.

Subsequently, after caller 106 selects a desired option from visual IVR menu 604, a connection is established between device 102*b* and a destination based on the selected action. In one embodiment, Visuphone 104 may be configured to detect and present applications suitable to caller 106 for initiating the connection. For example, Visuphone 104 may detect more than one VOIP applications present in device 102*b* and present them to caller 106 on display 512. Thereafter, caller 106 can select an application to be used or initiate the connection in a default configuration. The default configuration can be for example, VOIP application 608 on which phone number 610 was dialed. In another embodiment, caller 610 may select a phone number displayed in applications such as a browser, messenger, or a mail client. Subsequently, Visuphone 104 detects and presents applications suitable to caller 106 for initiating the connection. Furthermore, Visuphone 104 is configured to display visual IVR menu 604 for the phone number selected from the applications. Further, one or more options such as file, edit, new, and so forth may be displayed in field 602 as shown.

In an embodiment, Visuphone 104 is further configured to display an advertisement 606. Advertisement 606 may correspond to the type of services provided by destinations. For example, if the destination is a bank, then advertisement 606 may include promotions or offers about new loans or schemes. Moreover, advertisement 606 may include promotions or offers from a third party or a competitor of destination. Visuphone 104 may be configured to connect to intended destination, when caller selects advertisement 606. Further, Visuphone 104 displays visual IVR menu 606 of the intended destination. In an embodiment, Visuphone 104 stores the interactions of caller with visual IVR menus after a call to an IVR was made. Therefore, when caller calls the same destination again, then the options that were selected in the last interaction are presented prominently. Further, the options that are frequently selected can be presented prominently. For example, if caller dials a bank frequently to check his account balance, then the options for selecting his account balance may be highlighted.

As illustrated in FIG. 7, device 102*b* may include a web browser 702 to display web pages from the Internet and/or other computer networks. Various websites provide a phone number on the web pages as a click-to-talk button. The clickable button can provide, for example, a contact number of executives of the organization. The clickable button may be programmed to display a phone number of the organization and/or display a caller a form to provide his contact details, so that an executive from the organization can call back the caller. Visuphone 104 is configured to detect a connect button 706 on a webpage 704. Connect button 706 may be used by Visuphone 104 to initiate a connection to a destination 108.

Thereafter, Visuphone 104 can detect and launch a VOIP application on device 102*b*. In an embodiment, in case more than one application is available on device 102, Visuphone 104 selects a VOIP application preferred by caller. Moreover, Visuphone 104 may be configured to automatically login into the VOIP application. In an embodiment, caller 106 stores the login details for the VOIP application in Visuphone 104. Further, Visuphone 104 displays a visual IVR menu corresponding to audible IVR menu of the destination connected once click on connect 706 tab. Therefore, caller 106 can connect to the destination from web browser 702 automatically and may not be required to dial the phone number or provide call-back information.

In an embodiment of the invention, Visuphone 104 may include a VOIP plug-in that monitors the outgoing calls made from the VOIP application. Therefore, the VOIP plug-in may search each dialed number in visual menu database 308. In case, the dialed number is found in visual menu database 308 and is associated with an IVR, then the VOIP plug-in may display the visual IVR menu corresponding to the audible IVR menu of the dialed number.

Another embodiment of the invention allows the caller to select the visual IVR menu using car display like GPS display. Hands-free cell phone system is used in many cars as a separated device or as an integrated system in the car. These devices allow the caller to talk with the cell phone without holding the cell phone in his hands. Some devices are using the car speakers for the phone call. In many cases, the hands-free system can use a display screen in the car like GPS screen or other display. Following voice menu while driving might not be the optimal way to use hands-free cell phone system. In some cases, selecting an option from a visual IVR menu is preferred. While driving or stopping in red light, it might be easier to use larger display like the GPS display in the car. The display can present the visual IVR menu and the caller can select the option from the menu. The computing engine to support the visual IVR menu could be embedded in the car GPS system or in another controller that have access to the car display. Once the system recognizes a destination of a call to be an IVR it will access the database pull out the menu and display. Accordingly all the other Visuphone features could be incorporated. In an embodiment of the invention, the caller may select a visual IVR menu or an option of the visual IVR menu by giving a voice command or voice input. For example, the caller may see the visual IVR menu options at the GPS display and may select an option accordingly. Thereafter, the caller may interact with the visual IVR menus by giving one or more voice commands or inputs.

FIG. 8 illustrates exemplary software architecture 800 of Visuphone 104, in accordance with an embodiment of the invention. A hardware layer 802 includes various hardware of device. For example, but not limited to, a mouse, a keyboard, a speaker, a microphone, a camera, a USB device, a display, and so forth. The drivers or files required for proper functioning or installation of the hardware of device are provided by a driver's layer 804. Moreover, drivers layer 802 interfaces with an Operating System 806.

Operating System 806 provides memory and environment required by Visuphone 104 and other applications 808 for functioning on device. Examples of Operating System 806 include, but are not limited to, Windows, Macintosh, Linux, Symbian, Android, and so forth. Visuphone 104 may be implemented as a plug-in to other applications 808, such as Skype, Google Talk, web browser, mail client, and so forth. In an embodiment, Visuphone 104 may be implemented as a standalone application on device. Further, Visuphone 104 may be configured to execute as a background application. Therefore, caller 106 may not be required to specifically launch Visuphone 104. Furthermore, Visuphone 104 may be implemented as a multi-threaded application. Therefore, visual IVR menus of more than one destination may be displayed simultaneously on device.

FIG. 9 illustrates exemplary components of Visuphone 104, in accordance with an embodiment of the invention. As discussed above, Visuphone 104 may be implemented as hardware, software, or firmware on device 102. Further, Visuphone 104 may be configured to execute as a background process on device. In an embodiment, Visuphone 104 may be configured to execute as a system service. Therefore, other processes or applications executing on the device may not block the operation of Visuphone 104.

When caller 106 dials, selects or receives a phone number on the device, a detection module 902 of Visuphone 104 detects that a phone number has been dialed, selected or received. For example, detection module 902 may detect key presses or caller ID on device. Caller 106 may use a VOIP application on device for dialing the phone number. Moreover, caller 106 may use a mouse to a joystick to select or press icons of numbers displayed on the VOIP application. Further, detection module 902 is configured to identify the VOIP applications available on device and used by caller. Moreover, detection module 902 may detect the position co-ordinates of the VOIP application on a display of device. For example, in case device includes the Microsoft Windows OS, then the position co-ordinates of the VOIP application can be detected from the registry of the OS. Detection module 902 may be configured to store the position of number icons relative to position co-ordinates of various VOIP applications. Therefore, based on the co-ordinates of the position of the VOIP application, detection module 902 can detect the exact position of each number icon on the display of device. For example, if the co-ordinates of a top-left edge of the VOIP application is (X,Y) on the display, and the co-ordinates of an icon for number '1' on VOIP application is (X1,Y1) relative to its top-left edge, then the exact co-ordinates of the icon for number '1' may be calculated as (X+X1, Y+Y1) on the display. A person skilled in the art will appreciate that other types of mathematical operations can be applied to calculate the co-ordinates of the icons on the display of the device.

Detection module 902 may be configured to detect the co-ordinates of the cursor on the display of device. Further, detection module may be configured to detect the action events generated by the mouse or joystick, such as a click, a double click, a drag, a select, a scroll, and so forth. Therefore, when caller selects or press a number on the VOIP application, detection module 902 may detect the number from the position of the cursor, the VOIP application and the number icon. In an embodiment, detection module 902 may be configured to store the last used co-ordinates of the VOIP application and number icons. Therefore, detection and/or calculation of the co-ordinates may not be required. Furthermore, detection module 902 may be configured to detect a connect button displayed on a web page of a browser on device as explained with reference to FIG. 7. Therefore, when caller clicks the connect button, detection module 902 identifies the phone number behind the connect button. In an embodiment, detection module 902 detects the connect button and the associated phone number by scanning the source code of the web page.

The phone number detected by detection module 902 is used by a search module 904 of Visuphone 104. In an embodiment, detection module 902 may be configured to transfer each digit to search module 904 in real-time as clicked by caller. Search module 904 searches visual IVR menu database for visual IVR menu corresponding to the phone number. An exemplary visual IVR menu is as explained above in conjunction with FIGS. 2B and 2C. As discussed above, visual IVR menu database stores visual IVR menus corresponding to the audible IVR menus of destinations 108a-n. Moreover, visual IVR menu database may store other information, which is explained in conjunction with FIG. 10. Search module 904 may also be configured to search for other information in visual IVR menu database. In an embodiment, search module searches visual IVR menu database in real-time based on the digits received from detection module 902. Therefore, a visual IVR menu may be identified based on the best match of the number formed by the received digits in visual IVR menu database. As a result, caller may not be required to dial, click, press or select the complete number, which may be convenient and time saving.

The visual IVR menu identified by a search module 904 is displayed on the display of device by display module 906 of Visuphone 104. Display module 906 identifies the position on the display where the visual IVR menu is to be displayed. In an embodiment, the visual IVR menu is displayed such that there is minimum overlap with the VOIP application from which the phone number was dialed or selected. Moreover, display module 906 identifies the size of the visual IVR menu for display based on the characteristics of the display screen of device. Examples of characteristics of the display screen include, but are not limited to, a screen size, resolution, and so forth. Furthermore, in case the visual IVR menu is not completely displayed on the display, then display module 906 may allow caller to navigate the visual IVR menu by scrolling. Moreover, display module 906 may be configured to display other information received from search module 904.

Caller 106 may interact with the visual IVR menu or other information displayed on device 102. For example, caller 102 may scroll through the visual IVR menu, or select a node from the visual IVR menu. Therefore, when caller 106 selects a node from the visual IVR menu, detection module 902 detects the selected node and communicates the selection to a connection module 908. Thereafter, connection module 908 may establish a connection between device 102 and a destination 108 based on the nodes selected by caller. Connection module 908 may be configured to detect communication systems available in device. For example, in a case, device 102 is a phone not connected to the Internet, connection module 908 may detect that only a radio connection can be made. Otherwise, a most suitable or a connection preferred by caller 106 can be made. In an embodiment, connection module 908 may allow caller 106 to select a VOIP application to establish the connection. In another embodiment, communication module 908 may launch a default VOIP application on device 102. In yet another embodiment of the invention, connection module 908 can use a VOIP protocol stack defined by Visuphone 104 to establish the connection.

In an embodiment, a call of caller 106 may be transferred from one point in the organization to another point within the same organization or to a completely different organization (or another branch of same organization). For example, a call of caller 106 with destination 108a may be transferred to destination 108b. However, destinations 108a and 108b may have different audible IVR menus. Connection module 908 is configured to identify the transfer of call and to switch the visual IVR menu of destination 108a with destination 108b. The switching of visual IVR menus is explained in detail in conjunction with FIG. 11.

Some organizations such as banks may require caller 106 to present a voice input for the purpose of authentication. For example, caller 106 may be required to voice out his name or an answer to a security question specified by caller 106 to the bank. Furthermore, voice input may be required to accept or decline a transaction. Caller 106 may record and store the voice responses for such authentications or questions alternatively the system can use synthesis voice. Therefore, when connection module 908 detects that a voice authentication is required, and then voice module 910 is used. Voice module 910 provides voice inputs on behalf of caller 106 by using the responses recorded by caller 106 (or user). Subsequently, the connection or the transaction can be processed.

As discussed in conjunction with FIGS. 4 and 6, Visuphone 104 may be configured to display advertisements on device 102. The advertisements are managed by advertisement module 912 of Visuphone 104. The advertisement may be selected based on the type of destinations. For example, when a dialed destination is a bank, then an advertisement related to banking may be displayed. Moreover, the advertisement can be related a third-party dealing in the same business or professional area or a competitor of the dialed destination. The displayed advertisement may be a text, audio, image or video. In one embodiment, advertisement module 912 may display the advertisements based on the connection bandwidth available at device 102. In another embodiment, advertisement module 912 may display the advertisements based on the pre-set preferences by caller 106. In one embodiment, advertisement module 912 may be configured to receive the advertisements directly from the dialed destination. In another embodiment, advertisement module 912 may be configured to receive the advertisements from a remote server on a network. The remote server is explained in detail in conjunction with FIG. 10. A selection or click by caller 106 on advertisements may be detected by detection module 902 to display a visual IVR menu of the destination for which the advertisement was displayed.

In some cases, the audible IVR menu of destination may change. For example, the extension numbers of agents in banks may be changed due to addition of new agents. A person skilled in the art will appreciate that there can be other reasons for the audible IVR menu of a destination to be edited, amended or updated. Further, new organizations may be available that use audible IVR menus. The visual IVR menus for these new organizations may not be available in visual IVR menu database stored on device. Therefore, visual IVR menu database may be required to be updated. In an embodiment, Visuphone may be updated to provide additional functionalities to caller. An update module 914 may be configured to update the visual IVR menus stored in visual IVR menu database of device. In an embodiment of the invention, the visual IVR menus in visual IVR menu database may be updated based on speech recognition of voice commands. In an embodiment of the invention, Visuphone 104 may also score the quality of the speech recognition for one or more records of the database.

Moreover, update module 914 may be configured to update Visuphone 104. Update module 914 may receive the updated visual IVR menus from the remote server on the network. The remote server is explained in detail in conjunction with FIG. 10.

Visuphone 104 may record the caller's selections or keystrokes for audible IVR menus by using customization module 916. The keystrokes may be some personal data of the caller such as his account number, customer number, and so forth. Visuphone 104 can provide better support to caller by presenting the recorded keystrokes so that the caller can approve and sending them without entering them every time. Customization module 916 personalizes the generic visual IVR menu by associating the keystrokes with it and storing in visual menu database 308. Alternatively, an additional set of standard may be defined for representing caller data. In this case, only the code indicating the type of required data is added to visual menu database 308. Visuphone 104 can than build a relatively small table in visual menu database 308, with the various personal data codes and the actual caller data as analyzed from the caller's keystrokes during his connection with destinations of the audible IVR menus.

In an embodiment of the invention, Visuphone 104 may allow caller 106 to navigate an IVR system of a destination before actually dialing phone number of the destination. In an embodiment of the invention, Visuphone 104 may be launched through a website or it may be launched by selecting a sub part of a web site or web page. Functionality of Visuphone 104 may be accessed through the web site. Caller 106 may navigate a website IVR system and may select the right person or option in the IVR system before connecting to the IVR system by using Visuphone 104 application. Visuphone 104 further allows caller 106 to search for an appropriate service, product, department or option in the IVR system of a company or website or destination before dialing to the destination. Thereafter, selecting the desired department or option, caller 106 may dial phone number of the destination.

Further, features of Visuphone 104 may be provided by a service provider, such as but not limited to, a cellular service provider, a cable TV service provider, optical network provider, an Internet Service Provider (ISP), a Wi-Fi service provider, and so forth. In an embodiment of the invention, Visuphone 104 is not installed at device 102. In such a scenario, caller 106 may use functionalities of Visuphone 104 through various service providers. For example, if Visuphone 104 is not installed at a smart phone and user of the smart phone wants to use Visuphone 104, he/she may do so by subscribing to Visuphone 104 services from a service provider such as an ISP. In an embodiment of the invention, Visuphone 104 application may be provided by various service providers on subscription basis. In an embodiment of the invention, Visuphone 104 may be used by various users through cloud implementation.

In an embodiment of the invention, the cellular service provider may provide the service(s) of Visuphone 104 to users. Further, the cellular service provider may user a data channel to present the visual IVR menus at device 102. All the functionalities of Visuphone 104 will be implemented in cloud or network of cellular service provider. The user may not require installing Visuphone 104 at his/her device.

FIG. 10 illustrates an exemplary remote server 1002 connected to a remote repository 1004. As shown remote server 1002 is connected to device 102 through a computer network 1006. Examples of computer network 1006 may include, but are not limited to, a Local Area Network (LAN), a Wide Area Network (WAN), a Wi-Fi network, a WiMAX, a $3^{rd}$ Generation network, a $4^{th}$ generation network, a Long Term Evolution (LTE) network, a Universal Mobile Telecommunication Systems (UMTS) network, a IEEE 802.16m, a LTE Advanced network, a Mobile WiMAX, a IEEE 802.20, a Flash-OFDM, a HIPERMAN, an iBurst, a HSDPA, a Global System for Mobile communications (GSM), a Code Division Multiple Access (CDMA), an Evolution Data Optimized (EV-DO), a General Packet Radio Service (GPRS), an Enhanced Data rates for GSM Evolution (EDGE), a High Speed Packet Access (HSPA), a High-Speed Downlink Packet Access (HSDPA), a Mobile Broadband Wireless Access (MBWA), and so forth. Further, remote server 1002 can be connected to destinations 108a-n through computer network 1006, a gateway 1008, and a PSTN 1010. A person skilled in the art will appreciate that device 102 can connect to destinations 108a-n directly through PSTN 1010; therefore the connection is not limited to network 1006. Each of destinations 108a-n may be connected to audible IVR menu repository 1012a-n, here after referred to as destination repository 1012a-n.

Further, device 102 includes visual menu database 308. As discussed above, visual menu database 308 includes visual IVR menus corresponding to audible IVR menus of destinations 108a-n. Moreover, visual menu database 308 may store other information such as profile of caller, voice response of caller, login details for a VOIP application, preferences of caller, ratings for visual IVR menus, identity of visual IVR menus, and so forth. As discussed in conjunction with FIG. 9, Visuphone 104, the visual IVR menus or other information stored in visual menu database 308 may require to be updated. In an embodiment, visual menu database 308 is updated by information received from remote repository 1004. In another embodiment of the invention, visual menu database 308 may be updated by receiving menus through Short Messaging Service (SMS), or Multimedia Messaging Service (MMS). The SMS may be sent from destination 108a-n or remote repository 1004 to device 102. Remote repository 1004 includes visual IVR menus corresponding to audible IVR menus of destinations 108a-n. Further, remote repository 1004 stores advertisements related to destinations 108a-n, last updated time of the visual IVR menus, rating of visual IVR menus, and so forth.

In case, the audible IVR menu of a destination is changed, caller may not be able to connect to the destination by using Visuphone 104. Visuphone 104 is configured to detect the error generated while establishing the connection. For example, caller may select a node in the visual IVR menu that may not have a corresponding option available in audible IVR menu, or a connection not be established between device 102 and the destination. The error is detected by update module 914 of Visuphone 104. Subsequently, update module 914 sends an error report to remote server 1002. Remote server 1002 may check remote repository 1004 for updates related to the visual IVR menu. Thereafter, in case any updates are available, remote server 1002 may send the updates to device 102 for performing the update. In an embodiment, visual menu database 308 may be checked and updated based on a pre-defined time interval by device 102. In an embodiment, the error report may include the error generated and an Identity (ID) or version of the visual IVR menu on which the error was generated. In case, the updates are not available in remote repository 1004, then an update of remote repository 1004 may be required.

In an embodiment of the invention, remote repository 1004 is updated based on a pre-defined time interval. In another embodiment of the invention, the caller can rate the relevance or correctness of the visual IVR menu from device 102. Therefore, remote repository 1004 can be updated based on a cumulative ratings received from callers and other callers of the visual IVR menu. Further, Visuphone 104 may also validate the accuracy of remote repository 1004 by crowd sourcing based on reviews and ratings of the users about the visual IVR menus. For example, if five users have given some good rating about a visual IVR menu stored in remote repository 1004, and two users have given bad rating or reviews about the visual IVR menu then, Visuphone 104 may update remote repository 1004 accordingly. In an embodiment of the invention, Visuphone 104 may create a new entry in remote repository 1004 corresponding to changes in visual IVR menu. In an embodiment of the invention, Visuphone 104 may update visual IVR menus at visual menu database 308 at device 102 based on crowd sourcing and based on cumulative ratings from different users about IVR menus.

Remote server 1002 can comprise a process of continuously scanning the IVRs 108a to 108n updating remote repository 1004 with changes of various IVR menus and adding addition menu records for new IVRs. Also, remote server 1002 might get a 'problem report' from device 102 if caller identify problem between the menus as it is in database 308 and the audible menu of a specific IVR. In such case a recheck process will be initiated to update remote repository 1004 and the new information can be than offered to device 102 for download an update. In an embodiment of the invention, remote repository 1004 may be updated by SMS and MMS messages.

In an embodiment, device 102 may send one or more messages or data packets for connection establishment with one of the destinations. Further, Visuphone 104 may detect a data network such as internet for sending data packets. The data network is a network capable of establishing data and voice communication among various communication devices (or devices). In an embodiment, when a data network is not available the one or more messages for establishing connection may be sent using Dual-Tone Multi-Frequency (DTMF) tones or messages. The process of establishing connection between device and a second communication device (or destination) is described in detail in FIGS. 31A, 31B, 31C, 31D, 32, 33 and 34.

In an embodiment of the invention, visual menu database 308 may include other information and parameters related to the visual IVR menus. The parameters related to the visual IVR menus enable accessing, modifying or updating of the visual IVR menus. Examples of parameters of visual IVR menus include, but are not limited to, ID or version of the visual IVR menus, destination phone numbers, and a last update timestamp. Furthermore, visual menu database 308 may include other information such as a profile, the calling history, or preferences of the caller. The calling history of a caller may include the numbers dialed or received, most frequent numbers dialed or received, most frequent nodes selected from visual IVR menus. The profile of a caller may include, but is not limited to, the name, age, sex, address, phone number, profession, office address, recorded voice responses for visual IVR menus, or other personal and professional details of the caller. Further, Visuphone 104 may activate voice responses at device 102.

FIG. 11 illustrates an exemplary process for presentation of the visual IVR menu when the call of caller 106 is forwarded or transferred from destination 108a to destination 108b, in accordance with an embodiment of the invention. Destination 108a may have completely different audible IVR menus as compared to destination 108b. For example, destination 108a may be a loan department and destination 108b may be an insurance department of a bank. Similarly, the call may be forwarded from one organization to another. For example, from one branch of a back to another branch of same bank. Therefore, caller 106 may be required to respond to a different audible IVR menu. Visuphone 104 may be configured to detect that the call has been forwarded and subsequently display the visual IVR menu of destination 108b.

As shown in FIG. 11, device 102 establishes a connection with destination 108a as depicted by arrow 1102. The connection is established by using the visual IVR menu provided by Visuphone 104 based on destination 108a. In an embodiment, the connection is established directly without using Visuphone 104. Thereafter, destination 108a may forward the call to destination 108b, as indicated by arrow 1104. The visual IVR menu corresponding to the audible IVR menu of destination 108b may not be visible on device 102, as the call was forwarded between destination 108a and destination 108b. In an embodiment, Visuphone 104 may not detect the forwarding of the call. In this case, device 102 may be presented with audible IVR menu of destination 108b. Thereafter, Visuphone 104 may record the options and responses on device 104 for the audible IVR menu of destination 108b. The recorded options and responses may be stored at remote repository 1004 for updating it. Further, the recorded options and responses may be stored visual IVR menu database of device 102.

In an embodiment, destination 108b sends an identity (ID) or version of the audible IVR menu to a caller as shown by arrow 1106. The audible IVR menu ID is specific to the audible IVR menu of destination 108b. Subsequently, display module 906 of Visuphone 104 uses the audible IVR menu ID to display the corresponding visual IVR menu. Further, a caller may select a node from the visual IVR menu corresponding to destination 108b. Therefore, when a caller selects a node, a connection may be established with destination 108b. In an embodiment of the invention, connection between device 102 and destination 108a is disconnected after establishing a connection between device 102 and destination 108b. In another embodiment of the invention, connection between device 102 and destination 108a is maintained for complete communication session till the caller disconnects the call.

Another embodiment of the invention allow visual IVR menu for calls made from a conventional home telephone. FIG. 12 illustrate a phone 1204 connected to a Public Switched Telephone Network (PSTN) 1208 and through a gateway 1218 to the Internet network 1220. Network 1220 may be any service provider that provides services, for example, but not limited to, telephone services, cell phone services, wireless services, Internet services, cable television services, or various combinations of the above or other type of services. Examples of computer network 1220 may include, but are not limited to, a Local Area Network (LAN), a Wide Area Network (WAN), a Wi-Fi network, a WiMAX, a $3^{rd}$ Generation network, a $4^{th}$ generation network, a Long Term Evolution (LTE) network, a Universal Mobile Telecommunication Systems (UMTS) network, a IEEE 802.16m, a LTE Advanced network, a Mobile WiMAX, a IEEE 802.20, a Flash-OFDM, a HIPERMAN, an iBurst, a HSDPA, a Global System for Mobile communications (GSM), a Code Division Multiple Access (CDMA), an Evolution Data Optimized (EV-DO), a General Packet Radio Service (GPRS), an Enhanced Data rates for GSM Evolution (EDGE), a High Speed Packet Access (HSPA), a High-Speed Downlink Packet Access (HSDPA), a Mobile Broadband Wireless Access (MBWA), and so forth.

Further, the connection to network 1220 is associated with a wide band Internet 'smart' modem 1206. Phone 1204 may be a regular phone, such as a landline phone or a cordless landline phone. Modem 1206 may be a Digital Subscriber Line (DSL) modem or a cable modem that connects the home device to the Internet and/or computer network. Modem 1206 is connected to a service provider, and can provide the home devices with telephone, Internet and television services. Modem 1206 may provide both wired and wireless connections. As shown with reference to FIG. 12, modem 1206 provides the home with the Internet through wire 1210 to a computer 1202, or through a Wi-Fi connection. Modem 1206 comprises the ability to detect and recognize the dialing made by phone 1204. The numbers dialed by phone 1204 to establish connection are then compared with a database, such as visual menu database 308. Therefore, in case the dialed number corresponds to a destination with an audible IVR menu, and a corresponding visual IVR menu exists then, modem 1206 may provide the visual IVR menu on computer 1202 connected to it. Moreover, modem 1206 may use private web sites to present the visual IVR menu or just provide the dialed number to computer 1202. Thereafter, a software tool on computer 1202 may present the visual IVR menu on the screen of computer 1202.

Once the connection with the destination has been established, 'smart' modem 1206 will continue to monitor the numbers dialed or received by phone 1204 to browse or advance the visual IVR menu accordingly. Furthermore, the numbers dialed or received may be stored for future processing such as highlighting previous selections in the visual IVR menu, providing customized visual IVR menu, and so forth. The Visual IVR menu system comprising computer 1202 and Modem 1206 may incorporate additional enhancements as presented before such as automatic dialing of customer information. The automatic dialing may be achieved by using computer 1202 to initiate and execute such automatic dialing.

In another embodiment of the invention, a house television 1212 may be used to present the visual IVR menu. In various houses modem 1206 decodes television signals and transfer it to a set-top box 1216 that provide signals to television 1212. The visual IVR menu may be presented on a channel dedicated for IVR. Therefore, when phone 1204 is used to initiate a call, modem 1206 can detect it and present the visual IVR menu corresponding to the dialed number on the designated channel of the television 1212. Further, all the options described before can be provided now using the screen of television 1212 for the visual IVR menu. The caller selection can be done by using the simple home phone or alternatively using the TV 1212 set top box 1216 remote control. Further, television 1212 screen may be used to present the visual IVR menu in a few alternatives ways. For example, a device provided by a company, named RokuInc., allows streaming of content from the Internet to television. Most set-top boxes now have an Internet connection or telephone connections. Furthermore, various devices such as some Digital Versatile Disc (DVD) players, and video game players or controllers such as Xbox or Play station, can be connected to the Internet. Each of those devices may allow 'smart' modem 1206 to provide a visual IVR menu on the screens of television 1212.

In another embodiment of the invention a telephone connection may be established through an external telephone service by using a computer, as discussed with reference to FIG. 13. External telephone service provider 1310, such as 'Google Voice', which a caller may use through the Internet network from computer 1302. In such case, the caller can cause a telephone call to be established by indicating on service provider 1310-'Google Voice' web site a request to establish call to a designated location. Thereafter, the external service provider 1310 establishes connection 1306 by using PSTN 1308 to connect the caller telephone 1304 to a desired destination 1312. External service provider 1310 can now present the visual IVR menu as discussed above. External service provider 1310 may present the visual IVR menu on its web site and processed or advanced based on the dial choices made by the caller on his computer 1302. Furthermore, external service provider 1310 can also add various options as described before, such as but not limited to highlighting previous choices, automatic dialing of caller information and presenting related advertisements.

Another enhancement for such external service provider 1310 is to provide a 'smart' connect. In case of the 'smart' connect, the caller can designate not just destination 1312, but a specific node of visual IVR menu, such as node 212b as discussed with reference to FIG. 2B. The 'smart' connect will dial the proper selection in the visual IVR menu and connect to node 212b of the audible IVR. The 'smart' connect can even wait until the selected node 'Talk to Executive' yields the desired result of the executive answering the line and then connect the caller. Therefore, the efficiency of the IVR system does not come at the cost of inefficiency of the caller; rather both sides can became more efficient by using the 'smart' connect.

Additional alternatives to the invention are illustrated with reference to FIGS. 14A, 14B, and 14C. FIG. 14A illustrates a Visu-Add-on 1404 which can be connected to a standard home phone 1402 to provide all the features and functionalities as described above with respect to Visuphone 104. Accordingly, phone 1402 may be connected through connection 1406 to add-on 1404 that can be connected to a standard telephone connection line 1410. Add-on 1404 may comprise a processing unit, a display and a database. The database may be similar to visual menu database 308 as discussed in FIG. 3. Therefore, when phone 1402 is used to call a destination with an audible IVR menu, a corresponding visual IVR menu is presented on the display of add-on 1404. Furthermore, the display of add-on 1404 may comprise a touch sensitive screen for added convenience of a caller. Add-on 1404 may be loaded and updated by the use of removable memory devices, such as USB flash memory 1408. Alternatively, Add-on 1404 may comprise a modem to connect either by the use of the telephone connection line 1410 or by wireless means such as Wi-Fi or Bluetooth.

FIG. 14B illustrates an embodiment, where an add-on unit 1414 is plugged into a conventional digital picture frame 1420 by using a USB port. Digital picture frames recently became quite popular as a convenient way to display family photos in digital format. In this embodiment, picture frame 1420 can display family photo until a call is made by using a phone 1412 to a destination with an audible IVR menu. Phone 1412 may be connected to picture frame 1420 through a connection 1418 and add-on 1414 may be further connected to standard telephone line connection 1422. Add-on 1414 may comprise a processor and a database. The database may be similar to visual menu database 308 as discussed in FIG. 3. Therefore, when a connection is made to a destination having an audible IVR menu, then add-on 1414 will present the visual IVR menu on picture frame 1420. Picture frame 1420 may resume presenting the photos after the completion of the call. Furthermore, the database of add-on 1414 could be updated with one of the options described before in respect to the add-on 1404 of FIG. 14A. It should be noted that various home television provides functionality similar to picture frame 1420. Therefore, television can be used as an alternative to picture frame 1420.

FIG. 14C present another embodiment that can be applied as presented with respect to FIGS. 14A and 14B. It quite common these days to use a telephone handset 1424 that are connected by wireless means to a base station 1430 that is connected by a wire 1432 to the standard telephone lines. Add-on 1426 can comprise an internal radio circuit to detect the wireless communication. Therefore, add-on 1426 can detect the communication between handset 1424 and base station 1430 to present the visual IVR menu. As can be seen with reference to FIG. 14C, connection through wires such as wires 1406 or 1418 may not be required. Add-on 1426 may be provided by the manufacturer of the handset 1424 and the base station 1430, or by a third party. A person skilled in the art will appreciate that the functionalities of the add-on units as described in conjunction with FIGS. 14A, 14B and 14C can be combined into a single unit. Therefore, a single add-on unit may be used in various environments as discussed above.

Figures 14D, 14E:
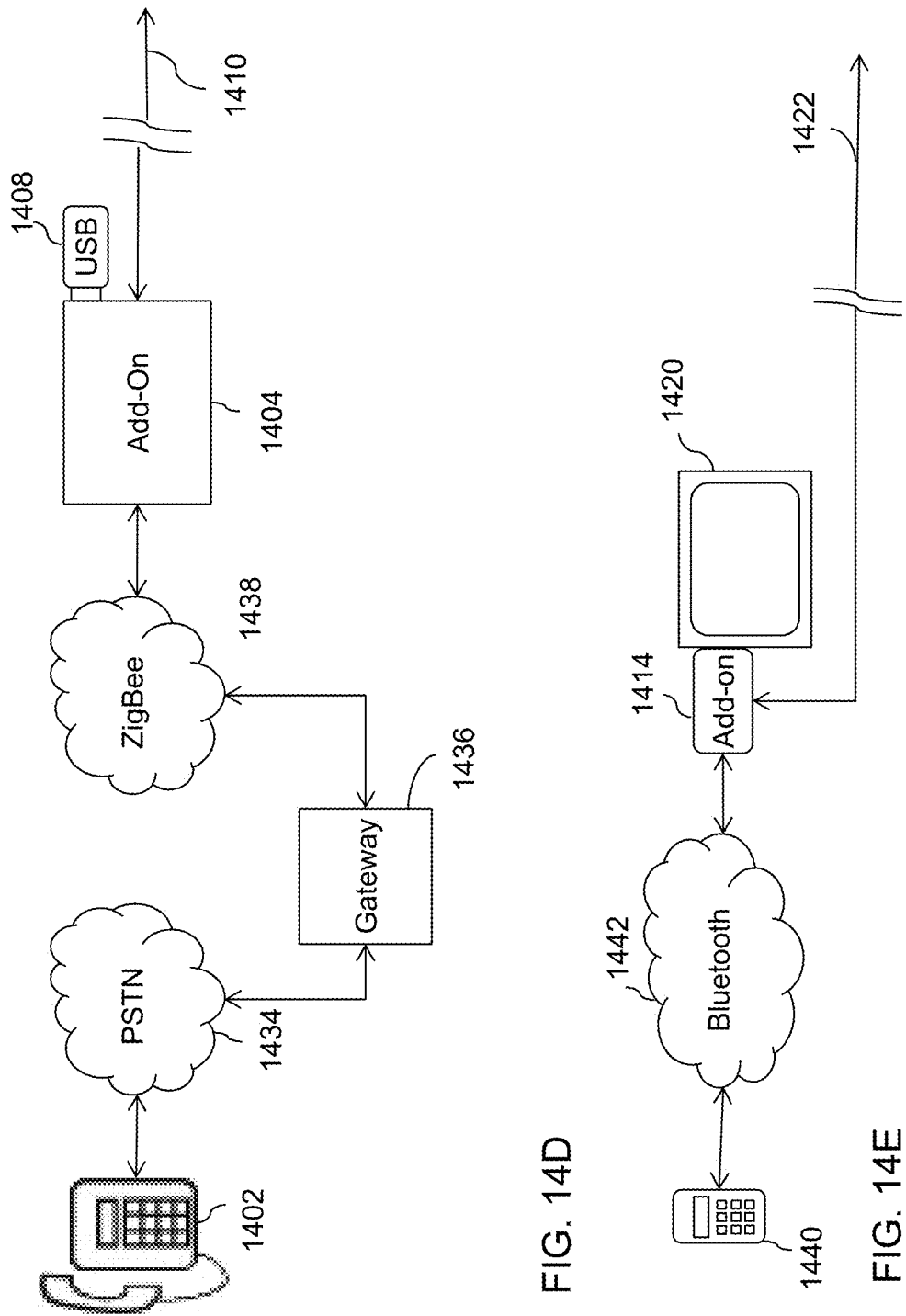

FIG. 14D illustrates Visu-Add-On 1404 which can be connected to a standard home phone 1402 to provide all the features and functionalities as described above with respect to Visuphone 104. Home phone 1402 may be connected to Add-On 1404 through a Public Switched Telephone Network (PSTN) 1434, a gateway 1436 and a wireless network such as ZigBee network 1438. Add-On 1404 may be connected to standard telephone connection line 1410. ZigBee network 1438 is a wireless network implemented by using a high level communication protocol called ZigBee. ZigBee protocol uses small, low power digital radios based on IEEE 802 standard for personal area networks (PAN). Add-on 1404 may comprise a processing unit, a display and a database. The database may store visual IVR menus and phone numbers of various destinations 108a-n. Therefore, when phone 1402 is used to call a destination of destinations 108a-n with an audible IVR menu, a corresponding visual IVR menu may be presented on the display of Add-On 1404. Add-on 1404 may be loaded and updated by the use of removable memory devices, such as USB flash memory 1408.

FIG. 14E illustrates an embodiment, where an Add-On unit 1414 is plugged into digital picture frame 1420 by using a USB port. A device such as a smart phone 1440 may be connected to Add-On 1414 that is further connected to picture frame 1420. Digital picture frames may display images and pictures in digital format. Bluetooth network 1442 is based on wireless protocol Bluetooth and may provide a wireless channel to connect various devices. Usually, Bluetooth protocol has short range for connecting devices but may differ depending on various versions of Bluetooth profiles. In an embodiment of the invention, Bluetooth network 1442 may be suitable for establishing low power consumption connections. In this embodiment, picture frame 1420 can display family photo until a call is made by using smart phone 1440 to a destination with an audible IVR menu. Smart phone 1440 may be connected to picture frame 1420 through a wireless network such as Bluetooth 1442 and Add-On 1414 may be further connected to standard telephone line connection 1422. Add-On 1414 may comprise a processor and a database. When a connection is made to a destination having an audible IVR menu, then Add-On 1414 will display the visual IVR menu of the destination at picture frame 1420. In an embodiment of the invention, picture frame 1420 may resume presenting the photos after the completion of the call. It should be noted that various home television provides functionality similar to picture frame 1420. Therefore, television can be used as an alternative to picture frame 1420. Similarly, a GPS display may also be used in place of picture frame 1420. In various embodiments of the invention, different devices such as, but not limited to, an LCD display, a projector screen, an LED display, laptop, a computer, a tablet computer, and so forth.

Figures 14F, 14G:
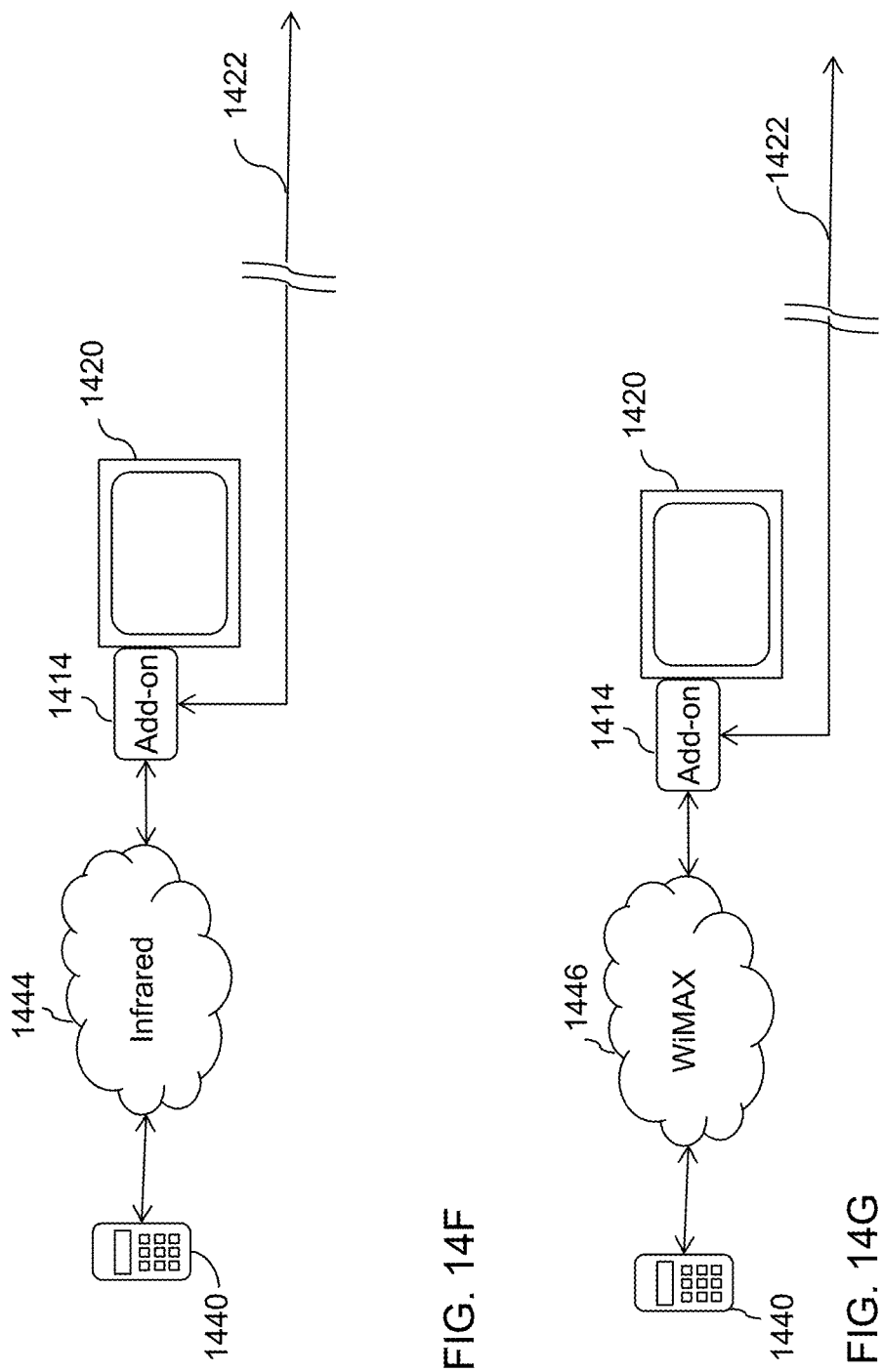

In an embodiment of the invention, smart phone 1440 may be connected to picture frame 1414 through an Infrared network 1444 as shown in FIG. 14F Infrared network 1444 may be implemented using infrared technology Infrared network 1444 may allow different devices to communicate via infrared data transmissions. In another embodiment of the invention, smart phone 1440 may be connected to Add-On c1414 connected to picture frame 1420 through a WiMAX network 1446 as shown in FIG. 14G. WiMAX network 1446 is based on a telecommunication protocol called Worldwide Interoperability for Microwave Access (WiMAX). WiMAX provides fixed and mobile Internet access to various users (or caller). Though FIGS. 14E-14G are explained for smart phone 1440, but a person skilled in the art will appreciate that there may be any communication device which can be connected to Add-On 1414. Examples of the communication device include, but are not limited to, a computer, a laptop, a PDA, a tablet computer, a set top box, a telephone, an I-Pod, a music player, and so forth. In an embodiment of the invention, various other wireless protocols or technology or network, such as, but are not limited to, IEEE 802.11, microwave communication, Radio Frequency 4 for Consumer Electronics (RF4CE), Wi-Fi, and so forth may be used to connect Add-On 1414 to devices.

FIGS. 15A, 15B, and 15C illustrate a flow diagram for presenting, selecting and updating the visual IVR menus, in accordance with an embodiment of the invention. It may be appreciated by a person skilled in the art that the presenting, selecting and updating visual IVR menus are not restricted to the embodiment as depicted in FIG. 15A, FIG. 15B, and FIG. 15C. Hereinafter, FIG. 15A, FIG. 15B, and FIG. 15C may collectively be referred to as "FIG. 15". The order of steps as shown in FIG. 15 does not limit the scope of the invention. Further, various other steps may be added, in accordance with various other embodiments of the present invention, for presenting, selecting and updating the visual IVR menus to a user.

Caller 106 may dial, select or receive a number to connect to a destination from a device, such as device 102*a*, 102*b*, 102*c* (explained earlier in conjunction with FIGS. 1A, 1B and 1C). Hereinafter, device 102*a*, device 102*b* and device 102*c* may collectively be referred to as "device 102". The destination may include an audible IVR menu for interaction with a caller. Further, device may include Visuphone, such as Visuphone 104, to present a visual IVR menu corresponding to the phone number of the destination. Therefore, a caller can directly interact with an IVR of destination through the visual IVR menu without listening to the audible IVR menu.

At step 1502, Visuphone, such as of device 102, detects a phone number dialed or selected by caller for destination. In an embodiment of the invention, the number is clicked according to the display of device 102. The number is detected by detection module 902 of Visuphone 104. Further, at step 1504, a search module, such as search module 904, may search visual menu database 308 of device 102 for the phone number. Search module 904 searches for visual IVR menu and other information corresponding to the phone number. Other information may include, for example, the caller profile, call history of the caller, advertisement associated with the phone number and so forth. In an embodiment of the invention, search module 904 searches visual menu database 308 in real-time.

At step 1506, it is determined by search module 904 whether the visual IVR menu and other information, corresponding to the phone number, are available in visual menu database, such as database 308. In case, the visual IVR menu is available in the visual menu database, then the process continues to step 1508.

Further, in an embodiment, on determining (at step 1506) that the visual IVR menu for the destination is available in the visual menu database 308, an asynchrony request may be sent to remote repository 1004. The request may be sent to check whether a newer version of the menu with different content is available. Subsequently, if such version exists in remote repository 1004, then visual menu database 308 may be updated accordingly. In case, the visual IVR menu is not available, then device 102 may be connected to remote repository 1004 by update module 914, at step 1518 as shown with reference to FIG. 15A Thereafter, it is determined whether the visual IVR menu is available in remote repository 1004, at step 1520. Subsequently, if the visual IVR menu is available, then visual menu database 308 may be updated from the information available at remote repository 1004, at step 1522. Further, if at step 1520, it is determined that the visual IVR menu is not available at remote repository 1004 then the process continues to a step 1524. At step 1524, an audible IVR menu selection is detected on device 102. The audible IVR menu selection may be determined based on Dual Tone Multi Frequency (DTMF) tones or keys pressed by the caller of device 102. Thereafter, in case a selection is detected, then the dialed number may be detected as a possible destination number. The dialed number may be provided to remote repository 1004 at step 1526. Thereafter, the process continues to step 1528, where remote repository 1004 is updated for information. Thereafter, in an embodiment, the process control may proceed back to step 1522 to follow further steps, as mentioned above.

In an embodiment, Visuphone detects the correctness of information based on the error received on connection to the IVR destination or behavior of the caller. In case, visual IVR menu is available, then the process continues to step 1508 (as explained above). Otherwise, in case the visual IVR menu is not available, then in one embodiment, the process may proceed to step 1518 to connect to remote repository. Further, in another embodiment, when the visual IVR menu is not available in remote repository also, the process may continue to step 1524 to follow the further steps (as explained above) to finally update remote repository 1004, at 1528, for information. The information stored in remote repository 1004 may be gathered from various destinations. For example, various destinations may be called to detect audio IVR menus and accordingly generate the information for remote repository 1004. In an embodiment, Visuphone 104 sends an error report to remote repository 1004 to initiate the update. The error report may include the error details of connection, behavior of the caller and other information required to update remote repository 1004. In another embodiment, the caller may provide ratings for the correctness of the visual IVR menu and other information. Subsequently, the ratings are sent to remote repository 1004. In an embodiment of the invention, ratings from multiple devices are received at remote repository 1004. Thereafter, remote repository 1004 may be updated based on the ratings. In an embodiment of the invention, remote repository 1004 may be updated based on a pre-defined time interval. In another embodiment of the invention, remote repository 1004 is updated by an administrator of remote server 1102.

On updating the remote repository, the visual menu database may be updated accordingly. Further, at step 1508, if the visual IVR menu is available in the visual IVR menu database, then the visual IVR menu (corresponding to the audible IVR menu of destination) is displayed on device 102. In an embodiment of the invention, advertisements related to the type of destination are also displayed on device 102. At step 1510, inputs from the caller are detected on the visual IVR menu. In an embodiment, the inputs may include nodes (as explained previously in conjunction with FIGS. 2B, 2C and 2D) of the visual IVR menu selected by the caller. In another embodiment, the inputs include the advertisement selected by the caller. Subsequently, device 102 may be connected to destination based on the inputs provided by the caller, at step 1512.

For example, if the user dials the phone number for a pizzeria, say 'Pizza Hut', the IVR menu may display a menu corresponding to 'Pizza Hut' along with one or more advertisements related to one or more pizzerias'. The advertisement may include a discount offer on purchasing a particular type of pizza from some other destination, say 'Dominos' The user may select the discounted pizza from Dominos to avail the offer shown in the advertisement. In an embodiment, the user may click on the advertisement to select the advertisement. Subsequent to the user's selection, the device 102 may be connected to Dominos. Further, the user may be provided with a hyperlink, to the advertisement, that may enable the user to link to web page corresponding to 'Dominos' outlet. In an embodiment, the user may further receive the detailed visual IVR menu corresponding to Dominos outlet. In another embodiment, the user may directly place an order for dominos pizza having a discount offer, as shown in the advertisement.

At step 1514, it is determined if the visual IVR menu displayed on device 102 is correct. In case, the visual IVR menu is not correct, then the process continues to step 1518 to connect the device to remote repository to check any updated visual IVR menu. Thereafter, the process steps as discussed above may be followed. However, in case the visual IVR menu is correct, then the connection between device 102 and destination is maintained, at step 1516. Moreover, further inputs from the caller may be received, to continue the communication till the caller or destination disconnects the connection.

With reference to FIG. 16 exemplary components of a device 1602 for implementing a database construction system 1606 are illustrated. Device 1602 can be a computing device such as, but not limited to, a server, a personal computer, a laptop, a mobile phone, a smart-phone, and so forth. Device 1602 can connect to network 1614 through a network interface 1612. Further, device 1602 can connect to a PSTN 1618 through gateway 1616 and network 1614 through network interface 1612. Examples of network 1614 include, but are not limited to a LAN, WAN, the Internet and so forth. Although not shown, device 1602 can connect to various external devices such as hard disks, mouse, keyboard, speaker, microphone, displays, Universal Serial Bus (USB) devices and so forth. Further, device 1602 can connect to various destinations 1620*a-n* through PSTN 1618. Destinations 1620*a-n* may provide audio IVR menu services. In an embodiment of the invention, device 1602 can connect to various devices that include Visuphone for providing updates to visual menu database 308.

In an embodiment of the invention, visual menu database 308 may also store a digital signature corresponding to each entry or record (visual IVR menus) in visual menu database 308. Digital signature may be used to check accuracy of the entry. For example, digital signatures for every visual IVR menu for each destination of destinations 108*a-n* may be stored in visual menu database 308. Further, while accessing a visual IVR menu of a dialed destination, a new digital signature may be generated which may be compared with a stored digital signature of the visual IVR menu to check accuracy of the visual IVR menu. In an embodiment of the invention. Digital signatures are generated and compared in real time. A mismatch in digital signatures while comparing the digital signatures indicates that the visual IVR menu has been modified and a new visual IVR menu is available for update. Therefore, based on the comparison results, visual menu database 308 may be updated by Visuphone 104. In an embodiment of the invention, Visuphone 104 may use speech recognition to check if a record needs to be updated. In an embodiment of the invention, quality of the speech recognition for one or more records of the database may be scored. In an embodiment of the invention, updates may be received from the dialed destination. In an embodiment of the invention, Visuphone 104 at device 102 may receive updates from a server or a remote repository.

Device 1602 may include a memory 1604 that stores various programs, data and/or instructions that can be executed by a processor 1610. Examples of memory include, but are not limited to, a Random Access Memory (RAM), a Read Only Memory (ROM), a hard disk, a computer-readable medium and so forth. A person skilled in the art will appreciate that other types of computer-readable media which can store data that is accessible by a computer, such as magnetic cassettes, flash memory cards, digital video disks, and the like, may also be used by device 1602. Memory 1604 may include Database Construction System (DCS) 1606 for gathering audible IVR menu information, which could be called the IVR customization record, from the destinations and store it in a records database 1608. In an embodiment of the invention DCS 1606 may be an application stored as software or firmware on device 1602.

DCS 1606 may include various modules or instructions that may be executed by processor 1610 for generating information in records database 1608, as explained in detail with reference to FIG. 17. The processor 1610 may generate at least one record based on personal information or the user or caller 106 and may store the same the at least one record in the records database 1608 (or the database of the device). As discussed above, DCS 1606 may be implemented as software, or firmware on a device. DCS 1606 may be implemented as a standalone module or as several independent instances performing similar jobs without coupling to the IVR destinations. Further, the non-coupling may be managed by a centralize module that may allocate different IVR destinations to each implementation instance of DCS 1606. In an embodiment of the invention, DCS 1606 and record database 1608 may be implemented on different devices.

Records database 1608, may include multiple records. Further each record may include an IVR identity code, multiple internal destinations and an activation code for each said internal destination. The IVR identity code may be for example, the phone number of the destinations. The activation code may be for example, a telephone key that should be dialed such as a dial tone associated with the phone number. The internal destination is usually an extension to which the call will be forward once the caller makes a choice, according to the provided menu, and apply the activation code that is usually a dial tone transmitted to the IVR from the Visuphone once the caller dials or selects a proper number or option. Each internal destination may further include another internal destination or extension that may be referred to as a sub-internal destination. Moreover, each sub-internal destination may be associated with a sub-record.

Furthermore, the internal destinations may be associated with an icon code. As discussed above, the icons provide a convenient display for the caller of a visual IVR menu. In some audible IVR menus the activation code may be a voice command that could be activated by the caller by voicing his selection, or the Visuphone may transmit a pre-recorded voice command or a synthesized voice command when the caller makes a selection from the option menu of the visual IVR menu provided by the Visuphone. Further, records database 1608 may include a record of the metadata or keywords associated with the various options in the menus. The metadata and/or keywords may be used by the Visuphone to enable the caller to search for a desired menu by providing keywords. In an embodiment of the invention records database 1608 is remote repository 1004.

FIG. 17A illustrates exemplary components of DCS 1606, in accordance with an embodiment of the invention. DCS 1606 may include a Database Construction Agent (DCA) 1720 for generating information in records database 1608, as explained in detail with reference to FIG. 17B and FIG. 17C. Some destinations may provide downloadable records or information for the callers. Download module 1710 of DCS 1606, downloads the information or records provided by the destinations. For example, download module 1710 may download recorded voice phrases, audio data of the audible IVR menu, activation codes, complete audible IVR menu file in a variety of formats and so forth. In an embodiment of the invention, DCS 1606 may connect to various devices that include Visuphone. Therefore, DCS 1606 may receive information from Visuphone, such as personal records, customized records of the callers, and frequently used numbers, keys and so forth. In an embodiment of the invention, download module 1710 may obtain permissions before downloading the information. The permission may be obtained from the caller, the destination or both. For example, download module 1710 may display a notification on screen on the device to the caller or administrator to permit or reject a download. Moreover, download module 1710 may send an authorized communication such as, but not limited to, a private key to the destination to authorize and obtain permission for download. Personalization module 1708 may generate personalized records for the callers by associating the personal information of the caller with the information, such as the telephone numbers stored in records database 1608. The records can then be forwarded to the caller's device by download module 1710.

Personalization module 1708 may be implemented as instructions executable by a processor. For example, the processor can be processor 1610 or a second processor dedicated for personalization module 1708. Moreover, the second processor may be CPU 304, CPU 504 or implemented in another device in communication with DCS 1606.

DCA 1720 may include a Target List Module (TLM) 1722 that assigns the IVR destination or a target list to each instance of DCA 1720 for connecting and gathering information. The target list may include the IVR identity code, which can be as phone number or any type of information on how to connect to the IVR directly or indirectly. Further, the target list may include additional details such as internal destination. In an embodiment of the invention, the additional information of the internal destination may be implemented as one or more activation codes associate with the IVR identity code. DCA 1720 may include an IVR Tracking Module (ITM) 1724 that tracks IVR content from a root location associated with the Target information assigned by TLM 1722. ITM 1724 constructs the full IVR content from a given IVR root.

ITM 1724 may include IVR Logic Module (ILM) 1726. ILM 1726 may detect the type of IVR of the destination. Typically, various types of audible IVR menus are implemented by destinations. The audible IVR menus may be categorized into various types, such as a simple IVR, IVR with audio response, IVR with additional data authentication and so forth. ILM 1726 detects the type of audible IVR menu, and accordingly the information is generated for records database 1608. Various categories of the audible IVR menu are explained in detail in conjunction with FIG. 19. ITM 1724 may call the destinations to determine the category the audible IVR menu. Thereafter, ILM 1726 constructs the database based on the category of the IVR. In an embodiment of the invention, ITM 1724 may call the destinations multiple times to determine the category of the invention. Various audible IVR menus may include a legal notice. For example, the audible IVR menu of a mortgage bank usually include an header stating that this is debt collector and anything stated during the call could be used for future collections. Other statements can be such as those that relate to the option to record the call and so forth. ILM 1726 may detect the legal statements and store them in records database 1608 in association with IVR identity code. The legal notice or the disclaimer may be a text message, a multimedia message, a voice message, and so forth. In an embodiment of the invention, the legal notice may be associated with the IVR menu(s). Further, Visuphone 104 is configured to detect a legal notice associated with the IVR menu. In an embodiment of the invention, Visuphone 104 may convert the legal notice to text by using the speech recognition. In an embodiment of the invention, Visuphone 104 may change the format of the legal notice. For example, Visuphone 104 may change an audio legal notice into a text legal notice or vice versa.

ILM 1726 as part of its internal algorithm will drive the interaction sessions with the IVR. ILM 1726 may include data structure optimized with the tracked IVR menus to decide a right path or a next choice at any existing stage of the IVR tracking. The decisions made by ILM 1726 may be optimized as a mathematically directed graph tracking process. The tracking process may use an option from the audible IVR menu that corresponds to a "return to a previous menu" option of the audible IVR menu. As a result, the number of sessions required for tracking the audible IVR menu is reduced.

The process of IVR tracking may require multiple communications with the audible IVR menu to completely determine the content. Further, during the tracking process the content of the audible IVR menu may be discovered partially. Therefore, ITM 1724 may include a Tree storage Module (TSM) 1728 to manage a temporary database record. Thereafter, when the process or a phase is complete, TSM 1728 may use Repository Connection Module (RCM) 1738 to submit the content as a batch of records to records database 1608. In case, a connection to records database 1608 is not available, then TSM 1728 may accumulate the information until a connection can be established.

Dialog Module 1730 of ITM 1724 interacts with the audible IVR menu. Further, dialog module 1730 manages the IVR requests and sends responses according to the decisions of ILM 1726. Further, dialog module 1730 may use a Speech recognition Module (SRM) 1732 to interpret the audio of the IVR request to generate multiple records for records database 1608. In an embodiment of the invention, the audio is interpreted to generate text information. Moreover, SRM 1732 can provide a score to the text generated for each audio, according to the amount of guessing that is required for translating the IVR audio request. SRM 1732 may use a single grammar or a combination of dedicated grammars, for example, but limited to, a specific IVR service topic, IVR service sub topic, IVR stage, IVR location, the specific IVR, the hour of the day, and so forth. Furthermore, SRM 1732 may use multiple preset terms stored in the memory. Examples, of preset terms include, but not limited to, "yes", "no", name of the caller, and so forth. The text generated by SRM 1732 from speech recognition may be parsed by dialog module 1730 to enable ILM 1726 to select a next path or option. In an embodiment of the invention, SRM 1732 may use speech recognition for determining whether a record in the visual menu database 308 needs to be updated or not. In an embodiment of the invention, SRM 1732 may further score the quality of the speech recognition for one or more records of the database.

Dialog module 1730 may be required to respond to the IVR requests during a tracking session. Dialog module 1730 may use a Response module 1734 to generate the required response. Various audible IVR menus require a voice response from the caller. For example, the voice response may be required for the authentication of the caller. Response module 1734 may provide a recorded voice response to the audible IVR menu. For example, the voice response may be recorded voice phrase or preset of terms such as, but not limited to, "yes", "no", name of the caller, and so forth. Further, the voice response may be a synthesized voice response, generated by response module 1734. Therefore, response module 1734 may include a voice synthesizer. In this case, the activation code may be the recorded voice phrase and/or the synthesized voice phrase. Moreover, response module 1734 may include a voice decoder to recognize the voice. For example, the voice prompts generated by an audible IVR menu. In some other cases, the IVR menus may require a simple key tone (DTMF). The response module 1734 may include recorded tones or an internal module to generate the require tones.

Various destinations may provide a different audible IVR menu in the working hours and a different menu after working hours or during the holidays. DCA 1720 may detect the various times or time periods for which the audible IVR menus are presented in different mode. SRM 1732 may decode the voice from the audible IVR menu to recognize the IVR message. Further, ILM 1726 may analyze the response message for the periods and different operating mode. Therefore, ILM 1726 may call the destinations based on the recognized periods to generate records database 1608. Further, records database 1608 may include the time information for which a particular audible IVR menu is active. Accordingly, ITM 1724 may call the destinations multiple times based on the time information. Various audible IVR menus include multi-level menus, as discussed with reference to FIG. 2A. Therefore, each level of menu may include sub-menus, which may further include sub-menus, and so forth. Accordingly, records database 1608 may include multiple sub-records, and each of the sub-records may have activation codes associated with them. Furthermore, records in records database 1608 may include a code to indicate a business domain of the destinations, such as airlines, banks and so forth. In an embodiment of the invention, TLM 1722 may use a web-based list such as yellow pages to call the destinations. Further, Visuphone 104 may update the IVR database based on the one or more properties of destinations in the yellow pages. In an embodiment of the invention, Visuphone 104 may add a business category code for each destination in the IVR database based on the yellow pages. Generally, the phone numbers of the destinations in the yellow pages are organized based on the business domains of the destinations. Accordingly the business domain code could be added to record database 1608. As graphics and icons are very effective in enhancing caller interface, ITM 1724 may associate various phrases with specific icons. For example, ITM 1724 may include a dictionary of various terms or phrases that are frequently used in IVR menus, such as "customer care", "main menu", and so forth. The terms may be decoded by Dialog module 1730 and icons may be associated with them. Accordingly, records database 1608 may include a code for icons associated with the IVR menus of the destinations. In an embodiment of the invention, Visuphone may match one or more record with a standard menu based on said business category of the destination. ITM 1724 may include components to connect to the audible IVR menu. As shown with reference to FIG. 17B, ITM 1724 may include a VOIP connection module 1736 to interact with a VOIP application 1740. VOIP application 1740 may be implemented within or outside DCA 1720. In such a case, VOIP connection module 1736 may use VOIP application 1740 to interact with the audible IVR menus. In an embodiment of the invention, the VOIP application may be implemented by using a VOIP phone. The user may use a VOIP phone for dialing a phone number of a destination.

Further, as shown with reference to FIG. 17C, ITM may include an IVR Connection module 1737, to interact directly with the audible IVR menu. IVR connection module 1737 may connect to multiple audible IVR menus through a network, a PSTN or any other communication or protocol. Moreover, IVR Connection module 1737 may act as a gateway between DCA 1720 and the destination of audible IVR menu.

FIG. 18A illustrates a flow diagram for creating a database for visual IVR menus, in accordance with an embodiment of the invention. As shown, FIG. 18A illustrates various steps of creating the database for visual IVR menus by a computer system. The audible IVR menus of destinations may be analyzed to generate records database 1608 for corresponding visual IVR menus. At step 1802a, a computer system may dial a phone number of a destination. The destination may include an IVR system. The IVR system may include audible IVR menus. The audible IVR menu may include one or more voice or audio options. In an embodiment of the invention, a combination of hardware and software that is connected to a phone system may automatically dial the IVR phone numbers.

At step 1804a, the voice options of the audible IVR menu may be recorded by the computer system. At step 1806a, the audible IVR menu may be analyzed. In an embodiment of the invention, the computer system may analyze the audible IVR system. In an embodiment, the computer system may include Visuphone to record and analyze audible IVR menu of the IVR system. At step 1808a, multiple entries of the audible IVR menu are entered into a database at the computer system. Thereafter, at step 1810a, a visual IVR menu may be generated for different entries of the audible IVR menu. In an embodiment of the invention, speech recognition may be used to generate an entry in the visual menu database. In an embodiment of the invention, Visuphone may also score the quality of the speech recognition for one or more records of the database. At step 1812*a*, the process of recording voice options, analyzing audible IVR menu and generating the visual IVR menu may be repeated for each level of the audible IVR menu. In an embodiment of the invention, the computer system may generate the voice tone that simulates the relevant touchtone of a phone number pressed. This process may be done in several levels until covering all the entries in all the levels of the specific IVR system. This process may be done for all the IVR phone numbers in the list.

In an embodiment of the invention, Visuphone may generate visual IVR menus in a language different from the language of the audible IVR menus. For example, Visuphone may generate an English visual IVR menu corresponding to a Spanish audible IVR menu. Further, Visuphone may store visual IVR menus in different language in a database at device.

FIG. 18B illustrates a flow diagram for creating a database for visual IVR menu in accordance with another embodiment of the invention. Records database 1608 may be created by using DCS 1606 (as explained earlier in FIG. 16). The audible IVR menus of destinations may be analyzed to generate records database 1608 for corresponding visual IVR menus. At step 1802*b*, a phone number may be dialed to establish connection with the destination to connect to an audible IVR menu of destination. The phone numbers and destinations may be selected automatically from a database of phone numbers. For example, yellow pages for a selected territory, category, business or other suitable classifications. As discussed with reference to FIG. 2A, the audible IVR menu may include various options for a caller to select. Typically, the options are structured and presented in form of levels to the caller. For example, with reference to FIG. 2A, options 204*a*, 206*a*, and 220*a* may form a first level of the audible IVR menu 222*a*. Further, options 208*a* and 210*a* may be referred to as sub-menus to option 204*a*. Similarly, each sub-menu may further comprise sub-menus, such as options 214*a* and 216*a*. Therefore, DCS 1606 is presented with audible instructions at first level. Thereafter, based on the selection by DCS 1606, corresponding audible instructions of sub-menus may be provided. The first level of the audible IVR menu is analyzed at step 1804*b*. The audible IVR menu may be analyzed by voice recognition.

In an embodiment of the invention, the voice or speech recognition for constructing records database 1608 is based on context-enhanced voice recognition. Further, quality of the speech recognition for one or more records of the database may also be scored.

As the process of calling the destination is initiated by selecting a number from a list such as yellow pages, the voice recognition system would be provided file of potential menu terms, which could be farther narrowed base on knowledge of the business domain and the potential options such destinations may offer. Therefore, the process of voice recognition is greatly enhanced, when the recognition is done with respect to a relatively small number of choices. SRM 1732 in DCA 1720 may be pre-loaded with a small set of terms most likely used by the destination and, therefore, may be required to make the recognition out of the relatively small set of terms. In an embodiment of the invention, speech recognition may be used for determining whether a record in the visual menu database needs to be updated or not.

Further, the voice may be converted to a text format. In an embodiment of the invention, a voice-to-text application may be used to convert the audible instructions to text format. Subsequently, the information generated from the analysis of the first level is stored in records database 1608, at step 1806*b*. The information may include the details about the sub-menu and the numbers to be dialed to access the sub-menu. For example, with reference to FIG. 2A, the information for option 204A may include, instruction part 'pizza order' and number part '2' in the database. At step 1808*b*, it is determined whether there are any sub-menus in the audible IVR menu. The sub-menus may be detected based on the information analyzed from the audible IVR menu. In an embodiment of the invention, sub-menus are detected based on the information stored in the database.

In case the audible IVR menu contains sub-menus, then the sub-menus are analyzed, at step 1810*b*. The sub-menus may be analyzed in a similar manner as the first level of audible IVR menu as discussed above. Subsequently, at step 1812*b*, the information corresponding to the sub-menus is stored in records database 1608. At step 1814*b*, it is determined whether there are any further sub-menus in the sub-menus of the audible IVR menu. DCS 1606 may make select an option for every menu to connect accordingly and determine if a final destination is reached or there is another layer of menu options to be processed. Once the final destination it reached, DCS 1606 may "hang-up" the connection and register the results. Further, DCS 1606 may dial again to iteratively discover the full menu of the IVR. In case, there are further sub-menus then each sub-menu is analyzed as discussed above. The process is iterated till the complete audible IVR menu with the sub-menus is analyzed. Further, the destinations may be dialed multiple times to ensure that complete audible IVR menu and sub-menus are analyzed.

Moreover, records database 1608 may be automatically checked and verified after complete analysis of the audible IVR menu. For example, all or various options or sub-menus in the audible IVR menu may be selected randomly or based on a pre-defined pattern to verify the information in records database 1608. In an embodiment of the invention, DCS 1606 may use quality marks for every term recognized during the process. For example, low marks may indicate relatively higher probability that the recognition was wrong. Further, follow-up steps may provide higher priority to check and validate the terms that received low marks. Such check may be performed by an additional automatic system or by human operators. In an embodiment of the invention, one or more records in records database 1608 may be generated by a human operator by listening to the IVR menus (or audible IVR menus). Further, speech recognition may be used to check if a record needs to be updated in the records database 1608. In an embodiment of the invention, the destinations may be connected automatically through various probe servers to analyze the audible IVR menus. The probe may be implemented as a script, a computer program, or firmware, on remote server 1002, as shown with reference to FIG. 10. Further, the audible IVR menus may be analyzed by human operators, in case of malfunction or other issues with the automatic functioning.

In an embodiment of the invention, records database 1608 may be updated automatically based on a pre-defined update time interval. The update may be required to validate the correctness of information in the database. Moreover, records database 1608 may be updated based on ratings from callers of Visuphone. For example, the caller may identify that a visual IVR menu is incorrect or incomplete, and may subsequently provide a rating to the visual IVR menu. Further, an administrator or caller of records database 1608 may update it manually.

Various audible IVR menus require audio commands from the caller instead of selecting options. DCS 1606 analyzes such IVRs to generate records database 1608. In an embodiment of the invention, a two-phase process may be applied to generate records database 1608. In the first phase a standard menu is generated for the IVR that may relate to a particular class of the destinations. A class can be a business class, for example, banks, airlines, hospitals and so forth. The first phase could be extended to cover as many domains as possible so that standard menus exist for most business classes of destinations. In the second phase, the IVR that requires a natural language voice command may be interrogated by repetitively applying the standard menus according to the class. Therefore, the relevance of the standard menu for the specific IVR is confirmed. In the process, a stored voice or synthesized voice could be used for each menu option. Thereafter, the menu may be stored in records database 1608 based on the confirmation. Some IVR menus may require any or both of natural language commands and dial tones. In such a case, both options could be made available in the records database 1608, and eventually in the visual IVR menu database for the caller at the time of use. As discussed with reference to FIG. 17, DCS 1606 may determine the type of audible IVR menu for generating records database 1608.

FIG. 19 illustrates an exemplary set of IVR categories 1902. As shown a category A 1904 refers to typical audible IVR menus that present IVR options to the caller that can be selected from simple dial tone selections. In this case, DCS 1606 may provide various dial tones to the IVR for analyzing it, and generating records for records database 1608. A category B 1906 refers to an audible IVR menu that requires the caller to answer some initial questions, before presenting simple dial tone options for further menu. For example, the caller may be required to select a language preference, before presenting the menu. A category C 1908 may require the caller to provide some personal information before presenting the menu. For example, the caller may be required to input an account number, a phone number, a customer number and so forth. A category C 1910 refers to an IVR menu that may require voice inputs or natural language selection from the caller. In this case, DCS 1606 generates an activation code that points to a recorded voice phrase or a code that can instruct to synthesize the proper voice phrase required.

Additional variations of the categories include an IVR menu that provides a legal notice. For example, the audible IVR menu of a mortgage bank usually include an header stating that this is debt collector and anything stated during the call could be used for future collections. Other statements can be such as those that relate to the option to record the call and so forth. The statement may be registered and added to records database 1608, so that the legal statement can be presented with the visual IVR menu. Further, additional statements may be added at the end of the statements regarding the last time when the IVR was verified. The legal notice or the disclaimer may be a text message, a multimedia message, a voice message, and so forth. In an embodiment of the invention, the legal notice may be associated with the IVR menu(s). Further, Visuphone 104 is configured to detect a legal notice associated with the IVR menu. In an embodiment of the invention, Visuphone 104 may convert the legal notice to text by using the speech recognition.

FIG. 20A illustrates an exemplary information process for an IVR menu stored in records database 1608, in accordance with an embodiment of the invention. Sometimes, an audible IVR may request the caller for some specific or personal information that is other than selection of IVR options. ILM 1726 may mark such requests and process them separately.

ILM 1726 can identify such requests based on a combination of the identity code and an ordered list of activation codes. As shown, the records database content 2002 may include exemplary request 2004a "Please enter the invoice number", request 2006a "Please enter the payment amount", request 2008a "Please choose your payment card: Press 1 for VISA and 2 for MasterCard", request 2010a "Please say or enter credit card number", and request 2012a "Please enter your Credit Card expiry date".

Corresponding to these requests a display may be generated on the caller's device, an exemplary illustration is as shown with reference to FIG. 20B. In one embodiment, a web form 2014 is generated corresponding to the requests. Web form 2014 may be presented on a web browser of the caller's device. In another embodiment of the invention, the display is presented as an independent form on the display of the device. Therefore, the device may not require a web browser application. Web form 2014 may include single or multiple pages. Further, in case the information is displayed directly on the device, then various screens, layers or scroll may be used to display the information. Web form 2014 may include an input box 2004b corresponding to request 2004a, input box 2006b corresponding to request 2006a, input box 2008b corresponding to request 2008a, input box 2010b corresponding to request 2010a, input box 2012b corresponding to request 2012a, and a submit button 2016. The Visuphone on the caller's device may automatically complete some or even all the require details based on stored profile or previous inputs of the caller. Therefore, the caller may only (if at all) be required to complete the missing information manually. Subsequently, the Visuphone may connect to the IVR after the caller clicks on the submit button 2016. Further, the Visuphone may navigate to the process root within the IVR menu, revalidate the process input requests, and transmit the caller data to the IVR without any action from the caller. Moreover, the Visuphone may hide the IVR validation question such as questions like "are you sure", "did you mean XYZ?" and so forth. After the submission, a response such as, but not limited to, a receipt number, specific flight landing time, and so forth may be presented to the caller. The response from the IVR can be in various forms, for example, but not limited to, a recorded audible response or a transcript of the audible response.

In another embodiment of the invention, electronic yellow pages directory allows the dialing the number directly from the directory and further provides the visual IVR menu of the destination. In an embodiment, one or more destinations along with their associated properties may be displayed at the device prior to displaying visual IVR menu. In an embodiment, the one or more destinations are displayed based on the position of the dialed destination number and position of the one or more destinations. The caller can select the exact destination before dialing or follow the visual IVR menu after dialing. For example, an airline company might have various options, menus and layers in the large organization. Selecting the exact department in the organization before dialing can save the caller the time and overhead of listening to the menu and making decisions based on the voice menu. The yellow pages company can have a copy of the visual IVR menu database or can be connected to a visual IVR menu service in order to provide the menu to the caller.

In an embodiment, multiple options of destinations related to the dialed destination business category may be displayed by Visuphone 104 prior to displaying a visual IVR menu as described in detail in FIG. 21. Further, Visuphone 104 may add a business category code for each destination in the IVR database based on the yellow pages. For example, when caller 106 dials a phone number of pizzeria then Visuphone 104 may first display all the pizzerias available in nearby area. Caller 106 may select one pizzeria from the list of pizzerias. Thereafter, Visuphone 104 may display a visual IVR menu associated with the selected pizzeria (or destination). Further, Visuphone 104 may display geographical information and properties corresponding to destination phone number dialed. In an embodiment, the geographical information may be displayed before a connection is established between device 102 and the dialed destination such as destination 108*b*. Moreover, the visual IVR menu is displayed after caller 106 selects one or more destinations based on the information. In an embodiment of the invention, Visuphone 104 displays information for destinations 108*a-n* based on a business category. For example, if the phone number dialed by caller 106 corresponds to a teleshopping network, then the information displayed may relate to the specific teleshopping network dialed and/or to other teleshopping networks. In another embodiment of the invention, Visuphone 104 displays the information based on a relative geographical distance of caller 106 from that of dialed destination. The distance may be within a predefined range. For example, the pre-defined range can be 0 to 5 km, 0 to 500 m, a caller defined value, and so forth.

FIG. 21 illustrates an exemplary display of representations 2102*a-n* of destinations 108*a-n* on device 102, in accordance with an embodiment of the invention. In an embodiment, representations 2102*a-n* may be displayed or presented to caller 106 prior to displaying visual IVR menu of a selected destination. Further, representations 2102*a-n* may be displayed based on the distance or position of the destinations from the dialed destinations. In an embodiment, representations 2102*a-n* may include information about various destinations which have same business category as of the dialed destination. For example, if caller 106 dials for a Chinese restaurant than Visuphone 104 will display representations of all restaurants serving Chinese food located within the pre-defined range of distance relative to caller 106.

Further, representations 2102*a-n* may include properties associated with destinations 108*a-n*. Examples of the properties include, but are not limited to a location code, a branch code, rating, reviews, an address, phone numbers, distance from caller 106, and so forth. In an embodiment of the invention, a caller representation as user 2104 corresponding to caller 106 may be displayed on device 102. Examples of the representation 2102 include, but are not limited to, graphical or text representations such as a table of rows and columns, icons, area map, and so forth. Representations 2102*a-n* may also include the distance of destinations 108*a-n* with respect to the location of caller 106.

Caller 106 may select a destination from the representations 2102*a-n* based on one or more displayed properties. Subsequently, the visual IVR menu of the selected destination may be presented to caller 106. For example, if caller 106 selects destination 108*c*, then a visual IVR menu corresponding to destination 108*c* is displayed at device 102. In an embodiment, the display may include representation of a subset of destinations 108*a-n* based on one or more criteria. The one or more criteria include displaying destination based on business category of dialed destination phone number. In an embodiment, the one or more criteria may also include displaying destinations based on location of device 102 or caller 106.

In an embodiment of the invention, device 102 may be an in-car navigation system such as a Global Positioning System (GPS). Therefore, when caller 106 dials a phone number of a destination, Visuphone 104 may provide a representation of one or more destinations on a map on device 102 screen. Further, the properties like location, reviews, ratings etc. associated with the destination may be displayed on the map. Caller 106 may interact with the displayed maps and can select a destination from the map based on the one or more properties. Further, caller 106 can select a destination by clicking or scrolling on the map. In an embodiment of the invention, a route map from caller 106 to the selected destination may be displayed on device 102 screen.

In an embodiment of the invention, device 102 can request for updates from a server through a communication network. The server may maintain the updated information of destinations and their associated properties. The communication network can include more than one device 102. Examples of the communication network include, but are not limited to, the Network, PSTN, Local Area Network (LAN), Wide Area Network (WAN), and so forth.

Alternatively an enhanced web based yellow page could be provided, wherein the caller can first choose the provider he/she requires to contact. Thereafter, if that destination provides an IVR, then the enhanced yellow page will use the visual IVR menu database to present a visual IVR menu on the web page. Moreover, the caller can click to choose the internal destination of that provider and the enhanced yellow page may accordingly initiate the call. In an embodiment of the invention, Visuphone may add a business category code for each destination in the IVR database based on the yellow pages. The call could be made using the conventional telephone network or PSTN. In this case, the enhanced yellow page may need the caller's telephone number to perform the connection. Alternatively, the enhanced yellow page could use VOIP to connect the caller over the web to the IVR of the destination. In an embodiment of the invention, caller 106 may use a VOIP phone for dialing a phone number of the destinations.

In some IVR systems, the caller may have to wait or hold on a queue of previous dialers until the specific department or agent is available. In another embodiment of the invention, the enhanced yellow page system will connect the caller only after the specific agent is available, without waiting in a long waiting line queue. The system can recognize that the waiting queue message of the specific department, and to connect the caller only after the agent is answering. Therefore, the waiting time of the caller on the phone queue that sometimes may be very long, may be reduced. The system can park on the line for the waiting line on the specific entry in the menu; as soon as the agent is available the caller gets a signal to start the conversation with the agent.

FIG. 22 illustrates an exemplary visual IVR menu 2202 of the selected destination with added graphics for the nodes on device 102. Visual IVR menu 2202 includes one or more options corresponding to every node in the destination. It is well known that graphics are easier to learn and are faster to recognize than words. Therefore, graphics can be used in various computerized device interfaces. Various types of graphics can be displayed for example, animated icons, icons that highlight or animate when the node is highlighted, and so forth. The graphics may be displayed for each node or a few nodes based on the usability of visual IVR menu 2202. For example, for node 2210 an icon of a vegetable may be displayed to designate a vegetarian pizza, and for node 2216 of home delivery, an icon of house may be displayed. In an embodiment of the invention, visual IVR menu 2202 can be customized to display only the text, only the icons, or both. Furthermore, caller 106 can suggest or use various icons based on his preferences. The visual IVR menu is specific to a destination. Further, each of destinations 108*a-n* may have more than one audio IVR menus. So different visual IVR menu corresponding to one or more audio IVR menus is possible. In an embodiment of the invention, Visuphone may generate visual IVR menu 2202 in a language which may be different from the language of audible IVR menu. Further, in another embodiment of the invention, a caller may navigate the IVR system of visual IVR menu before dialing to the destination. The caller may navigate various nodes of visual IVR menu 2202 and may select a desired node to which the caller would like to connect before actually dialing to the destination. Thereafter, the caller may dial the phone number of the destination based on the selection.

In an embodiment of the invention, Visuphone may be launched through a website or it may be launched by selecting a sub part of a web site or web page. Caller may navigate a website IVR system and may select the right person or option in the IVR system before connecting to the IVR system by using IVR application i.e. Visuphone. Visuphone further allows caller to search for an appropriate service, product, department or option in the IVR system of a company or website or destination before dialing to the destination. Thereafter, selecting the desired department or option, caller may dial phone number of the destination.

Further, features of Visuphone may be provided by a service provider, such as but not limited to, a cellular service provider, a cable TV service provider, optical network service provider, telecom service provider, an Internet Service Provider (ISP), a Wi-Fi service provider, and so forth. In an embodiment of the invention, Visuphone is not installed at device. In such a scenario, caller may use functionalities of Visuphone through various service providers. For example, if Visuphone is not installed at a smart phone and user of the smart phone wants to use the Visuphone, he/she may do so by subscribing to Visuphone services from a service provider such as an ISP. In an embodiment of the invention, Visuphone application may be provided by various service providers on subscription basis. In an embodiment of the invention, Visuphone may be used by various users through cloud implementation.

FIG. 23A illustrate a flow diagram for providing representation of destinations based on position, in accordance with an embodiment of the invention. At step 2302a, a phone number of a destination dialed from a communication device may be identified. Examples of the communication device may include, but are not limited to, a smart phone, a PDA, a tablet computer, a mobile phone, a laptop, a computer, and so forth. The destination may include an IVR system. Further, the device may include a Visuphone for connecting to the destination(s). At step 2304a, a location code associated with current location of the device may be determined. At step 2306a, the dialed phone number of the destination may be compared with one or more destination phone numbers stored in a database. The database may be present at the device. Further, the database may store at least one property associated with the destination phone numbers. Thereafter, at step 2308a, at least one property associated with one or more destination phone numbers may be displayed based on the comparison. Thereafter, the caller at the communication device may select a destination based on one or more properties and a visual IVR menu associated with the selected destination may be displayed at the communication device. The caller may interact with the visual IVR menu accordingly.

FIGS. 23B, 23C, and 23D illustrate a flow diagram for providing representation of destinations based on position, in accordance with an embodiment of the invention. Caller 106 may dial, select or receive one or more destination phone numbers to connect to a destination from device 102. Destinations, such as destinations 108a-n, may include an audible IVR menu for interaction with a caller. Further, device 102 may include Visuphone 104 to display one or more representations corresponding to multiple destinations on screen or display of device 102. Further, the one or more representations may include properties associated with the multiple destinations. Visuphone 104 also presents visual IVR menu corresponding to the phone number of the selected destination. Therefore, a caller can directly interact with a visual IVR menu 2202 of selected destination through visual IVR menu 2202 without listening to the audible IVR menu.

At step 2302b, Visuphone 104 identifies a phone number of a destination dialed by caller 106 of device 102. In an embodiment of the invention, the number is clicked according to the display of device 102. The number is identified by CPU 304. In an embodiment of the invention, Visuphone 104 displays at least one property associated with one or more destinations 108a-n based on the identified dialed phone number of the destination. Further, at step 2304b, a location code associated with current location of device 102 is determined. The location code determines the present location of device 102. When caller 106 is in his/her home country or state, the location code of the device and location code of the dialed destination phone number is same. In an embodiment, when a person is on roaming, the location code of caller 106 is different than the location code of the dialed destination phone number. This happens, in case when caller 106 is travelling and device 102 is on roaming. Central processing Unit (CPU) 304 of device 102 determines the location code of device 102.

At step 2306b, CPU 404 determines a business category associated with the dialed destination phone number. Destinations 108a-n can be categorized into various groups based on their associated business category. Various destinations are grouped into a business category based on the services and operations of the destinations. At step 2308b, CPU 304 searches visual menu database 308, for phone numbers of the destinations matching the business category of the dialed destination phone number. Further, at step 2310b, CPU 304 checks whether the destination phone numbers matching the business category are available in visual menu database 308. In case the one or more destination phone numbers are available, then the process continues to step 2312b, else the process control goes to step 2328b.

At step 2312b, CPU 304 searches for at least one phone number from the one or more destination phone numbers based on the location code. The location code is associated with device 102. The location code determines the present location of device 102. In an embodiment, CPU 304 searches for at least one phone number from the one or more destination phone numbers based on the location code of device 102b and a location code of the dialed destination phone number. At step 2314b, CPU 304 checks whether the at least one destination phone number matching the location code of the device is available in the visual menu database 308. In case the at least one destination phone number is not available, then step 2326b is executed. At step 2326b, a visual IVR menu of the dialed destination phone number is displayed on display 302, as shown with reference to FIG. 23C.

At step 2314b, when the at least one destination phone number matching the location code of device 102 is available in the visual menu database 308, the process continues to step 2316b. At step 2316b, the at least one destination phone number with its associated properties are displayed. CPU 304 displays the at least one destination phone number and associated properties on display 302 of device 102. Further, at step 2318b, caller 106 may select a destination phone number from the displayed representations of destinations. At step

2320*b*, a visual IVR menu of the selected destination is displayed on display 302 of device 102. CPU 304 displays the visual IVR menu on display 302.

As discussed with reference to FIG. 22, visual IVR menu 2202 includes one or more options. At step 2322*b*, caller 106 selects an option from visual IVR menu 2202. Thereafter, at step 2324*b*, device 102 connects to a destination corresponding to the selected option of the visual IVR menu 2202. Thereafter, caller 106 can interact according to his/her preference with the destination through the visual IVR menu 2202. At step 2310*b*, when the one or more destination phone numbers matching the business category of the dial phone number, are not available in the visual menu database 308, the process continues to step 2328*b*, device 102 requests for updates from a server of communication network. The updates include information associated with destinations 108*a-n*. The destination information includes destination phone number, and their associated properties. Further, at step 2330*b*, the updates are received from the server by device 102. Then, at step 2332*b*, the received updates are stored in the visual menu database 308 on device 102. Thereafter, the process continues to step 2308*b*.

In another embodiment of the invention, electronic yellow pages directory allows the dialing the number directly from the directory and further provides representation of one or more destinations and the visual IVR menu of the destination. Therefore, the caller can first select a destination from the representation based on one or more properties such as reviews of that particular destination. The caller can select the exact destination before dialing or follow the visual IVR menu after dialing. For example, an airline company might have various option, menus and layers in the large organization. Selecting the exact department in the organization before dialing can save the time of the caller and overhead of listening to the menu and making decisions based on the voice menu. The yellow pages company can have a copy of the visual menu database 308 or can be connected to a visual IVR menu service in order to provide the menu to the caller.

In an embodiment of the invention, Visuphone 104 may be configured to display one or more advertisements on device 102. As discussed with reference to FIG. 4 and FIG. 6 advertisement 408 may correspond to the type of services provided by the destinations dialed by a caller. For example, if destination dialed is a builder, then advertisement 408 may include promotions or offers about new plots or houses. Moreover, advertisement 408 may include promotions or offers from a third party or a competitor of the destination. Further, Visuphone 104 may be coupled to an advertising database. The advertising database may include advertisements related to the phone numbers of the destinations. The advertising database may be stored at device 102, the destinations, service providers or other third party servers. Further, the advertisements may be provided based on a profile of the caller. For example, assuming that the caller calls a bank holding his saving account. Therefore, the advertisement displayed to the caller may be based on the location, address, account balance, type and volume of transactions, loans, purchases, and so forth.

Visuphone 104 may be configured to connect to an intended destination, when the caller selects advertisement 408. Further, Visuphone 104 displays visual IVR menu of the intended destination. In an embodiment, Visuphone 104 can store the interactions of the caller with visual IVR menus. For example, Visuphone 104 may automatically learn the numbers dialed or options selected from the menu. Moreover, the learned numbers or choices are associated with the dialed phone number of the destination. Therefore, the caller is assisted in his future calls. For example, when caller calls the destination again, then the actions that were performed in the last interaction are presented prominently to caller; or a previous sequence may be automatically performed. Further, the actions that are frequently performed are presented prominently to caller. For example, if caller dials a bank frequently to enquire about his account balance, then the options for selecting his account balance may be highlighted.

As discussed with reference to FIG. 9, the advertisements are managed by advertisement module 912 of Visuphone 104. The advertisement may be selected based on the type of destinations or a business domain of the destination. For example, when a dialed destination is a bank, then the dialed number is identified and an advertisement related to banking may be displayed. Moreover, the advertisement can be related to a third-party dealing in the same business or professional area or a competitor of the dialed destination. The displayed advertisement may be a text, audio, image or video. Moreover, the advertisement may include hyperlinks. For example, the hyperlinks may link to web pages of the called destination. In one embodiment, advertisement module 912 may display the advertisements based on the connection bandwidth available at device 102. In another embodiment, advertisement module 912 may display the advertisements based on the pre-set preferences by caller 106. In one embodiment, advertisement module 912 may be configured to receive the advertisements directly from the dialed destination.

In another embodiment, advertisement module 912 may be configured to receive the advertisements from a remote server on a communication network. The remote server is explained in detail in conjunction with FIG. 10. A selection of options or click by caller 106 on advertisements may be detected by detection module 902 to display a visual IVR menu of the destination for which the advertisement was displayed. Furthermore, the advertisements may be associated with the personal data of caller 106. For example, the caller, who is a saving account holder of a bank, may receive advertisements related to easy loan facility that may be applicable for saving account holders. The caller may receive such advertisements when he/she calls a phone number to the bank. The advertisements for easy loan facility may correspond to the same bank (having the caller's saving account therein) or any other bank. Further, the advertisement may be displayed based on the calling pattern of caller 106.

FIG. 24 illustrates a flowchart for presenting advertisements along with the visual IVR menu on the device, in accordance with an embodiment of the invention. In an embodiment of the invention, Visuphone 104 may display advertisements along with the visual IVR menus on device 102. Device 102 can be a communication device or a device capable of data and/or voice communication. The advertisements may be stored in a database. In an embodiment, visual menu database 308 of device 102 may store the advertisements. In an embodiment of the invention, the advertisements may be stored on a remote database that can be connected to device 102.

At step 2402, a number dialed by a caller such as caller 106 for a destination is identified by Visuphone 104. The destination may be associated with an IVR, for which a visual IVR menu is displayed on device 102. Moreover, the telephone numbers or the destinations or the IVR systems may be categorized based on a business domain. At step 2404, advertisement associated with the dialed phone number is searched in the database. In an embodiment of the invention, the advertisements are searched based on the business domain of the dialed number. For example, when a dialed destination is a bank, then the dialed number is identified and an advertisement related to banking such as investment schemes may be displayed. Moreover, the advertisement can be related to a third-party dealing in the same business or professional area or a competitor of the dialed destination.

Thereafter, at step 2406 the advertisement searched is displayed on device 102. In an embodiment of the invention, multiple advertisements can be displayed on device 102. The displayed advertisement may include text, graphics, audio, image, video or hyperlinks. For example, the hyperlinks may link to web pages of the called destination. In one embodiment, advertisement module 912 may display the advertisements based on the connection bandwidth available at device 102. Further, the advertisements may be displayed based on the pre-set preferences of caller 106. In an embodiment, the preferences may be set by caller 106. In one embodiment, the advertisements may be downloaded from dialed destination or remote database on a server in the network.

Further, caller 106 may interact with the displayed advertisements. For example, caller 106 may click the advertisement, or select an option from the advertisement. The options may be telephone numbers, destinations or an internal department of the destination. At step 2408, it is determined whether caller 106 has selected the advertisement. Subsequently, in case caller 106 has not selected the advertisement then the existing advertisement is displayed as discussed at step 2406. In an embodiment of the invention, the advertisement is displayed for pre-set time duration. Otherwise, in case the advertisement is selected by caller 106 than the process continues to step 2410, where the telephone number of the destination associated with the advertisement may be dialed to establish connection between caller 106 and the destination corresponding to the advertisement. For example, a caller may receive an advertisement related to new vegetarian restaurant. The caller may select the advertisement to dial a telephone number corresponding to destination corresponding to the advertisement, i.e. new vegetarian restaurant. In an embodiment, the advertisement provided to the caller includes a hyperlink that may enable the caller to visit a web page corresponding to the destination related to the advertisement such as the new vegetarian restaurant. Further, in another embodiment, the user may access the visual IVR menu, corresponding to the new vegetarian restaurant, through device 102.

In an embodiment of the invention, Visuphone 104 may be configured to submit personal information of a caller prior to establishing a connection with a dialed destination. In an exemplary scenario, the personal information may be used for authenticating the caller at a service login (such as for a web site or for a bank).

FIG. 25A illustrates an exemplary information process for an IVR menu stored in records database 1608, in accordance with an embodiment of the invention. Sometimes, an audible IVR or visual IVR menu may request the caller for some specific or personal information that is other than selection of IVR options. In an embodiment, the specific information may be requested in form of one or more fields, in which the caller can enter the information. For example, for a bank IVR system, when a caller selects an option from the displayed visual IVR menu of the bank, the caller may be presented with a form asking for one or more fields such as caller name, password, and so forth. In an embodiment, IVR logic module (ILM) 1726, as shown in FIG. 17, may mark such requests and process them separately. Further, ILM 1726 can identify such requests based on a combination of the identity code and an ordered list of activation codes.

In another embodiment, caller 106 may be required to provide the specific or personal information as audio or voice inputs. Some organizations such as banks may require caller 106 to present one or more information in form of voice input for the purpose of authentication. For example, caller 106 may be required to voice out his name or an answer to a security question specified by caller 106 to the bank. Furthermore, the voice input may be required to accept or decline a transaction. Further, caller 106 may record and store the voice responses of caller 106 for such authentications or questions. As discussed with reference to FIG. 16 the audio prompts or voice inputs may be stored in the records database 1608 as content 2502. For example, the audio prompts may be converted to text and stored as content 2502. As shown, content 2502 of records database 1608 may include, but is not restricted to, an exemplary request 2504*a* "Please enter the login identity (ID)", and a request 2506*a* "Please enter the password".

As also discussed above, Visuphone 104 maintains a profile of the caller. Moreover, the caller can edit, remove, and/or update the profiles. For example, the profile may include information such as name, address, account type and codes, passwords, and so forth. Therefore, Visuphone 104 may match the content 2502 with the profile of the caller. As discussed with reference to FIG. 9, voice module 910 may be used when connection module 908 detects that a voice authentication is required. Voice module 910 is configured to provide voice inputs on behalf of the caller by using the responses recorded by the caller. Subsequently, the connection or the transaction can be processed.

FIG. 25B illustrates an exemplary web form generated for the information process of FIG. 25A, in accordance with an embodiment of the invention. As shown, web form 2510 may be generated corresponding to the requests. Web form 2510 may be presented on a web browser of the caller's device such as device 102. In another embodiment of the invention, the display is presented as an independent form on the display screen of the device of the caller. In an embodiment, web form 2510 may include single or multiple pages. Further, in case the information is displayed directly on the device, then various screens, layers or scroll may be used to display the information. Web form 2510 may include an input box 2504*b* corresponding to a request 2504*a*, an input box 2506*b* corresponding to request 2506*a*, and a submit button 2508. In an embodiment of the invention, Visuphone 104 may save one or more details entered by the caller in the web form 2510 for future interaction. Examples of the one or more details include, but are not limited to, name, password, login details, email id, credit card number, and so forth. In an embodiment, Visuphone 104 on the caller's device may automatically complete some or even all the required details based on stored profile or previous inputs (the one or more details) of the caller. Therefore, the caller may only (if at all) be required to complete the missing information manually. Subsequently, Visuphone 104 may connect to the IVR after the caller clicks on the submit button 2508.

Further, Visuphone 104 may navigate to the process root within the IVR menu, revalidate the process input requests, and transmit the caller data to the IVR (or destination) without any action from the caller. Moreover, Visuphone 104 may hide the IVR validation question such as questions like "are you sure?", "did you mean XXXX?" and so forth. After the submission, a response such as, but not limited to, a receipt number, saving account statement, and so forth may be presented to the caller. The response from the IVR system can be in various formats, for example, but not limited to, a recorded audible response or a transcript of the audible response. In an embodiment, Visuphone 104 may convert the format of the received response from a first format to a second format. In an embodiment, Visuphone 104 may change the format of the response from an audio format to a text format.

FIG. 26A illustrates a flowchart for submitting personal information of a caller by Visuphone, in accordance with an embodiment of the invention. At step 2602a, the caller may dial a phone number of a destination by using a device such as a smart phone. The device may include the Visuphone. At step 2604a, the dialed phone number of the destination such as of a pizzeria may be compared with one or more phone numbers of destinations stored in the device. In an embodiment of the invention, the one or more phone numbers of the destinations may be stored in a database at the device. Thereafter, at step 2606a, a form including one or more data request fields may be displayed at the device based on the comparison. The one or more request fields are the fields corresponding to a visual IVR menu associated with the dialed destination. The one or more request fields may be fields to enter password, credit card details, name, e-mail ID, and so forth. In an embodiment of the invention, the one or more request fields may be filled by the Visuphone automatically based on the caller's past inputs.

FIG. 26B illustrates a flowchart for submitting personal information of a caller by Visuphone 104, in accordance with another embodiment of the invention. At step 2602b, caller 106 dials a phone number of a destination 108 such as destination 108a. Subsequently, at step 2604b, a visual IVR menu associated with the dialed number is displayed on the display screen of caller device 102. For example, destination 108 may be a bank. Thereafter, at step 2606b caller 106 may select an option from the displayed visual IVR menu. For example, caller 106 may select to make a transaction from account, so caller 106 may select an appropriate option from the displayed visual IVR menu. In an embodiment, caller device 102 can be a communication device such as a mobile phone, a laptop computer, and so forth. Typically, banking services may require caller 106 to provide authentication information before a transaction can be made. At step 2608b, a form indicating the information required by the IVR of dialed destination 108 may be displayed on the display screen of caller device 102. In an embodiment, the form may include one or more data request fields. Further, the form is displayed corresponding to the visual IVR menu associated with the dialed destination. The exemplary form is discussed in conjunction with FIG. 25B.

Subsequently, at step 2610b, Visuphone 104 may fill the information in the form displayed. In an embodiment, Visuphone 104 may fill the form partially. In an embodiment, the one or more data request fields may be filled based on predefined information. The predefined information may be associated and/or specific to the visual IVR menu of the dialed destination. In an embodiment, the predefined information may be defined by caller 106. In an embodiment of the invention, Visuphone 104 may require caller 106 to provide at least one count of authentication information from the perspective of security. In an embodiment, caller 106 may fill the one or more data request fields with important information. Further, caller 106 may define the predefined information. Hereinafter, caller 106 may also be referred as a caller. For example, Visuphone 104 may submit the name and account number of a caller, but may not submit the transaction password. In another embodiment of the invention, Visuphone 104 may allow the caller to submit, edit and/or update the complete information in the form. Therefore, the updated information may be stored in the database on caller device 102. Thereafter, at step 2612b the connection between dialed destination 108 and caller device 102 may be established and the information stored in the form is submitted. Typically, the IVR of destination 108 may require caller 106 to provide the information in form of audio inputs. Therefore, Visuphone 104 may provide audio inputs corresponding to the information of the form. In an embodiment of the invention, the audio format of the information may be stored in caller device 102. In another embodiment of the invention, Visuphone 104 may convert the stored text data to audio information and submit it to the IVR of destination 108. Thereafter, caller 106 may interact with dialed destination 108.

In an embodiment, caller device 102 may receive a response from the dialed destination. In an embodiment, Visuphone 104 may convert a format of the received response from a first format to a second format. For example, Visuphone 104 may convert the receiver format of the response from the audio to text. In an embodiment, the first format of the received response may be an audio format. Examples of the audio format include, but are not limited to, WAV, Real Audio, Musical Instrument Digital Interface (MIDI), Windows Media Audio (WMA), MP3, Ogg, and so forth. In an embodiment, the second format may be a text format such as a Unicode text, Rich Text format, Hyper Text Markup Language (HTML) or any other format compatible with the caller device 102.

In an embodiment of the invention, Visuphone 104 may call the dialed destination automatically, based on predefined calling information. Such automatically dialing to the destination may be referred to as 'enhanced telephony' and is described in detail in conjunction with FIG. 30A and FIG. 30B. In an embodiment, Visuphone 104 may keep on calling to the dialed destination until the requested information is received. Further, Visuphone 104 may save and/or display the received information at device 102.

FIG. 27 illustrates an exemplary representation of a visual IVR menu 2702 associated with the dialed phone number of the destination along with a scheduling mode option, in accordance with an embodiment of the invention. Visual IVR menu 2702 includes one or more options corresponding to every node in the audible IVR menu of the dialed destination of destinations 108a-n. Visual IVR menu 2702 is an exemplary visual IVR menu of a pizzeria. It is well known that graphics are easier to learn and are faster to recognize than words. Therefore, graphics are used in various computerized device interfaces. Various types of graphics can be displayed for example, animated icons, icons that highlight or animate when the node is highlighted, and so forth. The graphics may be displayed for each node or a few nodes based on the usability of visual IVR menu 2702. For example, for node 2710 an icon of a vegetable may be displayed to designate a vegetarian pizza, and for node 2716 of home delivery, an icon of house may be displayed. In an embodiment of the invention, the visual IVR menu 2702 can be customized to display only the text, only the icons or both. Furthermore, caller 106 can suggest or use various icons based on his preferences. The visual IVR menu is specific to a destination.

Further, each of destinations 108a-n may have more than one audio IVR menus. Therefore, different visual IVR menus corresponding to one or more audio IVR menus can be available for each of destinations 108a-n. In an embodiment, device 102 may include more than one visual IVR menus for each destination of destinations 108a-n based on the time. Therefore, different visual IVR menus corresponding to a destination 108 might be presented to caller 106 depending on the time of dialing to destination 108.

In an embodiment of the invention, a scheduling mode option 2720 can be displayed on the screen along with the visual IVR menu associated with the dialed destination. Caller 106 may switch device 102 to a scheduling mode by selecting scheduling mode option 2720. When device 102 is in scheduling mode, Visuphone 104 may start saving the inputs of caller 106. The inputs from caller 106 may include the selection of one or more options of the displayed visual IVR menu 2702. In the scheduling mode, Visuphone 104 may display one or more input options on the screen to enter a call schedule by caller 106. The call schedule may include information such as a date and a time. The selection of the date and the time is explained in conjunction with FIG. 28.

Furthermore, Visuphone 104 may automatically call a phone number of a destination of destinations 108*a-n* automatically based on predefined calling information. The predefined calling information can be entered and/or selected by caller 106. The predefined calling information may include the selection information such as one or more options of visual IVR menu 2702 that are selected by caller 106 in the scheduling mode. Further, the predefined calling information may include the call schedule, which is the date and time information for the call. In an embodiment of the invention, the predefined calling information may also include additional data such as a predefined time interval, maximum number of dialing attempts, waiting time, and so forth.

In another embodiment of the invention, device 102 may be switched to the scheduling mode based on a predefined key sequence. Caller 106 may press or select or enter a predefined key sequence for switching device 102 to a scheduling mode. The predefined key sequence may be a combination of one or more keys. For example, the predefined key sequence may include two asterisks (*) after dialing a phone number such as 123456-7890". Visuphone 104 may detect such predefined key sequence dialed and switch device 102 to the scheduling mode. Thereafter, Visuphone 104 may save the user inputs. Further, Visuphone 104 may display the visual IVR menu associated with the dialed destination. Furthermore, Visuphone 104 may allow caller 106 to schedule the call by entering date and time information.

FIG. 28 illustrates another exemplary representation of a visual IVR menu 2802 associated with the dialed phone number of the destination along with the scheduling mode option 2720, in accordance with an embodiment of the invention. Visual IVR menu 2802 is an exemplary visual IVR menu of a bank. Visual IVR menu 2802 includes one or more options corresponding to every node in the audible IVR menu of the bank (or dialed destination of destinations 108*a-n*). Though not shown, nodes of visual IVR menu 2802 may be represented using graphics such as, animated icons, icons that highlight or animate when the node is highlighted, and so forth. Further, graphics may be displayed for each node or a few nodes based on the usability of visual IVR menu 2802. Visual IVR menu 2802 includes nodes such as personal banking node 2806, NRI banking node. Caller 106 can choose NRI banking by pressing a combination 1-3. Thereafter, caller 106 can select investment option by pressing 2. Furthermore, caller 106 can suggest or use various icons based on his preferences. The visual IVR menu is specific to a destination. For example, hospitals will have different IVR menu than that of the bank. In an embodiment, scheduling mode option 2720 may also be displayed on the screen of device 102. Caller 106 can select scheduling mode option 2720 for switching device 102 to the scheduling mode. Further, Visuphone 104 may start saving one or more inputs from the caller after switching to the scheduling mode.

FIG. 29 illustrates an exemplary display at device 102 after switching to a scheduling mode, in accordance with an embodiment of the invention. As discussed with reference to FIG. 27, Visuphone 104 may save the inputs from caller 106 after switching to the scheduling mode. Device 102 switches to the scheduling mode based on the selection of the scheduling mode option 2720 by caller 106. In an embodiment, Visuphone 104 may be configured to detect the selection of the scheduling mode option 2720 by caller 106. In an embodiment of the invention, caller 106 may enter and/or select a call schedule 2902. For example, call schedule 2902 may include, but are not limited to, a date and time information. A calendar 2904 may be displayed on the screen of device 102 for entering and/or selecting the date information for scheduling the call. A time input box 2906 may be displayed on the screen of device 102*a* for entering and/or selecting the time information for scheduling the call. For example, the call schedule information will include a date Mar. 15, 2011, and time 11:25:40, therefore Visuphone 104 dial at the phone number of the destination on Mar. 15, 2011 at 11:25:40 AM. In an embodiment, the time information may be displayed in 12 hour format. In another embodiment, the time information may be displayed in 24 hours format.

In another embodiment of the invention, call schedule 2902 may include a predefined schedule for calling to the destination. For example, Visuphone 104 may automatically schedule a call in next five minutes on the same day, based on the predefined schedule. In an embodiment, caller 106 is not required to enter or select the date and the time information for scheduling the call. In such a case, Visuphone 104 automatically schedules the call to the destination based on the predefined schedule. A person skilled in the art will appreciate that the date and time for predefined schedule is not limited to five minutes or same day, and can be edited by caller 106. Further, call schedule 2902 may also include additional information such as maximum number of calling attempts, waiting time, and so forth.

Thereafter, a communication is established between device 102 and the dialed destination. After establishment of the communication, Visuphone 104 may request and/or receive information from the dialed destination based on the selection information of the predefined calling information. In an embodiment, Visuphone 104 may keep on dialing the phone number of the destination until the requested information is received from the dialed destination based on the selection information. In an exemplary scenario, Visuphone 104 may be required to dial the phone number of the destination repeatedly when the requested information is not available on the dialed destination. The call schedule may further include the predefined time interval for calling the destination. For example, when the communication is not established with the dialed destination, Visuphone 104 can call the destination after waiting for the predefined time interval such as after ten minutes. A person skilled in the art will appreciate, that the predefined time interval is not limited to ten minutes, and can be edited by caller 106. In an exemplary scenario, if the requested information is not available at the dialed destination, than Visuphone 104 may wait for the predefined time interval of the call schedule and may call the previously dialed destination again, and may request for the desired information according to the selection information.

As discussed with reference to FIG. 3A, visual menu database 308 may store the predefined calling information. Further, visual menu database 308 may store the selection information and call schedule 2902. In an embodiment, call schedule 2902 may also include a predefined time interval and a predefined schedule. In an embodiment, visual menu database 308 may further store the predefined schedule and predefined time interval. Device 102 may also request or receive updates from the server at a predefined time. The predefined time may be for example, once a week, once a month, or any other interval predefined by caller 106 or Visuphone 104. In an embodiment of the invention, device 102 may receive updates from the server through one or more messages, such as, but are not limited to, Short Messaging Service (SMS) message, Multimedia Messaging Service (MMS) message, and so forth.

FIG. 30A illustrates a flowchart for providing enhanced telephony by presenting a scheduling mode option to the caller, in accordance with an embodiment of the invention. In an embodiment of the invention, a device may be provided for scheduling a call to a destination based on predefined calling information. Examples of the device include, but are not limited to, laptop, a tablet computer, a computer, a smart phone, a mobile phone, a PDA, and so forth. The device may include a database including a plurality of visual IVR menus associated with the destinations. The destinations may include an audible IVR menu for interaction with the caller. The device may include a Visuphone for displaying visual IVR menus of the destinations at the device. The Visuphone may also display a scheduling mode option at the device. The caller may switch to a scheduling mode by selecting the 'scheduling mode' option. In an embodiment of the invention, the Visuphone may dial a phone number of a destination automatically when the device is switched to the scheduling mode.

At step 3002a, a phone number of a destination may be dialed from a device based on predefined calling information. The Visuphone may dial the phone number of the destination automatically, when the scheduling mode is on. The predefined calling information may include selection information and call schedule information. Further, the predefined calling information may be selected from a visual IVR menu associated with the destination dialed from the device. The Visuphone may request information as per the predefined calling information from the dialed destination. At step 3004a, information may be received from the dialed destination based on the predefined calling information. Thereafter, at step 3006a, the received information may be displayed at the device. In an embodiment of the invention, the information may be stored at the device, which may be used by the caller as per his/her convenience.

FIGS. 30B and 30C illustrate a flowchart for providing enhanced telephony by presenting a scheduling mode option 2720 to caller 106, in accordance with an embodiment of the invention. Caller 106 may dial, select or receive one or more destination phone numbers to connect to a destination from device 102. Destinations, such as destinations 108a-n, may include an audible IVR menu for interaction with caller 106. Further, device 102 may include Visuphone 104 to display a visual IVR menu associated with a phone number of a destination dialed by caller 106. As discussed with reference to FIG. 27, Visuphone 104 may further display scheduling mode option 2720 at device 102. Visuphone 104 may establish a communication with the phone number of the destination based on predefined calling information. In an exemplary scenario, a user of device calls a bank, and then a scheduling mode option and a visual IVR of the bank may be displayed on the device. Sometimes, the user might not be able to receive desired information during this call then the user can switch to a scheduling mode by selecting the 'scheduling mode' option (shown in FIG. 27 as 'scheduling mode 2720'). Thereafter, Visuphone 104 may ask the user to enter predefined calling information. Later, Visuphone 104 may dial the phone number of the previously dialed bank based on the predefined calling information.

At step 3002b, a phone number of a destination is dialed from device 102. Caller 106 may dial the phone number of a destination from one or more destinations, such as destinations 108a-n. At step 3004b, a visual IVR menu associated with the dialed number and a scheduling mode option 2720 is displayed at device 102. As discussed with reference to FIG. 3A, visual IVR menu 2702 and scheduling mode option 2720 may be displayed on display 302 of device 102. In an embodiment, caller 106 may interact with the dialed destination and request for information, by selecting one or more options of the visual IVR menu. In an embodiment, the requested information may not be available at the dialed destination at the time of the call. Therefore, in such a case caller 106 may need to dial the destination again or caller 106 may schedule a call at later time. At step 3006b, device 102 is switched to a scheduling mode. Caller 106 selects scheduling mode option 2720 for switching device 102 to the scheduling mode. As discussed with reference to FIGS. 1A and 27, in scheduling mode Visuphone 104 may save inputs such as predefined calling information from caller 106. The predefined calling information may include selection information and a call schedule.

At step 3008b, Visuphone 104 saves the selection information including the one or more options of the displayed visual IVR menu. The one or more options are selected by caller 106. Thereafter, a display 2700 of device 102 switches to display 2900 including calendar 2904 and time input box 2906. Caller 106 may enter the date and time information in calendar 2904 and time input box 2906 respectively. At step 3010b, Visuphone 104 saves the call schedule including the date and time information.

At step 3012b, it is checked whether the entered date and time, corresponding to call schedule, has arrived. Visuphone 104 may perform the checking by comparing the date and time (corresponding to call schedule information) with the current date and time. In an embodiment, Visuphone 104 determines the current date and time based on the system clock and/or internet. If the call schedule's date and time is not equal to current date and time, then, at step 3014b, the process waits for the call schedule's date and time to arrive, otherwise the process control goes to step 3016b. At step 3016b, Visuphone 104 dials the phone number of the destination. Visuphone 104 dials the phone number of the destination based on the call schedule of the predefined calling information and without any user intervention. Thereafter, Visuphone 104 may establish a connection with the dialed destination.

At step 3018b, Visuphone 104 requests information from the dialed destination based on the selection information of the predefined calling information. In an embodiment, the requested information may not be available at the dialed destination at this time, so Visuphone 104 may wait for the predefined interval and may dial the phone number of the destination again. Examples of the predefined time interval may include, but are not limited to, thirty seconds, one minute, five minutes, ten minutes, twenty minutes, and so forth. In another embodiment, the dialed destination may transfer the request for the information by Visuphone 104 to the server, when the information is not available at the dialed destination. In another embodiment, when the information is not available at the dialed destination, the request of the information may be transferred to another destination of destinations 108a-n. In an embodiment, caller 106 may interact with the dialed destination after establishment of the connection by Visuphone 104.

At step 3020b, the requested information is received at device 102. The dialed destination may send the requested information to device 102 based on the availability of the information. In an embodiment, the requested information may be received from the other destination of destinations 108*a-n*. In yet another embodiment, Visuphone 104 may receive requested information from the server. In an embodiment, Visuphone 104 may convert the format of the received information from a first format to a second format. In an embodiment, the first format of the received information may be an audio format. Examples of the audio format include, but are not limited to, WAV, Real Audio, Musical Instrument Digital Interface (MIDI), Windows Media Audio (WMA), MP3, Ogg, and so forth. In an embodiment, the second format may be a text format such as a Unicode text, Rich Text format, Hypertext Markup Language (HTML) or any other format compatible with device 102.

At step 3022*b*, Visuphone 104 saves the received information at device 102. In an embodiment, the saved information may be accessed by caller 106 in real time. In another embodiment, the saved information may be accessed by caller 106 later. At step 3024*b*, Visuphone 104 displays the received information on display 302 of device 102.

According to an embodiment of the invention, Visuphone 104 may send one or more data packets (or messages) for establishing a connection or communication session in a communication network 3100 as illustrated in FIGS. 31A-D.

FIGS. 31A-D illustrates exemplary environments, where various embodiments of the invention can function. Communication network 3100 includes a device 3102*a*. In an embodiment, communication network 3100 may include different types of devices 3102*a-n*. Herein after, device 3102*a* may be referred as a first communication device. A person skilled in art will appreciate, that communication network 3100 may also include a plurality of devices 3102. Examples of communication network 3100 include, but are not limited to, the Internet, PSTN, Local Area Network (LAN), Wide Area Network (WAN), Metropolitan Area Network (MAN), and so forth. In an embodiment, communication network 3100 can be a data network such as the Internet. The data network is a network capable of establishing data and voice communication among various communication devices. In an embodiment, communication network 3100 can be a telecommunication or telephone network capable of establishing only voice communication among various communication devices.

Further, communication network 3100 includes a second communication device 3108*a*. In an embodiment, communication network 3100 may include a plurality of second communication devices 3108. A caller 3106 may use first communication device 3102*a* to connect to second communication device 3108*a*. First communication device 3102*a* can be a telecommunication device that can connect directly to a PSTN 3110. A person skilled in the art will appreciate, that first communication device 3102*a* can also connect to a private telephone exchange Examples of first communication device 3102*a* include, but are not limited to, a telephone, a mobile phone, a smart phone or any other device capable of voice or data communication. Caller 3106 may dial a phone number associated with second communication device 3108*a* for connecting to second communication device 3108*a*. First communication device 3102*a* may have one or more associated phone numbers, which may be used by other devices for connecting to first communication device 3102*a*. Similarly, each of the plurality of second communication device 3108 may have associated at least one phone number. In another embodiment, first communication device 3102*a* may include a plurality of visual IVR menus corresponding to phone numbers of the plurality of second communication devices 3108.

Figure 31A:
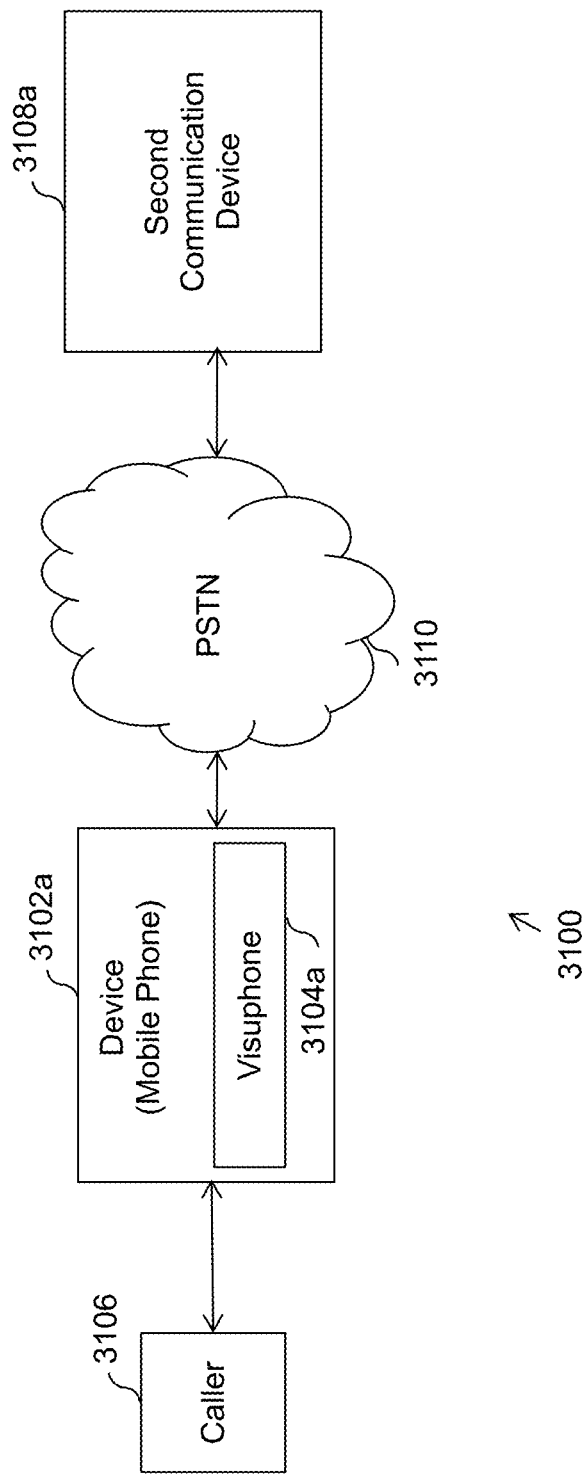

In an embodiment, first communication device 3102*a* may include an IVR application. In an embodiment, first communication device 3102*a* may include the IVR application such as Visuphone 3104*a* as shown in FIG. 31A. Visuphone 104*a* may provide data regarding a phone number of second communication device 3108*a* dialed by caller 3106. For example, the data may include geographical information or services provided by second communication device 3108*a-n*. Second communication device 3108*a* includes an IVR system. The IVR system allows caller 3106 to interact automatically with second communication device 3108*a*. When caller 3106 dials a phone number and connects to second communication device 3108*a*, an audible IVR menu may be played to caller 3106. Second communication device 3102*a* can have more than one IVR menus. Visuphone 3104*a* may display a visual IVR menu on first communication device 3102*a* corresponding to the audible IVR menu associated with the phone number of second communication device 3108*a* to be connected.

Second communication device 3108*a* can be a device capable of data/voice communication. Examples of second communication device 3108*a* include, but are not limited to, a telephone, a computer, a laptop computer, a tablet computer, a palm computer, a personal digital assistant (PDA), a mobile phone, a smart phone, and so forth. Various types of second communication device 3108*a* that implement the audible IVR menu include, for example, banks, hotels, fast-food outlets, utility services providers, corporate offices, mobile phone service providers, hospitals, and so forth. Further, second communication device 3108*a* can have more than one audio/visual IVR menus. Typically, the audible IVR menu provided by second communication device 3108*a* comprises audible options or instructions. In an embodiment, the visual IVR menu includes one or more text and/or graphical representation of different nodes corresponding to different nodes of the audio IVR menu.

In an embodiment, Visuphone 3104*a* may send or receive one or more messages to or from second communication device 3108*a* for establishing a communication session in communication network 3100. The one or messages may be sent as data packets when a data network such as the Internet is available. In an embodiment, the one or more messages may be sent as DTMF signals or tones. After establishing a communication session with second communication device 3108*a*, caller 3106 can interact with second communication device 3108*a* via the visual IVR menu associated with second communication device 3108*a*.

In an embodiment, first communication device 3102*a* may receive an acknowledgement message from second communication device 3108*a*. In an embodiment, the acknowledgement message is received only when second communication device 3108 includes an IVR application such as Visuphone. The Visuphone will have similar functionality as explained in above figures.

Figure 31B:
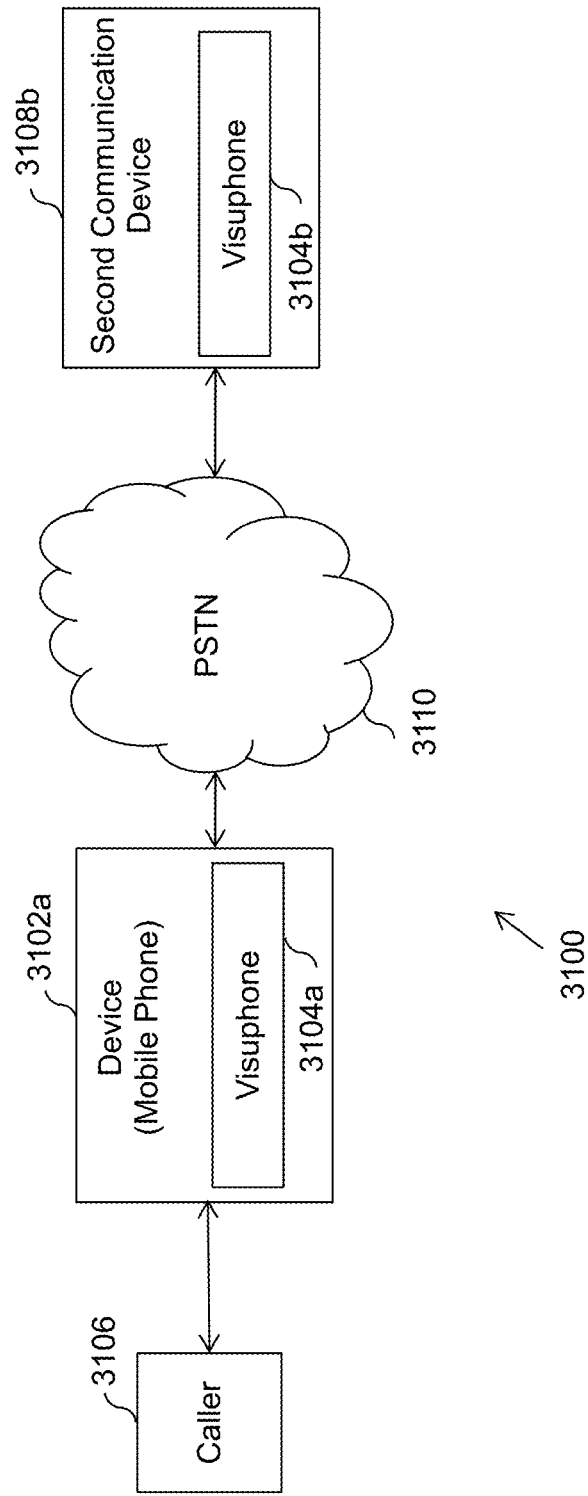

In an embodiment, second communication device 3108 such as a second communication device 3108*b* may include an IVR application such as Visuphone 3104*b* as shown in FIG. 31B. As shown communication network 3100 may further include a second communication device 3108*b* (herein after second communication device 3108 may be used to refer second communication device 3108*b* and second communication device 3108*a* collectively or interchangeably). Visuphone 3104*b* may send or receive one or more messages including information such as acknowledgment to or from first communication device 3102*a*. Visuphone 3104*b* is capable of sending messages required to establish a communication session with first communication device 3102*a*.

Figure 31C:
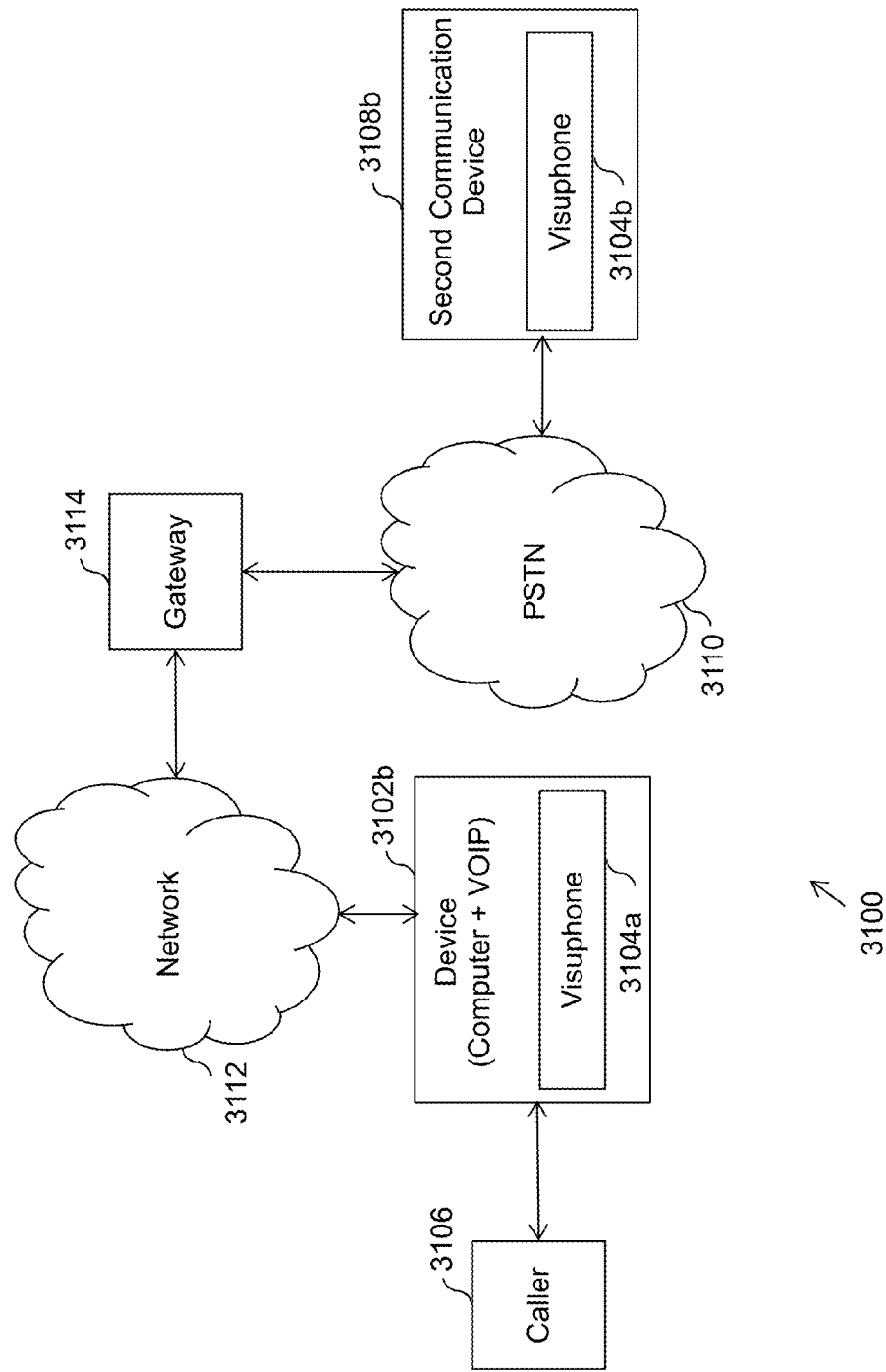

FIG. 31C illustrates another exemplary environment where communication device may exchange one or more messages or data packets for establishing communication session, in accordance with an embodiment of the invention. As shown, first communication device 3102b can be a communication device that may be connected directly to a network 3112. Examples of first communication device 3102b include, but are not limited to, a personal computer, a laptop, a mobile phone, a smart-phone, a fixed line telephone, a tablet computer, a palmtop computer, a Voice Over Internet Protocol (VOIP) phone or other devices capable of voice or data communication. Examples of network 3112 include any wired or wireless network, such as but not limited to, LAN, WAN, a Wi-Fi network, WiMAX, $3^{rd}$ Generation network, $4^{th}$ generation network, Long Term Evolution (LTE) network, Universal Mobile Telecommunication Systems (UMTS) network, IEEE 802.16m, LTE Advanced network, Mobile WiMAX, IEEE 802.20, Flash-OFDM, HIPERMAN, iBurst, HSDPA, Global System for Mobile communications (GSM), Code Division Multiple Access (CDMA), Evolution Data Optimized (EV-DO), General Packet Radio Service (GPRS), Enhanced Data rates for GSM Evolution (EDGE), High Speed Packet Access (HSPA), High-Speed Downlink Packet Access (HSDPA), Mobile Broadband Wireless Access (MBWA), and so forth. Further, first communication device 3102b may include various applications or computer programs that enable caller 3106 to use first communication device 3102b for dialing a phone number of second communication device 3108a-n through PSTN 3110 over network 3112 through a gateway 3114. For example, the applications may be VOIP applications, such as but not limited to, Skype, Magic Jack, Google Talk, and so forth. As discussed with reference to FIG. 31A and FIG. 31B, second communication device 3108b (or 3108a) presents the audible IVR to first communication device 3102b.

Further, Visuphone 3104a may search or detect a data network. In an embodiment, Visuphone 3104a may send one or more messages in the form of data packets to second communication device 3108b, when a data network such as the Internet is detected or available. Further, Visuphone 3104a may establish a communication session with second communication device 3108b by exchanging one or more messages or data packets. Furthermore, Visuphone 3104a may send a first section of a data packet including first information such as header information to second communication device 3108b. In an embodiment, Visuphone 3104a may receive a message including acknowledgement information from second communication device 3108b. In an embodiment, the acknowledgement message is received at first communication device 3102b, when second communication device 3108b includes an IVR application such as Visuphone 3104b as shown in FIG. 31B. The acknowledgement message may be received based on the first section of the data packet. Thereafter, Visuphone 3104a of first communication device 3102b may send a second section of the data packet including second information such as a payload. In an embodiment, the Visuphone 3104a may exchange one or messages with Visuphone 3104b or second communication device 3108a in form of DTMF signals or tones.

Figure 31D:
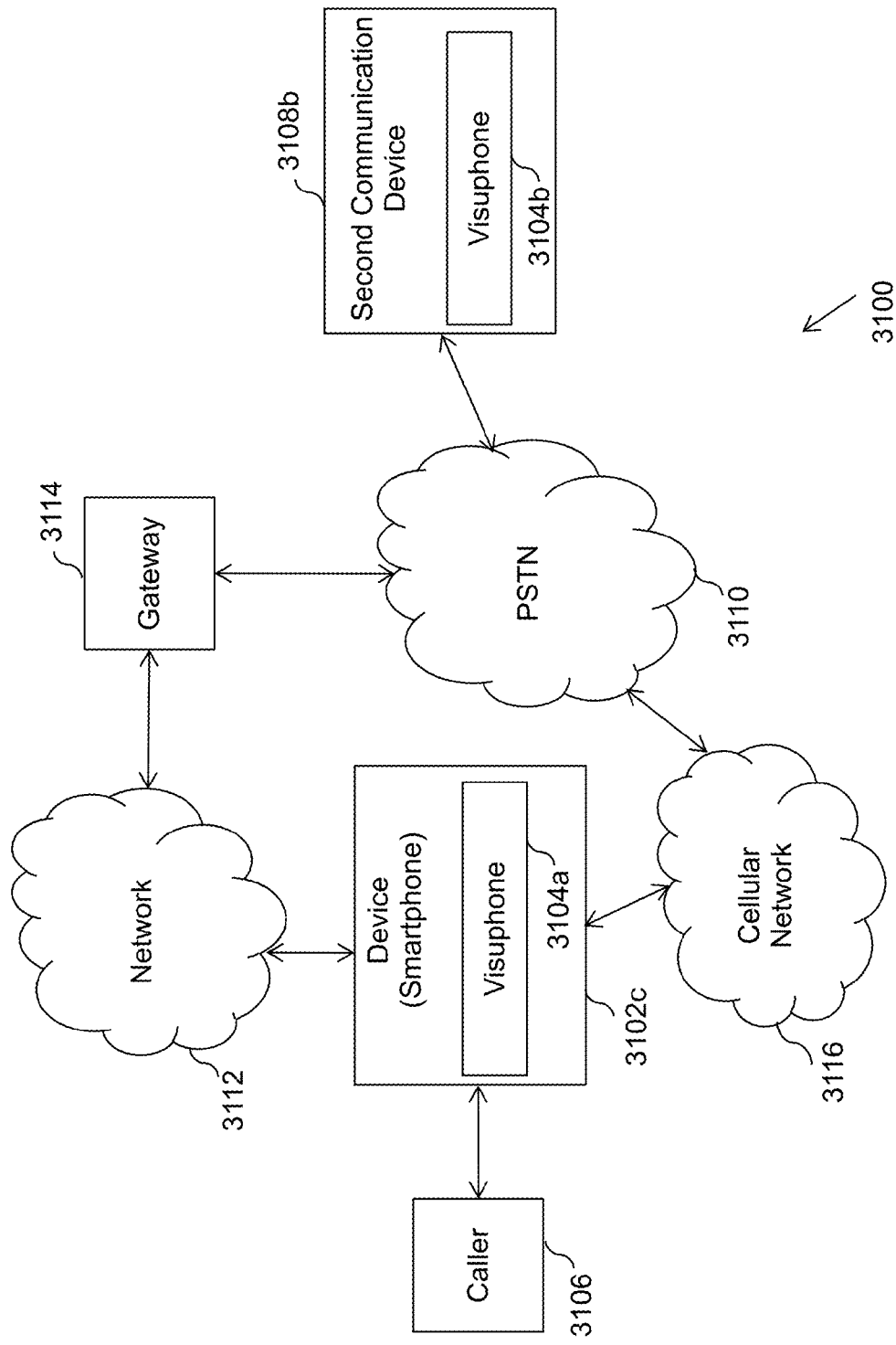

As illustrated in FIG. 31D, first communication device 3102c can be connected to the PSTN 3110 through network 3112 or through a cellular network 3116. Various service providers provide multiple or overlapping services to customers. For example, cable television service provider may also provide phone and network service, optical network provider may also provide phone or television services, Long Term Evolution (LTE) service provider that provides Internet or cable TV service, WiMAX service providers that provide phone service, and so forth. Network 3112 may be any service provider that provides such services, for example, but not limited to, cell phone services, wireless services, network services, cable television services, or various combinations of the above or other type of services.

First communication device 3102c includes Visuphone 3104a which displays data corresponding to the dialed phone number of second communication device 3108b (or 3108b). Further, Visuphone 3104a may display a visual IVR menu corresponding to the audible IVR menu of the dialed phone number of second communication device 3108b (or 3108a). In an embodiment, the visual IVR menu may be displayed when a call is received from second communication device 3108b. Thereafter, caller 3106 may select one or more options from the displayed visual IVR menu. In an embodiment, the visual IVR menu may have an associated identity (ID) or number. The visual IVR menu will indicate the version information of the visual IVR menu. In an embodiment, Visuphone 3104a may send selection information including one or more options selected by caller 3106 to second communication device 3108b. In an embodiment, Visuphone 3104a may receive the audio/visual IVR menu from second communication device 3108b when a latest version of the visual IVR menu is not available at first communication device 3102c. In an embodiment, the dialed second communication device 3108b may request the information from the server of communication network 3100 when the information requested by Visuphone 3104a is not available at second communication device 3108b. Thereafter, second communication device 3108b may send the information received from the server to Visuphone 3104a. Visuphone 3104a may further request and/or receive information from the dialed second communication device 3108b. Further, Visuphone 3104a may display the information at first communication device 3102c. In an embodiment, Visuphone 3104a may include version information. The version information may be a combination of numbers, alphabets or an alphanumeric code indicating a version of Visuphone 3104a. Herein after, first communication device 3102 may be used to refer first communication device 3102a-c collectively.

FIG. 32 illustrates an exemplary packet 3202 sent from first communication device 3102 (or device 3102) to second communication device 3108, in accordance with an embodiment of the present invention. In an embodiment, Visuphone 3104a of first communication device 3102 may send the packet 3202 to second communication device 3108 for establishing a communication session when a data network such as the Internet is available. Examples of packet 3202 include but are not limited to an Internet Protocol version 4 (IPv4) packet, an Internet Protocol version 6 (IPv6) packet, and so forth. In an embodiment, packet 3202 includes a first section 3202a and a second section 3202b. First section 3202a of packet 3202 includes first information. In an embodiment, first section 3202a may include header information. Examples of the first information include, but are not limited to, a Visuphone version, a visual menu identity (ID) of the visual IVR menu associated with second communication device 3108, an ACK bit, and so forth. The Visuphone version indicates the version information of Visuphone 3104a present at first communication device 3102. The visual menu ID indicates the identity information of the visual IVR menu associated with the dialed phone number of second communication device 3108. In an embodiment, the ACK or acknowledgement bit may be used by second communication device 3108 (or 3108b) to send an acknowledgement message. In an embodiment, the ACK bit may have a value such as 0 or 1. For example, second communication device 3108 may set the ACK bit or acknowledgement bit to 1 and send it back to first communication device 3102 as an acknowledgement message. A value 1 in the ACK bit indicates that the message is an acknowledgement message for a previously sent message or section of the packet. In an embodiment, second communication device 3108 sends the acknowledgement message when second communication device 3108 includes Visuphone 3104b as shown in FIG. 31B. The ACK bit set as 1 indicates that the packet sent from first communication device 3102 has been received at second communication device 3108. In an embodiment of the invention, first section 3202a may be a header section of IPv6 packet. The structure of header section or first section 3202a is shown in FIG. 33.

In an embodiment, second section 3202b of packet 3202 may include second information. Examples of the second information include, but are not limited to, a user ID, user options (selected from the visual IVR menu), user profile information (last dialed details), and so forth. In an embodiment, the second section may include a data or payload section. The user ID is the identity information of caller 3106 dialing the phone number of second communication device 3108. The user options indicate selection information including the one or more options selected from the displayed visual IVR menu. Visuphone 3104a displays the visual IVR menu associated with second communication device 3108 when the caller dials the phone number of second communication device 3108. The user profile indicates the information related to previous communication session or activities of caller 3106 or first communication device 3102. The user profile indicates information such as last dialed numbers, time of last call, duration of last call to the second communication device 3108, access pattern of caller 3106, and so forth. In an embodiment, second section 3202b may be a payload or data section of IPv6 packet. In an embodiment, the information of first section 3202a and second section 3202b may be sent separately as two different packets by Visuphone 3104a. In an embodiment first section 3202a and second section 3202b may be sent in form of DTMF tones or signals. The messages are sent in form of DTMF tones when the data network is not available.

FIG. 33 illustrates an exemplary structure of first section 3202a of packet 3202 sent to second communication device 3108, in accordance with an embodiment of the invention. In an embodiment, first section 3202a of packet 3202 may be a header section of IPv6 packet. Further, first section 3202a may include a plurality of fields. Example of plurality of fields include, but are not limited to, a packet version 3302, a traffic class 3304, a flow label 3306, a payload length 3308, a next header 3310, a hop limit 3312, a source address 3314, a destination address 3316, and so forth. Packet version 3302 indicates version information associated with packet 3202 such as IPv4, IPv6, and so forth. The version information may include numeric characters, alphabets or a combination thereof. In an embodiment of the invention, traffic class 3304 field may indicate whether the source device i.e. first communication device 3102 provides congestion control management or not. Flow label 3306 field may be used to provide real time applications special services. Payload length 3308 field may indicate the size or length of the payload or data section (second section 3202b). Next header 3310 field points to next element or packet in the chain of packets when multiple packets are sent. Hop limit 3312 field may indicate the number of stops or hops the packet may take before reaching the final destination or second communication device 3108. Source address 3314 field may include the address of first communication device 3102. Destination address 3316 field may be address of second communication device 3108. In an embodiment, destination address 3316 field may be the address of next hop of packet 3202.

FIG. 34A illustrates a flowchart for establishing communication among a plurality of communication devices, in accordance with an embodiment of the invention. As discussed with reference to the FIGS. 31A and 31B, communication network 3100 includes first communication device 3102. Further, communication network 3100 includes second communication device 3108. In an embodiment, first communication device 3102 may include Visuphone 3104a. In an embodiment, second communication device 3108b includes an IVR application such as Visuphone 3104b, as shown in FIG. 31B. In another embodiment, second communication device may not include Visuphone, as shown in FIG. 31A.

At step 3402a, a first communication device 3102 may send a first section of a data packet to a second communication device 3108. The first section of the data packet may include first information or header information. Further, the first section may be sent based on a visual IVR menu associated with at least one IVR system. In an embodiment of the invention, Visuphone 3104a may send the first section to second communication device 3108. At step 3404a, an acknowledgement message from second communication device 3108 may be received at first communication device 3102. In an embodiment of the invention, Visuphone 3104a may receive the acknowledgement message. In an embodiment of the invention, the acknowledgement message is sent by second communication device 3108 based on the first section of the data packet. The acknowledgement message may be sent to confirm the receipt of the first section of the data packet at second communication device 3108. Thereafter, at step 3406a, first communication device 3102 may send a second section of the data packet to second communication device 3108. The second section may include second information. Further, the second section of the data packet may be sent based on the acknowledgement message.

FIG. 34B illustrates a flowchart for establishing communication among a plurality of communication devices, in accordance with another embodiment of the invention. At step 3402b, first communication device 3102 may dial a phone number of second communication device 3108. At step 3404b, first communication device 3102 may detect a data network. In an embodiment of the invention, the data network may be the Internet. In an embodiment, the data packet may be an IPv4 packet, an IPv6 packet, and so forth. As discussed with reference to FIG. 33, the first section of the packet includes first information or header information. Examples of the first information include, but are not limited to, a Visuphone version, a visual menu identity (ID) associated with the visual IVR menu corresponding to second communication device 3108, an ACK bit, hop limit, payload length, traffic class, and so forth. Thereafter at step 3406b, first communication device 3102 may send a first section of a data packet to second communication device 3108 when the data network is available. In another embodiment, when the data network is not detected, first communication device 3102 may send the first section to second communication device 3108 as DTMF signals or tones.

FIGS. 34C and 34D illustrate a flowchart for communicating among a plurality of communication devices, in accordance with yet another embodiment of the invention. As discussed with reference to the FIGS. 31A and 31B, communication network 3100 includes first communication device 3102 and second communication device 3108. First communication device 3102 may include Visuphone 3104a. In one embodiment, second communication device 3108b may include an IVR application such as Visuphone 3104b, as shown in FIG. 31B. In another embodiment, second communication device may not include Visuphone as shown in FIG.

31A. Visuphone 3104a of first communication device 3102a may send one or more messages or packets to second communication device 3108. The messages may be sent as Dual-Tone Multi-Frequency (DTMF) or tones depending on the availability of the data network. Similarly, Visuphone 3104b may receive or send one or more messages/packets from/to first communication device 3102. Further, Visuphone 3104a may display the visual IVR menu associated with a phone number of second communication device 3108. First communication device 3102 includes one or more visual IVR menus associated with a plurality of second communication devices.

Caller 3106 may dial a phone number of second communication device 3108. In an embodiment, Visuphone 3104a may display a visual IVR menu associated with the dialed second communication device 3108. At step 3402c, Visuphone 3104a of first communication device 3102 searches for a data network such as the Internet. At step 3404c, an availability of the data network is checked. When the data network is available the process continues to step 3408c else the process control goes to step 3406c. At step 3406c, Visuphone 3104a sends a first section of the packet to second communication device 3108, such as second communication device 3108b, as DTMF signals or tones. As discussed with reference to FIG. 33, first section may include a first information or header information. Thereafter, first communication device 3102 and second communication device 3108 may further communicate through the exchange of DTMF tones or signals.

At step 3408c, Visuphone 3104a sends a first section of the packet as a data packet to second communication device 3108a when the data network is available. In an embodiment, the data packet may be an IPv4 packet, an IPv6 packet, and so forth. As discussed with reference to FIG. 33, the first section of the packet includes first information. Examples of the first information include, but are not limited to, a Visuphone version, a visual menu identity (ID) associated with the visual IVR menu corresponding to second communication device 3108, an ACK bit, hop limit, payload length, traffic class, and so forth. The Visuphone version field indicates the version information of the Visuphone 3104a present at first communication device 3102. In an embodiment, the visual menu ID field may indicate the identity information of the visual IVR menu associated with the dialed phone number of second communication device 3108. The ACK bit or acknowledgement bit may be used by second communication device 3108 to send an acknowledgement message when the first section is received. In an embodiment, the ACK bit may have a value such as 0 or 1.

At step 3410c, it is checked, at second communication device 3108, whether a Visuphone is available at second communication device 3108. If the Visuphone is not available, first communication device 3102 and second communication device 3108 may communicate by exchanging messages/information as DTMF tones or signals else process control goes to step 3412c. At step 3412c, an acknowledgement message based on the first section is received from second communication device 3108. In an embodiment, the acknowledgement message is received based on the first information of the first section. In an embodiment, Visuphone 3104b of second communication device 3108b sends the acknowledgement message to first communication device 3102.

At step 3414c, Visuphone 3104a sends a second section of the packet including second information to second communication device 3108 such as to second communication device 3108b. Examples of the second information include, but are not limited to, a user ID, user options (selected from the visual IVR menu), user profile information (last dialed details), and so forth. The user ID is the identity information of caller 3106 who dials the phone number of second communication device 3108. The user options indicate selection information including the one or more options selected from the displayed visual IVR menu. The visual IVR menu is associated with the phone number of second communication device 3108 dialed from first communication device 3102. Visuphone 3104a may display the visual IVR menu associated with second communication device 3108. The user profile indicates the information related to previous communication session or activities of caller 3106 or first communication device 3102. The user profile indicates information such as last dialed numbers, time of last call, duration of last call to second communication device 3108, and so forth.

In an embodiment, Visuphone 3104a may send header information as a first section of the packet and data or payload as second section of the packet. In an embodiment, first communication device 3102 may send the second section of the packet after receiving an acknowledgement message from second communication device 3108. In an embodiment, the first section and the second section of the packet may be sent as a single packet 3202, as shown in FIG. 32.

FIGS. 35A, 35B, and 35C illustrate an exemplary communication network where a call is received at a device from a first party device, in accordance with various embodiments of the invention function. Specifically, in FIG. 35A, a device 3502a may receive a call from a plurality of first party devices 3508a-n in a communication network 3500. A person skilled in art will appreciate, that communication network 3500 may also include different types of devices. Further, communication network 3500 may include a plurality of device 3502. First party devices 3508a-n may initiate a call to connect to device 3502a. First party devices 3508a-n are devices which are capable of data/voice communication. Examples of first party devices 3508a-n include, but are not limited to, a telephone, a computer, a laptop computer, a personal digital assistant (PDA), a mobile phone, a tablet computer, a palmtop computer, and so forth. Each of first party devices 3508a-n may have associated one or more phone numbers. Further, each of first party devices 3508a-n may have audio or visual IVR menu corresponding to the associated one or more phone numbers. Various types of organization which implement audio IVR systems such as, but are not limited to, banks, hotels, fast-food outlets, utility services providers, corporate offices, mobile phone service providers, hospitals, and so forth. An agent or customer care executive, a person associated with the organizations may use first party devices 3508a-n for initiating calls to devices 3502a-n. Typically, the audible IVR menu provided by first party devices 3508a-n comprises audible options or instructions. Further, the visual IVR menu includes one or more text and/or graphical representation of different nodes corresponding to different nodes of the audio IVR menu as displayed in FIG. 2A and FIG. 2B.

A caller 3506 may connect to a first party device of the first party devices 3508a-n either by accepting a call from the calling first party device or by dialing a phone number of first party device 3508a. After establishing a connection with first party device 3508a, caller 3506 can interact with first party device 3508a via the IVR menu associated with first party device 3508a. Further, first party devices 3508a-n can send information to device 3502a. Similarly, device 3504a may also request information from first party devices 3508a-n. Device 3502a can be a telecommunication device that can connect directly to a PSTN 3510. A person skilled in the art will appreciate, that device 3502a can also connect to a private telephone exchange.

A Visuphone 3504 of device 3502a can display a visual IVR menu associated with the calling first party device. In an embodiment, Visuphone 3504 may display the visual IVR menu at device 3502a even before accepting the call by caller 3506. Thereafter, caller 3506 can select one or more options from the displayed visual IVR menu to obtain the required resource/information or service from the calling first party device 3508a. Furthermore, Visuphone 3504 may display one or more communication options on a screen of device 3502a. Examples of the communication options include, but are not limited to, a conferencing option, a call forwarding option, a busy option, and so forth. Caller 3506 can select a communication option from the displayed one or more communication options. Based on the selection by caller 3506 a communication session may be established between device 3502a and the calling first party device 3508a. In an embodiment, when caller 3506 selects the 'conferencing' option, another device of communication network 3500 may be included in the call with first party device 3508a.

In an embodiment of the invention, device 3502a can request and/or receive updates from the server. This may happen in a case when requested information is not available on the calling first party device. Device 3502a may also request information from first party device 3508a from which the call is received. In an embodiment of the invention, device 3502 may receive updates from the server through one or more messages, such as, but not limited to, Short Messaging Service (SMS) message, Multimedia Messaging Service (MMS) message, and so forth.

Further, FIG. 35B illustrates another exemplary communication network in which an IVR menu is displayed when a call is received from a first party device, in accordance with an embodiment of the invention. A device 3502b can be a communication device that can be connected directly to a network 3514. Examples of device 3502b include, but are not limited to, a personal computer, a laptop, a mobile phone, a smartphone, a fixed line telephone, a tablet computer, a set top box, a television, an I-Pod, a music player, a VOIP phone or other devices capable of voice or data communication. Device 3502b may include various applications or computer programs such as Skype, Magic Jack etc, that enable caller 3506 to use device 3502b for receiving and/or accepting call from first party devices 3508a-n through PSTN 3510 over network 3514 through a gateway 3512. Network 3514 may include any wired or wireless network, such as but not limited to, WiMAX, $3^{rd}$ Generation network, $4^{th}$ generation network, Long Term Evolution (LTE) network, Universal Mobile Telecommunication Systems (UMTS) network, IEEE 802.16m, LTE Advanced network, Mobile WiMAX, IEEE 802.20, Flash-OFDM, HIPERMAN, iBurst, HSDPA, Global System for Mobile communications (GSM), Code Division Multiple Access (CDMA), Evolution Data Optimized (EV-DO), General Packet Radio Service (GPRS), Enhanced Data rates for GSM Evolution (EDGE), High Speed Packet Access (HSPA), High-Speed Downlink Packet Access (HSDPA), Mobile Broadband Wireless Access (MBWA), and so forth LAN, WAN, a Wi-Fi network, and so forth. As discussed with reference to FIG. 35A, first party devices 3508a-n presents the audible IVR to device 3502b. Visuphone 3504 will function in a similar manner as described in FIG. 35A.

As shown in FIG. 35C, a device 3502c can be connected to PSTN 3510 throug 3514 or through a cellular network 3516. Various service providers provide multiple or overlapping services to customers. For example, cable television service provider may also provide phone and network service, optical network provider may also provide phone or television services, cellular service providers, WiMAX service providers that provide phone service, and so forth. Network 3514 may be any service provider that provides such services, for example, but not limited to, cell phone services, wireless services, network services, cable television services, or various combinations of the above or other type of services. In an embodiment of the invention, Visuphone 3504 may display one or more communication options at device 3502c along with the visual IVR menu of the associated calling phone number of first party device 3508a. Caller 3506 may select a communication option from the displayed communication options for interacting with the calling first party device 3508a. In an embodiment, Visuphone 3504 may receive the visual IVR menu from first party device 3508a. In an embodiment, calling first party device 3508a may request the information requested by Visuphone 3504 or caller 3506, from the server of communication network 3500. Thereafter, calling first party device 3508a may send the information received from the server to Visuphone 3504. Visuphone 3504 may further request and/or receive information from calling first party device 3508a. Further, Visuphone 3504 may display the information at device 3502c.

FIG. 36 illustrates yet another exemplary communication network in which an IVR is displayed when a call is received at a device, in accordance with an embodiment of the invention. As discussed with reference to FIG. 35A, communication network 3500 includes first party devices 3508a-n which may initiate a call to the phone number associated with device 3502a. Further, communication network 3500 may include a third party device 3602. In an embodiment, communication network 3500 may include more than one third party device 3602. Device 3502a includes Visuphone 3504 that can receive the call from first party device 3508. Visuphone 3504 may further display a visual IVR menu associated with the calling first party device 3508. In an embodiment, device 3502a may be referred as a second party device.

Further, Visuphone 3504 can highlight an option or node in the visual IVR menu. The highlighted option represents the exact position of first party device 3508 within the visual IVR menu from where the call is initiated. For example, in case of a bank, if a person from insurance department initiates a call to a mobile phone, then the node representing the insurance is highlighted in the visual IVR menu of the bank displayed at the mobile phone. Therefore, caller 3506 can know exactly from which department within the organization the call is coming from. Accordingly, caller 3506 may act or opt to attend or reject the call from first party device 3508.

Further, Visuphone 3504 may display one or more communication options on a screen of device 3502a. Examples of the one or more communication options can include, but are not limited to, a conferencing option, a call forwarding option, a busy option, and so forth. Caller 3506 may select an option from the displayed communication options. Visuphone 3504 may establish a connection with a third party device based on the selection of the communication option by caller 3506. Third party device 3602 may be a device 3502, a first party device of first party devices 3508a-n, a server, and so forth depending on the selection of the communication option. Further, third party device 3602 may have an associated phone number.

In an embodiment, when caller 3506 selects a 'conferencing' option from the displayed one or more communication options then third party device 3602 may be included in the call. Now third party device 3602, device 3502a, and first party device 3508a from which the call was received initially may communicate through a conference call and can interact with each other. Thereafter, all three types of devices in the conference call may further request or receive information from each other. In an embodiment, third party device 3602 may be another device of communication network 3500. In an embodiment, Visuphone 3504 may further display a visual IVR menu associated with third party device 3602. In an embodiment, Visuphone 3504 of the device 3502*a* may receive the visual IVR menu associated with the phone number of third party device 3602. In an exemplary scenario, a user receives a call at a first mobile phone from an executive of the insurance department of a bank. The user may select a 'conferencing' option and can include another user of a second mobile phone who might be interested in knowing about the insurance policies offered by the executive. In an embodiment, caller 3506 of device 3502*a* may opt to leave the conference call in between of the call. Thereafter, first party device 3508*a* and third party device 3602 may continue with the call.

In an embodiment, caller 3506 may select a 'call forwarding' option of the displayed one or more communication options to forward the call coming from first party device 3508*a* to third party device 3602. Thereafter, a user of third party device 3602 may interact with first party device 3508*a*. For example, when a user of first mobile phone receives a call from a pizzeria, then a visual IVR menu of the pizzeria can be displayed at the mobile phone along with various communication options. The user may forward the call to a second mobile phone by selecting the 'call forwarding' option. Now, the call will be between the second mobile phone and the pizzeria. In an embodiment, third party device 3602 may include a Visuphone or IVR application. In another embodiment, third party device 3602 may include one or more audio and/or visual IVR menus. In an embodiment, a visual IVR menu associated with a phone number of third party device 3602 may be displayed on device 3502*a*. Further, Visuphone 3504 may receive the visual IVR menu associated with the third party device from third party device 3602.

FIG. 37 illustrates an exemplary visual IVR menu 3702 along with one or more communication options at device 3502*a*, in accordance with an embodiment of the invention. As discussed with reference to FIGS. 35A and 36, Visuphone 3504 may display the visual IVR menu 3702 associated with the phone number of calling first party device 3508 on the screen of device 3502*a*. The visual IVR menu is displayed with added graphics on the screen of device 3502. Visual IVR menu 3702 may include one or more options corresponding to every node in calling first party device 3508. It is well known that graphics are easier to learn and are faster to recognize than words. Therefore, graphics are used in various computerized device interfaces. Various types of graphics can be displayed for example, animated icons, icons that highlight or animate when the node is highlighted, and so forth. The graphics may be displayed for each node or a few nodes based on the usability of visual IVR menu 3702. For example, for node 3716 of home delivery, an icon of house may be displayed. In an embodiment of the invention, visual IVR menu 3702 can be customized to display only the text, only the icons or both. Furthermore, caller 3506 can suggest or use various icons based on his preferences. The visual IVR menu is specific to first party device 3508 from which call is received.

Further, each of first party devices 3508*a-n* may have more than one audio IVR menus. Therefore, different visual IVR menu corresponding to the one or more audio IVR menus is possible for each of first party devices 3508*a-n*. In an embodiment, device 3502 may include more than one visual IVR menus for each first party device of first party devices 3508*a-n* based on the time. Therefore, different visual IVR menus corresponding to a first party device 3508 might be presented to caller 3506 depending on the time of dialing to first party device 3508. In an exemplary scenario, in a hotel, the food items in a daytime menu card may be different from a night menu card. Accordingly, the options in the visual IVR menu may differ. Therefore, the visual IVR menus for daytime and night can be different for the hotel. When caller 3506 receives a call from the phone number of the hotel in daytime, a daytime visual IVR menu can be displayed at device 3502, and if caller 3506 receives a call at night, a different menu can be displayed at device 3502. Therefore, a visual IVR menu of the hotel displayed at device 3502 for a call received at 1 PM may be different then the visual IVR menu displayed for another call received at 5 PM.

Further, Visuphone 3504 may display the one or more communication options 3720*a-n* on the screen of device 3502. Examples of one or more communication options 3720*a-n* include, but are not limited to, a conferencing option, a call forwarding option, a busy option, and so forth. In an embodiment, when caller 3506 selects a 'busy' option from communication options 3720*a-n*, a text or audio message may be sent to calling first party device 3508. For example, when a user receives a call from a bank and selects the 'busy' option from the displayed visual IVR menu of the calling bank, then a customized or predefined message such as "I am busy right now, so please call later" can be sent to the bank. In an embodiment, the message may be an audio message.

In an embodiment, when caller 3506 accepts the call from first party device 3508, a communication session is established between device 3502 and calling first party device 3508. After communication session establishment, Visuphone 3504 of device 3502 may request and/or receive information from calling first party device 102. In an embodiment, caller 3506 may include third party device 3602 by selecting 'conferencing' option from displayed communication options 3720*a-n*. Thereafter, the three devices i.e. first party device 3508, second party device 3502, and third party device 3602 may have a conference call and can communicate with each other. In an embodiment, caller 3506 may include more than one third party device 3602 in the conference call. In an embodiment, third party device 3602 may include another communication device of communication network 3500 in the conference call. In another embodiment, the calling first party device such as first party device 3508*a* may include another first party device such as a first party device 3508*b* in the conference call. In another embodiment, first party device 3508 from which call is received may connect device 3502 to another first party device 3508*b* during the call.

FIG. 38 illustrates another exemplary visual IVR menu 3802 along with one or more communication options at device 3502*a*, in accordance with an embodiment of the invention. Visual IVR menu 3802 is a visual menu corresponding to an audio IVR menu of a bank. Visual IVR menu 3802 includes one or more options corresponding to every node in the audible IVR menu when the calling first party is the bank or an executive of the bank. Though not shown, nodes of visual IVR menu 3802 may be represented using graphics such as, animated icons, icons that highlight or animate when the node is highlighted, and so forth. Further, graphics may be displayed for each node or a few nodes based on the usability of visual IVR menu 3802. Visual IVR menu 3802 includes nodes such as personal banking node 3806, NRI banking node 3808. Caller 3506 can choose NRI banking by pressing a combination 1-3. Thereafter, caller 3506 can select investment option by pressing 2. Furthermore, caller 3506 can suggest or use various icons based on his preferences. The visual IVR menu is specific to a destination. For example, hospitals will have different IVR menu than that of the bank. In an embodiment, one or more communication options 3720*a-n* may also be displayed on the screen of device 3502. Caller 3506 can select a communication option of displayed communication options 3720*a-n*. Visuphone 104 may include a third party device as shown in FIG. 36 based on selection of the communication option.

Another embodiment of the invention allow visual IVR menu for calls received at a conventional home telephone. FIG. 39 illustrates the presentation of the visual IVR menu when a phone connection is associated with a wide band internet 'smart' modem. A phone 3904 connected to a PSTN 3908 and through a gateway 3916 to the Internet network 3918 is shown in FIG. 39. A first party device 3508*a* can call a phone number of the phone 3904. Internet network 3918 may be any service provider that provides services, for example, but not limited to, telephone services, cell phone services, wireless services, Internet services, cable television services, or various combinations of the above or other type of services. An embodiment of the invention allow visual IVR menu for calls received at a conventional home telephone.

Further, the connection to network 3918 is associated with a wide band Internet 'smart' modem 3906. Phone 3904 may be a regular phone, such as a landline phone or a cordless landline phone. Modem 3906 may be a Digital Subscriber Line (DSL) modem or a cable modem that connects the home device to the Internet and/or computer network. Modem 3906 is connected to a service provider, and can provide the home devices with telephone, Internet and television services. Modem 3906 may provide both wired and wireless connections. Modem 3906 provides the home with the Internet through wire 3910 to a computer 3902, or through a Wi-Fi connection. Modem 3906 comprises the ability to detect and recognize the calls received by phone 3904. The phone number of the call received by phone 3904 to establish connection are then compared with phone numbers stored in a database, such as visual menu database 308. Therefore, in case the calling phone number corresponds to first party device 3508*a* with an audible IVR menu, and also when associated visual IVR menu exists then, modem 3906 may provide the visual IVR menu on computer 3902 connected to it. Moreover, modem 3906 may use private web sites to present the visual IVR menu or just provide the phone number of the calling first party device 3508*a* to computer 3902. Thereafter, a software tool on computer 3902 may present the visual IVR menu on the screen of the computer 3902.

Once the communication session is established between first party device 3508*a* and phone 3904, the 'smart' modem 3906 will continue to monitor the numbers dialed or received by phone 3904 to browse or advance the visual IVR menu accordingly. Furthermore, the numbers dialed or received may be stored for future processing such as highlighting previous selections in the visual IVR menu, providing customized visual IVR menu and so forth. The visual IVR menu system comprising computer 3902 and modem 3906 may incorporate additional enhancements as presented before.

In another embodiment of the invention, a house television 3912 may be used to present the visual IVR menu. In various houses modem 3906 decodes television signals and transfers it to a set-top box 3914 that provides signals to television 3912. The visual IVR menu may be presented on a channel dedicated for IVR. Therefore, when phone 3904 is used to receive a call, modem 3906 can detect it and present the visual IVR menu corresponding to the phone number of the calling first party device 3508*a* on the designated channel of the television 3912. Modem 3906 may further display one or more communication options 3720*a-n* on the designated channel of the television 3912. Further, all the options described before can be provided now using the screen of the television 3912 for the visual IVR menu. The caller selection can be done by using the simple phone 3904 or alternatively using TV 3912, set top box 3914 remote control. Further, television 3912 screen may be used to present the visual IVR menu in a few alternatives ways. For example, a device provided by a company, named RokuInc., allows streaming of content from the Internet to television. Most set-top boxes now have an Internet connection or telephone connections. Furthermore, various devices such as some Digital Versatile Disc (DVD) players, and video game players or controllers such as Xbox or Play station, can be connected to the Internet. Each of those devices may allow the 'smart' modem 3906 to provide a visual IVR menu and/or the one or more communication options 3720*a-n* on the screens of television 3912.

FIG. 40 illustrates a flowchart for providing enhanced telephony when a call is received, in accordance with an embodiment of the invention. First party devices 3508*a-n* may call a phone number of device 3502. Device 3502 may receive a call from the phone number of first party devices 3508*a-n*. Caller 106 may accept call at device 3502 to connect or interact with first party devices 3508*a-n* and/or third party device 3602. First party devices 3508*a-n* may include an audible IVR menu for interaction with caller 3506. Further, device 3502 may include Visuphone 3504 to display a visual IVR menu 3702 associated with a phone number of a calling first party device 3508. Further, Visuphone 3504 may display the one or more communication options 3720*a-n* at device 3502, as discussed with reference to the FIG. 37. Visuphone 3504 may establish a communication session with the phone number of calling first party device 3508*a-n* by accepting the call. In an exemplary scenario, a user of the mobile phone receives a call from a bank, then 'conferencing' and 'call forwarding' options may also be displayed along with the visual IVR menu of the bank on the mobile phone. The user may select a 'conferencing' option to include another mobile device in the conference call. Similarly, the user may select the 'call forwarding' option to forward the call to another communication device or a server in communication network 3500.

At step 4002, a call from a phone number of a first party device 3508 such as a first party device 3508*a*, is received. The call may be received by Visuphone 3504 of device 3502. First party device 3508*a* may initiate a call to device 3502 by dialing a phone number of device 3502. At step 4004, the phone number of first party device 3508*a* is compared with a plurality of phone numbers stored at device 104. Visuphone 3504 may compare the phone number of first party device 3508*a* with the stored phone numbers.

A visual menu database may store the one or more phone numbers of first party devices 3508*a-n*. Further, the visual menu database stores one or more visual IVR menus associated with the phone numbers of first party devices 3508*a-n*. In an embodiment, it may be checked whether a visual IVR menu associated with the phone number of the calling first party device 3508*a* is present in the visual menu database of device 3502. If the visual IVR menu is not present, device 3502 may receive the visual IVR menu associated with first party device 3508*a* from first party device 3508*a*. In an embodiment, the visual IVR menu associated with first party device 3508*a* may be received from the server.

At step 4006, visual IVR menu associated with the calling first party device 3508*a* is displayed. The visual IVR menu may be displayed at the display of device 3502. The visual IVR menu includes one or more graphics and/or text options corresponding to different nodes as shown in FIG. 37. At step 4008, one or more communication options 3720*a-n* is displayed. One or more communication options 3720*a-n* may be displayed at a display of device 3502. Examples of one or more communication options 3720*a-n* include, but are not limited to, a conferencing option, a call forwarding option, a busy option, and so forth. At step 4010, caller 3506 of device 3502 may be enabled to select a communication option of the displayed one or more communication options 3720*a-n*. At step 4012, a communication session is established based on the selection by caller 3506. In an embodiment, caller 3506 may select the 'conferencing' option, to establish the communication session between first party device 3508*a*, device 3502 and third party device 3602. Thereafter, all the three devices can communicate/interact with each other and may request/receive information from each other. In another embodiment, caller 3506 may forward the call of first party device 3502*a* to another communication device of communication network 3500 by selecting the 'call forwarding' option. In an embodiment, the call may be forwarded to a server of communication network 3500. In another embodiment, caller 3506 may select the 'busy' option when caller 3506 cannot attend the call. Selecting the 'busy' option by the user may send a predefined audio/text message to calling first party device 3508*a*.

In another embodiment of the invention, a method is disclosed for displaying a visual IVR menu associated with a phone number of a first party device from which a call is received, at the device.

In an embodiment of the invention, more than one visual IVR menus associated with the phone numbers of the first party devices may be displayed at a communication device. In an embodiment, the Visuphone may display the one or more visual IVR menus at the communication device. In another embodiment of the invention, the user may request information from more than one first party device simultaneously. The user may interact with more than one visual IVR menus associated with different first party devices. In an embodiment, the one or more visual IVR menus may be associated with the second party device. For example: a user receives a call from an insurance department of a bank offering some insurance policy to the user. When the user accepts the call a visual IVR menu associated with the bank with the insurance department highlighted is displayed on the screen of the device. During the call, if the user wish to check his/her account balance to take a decision regarding insurance policies. The user may check his/her account balance by selecting the personal banking option from the visual IVR menu of the bank. As soon as the user selects this option another visual IVR menu of the personal banking will be displayed on the screen of the communication device. Thereafter, the user may simultaneously interact with both the visual IVR menus.

In an embodiment of the invention, the user may request information from more than one first party device simultaneously. The user may interact with more than one visual IVR menus associated with different first party devices. For example: a user gets a call from a restaurant offering different types of cuisine. When the user accepts the call a visual IVR menu associated with the restaurant is displayed at the screen of the device. During the call, if the user wishes to check menus of two or more cuisines, the user may select from the main visual IVR menu of the restaurant. Based on the selection by the user, the two or more visual IVR menus may be displayed at the device. Thereafter, the user may simultaneously interact with the displayed visual IVR menus.

According to an embodiment of the invention, portable devices such as smart phones, mobile phones, land line phone, and so forth may also include Visuphone and can connect to external devices. Usually the display screen of portable device is small and not so user friendly. The Visuphone of such devices may be configured to automatically detect external devices such as a laptop, a computer, an LCD screen etc present in its vicinity. Further, the detected electronic devices are configured to connect with the portable devices. This functionality of the Visuphone has been explained in detail using FIG. 41 to FIG. 64.

FIG. 41 illustrates an environment 4100 where a device may be connected to an external device, according to an embodiment of the invention. Environment 4100 includes a portable device 4102 including a Visuphone 4104. Examples of portable device 4102 include but are not limited to a mobile phone, a smart phone, a Personal Desktop Assistant (PDA), a tablet Personal Computer (PC), a laptop, a computer, a set top box, a printer, and so forth. Environment 4100 further includes a plurality of external devices 4106*a-n*. Portable device 4102 may be used for data and voice communications. In an embodiment of the invention, portable device 4102 may include an Operating System (OS) such as, but not limited to, Windows Mobile, Apple iOS, Google Android, Symbian, and so forth. Portable device 4102 may be connected to multiple external devices 3506*a-n*. Examples of external devices 3506*a-n* include, but are not limited to, a display screen, a laptop, an electronic musical instrument, a keyboard, a mouse, and so forth.

Portable device 4102 may connect to external devices 4106*a-n* by using Bluetooth, Wi-Fi, Infrared, IEEE 802.11, IEEE 802.15.4, ZigBee, SimplicityTI, TI-MAC, RemoTI, or Radio Frequency 4 for Consumer Electronics (RF4CE), other wireless protocols. Further, portable device 4102 may connect to external devices 4106*a-n* by using an Ethernet cable, a video cable, Universal Serial Bus (USB), and so forth. When connected to the external device such as a display screen, the display of the external device may be used to display the content of screen of portable device 4102. Moreover, external device 4106*b* such as a mouse connected to portable device 4102, can be used to provide inputs that are reflected on the display of the external device. As a result, portable device 4102 can act as a universal communication hub that can enable interaction of multiple external devices 4106*a-n* among each other.

FIG. 42 illustrates exemplary functioning of portable device 4102 in the environment discussed in conjunction with FIG. 41, in accordance with an embodiment of the invention. As shown, a display screen 4202, a keyboard 4204, and a mouse 4206 can be connected through portable device 4102. Therefore, the screen of portable device 4102 is displayed on a larger screen of display screen 4202. Moreover, a user can use keyboard 4204 and mouse 4206 to access the information through portable device 4102. For example, in this configuration, the user can browse the Internet by using display screen 4202, keyboard 4204, and mouse 4206, while portable device 4102 provides the Internet connectivity. Therefore, a computer other than portable device 4102 may not be required by the user. As a result, the user can carry portable device 4102 and use it with various external devices as desired.

In an embodiment of the invention, portable device 4102*a* such as a smart phone or mobile phone may detect and connect to a laptop 4302 as shown in FIG. 43. The connection between portable device 4102*a* and laptop 4302 may be wired such as via a USB wire or it can be wireless such as via Bluetooth or Wi-Fi. Thereafter, portable device 4102*a* may use display of laptop 4302. Further, laptop 4302 may be used to control one or more functions of portable device 4102*a* and vice versa. For example, user can use one or more keys of laptop 4302 may be used to access phone book of the smart phone or to dial a phone number.

In another embodiment of the invention, portable device 4102a may detect a large display screen 4402 as shown in FIG. 44. Further, portable device 4102a may use Bluetooth, USB wire, and so forth to connect to large screen 4402. The large screen 4402 may be a Light Emitting Diode (LED) display screen, a Liquid Crystal Display (LCD) screen, and so forth. Usually. Portable devices such as mobile phones, smart phones, wired telephones etc. have either a small display or limited display capabilities. In such cases, portable devices include a Visuphone. The Visuphone may be further configured to detect and connect portable device 4102 to one or more external devices such as large screen 4402. Once configured, the Visuphone can detect large display 4402 and can connect to it via Bluetooth. In an embodiment, the portable device 4102a may connect to external devices 4106a-n using Near Field Communication (NFC) protocol. Further, when portable device 4102a is video conferencing with another portable device, the video can be displayed at large screen 4402. For example, when the smart phone is in video call with another phone, the video of the user at another phone will be displayed at the large screen.

In another embodiment of the invention, portable device such as a smart phone 4102a may detect and connect to a television screen 4502 as shown in FIG. 45. Visuphone 4104 can detect television screen 4502. In this case, television screen 4502 may be used to display the screen of portable device 4102a such as a mobile device. Therefore, when the user is connected to television 4502, screen of television 4502 can be used to access various functions of portable device 4102 such as, but are not limited to, call receiving, dialing, browsing the phonebook, typing a message, browsing the Internet, and so forth. This functionality increases the comfort in using the small form factor of portable device 4102.

In another embodiment of the invention, Visuphone 4104 may detect a picture frame 4602 and connect it to portable device 4102a it as shown in FIG. 46. The connection between portable device 4102a (the smart phone) and picture frame 4602 can be wireless or wired. The wireless connection may be established by using Bluetooth, Wi-Fi, NFC, and so forth. The wired connection may be established via USB or using a cable wire. In an embodiment, picture frame 4602 may be a digital picture frame. The digital picture frame is a picture frame which may be used to display images or photos without the need of printing or using them on computer. Once connected, display of picture frame 4602 may be used to display screen of portable device 4102a such as a mobile phone.

In another embodiment of the invention, portable device 4102a may detect and connect to a Global Positioning System (GPS) navigation system 4702 as shown in FIG. 47. Visuphone 4104 detects GPS navigation system 4702. Therefore, when the user is connected to GPS navigation system 4702, screen of GPS navigation system 4702 may be used as display of portable device 4102a such as a mobile device. Further, screen of GPS navigation system 4702 can be used to access various functions of portable device 4102a such as call receiving, browsing the phonebook, browsing the Internet, and so forth. This functionality increases the comfort in using portable device 4102a such as the mobile phone which has limited display.

In yet another embodiment of the invention, smart phone 4102a can detect and connect to a projector 4802 as shown in FIG. 48. Visuphone 4104 detects the availability of projector 4802. Further, Visuphone 4104 may connect to projector 4802 using any of wired or wireless connection. Further, projector 4802 is configured to connect to connect to Visuphone 4104 of smart phone 4102a. Projector 4802 may be connected to a display 4804. Similarly, the connection between projector 4802 and display 4804 can be wired or wireless. Further, projector 4802 can project the display of smart phone 4102a on display 4804. Further, one or more functions of projector 4802 may be controlled by using connected smart phone 4102a.

FIG. 49 illustrates exemplary display of an Interactive Voice Response (IVR) menu on a large display screen 4902 connected to a portable device 4102, in accordance with an embodiment of the invention. Large display screen 4902 can be a screen of any of external devices 4106a-n. Portable device 4102 can be a smart phone, a mobile phone, a pager, and so forth. A visual IVR menu 4904a is a visual menu including one or more options at portable device 4102. A visual IVR menu 4904b is a visual menu at large display screen 4902 corresponding to visual IVR menu 4904a. Displaying visual IVR menu of mobile phone on large display screen 4902 enhances visibility.

FIG. 50 illustrates a block diagram of portable device 4102, in accordance with an embodiment of the invention. Herein after, portable device 4102 may be referred to as device 4102. Device 4102 can connect to Public Switched Telephone Network (PSTN) 5016 through a radio interface 5012 in a wired or wireless manner For example, radio interface 5012 may provide 2G, 3G, and/or 4G connectivity in case of device 4102 being a mobile phone. Moreover, network interface 5014 can be used to connect device 4102 to network 5018. Examples of network 5018 include wireless or wired networks such as Local Area Network (LAN), Personal Area Network (PAN), or other specialized networks. FIG. 51 shows when network 5018 is a wireless network 5102. Network interface 5014 may allow connectivity through various protocols such as TCP/IP, Bluetooth, acoustic signals, or other types of radio signals. For example, device 4102 may connect to a television through Bluetooth for displaying the contents of device 4102.

Device 4102 includes a display 5002 to output graphical information to the user. In an embodiment of the invention, display 5002 may includes a touch sensitive screen. A memory 5006 of device 4102 stores various programs, data and/or instructions that can be executed by a processor 5004. Examples of memory 5006 include, but are not limited to, a Random Access Memory (RAM), a Read Only Memory (ROM), a hard disk, and so forth. A person skilled in the art will appreciate that other types of computer-readable media which can store data that is accessible by device 4102, such as magnetic cassettes, flash memory cards, digital video disks, and the like, may also be used by device 4102. Further, memory 5006 may include an OS 5010. Further, other applications such as instant messaging application, browser, and so forth may be available on device 4102. Processor 5004 may include a connection manager 5008 that enables device 4102 to connect to external devices 4106a-n through network interface 5014. In an embodiment of the invention, connection manager 5008 may be implemented as a second processor in device 4102.

Device 4102 includes a system bus 5020 for connecting the components. Examples of system bus 5020 include several types of bus structures including a memory bus or memory controller, a peripheral bus, or a local bus using any of a variety of bus architectures.

In another embodiment of the invention, a portable device may be connected to a user device as shown in FIG. 52. As shown, an environment 5200 includes a portable device 5202 that can be used by a user through a user device 5204. Further, portable device 5202 may include a Visuphone 5208 for connecting and establishing a communication with user device 5204. Examples of user device 5204 include, but are not limited to, a mobile phone, a smart phone, a Personal Digital Assistant (PDA), a tablet Personal Computer (PC), and so forth. User device 5204 may be used for data and/or voice communications over a PSTN, mobile network, the Internet, the Ethernet, and so forth. Further, portable device 5202 is configured to connect to multiple external devices 5206*a-n*. Furthermore, user device 5204 may be connected to multiple external devices 5206*a-n* and communicate with any of external device 5206 through portable device 5202. User device 5204 is configured to connect with portable device 5202. Similarly, multiple external devices 5206*a-n* are configured to connect to portable device 5202.

In an embodiment of the invention, portable device 5202 may include an Operating System (OS) such as, but not limited to, Windows Mobile, Apple iOS, Google Android, Symbian, and so forth. Examples of external devices 5206*a-n* include, but are not limited to, a display screen, a keyboard, a mouse, an LED screen, a Laptop, and so forth. In an embodiment of the invention, portable device 5202 may include a dock for receiving and connecting to user device 5204. In an embodiment, user device 5204 may include a Visuphone.

Portable device 5202 may connect to external devices 5206*a-n* by using Bluetooth, Wi-Fi, Infrared, or other wireless protocols. Further, Visuphone 5208 is configured to connect to any of external devices 5202*a-n*. Further, portable device 5202 may connect to external devices 5206*a-n* by using an Ethernet cable, a video cable, Universal Serial Bus (USB), and so forth. Therefore, the display on the screen of portable device 5202 can be presented on external device 5206*a* such as a display screen. Moreover, external device 5206*b* such as a mouse connected to portable device 5202 can be used to provide inputs that is reflected on the display screen. As a result, portable device 5202 acts as a universal communication hub that can enable interaction of multiple external devices 5206*a-n* among each other.

Further, as shown in FIG. 53, user device 5204 may be connected to portable device 5202 via a network 5302. Network 5302 can be the Internet, LAN, MAN, and so forth. In an embodiment, user device 5204 and portable device 5202 may be separated by a large distance. Further, user device 5204 is configured to connect to portable device 5202. Further, Visuphone 5208 is configured to search for available one or more devices such as external devices 5206*a-n* and user device 5204.

FIG. 54 illustrates exemplary functioning of portable device 5202 connected to a mobile phone 5402 in the environment as discussed in conjunction with FIG. 52 or FIG. 53. As shown, user device 5204 such as mobile phone 5402 may connect to display screen 4202, keyboard 4204, and mouse 4206 of the computer through portable device 5202. Therefore, the screen of mobile phone 5402 is displayed on a larger screen of display screen 4202. Moreover, a user can use keyboard 4204 and mouse 4206 to access the information through portable device 5202. For example, in this configuration, the user can browse the Internet by using display screen 4202, keyboard 4204, and mouse 4206, while mobile phone 5402 provides the Internet connectivity and portable device 5202 provides the connectivity among mobile phone 5402 (or user device 5204), display 4202, keyboard 4204 and mouse 4206. Therefore, a computer other than mobile phone 5402 and portable device 5202 may not be required by the user. In an embodiment, mobile phone 5402 (or user device 5204) may not include a Visuphone.

In an embodiment of the invention, portable device 5202 can provide connectivity to multiple user devices. For example, in a home environment, portable device 5202 may detect multiple mobile phones and wired phone. Therefore, the screen of a mobile phone may be displayed on a television near to that mobile phone. In another embodiment of the invention, portable device 5202 may enable communication among multiple user devices. Further, the multiple user devices are configured to connect to portable device 5202.

FIG. 55 illustrates an exemplary functioning of portable device 5202 connected to mobile phone 5402 and a projector 5502 in the environment as discussed in conjunction with FIG. 52 or FIG. 53. Portable device 5202 may be connected to projector 5502, and to a user device such as mobile phone 5402. Further, projector 5502 may be connected to a bigger display 5504. Once all the devices are connected, display of mobile phone 5402 may be displayed on bigger display screen 5504. Visuphone 5208 of portable device 5202 will detect and connect the configured devices i.e. mobile phone 5402 (or user device) and projector 5502. Thereafter, one or more functions of mobile phone 5502 can be controlled by using projector 5502 and vice versa.

FIG. 56 illustrates another exemplary functioning of portable device 5202 connected to mobile phone 5402 and large screen 4402 in environment 5200, in accordance with an embodiment of the invention. As shown Visuphone 5208 of portable device 5202 may detect an external device such as a large screen 4402. A user device such as a mobile phone 5402 can be connected to large screen 4402 via portable device 5202. Mobile phone 5402 is configured to connect with portable device 5202. Similarly, large screen 4402 is also configured to connect to portable device 5202. Further, the connection between portable device 5202 and mobile phone 5402 can be wired or wireless. Furthermore, the connection between portable device 5202 and large screen 4402 can be wired or wireless. Thereafter, display of mobile phone 5402 may be displayed on large screen 4402 after being connected to portable device 5202.

In an embodiment of the invention, external device 5206*a-n* such as a television 4502 may be connected to user device such as mobile phone 5402 via portable device 5202 as shown in FIG. 57. Further, mobile phone 5402 and television 4502 are configured to connect with portable device 5202. In an embodiment of the invention, mobile phone 5402 may include a Visuphone. Though not shown, any user device other than mobile phone 5402 may be connected to portable device 5202.

FIG. 58 illustrates exemplary functioning of portable device 5202 connected to mobile phone 5402 and a laptop 4302 in the environment of FIG. 52 or FIG. 53, in accordance with another embodiment of the invention. A communication session between mobile phone 5402 and laptop 4302 may be established via portable device 5202. Mobile phone 5402 is configured to connect with portable device 5202. Similarly, laptop 4302 is also configured to connect to portable device 5202. After getting connected to each other via portable device 5202 contents of mobile phone 5402 may be displayed on screen of laptop 4302.

In another embodiment of the invention, an external device such as picture frame 4602 may be connected to a user device such as a wired telephone 5902 via portable device 5202 as shown in FIG. 59. As shown, Visuphone 5208 of portable device 5202 may detect an external device such as wired telephone 5802 and connect to it. Further, Visuphone 5208 may detect and connect to an external device such as picture frame 4602.

According to yet another embodiment of the invention, external device such as a GPS navigation system 4702 may be connected to a user device such as mobile phone 5402 via portable device 5202 as shown in FIG. 60. Both the devices i.e. GPS navigation system 4702 and mobile phone 5402 are configured to connect to portable device 5202. Once connected to portable device 5202, contents of mobile phone 5402 may be displayed by using screen of GPS navigation system 4702. For example, when a call is received at mobile phone 5402, an IVR menu associated with the calling party may be displayed at screen of GPS navigation system 4702.

FIG. 61 illustrates an exemplary display of a visual Interactive Voice Response (IVR) menu on a large display screen 6102 connected to a portable device such as the smart phone 6106, in accordance with an embodiment of the invention. Display 6104a is a display of a visual IVR menu on smart phone 6106. Display 6104b is the display of the visual IVR menu on large display screen 6102 corresponding to display 6104a of smart phone 6106.

FIG. 62 illustrates a block diagram of portable device 5202, in accordance with an embodiment of the invention. Network interface 6210 can be used to connect portable device 5202 to network 6212. Examples of network 6212 include wireless or wired networks such as Local Area Network (LAN), Personal Area Network (PAN), Bluetooth, or other specialized networks. Network interface 6210 may allow connectivity through various protocols such as TCP/IP, Bluetooth, acoustic signals, or other types of radio signals. For example, portable device 5202 may connect a mobile phone to a television through a Bluetooth communication link. As a result, the contents on screen of the mobile phone can be displayed on the television screen which is larger than that of the mobile phone. In an embodiment of the invention, portable device 5202 can use different protocols for communicating with different devices based on their capabilities. For example, portable device 5202 may connect to a mobile phone through Bluetooth and the television through Wi-Fi.

Portable device 5202 includes a memory 6204 to store various programs, data and/or instructions that can be executed by a processor 6202. Examples of memory 6204 include, but are not limited to, a Random Access Memory (RAM), a Read Only Memory (ROM), a hard disk, and so forth. A person skilled in the art will appreciate that other types of computer-readable media which can store data that is accessible by portable device 5202, such as magnetic cassettes, flash memory cards, digital video disks, and the like, may also be used by portable device 5202. Memory 6204 may include an OS 6208. Further, other applications such as instant messaging application, browser, and so forth may be available on portable device 5202. Processor 6202 may include a connection manager 6206 that enables portable device 5202 to connect to external devices 5206a-n through network interface 6210. In an embodiment of the invention, connection manager 6206 may be implemented as a second processor in portable device 5202.

Device 5202 includes a system bus 6214 for connecting the components. Examples of system bus 6214 include several types of bus structures including a memory bus or memory controller, a peripheral bus, or a local bus using any of a variety of bus architectures.

FIG. 63 is a flowchart illustrating the functioning of portable device 4102 in accordance with an embodiment of the invention. As discussed with reference to FIG. 41, portable device 4102 includes a Visuphone 4104. Further, portable device 4102 is configured to detect and connect to any one of external devices 4106a-n.

At step 6302, Visuphone 4104 of portable device 4102 searches for an external device 4106. The external device may include, but is not restricted to, an electronic display device such as a computer, a laptop, television or any other display device. For example, a Visuphone present in a smart phone may search for an external device such a large display screen, a laptop, a computer, and so forth. At step 6304, it is checked whether the external device is available. In an embodiment, the availability of external device is checked within a pre-defined distance such as within 50 meters, 10 meters, and so forth. If the external device is not detected, the process control goes to step 6302 else the process proceeds to step 6306. In an embodiment, the process ends when the external device is not detected. For example, the process may end when the external device is not detected within a pre-defined time limit. Further, at step 6306, portable device connects to the detected external device. At step 6308, contents of display screen of portable device 5202 are displayed at the connected external device. For example, when a smart phone is connected to a laptop, the content of the smart phone is displayed on the laptop screen.

FIGS. 64A and 64B illustrate a flowchart for implementing a portable device 5202 in the environment 5200, in accordance with an embodiment of the invention. The environment 5200 is explained previously in conjunction with FIG. 52 and FIG. 53. Portable device 5202 includes a Visuphone 5208. Visuphone 5208 is configured to detect and connect to one or more devices such as external devices 5206a-n, user device 5204, and so forth.

At step 6402, Visuphone 5208 searches for a user device 5204. At step 6404, it is checked whether user device 5204 is available. If user device 5204 is available then a connection is established between portable device 5202 and the detected user device 5204 at step 6406 else control goes back to the step 6402.

At step 6408, Visuphone 5208 of portable device 5202 searches for an external device 5206. At step 6410, it is checked whether the external device 5206 such as external device 5206b is available. If the external device 5206 is available, then the process control goes to step 6412 else the control goes back to step 6408. In an embodiment, the process ends when the external device is not available. Further, at step 6412, a connection is established between portable device 5202 and the detected external device 5206b. Thereafter, contents of display of connected user device 5204 are displayed on a screen of the connected external device 5206b. For example, contents of a mobile phone may be displayed on a screen of a television which is connected to the television via portable device 5202.

FIG. 65 illustrates an exemplary functioning of portable device 5202 connected to large screen 4402 and laptop 4302 in the environment of FIG. 52 and FIG. 53. As shown in FIG. 65, a connection may be established between laptop 4302 and large screen 4402 via portable device 5202. The connection can be wireless or wired. After establishing the connection, the content stored at laptop 4302 may be displayed at large screen 4402. Further, while displaying the content of laptop 4302, large screen 4402 may not store the content. For example, if a user wants to watch a movie stored at laptop, he/she can do by connecting the laptop to the portable device (via wireless or wired connection). This way large screen 4402 can display movie without storing or saving movie in or at large screen 4402. Further, portable device 5202 can include an interface to transmit to or receive multiple control signals from external devices 5206a-n such as large screen 4402. The multiple control signals are the signals for displaying content of user device 5204 at the connected external device such as external device 5206b. In an embodiment, the interface can be hardware such as a Universal Serial Bus (USB) docket or a software application.

In an embodiment, laptop 4302 may include a Visuphone and the connection may be established directly between laptop 4302 (including Visuphone) and large screen 4402 as shown in FIG. 66. In the FIG. 66, laptop 4302 may act as the portable device in the environment of FIG. 41. In such a case the laptop 4302 is configured to detect external devices and can connect to detected external device. Further, the connection may be a wireless connection or a wired connection. After connecting with large screen 4402, the content stored at laptop 4302 may be displayed by using large screen 4402. Further, the content stored at laptop 4302 such as pictures, movies, music files etc are never transferred to memory of external devices (such as large screen 4402).

FIG. 67 illustrates an exemplary functioning of a Visuphone for displaying one or more contact options at a device, in accordance with an embodiment of the invention. Sometimes it may be desired by a caller to call specifically to a particular branch or department of a destination. For example, while calling for a restaurant the user may be interested in calling to a particular branch (or location) of the restaurant but the user might not be aware of the exact phone number of that branch. In an embodiment, when a user or caller dials a phone number of a destination, Visuphone of device such as mobile phone may display one or more contact options 6720*a-n* along with the visual IVR menu associated with the dialed destination. Contact options 6720*a-n* can be contact details or information associated with different branches (or locations) of the dialed destination. For example, if the user dials a phone number of a pizzeria (e.g. pizza hut), then the Visuphone will display visual IVR menu 6702 of the pizzeria as well as one or more contact options corresponding to the other branches of same pizzeria (of pizza hut).

Further, by clicking or selecting at least one contact option of contact options 6720*a-n*, the user can connect to desired branch or department of the dialed destination (or pizzeria). In an embodiment, when the user selects a contact option 6720*b*, a visual IVR menu associated with a particular branch or department of the dialed destination can be displayed at the device. In an embodiment, contact options 6720*a-n* may include information such as, but not limited to, a phone number, an address, a department name, and so forth. In an embodiment, one or more contact options 6720*a-n* can be a tab with a tab name such as department name. The user can select one contact option of contact options 6720*a-n* based on the contact details or information. In an embodiment, the different branches of the dialed destination may have different IVR menus. Further, the user can switch the display on the screen of device (or device 102) by selecting at least one contact option 6720. Visuphone of device (device 102) takes the appropriate action based on the selection made by the user. In an embodiment, when the user selects a contact option, a visual IVR menu of the selected contact option such as a particular department of the dialed destination is displayed.

Visual IVR menu 6702 may include various options 6704 to 6718. The user can select one or more options from the displayed visual IVR menu. For example, the user can order a pizza by selecting option 6706 or by pressing 1-2 keys of keypad of device. In an embodiment, the user may switch directly to some other department or branch of the dialed destination by selecting at least one contact option from the displayed contact options 6720*a-n*. Based on the selection, the display of device 102 may change.

FIG. 68 illustrates change of display at user device 102, when a user selects a contact option, in accordance with an embodiment of the invention. As discussed with reference to FIG. 67, when a user selects a contact option such as 6720*b* of the contact options 6720*a-n*, a visual IVR menu 6802 associated with the contact option 6720*b* may be displayed at device 102. Visual IVR menu 6802 may include various options 6804-6814. For example, if the user selects a contact option corresponding to a home delivery department of the dialed pizzeria, then visual IVR menu 6802 for home delivery can be displayed as shown. Visual IVR menu 6804 includes options such as for ordering pizza by selecting an option 6806 (in case of a touch screen enabled device) or by pressing a combination of keys i.e. 1-2 on keypad of device 102. Similarly, the user may get status for previously placed order by selecting an option 6808. The user can choose to talk to an executive by selecting option 6814. Contact options 6720*a-n* provides an option to the user for directly connecting to IVR system of the desired branch, this way time can be saved.

FIG. 69 illustrates an exemplary functioning of Visuphone for displaying one or more contact options at a device, in accordance with another embodiment of the invention. When a user dials a phone number of a destination, such as an XYZ airlines customer care, from device 102. Then a visual IVR menu 6902 of the XYZ airlines can be displayed at screen of device 102. Additionally, one or more contact options such as XYZ Domestic Airline Contact Option 6920*a* and XYZ International Airline Contact Option 6920*b* can be displayed at the screen of device 102.

In an exemplary scenario, the user may be interested in contacting or knowing details of domestic airlines or international airlines department of XYZ Airlines specifically. The user may directly dial to these specific airline departments by selecting a related contact option from the displayed contact options. For example, the user can directly connect to domestic airlines IVR system of XYZ airlines by selecting the XYZ Domestic Airlines Contact Option 6920*a*. After detecting the selection of option 6920*a*, the Visuphone of device 102 can display a visual IVR menu associated with the Domestic Airlines department of XYZ airline as shown in FIG. 70. Similarly, the user can select International Airlines Contact Option 6920*b* to directly connect to the XYZ International Airlines department. Thereafter, the user can interact with the displayed visual IVR menu.

FIG. 70 illustrates change in display at device 102 based on selection of a contact option by a user of device 102, in accordance with an embodiment of the invention. As discussed with reference to FIG. 69, a visual IVR menu of XYZ airlines is displayed when the user dials a phone number of XYZ Airlines. One or more contact options 6920*a-b* can also be displayed along with visual IVR menu 6902. After detecting a selection of contact option from the user at device 102, the Visuphone may display a visual IVR menu of the selected option. As shown, the visual IVR menu 7002 associated with domestic airlines department of XYZ is displayed when the user selects 'XYZ Domestic Airlines Contact Option' 6920*a*. Visual IVR menu of XYZ domestic airlines includes multiple options such as a Booking option 7006, a Status Inquiry option 7008, an Other Inquiry option 7010, and so forth. The user can interact with visual IVR menu 7002 by selecting one or more options of visual IVR menu 7002 from these options 7004 to 7018. For example, the user can select a combination of keys 1-4-2 to directly talk to an executive. In an embodiment, device 102 may have a touch sensitive screen, in such as device the user can select option 7018.

FIG. 71 illustrates a flow diagram illustrating an exemplary functioning of the Visuphone for displaying one or more contact options, in accordance with an embodiment of the invention. Device 102 includes a Visuphone for displaying a visual IVR menu associated with a dialed phone number of a destination. Further, the Visuphone can display one or more contact options on a screen of device 102. Device 102 can be a telecommunication device that can connect directly to a Public Switched Telephone Network (PSTN) 110. A person skilled in the art will appreciate, that device 102 can also connect to a private telephone exchange Examples of device 102*a* may include, but not limited to, a mobile phone, a Smartphone, a telephone, or any other device capable of voice or data communication. When caller 106 dials a phone number of a destination and connects to any destination from destinations 108*a-n*, a visual IVR menu may be displayed at device 102. Additionally, one or more contact options may also be displayed at device 102. Contact options may include information describing one or more branches of the dialed destination.

At step 7102, a user dials, from a device, a phone number of a destination. At step 7104, the Visuphone displays a visual IVR menu associated with the dialed phone number of the destination. At step 7106, one or more contact options are also displayed at the screen of device 102. In an embodiment, the Visuphone searches the database for contact options matching the phone number of the dialed destination and displays the contact options at device 102. At step 7108, a user selects at least one contact option from the displayed contact options as shown in FIG. 67 and FIG. 69. Thereafter, at step 7110, the display of the visual IVR menu at device 102 is changed based on the selection of the contact option. In an embodiment, a visual IVR menu associated with the selected contact option is displayed at device 102. Thereafter, the user or caller may interact with the displayed visual IVR menu of the selected contact option.

FIG. 72 illustrates a flowchart for creating a visual menu database, in accordance with an embodiment of the invention. As discussed with reference to FIGS. 1A to 1D, a caller may connect to a plurality of destinations by using device such as, but not limited to, a smart phone. The smart phone may include Visuphone for displaying visual IVR menus at the smart phone. In accordance with an embodiment of the invention, the visual menu database may be created by accessing an IVR internal database of an IVR system. This approach may require the collaboration with an IVR maker and at least permission from an IVR owner. In an embodiment of the invention, the visual menu database may be created at the smart phone (or the device). In another embodiment of the invention, the visual menu database may be created at or by using a computer system.

At step 7202, the caller of the device may collaborate with the IVR maker. In an embodiment of the invention, the IVR maker may be an organization or an individual responsible for creating and maintaining the IVR system. In an embodiment of the invention, the collaboration between the caller and the IVR maker may happen through some contract or agreement. At step 7204, the caller of the device may take permission from the IVR owner. In an embodiment of the invention, the IVR owner may be a company or individual owner of the IVR system. In an embodiment of the invention, the IVR maker and the IVR owner may refer to same entity in the communication network. At step 7206, the device may be connected to the IVR system of the IVR owner by using a maintenance port of the IVR system. The device may connect to the maintenance port through the Internet. In an embodiment of the invention, the device may connect to the maintenance port by using wireless technologies such as, but are not limited to, WiMAX, LTE, UMTS, CDMA, Wi-Fi network, HSPA, GPRS, and so forth. At step 7208, the IVR system of the IVR owner may be accessed.

Accordingly, the smart phone (or the computer system) may access the IVR system and once authorized by the IVR owner it may download the internal file representing the IVR menu, which may be called an IVR customization record. Therefore, at step 7210, the IVR customization record may be downloaded from a database of the IVR owner. Thereafter, at step 7212, a visual menu corresponding to the downloaded IVR customization record may be generated. In an embodiment of the invention, the visual menu may be generated from the downloaded IVR customization record by using an application or utility that may be designed according to the format. In an embodiment of the invention, the format may be provided by the IVR maker.

FIG. 73 illustrates a method for providing enhanced telephony at a communication device, in accordance with an embodiment of the invention. A caller may connect to destinations by using a communication device. The communication device may include an IVR application such as a Visuphone. The destinations may include an IVR system including one or more audio or voice menus. The Visuphone is configured to display graphical information at the communication device. Further, the Visuphone is configured to display visual IVR menus corresponding to the IVR systems of the destinations. The visual IVR menus may include one or more options. The options can be graphical icons or text or combination of these.

At step 7302, the communication device may dial a phone number of a destination. The communication device may include a plurality of visual IVR menus associated with a plurality of destinations. At step 7304, the dialed phone number of the destination may be compared with phone numbers of the destination stored at the communication device. In an embodiment of the invention, the communication device may include a database to store the phone numbers of the destinations and the visual IVR menus. The Visuphone of the communication device may search for a visual IVR menu corresponding to the dialed destination. In an embodiment of the invention, the Visuphone may also search for a form associated with the dialed phone number of the destination in the database of the communication device. Thereafter, at step 7306, the form may be displayed at the device based on the comparison of the phone number of the destination with phone numbers of the destinations in the database. In an embodiment of the invention, the form may include one or more data request fields corresponding to a visual IVR menu of the dialed destination. The user may fill his/her personal information in the one or more data request fields to be stored in the database.

FIG. 74 illustrates an environment 7400 where various embodiments of the invention may function. A caller 7406 may use a device 7402 to dial and communicate with a destination 7408. Destination 7408 may include an IVR system and may have one or more voice or audio menus associated with the IVR system. Device 7402 may include an IVR application such as a Visuphone 7404 for displaying visual IVR menus of destination(s) 7408 at device 7402. Device 7402 may include a database 7410. Examples of device 7402 include, but are not limited to, a mobile phone, a Smartphone, a telephone, a laptop, a computer, a tablet computer, or any other device capable of voice or data communication. Database 7410 may store visual IVR menus. Further, destination 7408 may have one or more associated phone numbers. Caller 7406 may dial a phone number of destination 7408 for establishing communication. Though not shown, but a person ordinarily skilled in the art will appreciate that environment 7400 may include more than one destination 7408. Various types of destinations 7408 that implement the audible IVR menu include, for example, banks, hotels, fast-food outlets, utility services providers, corporate offices, and so forth.

Further, environment 7400 may include a remote server 7412 connected to destination 7408 via a communication network 7416. Examples of communication 7416 include, but are not limited to, Local Area Network (LAN), Wide Area Network (WAN), Wi-Fi network, WiMAX, $3^{rd}$ Generation network, $4^{th}$ generation network, Long Term Evolution (LTE) network, Universal Mobile Telecommunication Systems (UMTS) network, IEEE 802.16m, LTE Advanced network, Mobile WiMAX, IEEE 802.20, Flash-OFDM, HIPERMAN, iBurst, HSDPA, Global System for Mobile communications (GSM), Code Division Multiple Access (CDMA), Evolution Data Optimized (EV-DO), General Packet Radio Service (GPRS), Enhanced Data rates for GSM Evolution (EDGE), High Speed Packet Access (HSPA), High-Speed Downlink Packet Access (HSDPA), Mobile Broadband Wireless Access (MBWA), and so forth.

Device 7402 may access or request one or more information from destination 7408. Information can be but not limited to, visual menus, audio menus, one or more properties of the destination 7408, review about destination 7408, rating of destination 7408, and so forth. In an exemplary scenario, destination 7408 may not include the requested information. In such a scenario, destination 7408 may request updates from remote server 7412 through communication network 7416. In an embodiment of the invention, device 7402 may receive updates from remote server 7412 through one or more messages, such as, but are not limited to, Short Messaging Service (SMS) message, Multimedia Messaging Service (MMS) message, and so forth.

Remote server 7412 may include a remote database 7414 for storing updated information of destinations such as of destination 7408 and their associated properties. Examples of the properties include, but are not limited to a location code, a branch code, rating, reviews, an address, phone numbers, distance from caller 7406, and so forth. In another embodiment of the invention, remote database 7414 may maintain updated visual IVR menus of destinations. After receiving the updated information from remote server 7412, destination 7408 may provide the information to device 7402. In an embodiment of the invention, device 7402 may request updates from remote server 7412. Device 7412 may request updates from remote server 7412 after a predefined time period such as after every two days, once a week, and so forth.

In an embodiment of the invention, Visuphone 7404 may validate the accuracy of database 7410 by crowd sourcing. For example, if ten users have given some good rating about a visual IVR menu stored in remote repository 1004, and two users have given bad rating or reviews about the visual IVR menu then, Visuphone 7404 may update database 7410 accordingly. In an embodiment of the invention, Visuphone 7404 may create a new entry in database 7410 corresponding to changes in visual IVR menu(s). In an embodiment of the invention, Visuphone 7404 may update visual IVR menus at remote database 7414 at remote server 7412 based on the crowd sourcing and based on cumulative ratings from different users or callers in communication network 7416.

FIG. 75 illustrates an environment 7500 explaining functionality of an advertisement server, in accordance with another embodiment of the invention. As shown environment 7500 may include a device 7502. A caller 7506 may dial a phone number on device 7502. The phone number may correspond to any of destinations such as a destination 7508. Further, device 7502 may be, such as, but not limited to, a smart phone, a mobile phone, a computer, a laptop, a palmtop computer, a tablet computer, an I-pod, a home communication device, and so forth. In an embodiment of the invention, caller 7506 may dial a phone number by using a VOIP application on device 7502. Subsequently, a visual IVR menu of dialed destination 7508 may be displayed at device 7502. The visual IVR menu may include multiple options. In an embodiment of the invention, device 7502 may include a touch sensitive screen. Caller 7506 may select an option from the visual IVR menu by touching an option on device 7502. In an embodiment of the invention, caller 7506 may select an option from the visual IVR menu through a voice command or voice inputs. Device 7502 may include an IVR application such as Visuphone 7504 for displaying visual IVR menus at device 7502. Device 7502 may include a database 7510 for storing visual IVR menus and phone numbers of a plurality of destinations.

Device 7502 and destination 7508 may connect to an advertisement server 7512 through a communication network 7516. Examples of communication network 7526 may include, but are not limited to, the Network, PSTN, Local Area Network (LAN), Wide Area Network (WAN), WiMAX, IEEE 802.11, Wi-Fi network, ZigBee, Radio Frequency 4 for consumer Electronics (RF4CE), Long Term Evolution (LTE) network, HSPA, HSDPA, MBWA, GPRS, EV-DO, CDMA, GSM, UMTS, $3^{rd}$ generation (3G) network, $4^{th}$ generation (4G) network, and so forth. Advertisement server 7512 may include an advertisement database 7514 for storing advertisements about various products or services. In an embodiment of the invention, advertisement database 7514 may include advertisement(s) about destination 7508 or other destinations in communication network 7516. The other destinations may be competitors of dialed destination 7508. For example, if dialed destination is a Chinese restaurant, then the advertisements may be about other competitor Chinese restaurants. In an embodiment of the invention, device 7502 and/or destination 7508 may request or receive advertisements from advertisement server 7512.

Visuphone 7504 may display one or more advertisements at display of device 7502 along with the visual IVR menu of dialed destination. The advertisements may be related to the products and services offered by dialed destination 7508. For example, if the dialed destination is a bank, then the advertisements may be about various investment or insurance schemes. In an embodiment of the invention, the displayed advertisements may be based on location of dialed destination 7508 and/or device 7502. For example, the advertisements may be about a pizzeria in nearby area of dialed destination. The advertisements may include text, audio, video, graphics, images, or combination of these.

FIG. 76 illustrates an exemplary display of a visual IVR menu along with an advertisement on device 7502, in accordance with an embodiment of the invention. As discussed with reference to FIG. 75, caller 7506 may dial a phone number of destination 7508 by using device 7502 such as a smart phone. Accordingly a visual IVR menu 7604 may be displayed at a display 7602 of device 7502. As shown, visual IVR menu 7604 may include one or more options. In an embodiment of the invention, display 7602 may be a touch sensitive screen. Caller 7506 may select an option from the one or more option by touching an option at display 7602. In another embodiment of the invention, caller may provide one or more voice inputs to select or interact with the visual IVR menus. In an embodiment of the invention, an advertisement 7606 may be displayed along with visual IVR menu 7604 at device 7502. Advertisement 7606 may provide some offers or deals or information about products and services offered by dialed destination 7508 or it may be related to competitors of dialed destination 7508. In an embodiment of the invention, advertisement 7606 may be an interactive advertisement. Therefore, caller 7506 may select or interact with advertisement 7606. In an embodiment of the invention, caller 7506 may select or interact with advertisement 7606 through the voice inputs. In an embodiment of the invention, advertisement 7606 may include a Uniform Resource Locator (URL) which can be clicked by caller 106. Thereafter, Visuphone 104 may direct and connect caller 106 to a destination associated with advertisement 7606. Further, Visuphone 7504 displays visual IVR menu 606 of the intended destination of the advertisement. In an embodiment, Visuphone 7504 stores the interactions of caller 7506 with visual IVR menus after a call to an IVR was made. Therefore, when caller calls the same destination again, then the options that were selected in the last interaction are presented prominently. Further, the options that are frequently selected can be presented prominently. For example, if caller 7506 dials a bank frequently to check his account balance, then the options for selecting his account balance may be highlighted. Additionally the information such his account number can be brought up to save effort for the caller who can than just OK for that 'auto fill' to be dialed out to the IVR at the proper time.

FIG. 77A-C illustrates functionality of Visuphone provided by various service providers. In an embodiment of the invention, Visuphone may not be installed at a device 7702. Caller 7706 may still use the functionality of Visuphone as explained in above description through a service provider. In such a case one or more services of Visuphone are provided by the service provider.

As shown in FIG. 77A, a cellular service provider 7710 may provide the services of a Visuphone 7704. Caller 7706 may subscribe to the services provided by cellular service provider 7710. In such a case, device 7702 may not have Visuphone installed. Cellular service provider may take care of all implementation and functionality of Visuphone 7704. The subscription to Visuphone 7704 services may be on monthly basis, hourly basis or per service basis. In an embodiment of the invention, caller 7706 may be charged based on subscription of the services. Further, caller 7706 may receive one or more messages from the cellular service provider 7710 regarding subscription offers of Visuphone 7704 services. The one or more messages may be SMS, MMS, E-mail, Push messages, and so forth.

As shown in FIG. 77B, a cable television (TV) service provider 7712 may provide the services of Visuphone 7704. Caller may connect to cable service provider 7712 and pay for the services as per usage to the cable TV service provider 7712. Similarly, the services of Visuphone 7704 may be provided by an Internet Service Provider (ISP) 7714 as shown in FIG. 77C. Though not shown, there may be other service providers such as an optical service provider, a telephone service provider, and so forth, that may implement functionality of Visuphone 7704 to provide services to caller 7706.

FIG. 78 illustrates a flowchart for validating a database entry at the device based on digital signatures, in accordance with an embodiment of the invention. As described with reference to FIG. 1A-1D, device 102 may be used to dial a phone number of destinations 108*a-n*. Destinations 108*a-n* may include an IVR system. Further, Visuphone 104 at device 102 is configured to display a visual IVR menu corresponding to an audio IVR menu of the dialed destination. As shown in FIG. 3, visual menu database 308 stores the visual IVR menus and multiple phone numbers of destination 108*a-n*. Visual menu database 308 may further store digital signatures corresponding to every entry i.e. visual IVR menu and phone number of destinations 108*a-n*. The digital signature may include voice or text or video. Further, in an embodiment of the invention, the digital signature may be created based on one or more inputs from caller 106. Digital signatures may be used to validate visual menu database 308. While creating visual menu database 308, digital signatures may be generated for every entry in visual menu database 308. In an embodiment of the invention, digital signatures are also created every time the entry is accessed, e.g. when the visual IVR menu is displayed, and/or the IVR system of dialed destination is accessed.

At step 7802, caller 106 at device 102 may dial a phone number of a destination such as destination 108. The dialed destination may include an IVR system. Further, device 102 may include a visual IVR menu of the dialed destination 108 and a digital signature of the visual IVR menu. At 7804, a new digital signature corresponding to the visual IVR menu of the IVR system of dialed destination 108 may be generated. At step 7806, Visuphone 104 may compare the generated new digital signature with the stored digital signature corresponding to the visual IVR menu. A mismatch among the digital signatures may indicate that the visual IVR menu have been changed over a period of time. Therefore, database at device 102 may need to be updated. Further, an exact matching of the digital signatures may indicate that the visual IVR menu has not been modified since generated or last accessed. No updates may be required in this case. Thereafter, at step 7808, the database at device 102 may be updated based on the comparison of the digital signatures. In an embodiment of the invention, the database at device 102 may create a new entry for the visual IVR menu (a new version) and old entry for the visual IVR menu (old version) of visual IVR menu may also be maintained. In another embodiment of the invention, the old version of visual IVR menu may be modified or replaced with the new version of visual IVR menu (or a new entry). By following these steps accuracy of the database at device 102 may be checked and validated.

Embodiments of the invention provide a method for establishing a communication session among a plurality of communication devices. A communication device may send a first section including first information or header information to a second communication device. A Visuphone at the communication device sends the first section. The communication device includes one or more visual IVR menus. The header information may include information such as Visuphone version, visual IVR menu ID, ACK bit, and so forth. In an embodiment, the communication device may receive an acknowledgement message, based on the first section, from the second communication device. The acknowledgement message is received when the second communication device includes a Visuphone. Thereafter, the Visuphone at the first communication device may send a second section or packet including a second information or payload to the second communication device. The payload may include information such as user ID, user profile, user selection, and so forth. Thereafter, a communication session is established between the communication device and the second communication device. In an embodiment, the second communication device may not include the Visuphone. In such a case the communication device and the second communication device communicates through DTMF signals or tones.

An aspect of the invention is to generate a database of visual IVR menus. The database generation could be done by successive calling the IVR and combined with voice recognition. Calling the IVR systems can be done manually by operators that will listen to options of the IVR and enter these options into the database. In this manual mode, the operator will dial IVR numbers from a list and for each of them will follow all the options in several levels of audible IVR menu and in each level, enter the menu entries into the database. This can be done to many different IVR phone numbers, by one or multiple operators. The voice menu can be recorded for analyzing in a different process or at a different time.

Another aspect of the invention is to generate a database of visual IVR menus by a computer system. Combination of hardware and software that is connected to phone system and automatically dials the IVR phone numbers, may record the different options of the voice menu, and analyze the voice menu to generate and enter the different entries into the database. The system will generate the voice tone that simulates the relevant touchtone of a phone number pressed. This process will be done in several levels until covering all the entries in all the levels of the specific IVR system. This process may be done for all the IVR phone number in the list.

Additional alternative is to access the IVR internal database and download the menu. This approach requires the collaboration with the IVR maker and at least permission from the IVR owner. Having both, a system could be built to access IVR using their maintenance port, which is often connected to the Internet. Accordingly, the system would access the IVR and once authorized by the IVR owner it will download the internal file representing the IVR menu, which could be called the IVR customization record. The downloaded file would then be converted to visual IVR menu by utility that could be designed according to the format, which could be provided by the IVR maker.

Another aspect of the invention is to provide to a caller, using a device, a visual IVR menu corresponding to an audible IVR menu of a destination.

Another aspect of the invention is to enable the caller to directly interact with the visual IVR menu without listening to the audible IVR menu of the destination.

Another aspect of the invention is to provide the visual IVR menu to the caller before establishing a connection of the device with the destination.

Another aspect of the invention is to provide advertisements related to the destination or function of the destination dialed by the caller.

Another aspect of the invention is to provide a visual IVR menu of a destination according to the location of the communication device of a caller and/or a location of the dialed destination phone number.

Embodiments of the invention provide an enhanced communication device. The enhanced communication device comprises a processor and a memory coupled to the processor. The memory comprises a database including one or more destination phone numbers and at least one property associated with the destination phone numbers. Further, the memory comprises instructions executable by the processor for identifying a dialed phone number of a destination, determining a location code associated with a current location of the communication device, comparing the dialed phone number to one or more destination phone numbers stored in a database, and displaying at least one property associated with the one or more destination phone numbers based on the comparison.

An aspect of the invention is to provide a system for communicating among a plurality of IVR enabled communication devices.

Another aspect of the invention is to enable the caller to interact with the visual IVR menu by using a touch sensitive screen of the device.

Another aspect of the invention is to provide position based visual IVR menus in a communication network.

Another aspect of the invention is to provide a device for communicating with a second communication device. The device includes an IVR application such as Visuphone. In an embodiment, the second communication device also includes the IVR application such as Visuphone.

Another aspect of the invention is to provide the visual IVR menu when the call is forwarded from one first party device to another first party device.

Another aspect of the invention is to provide visual IVR menus on receiving a call from the first party device on electronic devices with screens that are connected to Visuphone.

Yet another aspect of the invention is that the user may involve other one or more users or communication devices in a call from a first party device. Thereafter, the user, the other users may interact with the first party device in a conference call. In an embodiment, the user may leave the conference call in between the call.

Additional aspect of the invention is to provide a method for establishing a communication session in a communication network. The communication session may be established between two or more IVR enabled devices.

Further aspect of the invention is to provide a method for establishing a communication session among a plurality of communication devices. The communication devices may or may not include Visuphone.

Another aspect of the invention is to provide a method for establishing a communication session among a plurality of communication devices. The communication session is established by sending one or more packets when a data network such as the Internet is available.

Another aspect of the invention allows a device to call a destination automatically according to the predefined calling information entered by a user.

Another aspect of the invention saves the effort made by the user of the communication device for retrieving information from an IVR system of the dialed destination. The Visuphone dials the phone number of the destination and retrieves the information automatically depending on the predefined calling information. Later, the user can use the retrieved information as per his/her convenience. In an embodiment, the user may not wish to use the information at the time of its retrieval. In such a case the information is stored and can be accessed later.

An advantage of the invention is that the communication device can send more information as data packets/messages to the second communication device by using a data network. The data packets may be exchanged among various communication devices. The data packet may include information required for establishing a communication session.

An advantage of an embodiment of the invention is that the user himself/herself does not have to dial the destination again and again for receiving information. Visuphone 104 present at device 102 of caller 106 may dial the phone number of the destination automatically based on the predefined calling information set by caller 106. Further, Visuphone 104 requests and receives the requested or inquired information automatically.

Another advantage of the invention is that the user does not have to wait for long time for retrieving any information from a destination. When the requested information is not available, the user may schedule a call at later time by entering few settings on device 102. Thereafter, Visuphone 104 may dial the phone number of the destination according to the entered settings automatically and may download the desired information. The downloaded information may be used by the user at a later time.

Additional advantage of the invention relates to callers who are more proficient in foreign language. Visuphone may provide the visual IVR menu in multiple languages. A caller can then choose a language of his choice and download, to his device database, the menu in that language.

Another aspect of the invention provides a method for validating a database at device by using digital signatures.

Another aspect of the invention, provide a method for enabling a caller to navigate the IVR system of a destination before dialing a phone number of the destination.

Further aspect of the invention provides a method for displaying visual IVR menus of destinations through a website.

Another aspect of the invention provides an interface to allow users of device to access IVR system of various destinations via a website.

Another aspect of the invention provides a web interface to display visual IVR menus to caller or user of device.

Another embodiment of the invention provides an IVR application Visuphone for displaying the visual IVR menus through website.

Another embodiment of the invention provides a web interface to users for accessing the IVR menu(s) of a destination without actually dialing the phone number of the destination.

Yet another advantage of the invention relates to IVR that ask for voice commands. This IVR interface is for some caller, harder to use, due to accent or other problems. The database could be provided with the option that has been described before for the system to output voice command according to caller selection of the menu options.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions which execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, mini-computers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for enhancing user interaction with a plurality of destinations comprising one or more Interactive Voice Response (IVR) menu systems, the system comprising:
   (a) a processor; and
   (b) a memory coupled to the processor, the memory comprising:
      (i) an IVR menu database comprising a list of telephone numbers associated with the plurality of destinations and the associated visual IVR menu for each destination; and
      (ii) instructions executable by the processor for selecting at least one visual IVR menu from said IVR menu database and displaying said at least one visual IVR menu to a user, wherein said at least one visual IVR menu is associated with a telephone number dialed by the user from the list of telephone numbers, further wherein said at least one visual IVR menu comprises at least one icon, wherein said visual IVR menu was downloaded and stored in a user device before establishing a phone connection to said at least one IVR destination.

2. The system of claim 1, wherein said IVR menu database comprises at least two records associated with at least two distinct destinations, each of said at least two records comprises a business category field, and each of said at least two records have the same business category; and
   a standard menu for said same business category.

3. The system of claim 1, wherein the memory further comprises instructions executable by the processor for selecting and displaying at least one advertisement, wherein said at least one advertisement is selected based on at least one category associated with said at least one visual IVR menu.

4. The system of claim 1, wherein the memory further comprises instructions executable by the processor for:
   generating at least one record based on personal information of the user; and
   storing said at least one record in the IVR menu database.

5. The system of claim 1 further comprising a Voice over Internet Protocol (VOIP) phone.

6. The system of claim 1, wherein said IVR menu database comprises voice responses of the user.

7. The system of claim 1 further comprising:
   a portable device configured to enable the user to dial the telephone number; and
   an external device configured to display said at least one visual IVR menu to the user.

8. The system of claim 4, wherein the memory further comprises instructions executable by the processor for displaying a form comprising one or more data request fields to the user for filling the personal information to be stored in said IVR menu database.

9. The system of claim 1, wherein said menu is displayed based on the time of dialing said telephone number by the user.

10. A system for enhancing user interaction with a plurality of destinations comprising one or more Interactive Voice Response (IVR) menu systems, the system comprising:
(a) a processor; and
(b) a memory coupled to the processor, the memory comprising:
(i) an IVR menu database comprising a list of telephone numbers associated with the plurality of destinations and the associated visual IVR menu for each destination; and
(ii) instructions executable by the processor for selecting at least one visual IVR menu from said IVR menu database and displaying said at least one visual IVR menu to a user, said visual IVR menu is associated with a telephone number dialed by the user from the list of telephone numbers, wherein said visual IVR menu was downloaded and stored in a user device before establishing a phone connection to said at least one IVR destination;
wherein said IVR menu database comprises at least two records associated with at least two distinct destinations, further wherein each of said at least two records comprises a business category field, and each of said at least two records have the same business category, further wherein said IVR menu database comprises a standard menu for said same business category.

11. The system of claim 10, wherein the memory further comprises instructions executable by the processor for selecting and displaying at least one advertisement, wherein said at least one advertisement is selected based on at least one category associated with said at least one visual IVR menu.

12. The system of claim 10, wherein the memory further comprises instructions executable by the processor for:
generating at least one record based on personal information of the user; and
storing said at least one record in the IVR menu database.

13. The system of claim 10, wherein said IVR menu database comprises voice responses of the user.

14. The system of claim 12, wherein the memory further comprises instructions executable by the processor for displaying a form comprising one or more data request fields to the user for filling the personal information to be stored in said IVR menu database.

15. The system of claim 10, wherein said at least one visual IVR menu is displayed based on the time of dialing said telephone number by the user.

16. A system for enhancing user interaction with a plurality of destinations comprising Interactive Voice Response (IVR) menu systems, the system comprising:
(a) a processor; and
(b) a memory coupled to the processor, the memory comprising:
(i) an IVR menu database comprising a list of telephone numbers associated with the plurality of destinations and the associated visual IVR menu for each destination;
(ii) instructions executable by the processor for selecting at least one visual IVR menu from said IVR menu database and displaying said at least one visual IVR menu to a user, wherein said at least one visual IVR menu is associated with a telephone number dialed by the user from the list of telephone numbers, further wherein said visual IVR menu was downloaded and stored in a user device before establishing a phone connection to said at least one IVR destination; and
(iii) instructions executable by the processor for selecting and displaying at least one advertisement, wherein said at least one advertisement is selected based on at least one category associated with said at least one visual IVR menu.

17. The system of claim 16, wherein said IVR menu database comprises at least two records associated with at least two distinct destinations, each of said at least two records comprises a business category field, wherein each of said at least two records have the same business category, further wherein said IVR menu database comprises a standard menu for said same business category.

18. The system of claim 16, wherein the memory further comprises instructions executable by the processor for:
generating at least one record based on personal information of the user; and
storing said at least one record in the IVR menu database.

19. The system of claim 16, wherein the memory further comprises instructions executable by the processor for activating voice response for the user.

20. The system of claim 18, wherein the memory further comprises instructions executable by the processor for displaying a form comprising one or more data request fields to the user for filling the personal information to be stored in said IVR menu database.

\* \* \* \* \*